US008307109B2

(12) United States Patent
Mamou et al.

(10) Patent No.: US 8,307,109 B2
(45) Date of Patent: Nov. 6, 2012

(54) METHODS AND SYSTEMS FOR REAL TIME INTEGRATION SERVICES

(75) Inventors: Jean-Claude Mamou, Millbury, MA (US); Thomas Cherel, Saint-Eustache (FR); Brian Tinnel, North Grafton, MA (US); Christophe Toum, Carrieres sous Poissy (FR); Cassio Dos Santos, Boston, MA (US); David T. Meeks, Ashland, MA (US); Lee Scheffler, West Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 1102 days.

(21) Appl. No.: 10/925,897

(22) Filed: Aug. 24, 2004

(65) Prior Publication Data

US 2005/0086360 A1    Apr. 21, 2005

Related U.S. Application Data

(60) Provisional application No. 60/498,531, filed on Aug. 27, 2003.

(51) Int. Cl.
*G06F 15/16* (2006.01)
(52) U.S. Cl. ........................................ 709/232; 709/203
(58) Field of Classification Search ................... 709/232, 709/203
See application file for complete search history.

(56) References Cited

U.S. PATENT DOCUMENTS

| | | | | |
|---|---|---|---|---|
| 4,561,092 A | * | 12/1985 | Shaver | 370/448 |
| 5,191,326 A | * | 3/1993 | Montgomery | 340/855.5 |
| 5,291,492 A | * | 3/1994 | Andrews et al. | 370/259 |
| 5,524,253 A | | 6/1996 | Pham et al. | |
| 5,727,158 A | | 3/1998 | Bouziane et al. | |
| 5,842,213 A | | 11/1998 | Odom et al. | |
| 5,901,327 A | * | 5/1999 | Ofek | 710/5 |
| 5,909,681 A | | 6/1999 | Passera et al. | |
| 5,995,980 A | | 11/1999 | Olson et al. | |
| 6,029,178 A | | 2/2000 | Martin et al. | |
| 6,052,691 A | | 4/2000 | Ardoin et al. | |
| 6,094,688 A | | 7/2000 | Mellen-Garnett et al. | |
| 6,108,635 A | * | 8/2000 | Herren et al. | 705/2 |

(Continued)

FOREIGN PATENT DOCUMENTS

EP    0520459 A2    12/1992

(Continued)

OTHER PUBLICATIONS

Ascential Software: "DataStage Product Family Architectural Overview" Internet Documentation, 'Online! Jan. 2, 2002, pp. 1-34, URL:http://h71028.www7.hp.com/enterprise/downloads/DataStage%20Product%20Family%20Architectural%20Overview%20Whitepaper.pdf>.

(Continued)

*Primary Examiner* — Krista Zele
*Assistant Examiner* — Tariq Najee-Ullah
(74) *Attorney, Agent, or Firm* — Yee & Associates, P.C.; Douglas Lefeve

(57) ABSTRACT

Methods and systems for enterprise data integration are described. The methods and systems take elements of a data integration process typically operating in a batch-mode, transform the elements in real time, and expose the results as a service that can be accessed by a business enterprise in real time, and optionally also in batch mode. The service can be accessed through a graphical user interface, providing automatic data integration in real time without additional coding. The service can also operate with mobile devices.

53 Claims, 106 Drawing Sheets

U.S. PATENT DOCUMENTS

| | | |
|---|---|---|
| 6,192,390 B1 | 2/2001 | Berger et al. |
| 6,208,345 B1 | 3/2001 | Sheard et al. |
| 6,230,117 B1 | 5/2001 | Lymer et al. |
| 6,272,449 B1 | 8/2001 | Passera |
| 6,289,474 B1 | 9/2001 | Beckerle |
| 6,292,932 B1 | 9/2001 | Baisley et al. |
| 6,311,265 B1 | 10/2001 | Beckerle et al. |
| 6,321,240 B1 | 11/2001 | Chilimbi et al. |
| 6,330,008 B1 | 12/2001 | Razdow et al. |
| 6,330,556 B1 | 12/2001 | Chilimbi et al. |
| 6,347,310 B1 | 2/2002 | Passera |
| 6,370,573 B1 | 4/2002 | Bowman-Amuah |
| 6,415,286 B1 | 7/2002 | Passera et al. |
| 6,453,464 B1 | 9/2002 | Sullivan |
| 6,536,037 B1 | 3/2003 | Guheen et al. |
| 6,542,908 B1 | 4/2003 | Ims |
| 6,553,563 B2 | 4/2003 | Ambrose et al. |
| 6,564,251 B2 | 5/2003 | Katariya et al. |
| 6,604,110 B1 | 8/2003 | Savage et al. |
| 6,625,651 B1* | 9/2003 | Swartz et al. ............... 709/226 |
| 6,684,207 B1 | 1/2004 | Greenfield et al. |
| 6,715,075 B1* | 3/2004 | Loukianov ............... 713/176 |
| 6,721,713 B1 | 4/2004 | Guheen et al. |
| 6,738,975 B1 | 5/2004 | Yee et al. |
| 6,757,689 B2 | 6/2004 | Battas et al. |
| 6,763,353 B2 | 7/2004 | Li et al. |
| 6,782,403 B1 | 8/2004 | Kino et al. |
| 6,789,096 B2* | 9/2004 | Sankaran et al. ............ 707/203 |
| 6,865,582 B2 | 3/2005 | Obradovic et al. |
| 6,920,474 B2 | 7/2005 | Walsh et al. |
| 6,922,685 B2 | 7/2005 | Greene et al. |
| 6,937,983 B2 | 8/2005 | Romero |
| 6,938,053 B2 | 8/2005 | Jaro |
| 6,985,939 B2 | 1/2006 | Fletcher et al. |
| 7,003,526 B1 | 2/2006 | Lee et al. |
| 7,003,560 B1 | 2/2006 | Mullen et al. |
| 7,080,092 B2 | 7/2006 | Upton |
| 7,117,208 B2* | 10/2006 | Tamayo et al. ............... 707/6 |
| 7,117,215 B1 | 10/2006 | Kanchwalla et al. |
| 7,120,897 B2 | 10/2006 | Ebbo et al. |
| 7,124,413 B1 | 10/2006 | Klemm et al. |
| 7,131,110 B2 | 10/2006 | Brewin |
| 7,139,199 B2 | 11/2006 | Srinivasan et al. |
| 7,139,999 B2 | 11/2006 | Bowman-Amuah |
| 7,143,112 B2 | 11/2006 | Yagawa |
| 7,146,606 B2 | 12/2006 | Mitchell et al. |
| 7,174,534 B2 | 2/2007 | Chong et al. |
| 7,181,731 B2 | 2/2007 | Pace et al. |
| 7,200,569 B2 | 4/2007 | Gallagher et al. |
| 7,206,789 B2 | 4/2007 | Hurmiz et al. |
| 7,212,233 B2 | 5/2007 | Nakamura |
| 7,213,037 B2 | 5/2007 | Rangadass |
| 7,257,820 B2 | 8/2007 | Fischer et al. |
| 7,260,623 B2 | 8/2007 | Wookey et al. |
| 7,343,428 B2 | 3/2008 | Fletcher et al. |
| 7,366,990 B2 | 4/2008 | Pitroda |
| 7,382,479 B2 | 6/2008 | Hirose et al. |
| 7,392,255 B1 | 6/2008 | Sholtis et al. |
| 7,392,320 B2 | 6/2008 | Bookman et al. |
| 7,395,540 B2 | 7/2008 | Rogers |
| 7,424,702 B1 | 9/2008 | Vinodkrishnan et al. |
| 7,761,406 B2* | 7/2010 | Harken ............... 707/602 |
| 7,814,470 B2* | 10/2010 | Mamou et al. ............... 717/162 |
| 8,060,553 B2* | 11/2011 | Mamou et al. ............... 709/203 |
| 2001/0047326 A1 | 11/2001 | Broadbent et al. |
| 2002/0026630 A1 | 2/2002 | Schmidt et al. |
| 2002/0059172 A1 | 5/2002 | Muhlestein |
| 2002/0062269 A1* | 5/2002 | Kirmani et al. ............... 705/35 |
| 2002/0073059 A1 | 6/2002 | Foster et al. |
| 2002/0097277 A1 | 7/2002 | Pitroda |
| 2002/0103731 A1 | 8/2002 | Barnard et al. |
| 2002/0111819 A1 | 8/2002 | Li et al. |
| 2002/0116362 A1 | 8/2002 | Li et al. |
| 2002/0120535 A1* | 8/2002 | Yu ............... 705/29 |
| 2002/0133387 A1 | 9/2002 | Wilson et al. |
| 2002/0138316 A1* | 9/2002 | Katz et al. ............... 705/7 |
| 2002/0141446 A1* | 10/2002 | Koga ............... 370/468 |
| 2002/0169842 A1 | 11/2002 | Christensen et al. |
| 2002/0174000 A1* | 11/2002 | Katz et al. ............... 705/7 |
| 2002/0178077 A1* | 11/2002 | Katz et al. ............... 705/26 |
| 2002/0194181 A1 | 12/2002 | Wachtel |
| 2002/0198902 A1* | 12/2002 | Sankaran et al. ............... 707/203 |
| 2003/0003872 A1 | 1/2003 | Brinkley et al. |
| 2003/0014372 A1* | 1/2003 | Wheeler et al. ............... 705/71 |
| 2003/0014483 A1 | 1/2003 | Stevenson et al. |
| 2003/0020807 A1 | 1/2003 | Khoshnevis et al. |
| 2003/0033155 A1 | 2/2003 | Peerson et al. |
| 2003/0033179 A1* | 2/2003 | Katz et al. ............... 705/7 |
| 2003/0046307 A1 | 3/2003 | Rivette et al. |
| 2003/0055624 A1 | 3/2003 | Fletcher et al. |
| 2003/0065549 A1 | 4/2003 | Hoffman et al. |
| 2003/0069902 A1 | 4/2003 | Narang et al. |
| 2003/0093582 A1 | 5/2003 | Cruz et al. |
| 2003/0097286 A1 | 5/2003 | Skeen |
| 2003/0101111 A1 | 5/2003 | Dang et al. |
| 2003/0101112 A1 | 5/2003 | Gallagher et al. |
| 2003/0132854 A1 | 7/2003 | Swan et al. |
| 2003/0145096 A1 | 7/2003 | Breiter et al. |
| 2003/0188039 A1 | 10/2003 | Liu et al. |
| 2003/0212738 A1 | 11/2003 | Wookey et al. |
| 2003/0220807 A1 | 11/2003 | Hoffman et al. |
| 2003/0227392 A1 | 12/2003 | Ebert et al. |
| 2003/0233341 A1 | 12/2003 | Taylor et al. |
| 2004/0011276 A1 | 1/2004 | Jackson et al. |
| 2004/0015564 A1* | 1/2004 | Williams ............... 709/219 |
| 2004/0030740 A1 | 2/2004 | Stelting |
| 2004/0034651 A1 | 2/2004 | Gupta et al. |
| 2004/0064428 A1 | 4/2004 | Larkin et al. |
| 2004/0102687 A1* | 5/2004 | Brashears et al. ............... 600/323 |
| 2004/0103051 A1 | 5/2004 | Reed et al. |
| 2004/0111276 A1 | 6/2004 | Inge |
| 2004/0117759 A1 | 6/2004 | Rippert, Jr. et al. |
| 2004/0128394 A1* | 7/2004 | Knauerhase et al. ............... 709/229 |
| 2004/0133876 A1 | 7/2004 | Sproule |
| 2004/0177012 A1 | 9/2004 | Flanagan |
| 2004/0177335 A1 | 9/2004 | Beisiegel et al. |
| 2004/0205129 A1 | 10/2004 | Bongiorni et al. |
| 2004/0205206 A1 | 10/2004 | Naik et al. |
| 2004/0225660 A1 | 11/2004 | Carey et al. |
| 2004/0243453 A1 | 12/2004 | Call et al. |
| 2004/0243458 A1 | 12/2004 | Barkan |
| 2005/0015439 A1 | 1/2005 | Balaji et al. |
| 2005/0021502 A1 | 1/2005 | Chen et al. |
| 2005/0027871 A1* | 2/2005 | Bradley et al. ............... 709/227 |
| 2005/0028158 A1 | 2/2005 | Ferguson et al. |
| 2005/0033588 A1 | 2/2005 | Ruiz et al. |
| 2005/0033603 A1 | 2/2005 | Suzuki et al. |
| 2005/0050058 A1 | 3/2005 | Jain et al. |
| 2005/0086178 A1* | 4/2005 | Xie et al. ............... 705/80 |
| 2005/0086197 A1 | 4/2005 | Boubez et al. |
| 2005/0091174 A1 | 4/2005 | Akkiraju et al. |
| 2005/0103051 A1 | 5/2005 | Jacquin |
| 2005/0108658 A1 | 5/2005 | Lortie |
| 2005/0114152 A1 | 5/2005 | Lopez et al. |
| 2005/0114829 A1 | 5/2005 | Robin et al. |
| 2005/0144114 A1 | 6/2005 | Ruggieri et al. |
| 2005/0144557 A1 | 6/2005 | Li et al. |
| 2005/0149484 A1 | 7/2005 | Fox et al. |
| 2005/0154627 A1 | 7/2005 | Zuzek et al. |
| 2005/0160104 A1 | 7/2005 | Meera et al. |
| 2005/0222931 A1 | 10/2005 | Mamou et al. |
| 2005/0223109 A1 | 10/2005 | Mamou et al. |
| 2005/0223392 A1 | 10/2005 | Cox et al. |
| 2005/0228808 A1 | 10/2005 | Mamou et al. |
| 2005/0232046 A1 | 10/2005 | Mamou et al. |
| 2005/0234969 A1 | 10/2005 | Mamou et al. |
| 2005/0235103 A1* | 10/2005 | Saliba et al. ............... 711/111 |
| 2005/0235274 A1 | 10/2005 | Mamou et al. |
| 2005/0240354 A1 | 10/2005 | Mamou et al. |
| 2005/0240592 A1 | 10/2005 | Mamou et al. |
| 2005/0243604 A1* | 11/2005 | Harken et al. ............... 365/185.22 |
| 2005/0251501 A1 | 11/2005 | Phillips et al. |
| 2005/0251533 A1 | 11/2005 | Harken et al. |
| 2005/0256892 A1 | 11/2005 | Harken |
| 2005/0257196 A1 | 11/2005 | Hollander et al. |
| 2005/0262188 A1 | 11/2005 | Mamou et al. |
| 2005/0262189 A1 | 11/2005 | Mamou et al. |

| | | | |
|---|---|---|---|
| 2005/0262190 A1 | 11/2005 | Mamou et al. |
| 2005/0262191 A1 | 11/2005 | Mamou et al. |
| 2005/0262192 A1 | 11/2005 | Mamou et al. |
| 2005/0262193 A1 | 11/2005 | Mamou et al. |
| 2005/0262194 A1 | 11/2005 | Mamou et al. |
| 2005/0273462 A1 | 12/2005 | Reed et al. |
| 2005/0286306 A1 | 12/2005 | Srinivasan et al. |
| 2006/0010195 A1 | 1/2006 | Mamou et al. |
| 2006/0020641 A1 | 1/2006 | Walsh et al. |
| 2006/0069717 A1 | 3/2006 | Mamou et al. |
| 2006/0112367 A1 | 5/2006 | Harris |
| 2006/0259542 A1 | 11/2006 | Wu et al. |
| 2007/0094256 A1 | 4/2007 | Hite et al. |
| 2007/0156859 A1 | 7/2007 | Savchenko et al. |
| 2008/0005713 A1 | 1/2008 | Singh et al. |
| 2008/0046506 A1 | 2/2008 | Broda |
| 2008/0077656 A1 | 3/2008 | Broda |
| 2008/0307392 A1 | 12/2008 | Racca et al. |
| 2009/0172024 A1 | 7/2009 | Hsu et al. |

FOREIGN PATENT DOCUMENTS

| | | | |
|---|---|---|---|
| JP | 2002259643 A | 9/2002 |
| JP | 2004102886 A | 4/2004 |
| WO | WO 03/040892 A | 5/2003 |
| WO | 2004054295 A1 | 6/2004 |

OTHER PUBLICATIONS

Blor Research: "Enterprise Integration suite from Ascential Software" Internet Article, 'Online! 2002, pp. 1-28 URL:http://www.ascentialsoftware.it/pdf/BloorReview_AscEnterpriseIntegrationSuite.pdf.

Ascential Software: Ascential Real-Time Integration Services (RTI): Delivering an the Promise of the Right-Time Enterprise, Internet Document, 'Online! URL:http://www.infotechlive.com/whitepapers/RTI%20Services.pdf.

Rubinstein, David: "Integration Suite drops 'E' and 'L'" SDTIMES, 'Online! Jul. 1, 2003 URL:http://www.sdtimes.com/download/images/SDTimes.081.pdf.

Ascential Software: "DataStage: All built on the most scalable and robust architecture available" Internet Document 'Online! Jun. 1, 2003 URL: http://h71028.www7.hp.com/enterprise/downlods/Ascential%20Software%20DataStage%207.0%20Solution%20Brochure.pdf.

Zeigler et al., "Distributed Supply Chain Simulation in a DEVS/COBRA Executive Environment", ACM, 1999, pp. 1333-1340.

David Marco, "Managed Meta Data Environment (MME): A Complete Walkthrough", The Data Administration Newsletter, TDAN.com, Apr. 1, 2004, pp. 1-9, <http://www.tdan.com/view-articles/5185>.

Haas et al., "Data Integration Through Database Federation", IBM Systems Journal, IBM Corporation, Armonk, New York, vol. 41, No. 4, Jan. 1, 2002, pp. 578-596.

Gallagher et al., "A General Purpose Registry//Repository Information Model", Oct. 16, 2000, pp. 1-32, <http://lists.oasis-open.org/archives/regrep/200010/pdf00000.pdfpages>.

"Working Draft 1.1 Dec. 30, 2000", OASIS Registry/Repository Technical Specification, Dec. 12, 2000, <http://xml.Coverpages.org/OasisRegrepSpec11-20001215.pdf>.

Tan et al., "Domain-Specific Metamodels for Heterogeneous Information Systems", Proceedings of the 36$^{th}$ Hawaii International Conference on System Sciences (HICSS'03), retrieved Dec. 23, 2005, pp. 1-10, <http://csd12.computer.org/comp/proceedings/hicss/2003/187490321a.pdf>.

EP Search report for application PCT/US2005030953 dated Apr. 11, 2011.

* cited by examiner

| TOPOLOGY | JOB REUSABILITY | INPUT ARGUMENTS | OUTPUT ARGUMENTS | JOB PARAMETERS |
|---|---|---|---|---|
| NO-RTI | HIGH | NONE OR JOB PARAMETERS IF ANY | NONE | OPTIONALLY AS INPUT PARAMETERS FIXED AT DEPLOYMENT |
| RTI-O | HIGH | NONE OR JOB PARAMETERS IF ANY | ONE OR MORE COLUMNS OF THE RTI OUTPUT STAGE | OPTIONALLY AS INPUT PARAMETERS FIXED AT DEPLOYMENT |
| RTI-IO | LOW | ZERO OR MORE COLUMNS OF THE RTI INPUT STAGE | ONE OR MORE COLUMNS OF THE RTI OUTPUT STAGE | FIXED AT DEPLOYMENT |

METHODS AND SYSTEMS FOR REAL TIME INTEGRATION SERVICES

CROSS-REFERENCE TO OTHER PATENT APPLICATIONS

This application claims the benefit of U.S. provisional Patent Application No. 60/498,531, filed Aug. 27, 2003, the content of which is incorporated herein by reference in its entirety.

BACKGROUND OF THE INVENTION

This invention relates to the field of information technology, and more particularly to the field of enterprise application integration.

With the advent of computer applications, many business processes have become faster and more efficient; however, the proliferation of different computer applications that use different data structures, communication protocols, languages and platforms has also made the information technology infrastructure of the typical business enterprise more complex. Different business processes within the typical enterprise may use different computer applications, each computer application being developed and optimized for the particular business process, rather than for the enterprise as a whole. For example, a business may have one computer application for tracking accounts payable and a different computer application for keeping track of customer contacts. In fact, even the same business process may use more than one computer application, such as when an enterprise keeps a centralized customer contact database, but employees keep their own contact information, such as in a personal information manager.

While specialized computer applications offer the advantages of custom-tailored solutions, the proliferation leads to inefficiencies, such as repetitive entry and handling of the same data many times throughout the enterprise, or the failure of the enterprise to capitalize on data that is associated with one process when the enterprise executes another process that could benefit from that data. For example, if the accounts payable process is separated from the supply chain and ordering process, the enterprise may accept and fill orders from a customer whose credit history would have caused the enterprise to decline the order. Many other examples can be provided where an enterprise would benefit from consistent access to all of its data across varied computer applications.

A number of companies have recognized and addressed the need for integration of data across different applications in the business enterprise. Thus, enterprise application integration, or EAI, is a valuable field of computer application development. As computer applications increase in complexity and number, enterprise application integration efforts encounter many challenges, ranging from the need to handle different protocols, the need to address ever-increasing volumes of data and numbers of transactions, and an ever-increasing appetite for faster integration of data. Conventional approaches to EAI have involved forming and executing data integration jobs. A typical data integration job may include extracting data from one or more sources of data, transforming the data (which might include merging one set of with data from another source), and loading the data into a target. This process of extraction, transformation and loading being sometimes referred to as ETL. Various approaches to EAI have been proposed, including least-common-denominator approaches, atomic approaches, and bridge-type approaches. These approaches typically work in batch mode, extracting large amounts of data from a given application in batch form and supplying it to one or more other applications in a format suitable for those applications. However, a batch mode is typically executed at specified times, so that the data are not available in real time.

Accordingly, a need exists for enterprise application integration methods and systems that can provide data integration in real time, instead of or in addition to batch mode.

SUMMARY

Disclosed herein are, inter alia, methods and systems for enterprise data integration that take elements of a data integration process typically operating in a batch-mode, transform the elements in real time, and expose the results as a service that can be accessed by a business enterprise in real time, and optionally also in batch mode. The service can be accessed through a graphical user interface, providing automatic data integration in real time without additional coding.

According to one aspect of the invention, a method for real time integration of data residing in a plurality of data sources includes processing a request for data from the data sources, receiving data from the data sources, integrating the received data in real time and forming at least one integrated data output configured for at least one data target, and exposing the integrated data of the data target to a user in real time as a service.

According to another aspect of the invention, a data retrieval process for retrieving data from a plurality of data sources in real time includes generating a data request, processing the data request, and based on the request, extracting the data from at least one of the plurality of data sources, integrating the extracted data in real time and forming at least one integrated data output, and exposing the integrated data output in real time as a service.

According to yet another aspect of the invention, an enterprise real time integration platform includes a plurality of data sources, a data integration facility in communication with the plurality of data sources, and a real time integration facility that exposes the data integration platform as a service, processes a data request in real time through the data integration facility, and extracts from at least one of the plurality of data sources data in a format suitable to be read by a device or an application of the enterprise.

Embodiments of the invention may include one or more of the following features. The service may be accessed through a web service protocol. Real time integration of the data may support data integration job instances, whereby a job instance may be capable of supporting a batch topology and/or a real time topology. The job instance may be delivered via a pipeline facility. An end-of-wave marker may be inserted between data integration transactions to separate processing the transactions into distinct units.

The real time integration facility may communicate with one or more additional data source where data is handled or data or other information is stored. A data request may be processed through several processing facilities which may process the data request concurrently. In some instances, data inputs may be received from the data sources intermittently, for example, when using a wireless communication channel.

The data source may include a data warehouse and/or a data retrieval system, or the data may be received from a mobile computing facility, a desktop computing facility, and/or a central computing facility. The data in the data sources may originate from different sources, and one or more of the different sources may be incompatible with the real time integration process or system. One or more of the processing facilities may be located remotely and may include a server.

The service may be published as a web service, for example in a public or private registry, and may be defined by a WSDL description. The service can be bound by multiple access protocols.

The enterprise application that accesses the service can be, for example, a distribution process, a manufacturing process, and/or a financial process. In addition, a client application, which can be downloaded and can run on a mobile computing device, can be attached to the service.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

FIG. 88 represents a window showing mapping of the RTI input stage on a request message;

FIG. 92 shows the window of FIG. 88 for the RTI service of FIG. 91 without an RTI input stage;

FIG. 93 shows a window that allows adjustment the static values of FIG. 90 at deployment time;

FIG. 96 is a table with job reusability, input arguments, output arguments, and job parameters for the job topologies of FIG. 95;

DETAILED DESCRIPTION

Figure 1:
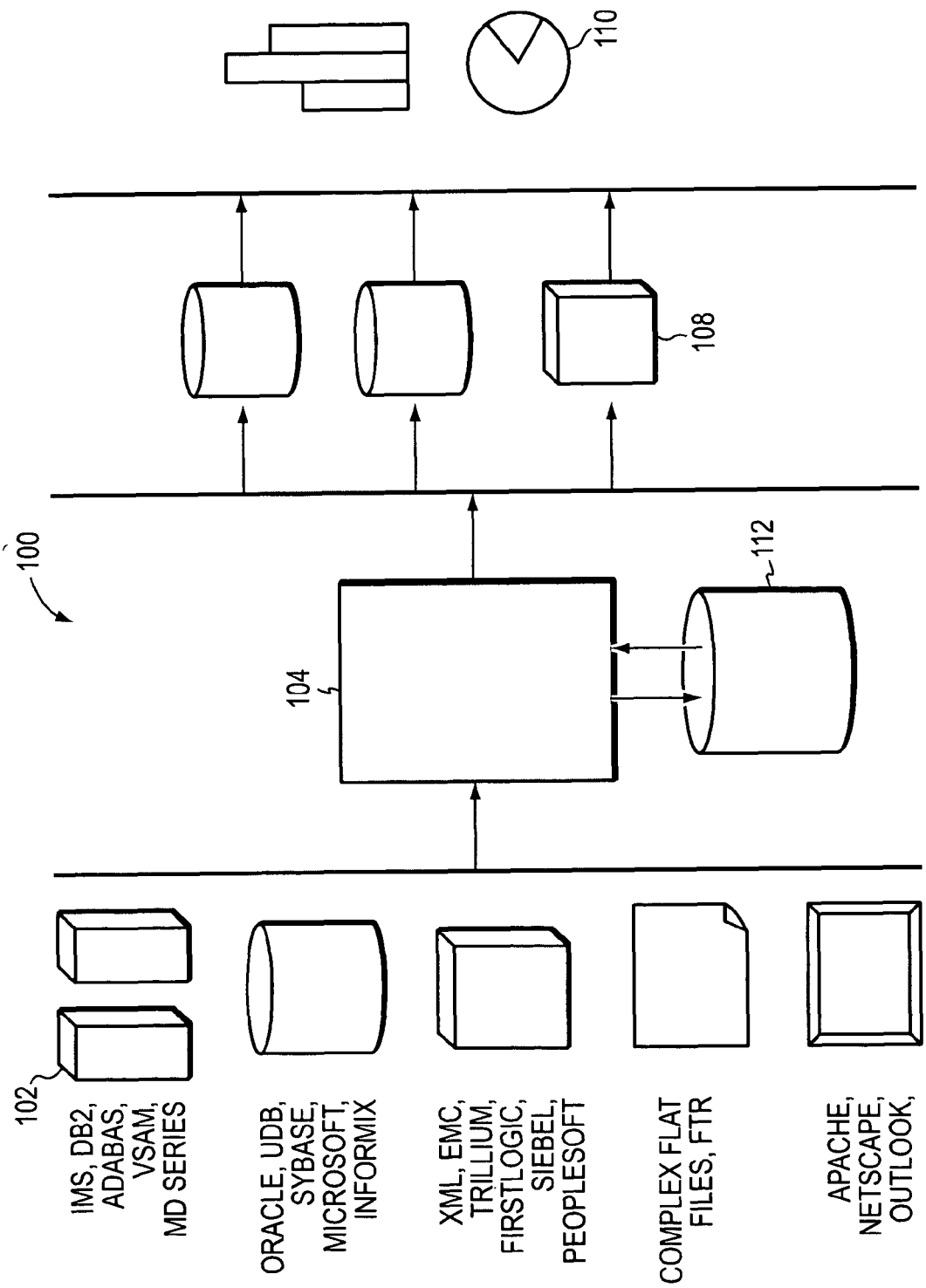
FIG. 1 is a schematic diagram of a business enterprise with a plurality of business processes, each of which may include a plurality of different computer applications and data sources.

The systems and methods described herein are directed, inter alia, to real time integration of data from various sources that often have different formats to allow data retrieval that can be accessed by a user, for example, an enterprise, as a service, preferably a web-based service.

The following terminology will be used throughout the specification:

"Ascential" as used herein shall refer to the software corporation Ascential Software Corporation of Westboro, Mass.

"Data source" or "data target" as used herein, shall include, without limitation, one or more databases or repositories, repository information manager, data facility, data storage facility, data provider, website, web browser, message service, server, client, computer, laptop, PDA phone, mobile phone, computer storage facility, CD, DVD, RAM, ROM, flash memory, memory card, magnetic tape, mobile storage facility, central storage facility, hard disk, multiple coordinating data storage facilities, temporary memory facility, permanent memory facility, locally connected computing facility, remotely connected computing facility, wireless or mobile facility, wired facility, central facility, information platform, analysis facility, processing facility, business enterprise system or other facility where data is handled or other facility provided to store data or other information.

"Real time" as used herein, refers to a period of time that approximates the duration of a business transaction and is meant to include processes or services performed during such business transaction, as opposed operations performed off-line, such as in a batch process. Depending on the duration of the business transaction, real time may range from fractions of seconds to hours, or even days.

"Data Stage" as used herein refers to a data processing or data integration facility where one or more process steps can take place such as, without limitation, collecting, cleansing, transforming, and transmitting data, interfacing with business enterprise software or other software, interfacing with a real time integration (RTI) facility. An RTI facility refers to a facility that performs data integration in real time, as defined above.

One example for a Data Stage is the DataStage™ software offered by Ascential.

"Data Stage Job" as used herein includes data or data processing steps accomplished through a Data Stage.

"Enterprise Java Bean (EJB)" refers to the server-side component architecture for the J2EE platform. EJB supports rapid and simplified development of distributed, transactional, secure and portable Java applications. EJB supports a container architecture that allows concurrent consumption of messages and provide support for distributed transactions, so that database updates, message processing, and connections to enterprise systems using the J2EE architecture can participate in the same transaction context.

"JMS" refers to the Java Message Service, which is an enterprise message service for the Java-based J2EE enterprise architecture.

"JCA" refers to the J2EE Connector Architecture of the J2EE platform described in more detail below.

"Business process," "business logic" and "business transaction" as used herein, refers, without limitation, to methods, services, operations, processes or transactions that can be performed by a business, including, without limitation, sales, marketing, fulfillment, inventory management, pricing, product design, professional services, financial services, administration, finance, underwriting, analysis, contracting, information technology services, data storage, data mining, data processing, data integration, delivery of information, routing of goods, scheduling, communications, investments, offerings, promotions, advertisements, engineering management, manufacturing management, supply chain management, human resources management, work flow administration, software and hardware production, development of new products, research and development tasks, strategical planning, quality control and assurance, packaging, logistics, customer relationship management, handling rebates and returns, customer support, product maintenance, telemarketing, corporate communications, investor relations, and many others.

"Service oriented architecture (SOA)", as used herein, can include services that form part of the infrastructure of a business enterprise. In the SOA, services can become building blocks for application development and deployment, allowing rapid application development and avoiding redundant code. Each service embodies a set of business logic or business rules that can be blind to the surrounding environment, such as the source of the data inputs for the service or the targets for the data outputs of the service.

"Metadata" refers, without limitation, to data that bring context to the data being processed, data about the data, information pertaining to the context of related information, information pertaining to the origin of data, information pertaining to the location of data, information pertaining to the meaning of data, information pertaining to the age of data, information pertaining to the heading of data, information pertaining to the units of data, information pertaining to the field of data, and information pertaining to other information relating to the context of the data.

"WSDL" or "Web Services Description Language" refers, without limitation, to specific formats, such as the XML format, for describing network services, e.g., web services, as a set of endpoints operating on messages containing either document-oriented or procedure-oriented information. The operations and messages are described abstractly, and then bound to a concrete network protocol and message format to define an endpoint.

Related concrete endpoints are combined into abstract endpoints (services). WSDL is extensible to allow description of endpoints and their messages regardless of what message formats or network protocols are used to communicate.

To provide background information and context for real time integration (RTI) processes and systems, integration processes will first be described with reference to FIGS. 1-22. Such processes typically operate in batch mode. Particulars of real time integration (RTI) processes and systems will be described thereafter with reference to FIGS. 23-106.

Referring first to FIG. 1, an exemplary platform 100 for facilitating integration of various data of a business enterprise can include a plurality of data sources 102, which may have different formats that may or may not be compatible with one another, and be centrally located or distributed across different physical locations. For example, a data source may include systems or applications from vendors, such as Oracle, Microsoft, EMC, Trillium, First Logic, Siebel, PeopleSoft, Sybase Inc., for example, IMS, DB2, ADABAS, VSAM, MD Series, UDB, Informix, XML, complex flat files, FTP files, Apache, Netscape, Outlook, as well as other systems or sources that provide data to the business enterprise.

The platform 100 illustrated in FIG. 1 also includes a data integration system 104 that can perform a number of functions to be described in more detail below. The data integration system 104 may, for example, facilitate collection of data from the data sources 102 in response to a query or retrieval command received by the data integration system 104. The data integration system 104 may send commands to one or more of the data sources 102 requesting data to be sent to the data integration system 104. Since the data received may be in multiple formats including varying metadata, the data integration system may reconfigure the received data into a format suitable for integrated processing.

The exemplary platform 100 can also includes one or more retrieval systems 108. The retrieval systems 108 may include databases or processing platforms used to further manipulate the data communicated from the data integration system 104. For example, the data integration system 104 may cleanse, combine, transform or otherwise manipulate the data received from the data sources 102 so that one or more of the retrieval systems 108 can use the processed data to produce reports 110 useful to the business. The reports 110 may be used to report data associations, answer simple or complex queries, or form other reports useful to the business or user.

The platform may also include a database or data base management system 112. The database 112 may be used to store information temporarily or permanently. For example, the data integration system 104 may collect data from one or more data sources 102 and transform the data into forms that are compatible with one another or suitable to be combined with one another. Once the data is transformed, the data integration system 104 may store the data in the database 112 in a decomposed form, combined form or in another form suitable for later retrieval.

Figure 2:
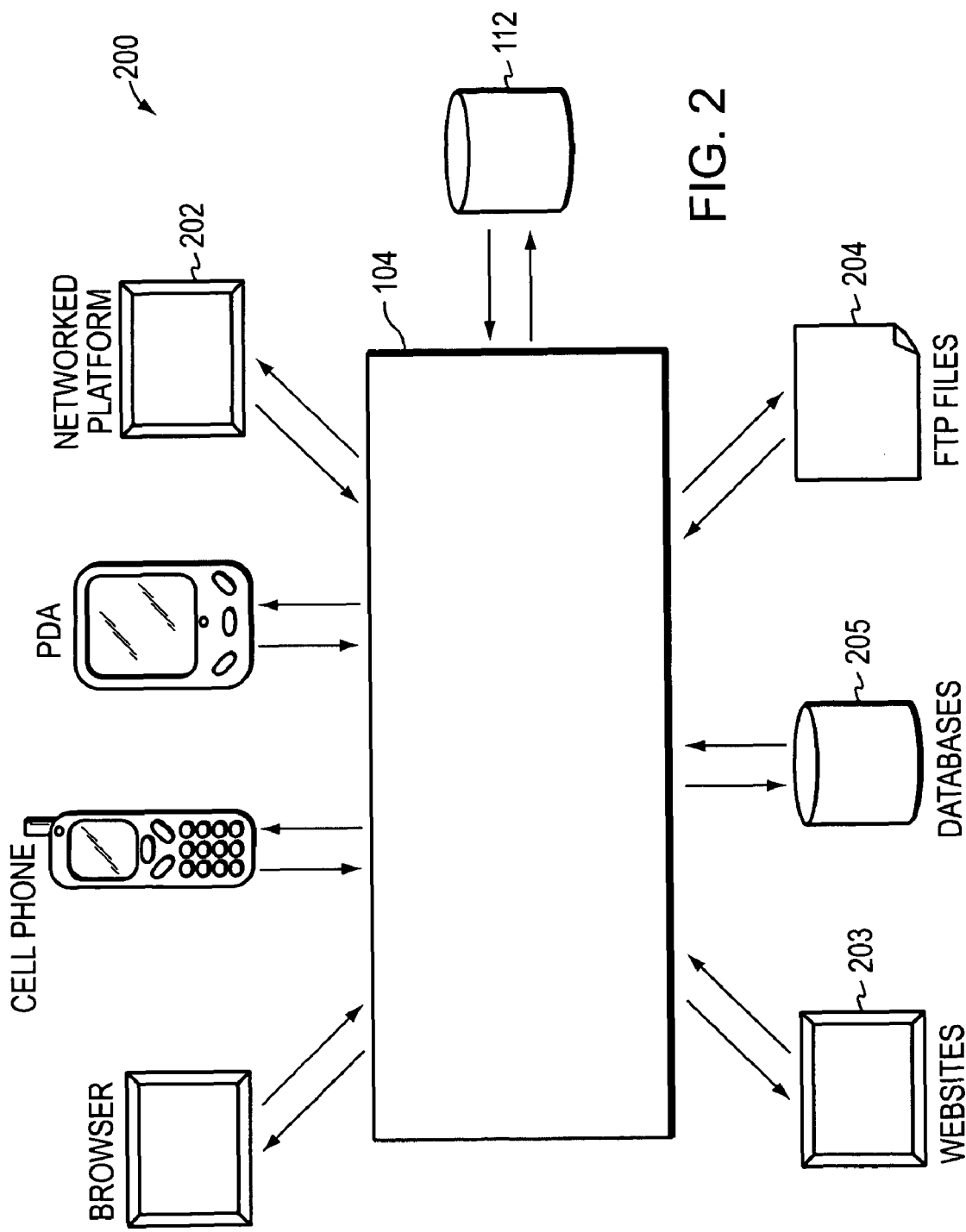
FIG. 2 is a schematic diagram showing data integration across a plurality of business processes of a business enterprise.

FIG. 2 is a schematic diagram 200 showing data integration across a plurality of business processes of a business enterprise. In the illustrated embodiment, the data integration system 104 facilitates the information flowing between user interface systems 202 and data sources 102. The data integration system 104 may receive queries from the user interface systems 202 where the queries necessitate the extraction and possibly transformation of data residing in one or more of the data sources 102. For example, a user may be operating a PDA and request information. The data integration system 104 receiving the request may generate the required queries to access information from a website 203 as well as another data source such as database 205 or an FTP file site 204. The data from the data sources 102 may be extracted and transformed into a format compatible with the PDA and then communicated to the PDA for user viewing and manipulating. In another embodiment, the data may have previously been extracted from the data sources 102 and stored in a separate database 112. The data may have been stored in the database in a transformed state or in their original state. In an embodiment, the data can be stored in a transformed state that would allow a later combination of the data from the several sources in another transformation process. For example, a query from the PDA may be transmitted to the data integration system 104 prompting the data integration system 104 to extract the information from the database 112. Following data extraction, the data integration system 104 may transform the data into a combined format compatible with the PDA before sending to the PDA.

Figure 3:
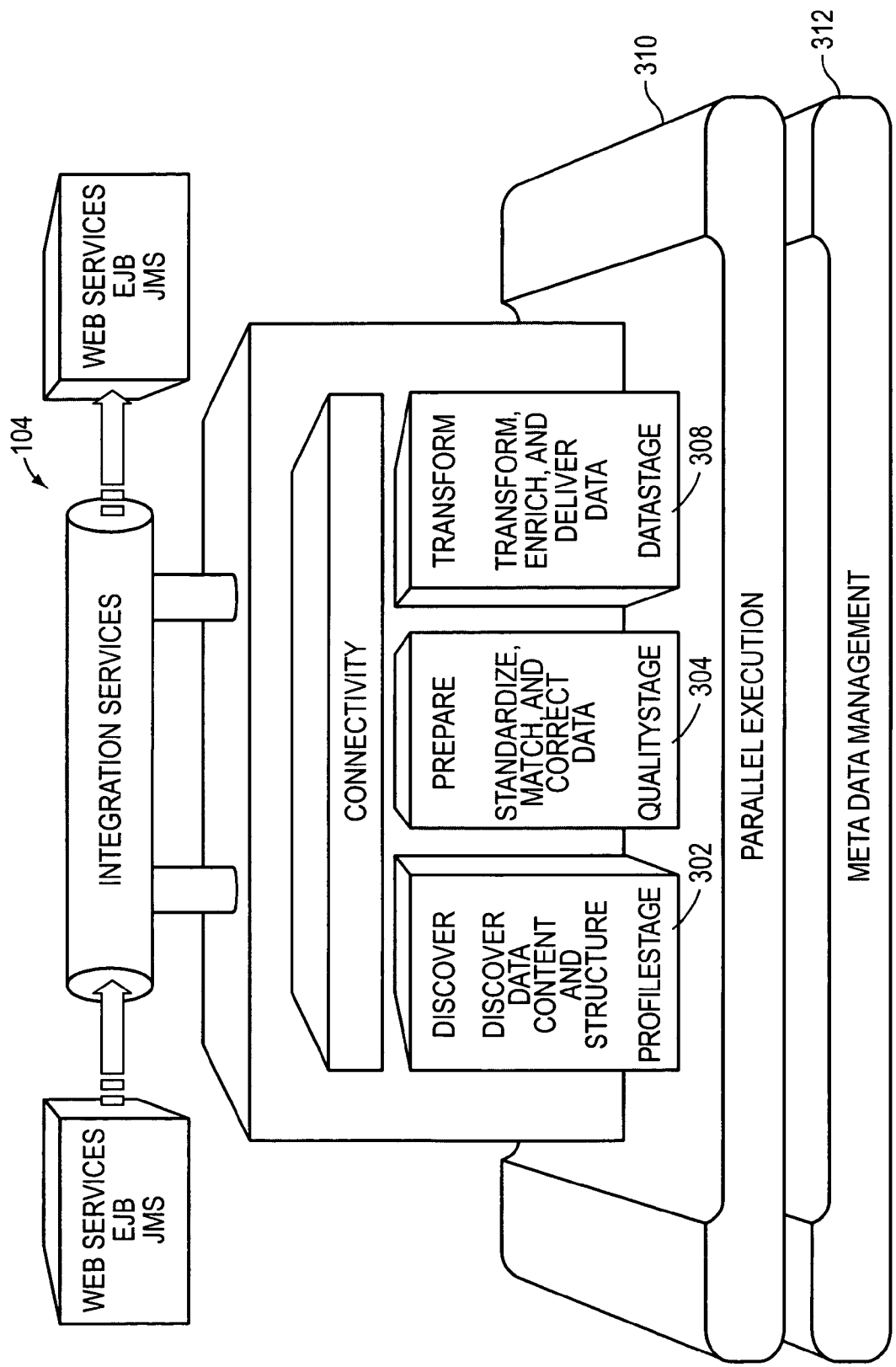
FIG. 3 is a schematic diagram showing an architecture for providing data integration for a plurality of data sources for a business enterprise.

FIG. 3 is a schematic diagram showing an architecture for integrating data from a plurality of data sources for a business enterprise. One embodiment of a data integration system 104 may include a discover data stage 302 to extract, optionally in conjunction with other processes, data from a data source. The data integration system 104 may also include a data preparation stage 304 where the data is prepared, standardized, matched, or otherwise manipulated to produce quality data suitable for subsequent transformation. The data integration system may also include a data transformation system 308 that transforms, enriches and delivers transformed data. The several stages 302, 304, 308 may be executed in a parallel, as indicated by reference numeral 310, or serially or in a combination thereof so as to optimize the performance of the system. The data integration system 104 may also include a metadata management system 312 that can enhance the level of integrity of the extracted and transformed data.

Figure 4:
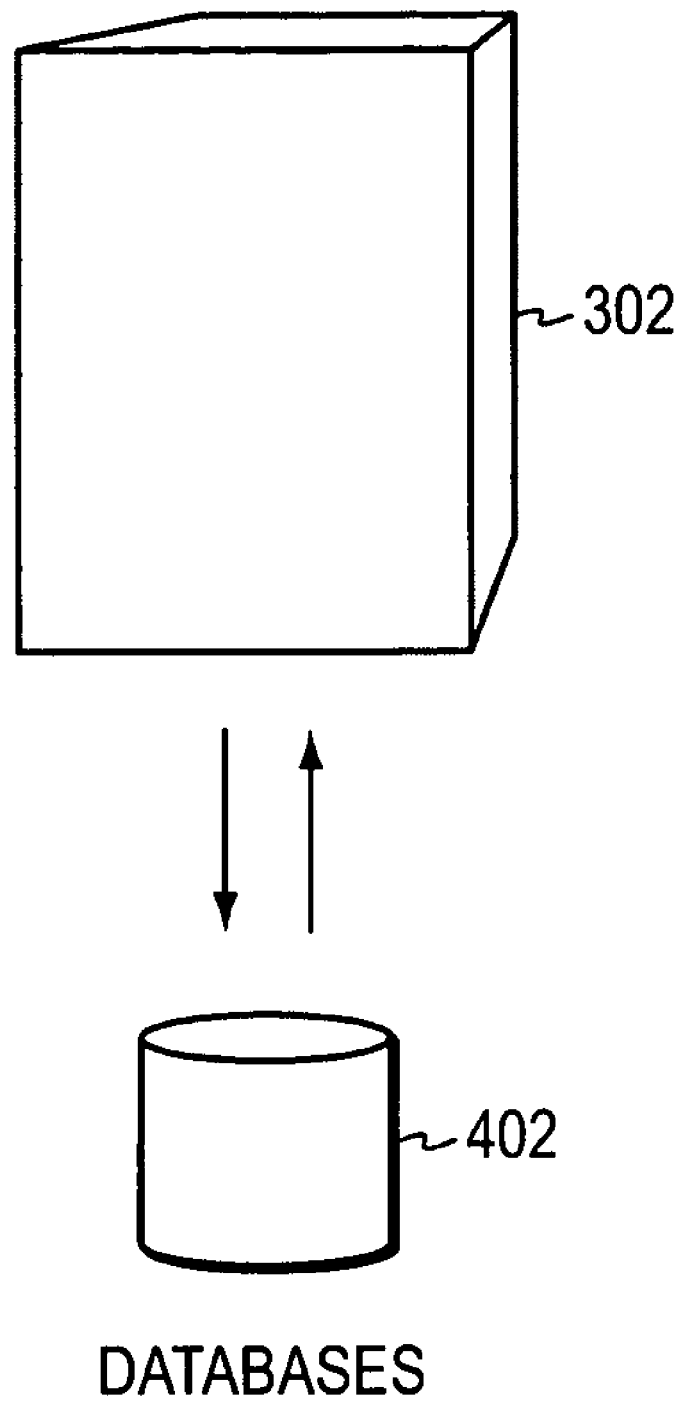
FIG. 4 is a schematic diagram showing details of a discovery facility for a data integration job.

FIG. 4 is schematic diagram showing the discovery facility 302 querying a data source, such as a database 402, to extract data. The discovery facility 302 can query more than one database 402. The database 402 then provides the extracted data to the discovery facility 302 for communication to the other components of the data integration system 104. The data integration system 104 can cleanse and consolidate the data into a central database or a repository information manager.

Figure 5:
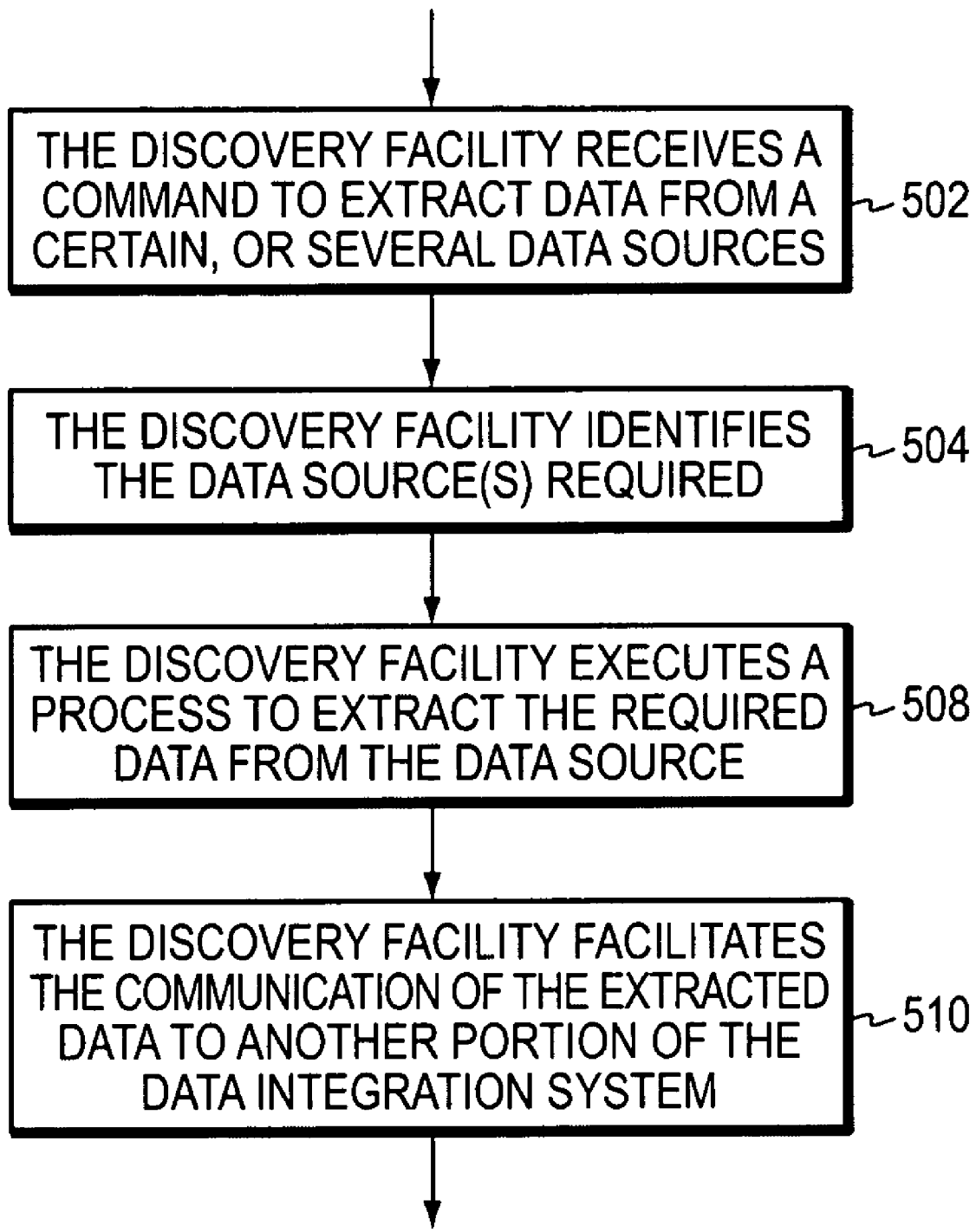
FIG. 5 is a flow diagram showing steps for accomplishing a discover step for a data integration process.

FIG. 5 is a flow diagram of a data integration process performed by the discovery facility 302. In a first process step 502, the discovery facility receives a command to extract data from one or more data sources. Following the receipt of an extraction command, the discovery facility may identify the appropriate data sources(s) where the data to be extracted resides, step 504. The data source(s) may or may not be identified in the command. If the data source(s) is identified, the discover facility may query the identified data source(s). In the event a data source(s) is not identified in the command, the discovery facility may determine the data source from the type of data requested from the data extraction command or from another piece of information in the command. Alternatively, the data source may also be determined from an association of the data with other required data. For example, the query may be for a customer address and a first portion of the customer address data may reside in a first database while a second portion resides in a second database. The discovery facility may process the extraction command and direct its extraction activities to the two databases without further instructions in the command. Once the data source(s) is identified, the data facility may execute a process to extract the data, step 508. Once the data has been extracted, the discovery facility may facilitate communication of the data to another portion of the data integration system, step 510.

Figure 6:
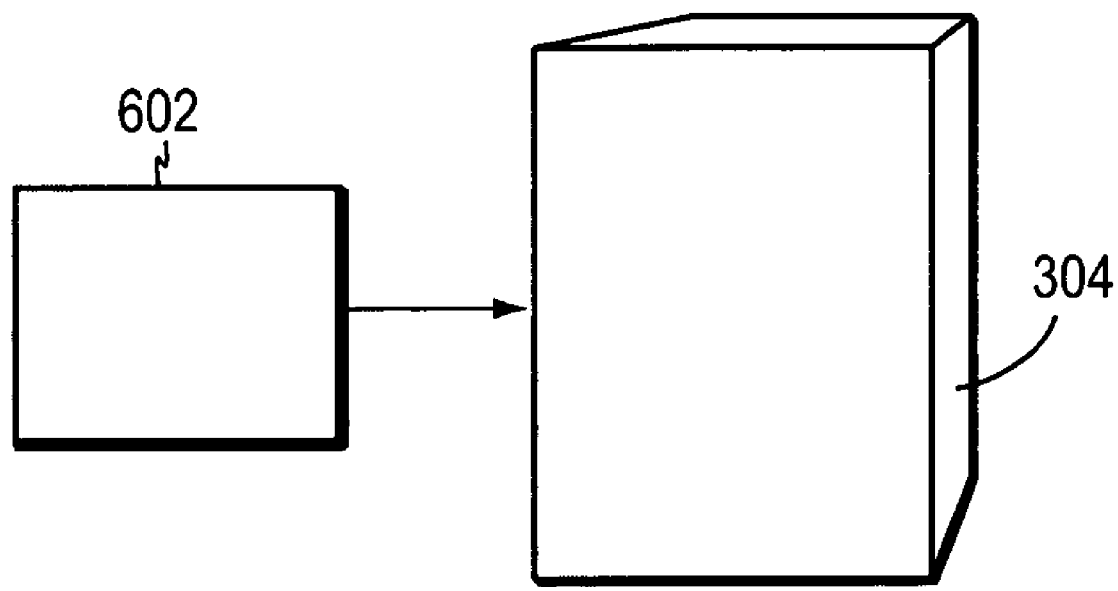
FIG. 6 is a schematic diagram showing a cleansing facility for a data integration process.

FIG. 6 is a schematic diagram showing a preparation or cleansing facility 304 for a data integration process. Generally, data received from several data sources may have inaccuracies which, if left unchecked and uncorrected, could cause errors in the interpretation of the data ultimately produced by the data integration system. Company mergers and acquisitions or other consolidation of data sources can further compound the data quality issue by introducing new acronyms, new methods for calculating fields, etc. One embodiment illustrated in FIG. 6 shows a cleansing facility 304 receiving data from one or more data sources 602, which may have inconsistencies or inaccuracies. The cleansing facility 304 may provide for automated, semi-automated, or manual facilities for screening, correcting and or cleaning the data form data source(s) 602. Once the data passes through the cleansing facility 304 it may be communicated to another portion of the data integration system 104.

Figure 7:
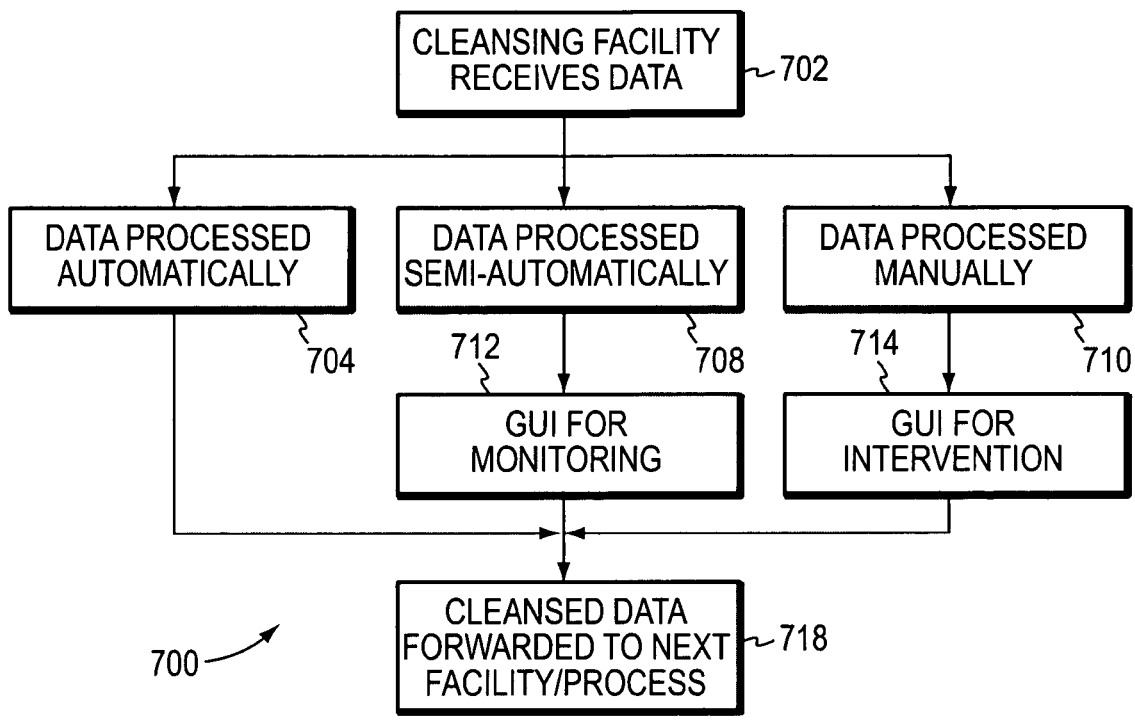
FIG. 7 is a flow diagram showing steps for a cleansing process for a data integration process.

FIG. 7 is a flow diagram showing steps for a cleansing process 700 for a data integration process. In the depicted embodiment, the cleaning process may include a step 702 for receiving data from one or more data sources (e.g. through a discovery facility 302). The process may include several different methods 704, 708, 710 for cleaning the data. For example, the process may include a step 704 for automatically cleaning the data. The process may include a step 708 for semi-automatically cleaning the data. The process may include a step 710 for manually cleaning the data. The process may also include processing via a graphical user interface, step 714. The step 704 for automatically correcting or cleaning the data or a portion of the data may involve process steps, for example, automatic spelling correction, comparing data, comparing timeliness of the data, condition of the data, or other steps of comparison or correction. The step 708 for semi-automatically cleansing data may include user interaction with some of the process steps while the system automatically performs other assigned cleaning tasks. The semi-automated system may include processing via a graphical user interface, step 712. The process may also include manually correcting the data, step 710, which may also include a user interface allowing manual correction, consolidation and/or cleaning of the data. The cleansed data from the cleansing processes may be transmitted to another facility in the data integration system 104, e.g. the transformation facility 308, step 718.

Figure 8:
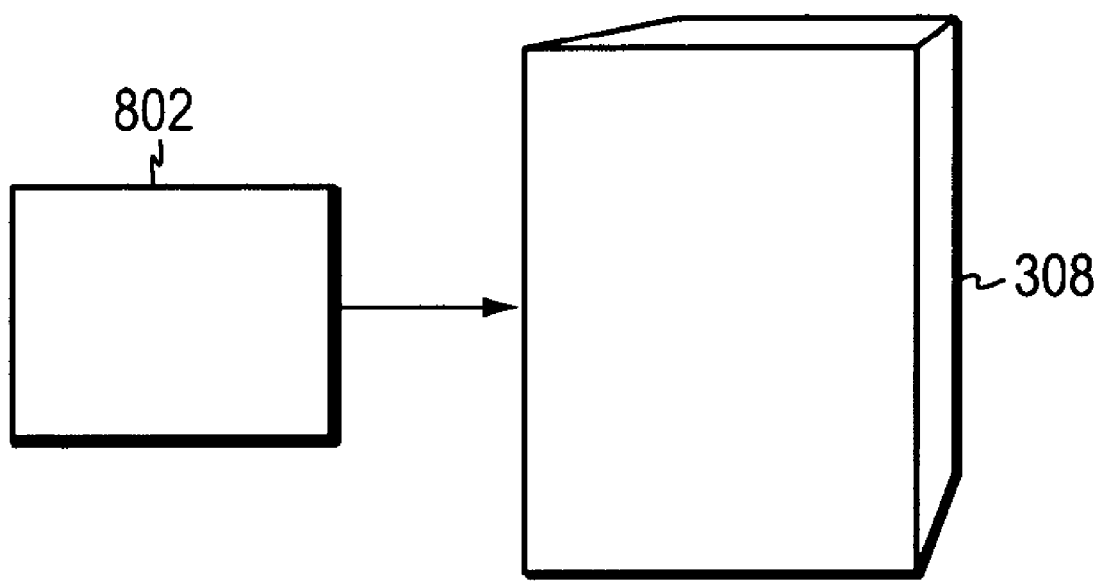
FIG. 8 is a schematic diagram showing a transformation facility for a data integration process.

FIG. 8 is a schematic diagram showing a transformation facility 308 that, in one embodiment, can receive cleansed data 802 from a cleansing facility and perform transformation processes, enrich the data and deliver the data to another process in the data integration system, or from the data integration system to another facility where the integrated data may be viewed, used, further transformed or otherwise manipulated, for example, for mining the data or generating reports useful to a user or business.

Figure 9:
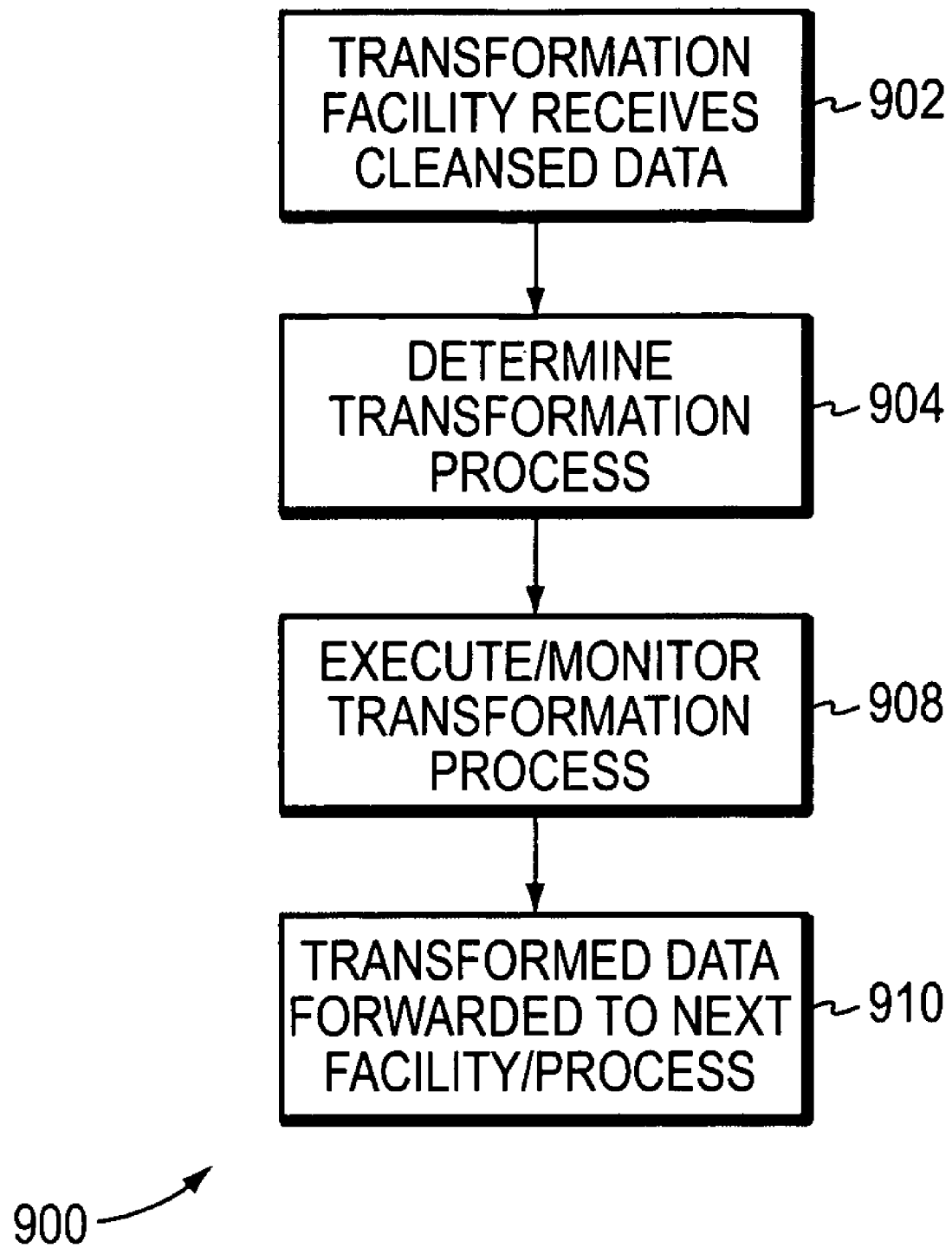
FIG. 9 is a flow diagram showing steps for a transformation process as part of a data integration process.

FIG. 9 is a flow diagram showing steps for a transforming data as part of a data integration process. In an embodiment, the transformation process 900 may include a step for receiving cleansed data, e.g. from a cleaning facility 308, step 902. In step 904, the type of desired transformation may be determined. The transformation is then executed in step 908. The transformed data may thereafter be transmitted to another facility, step 910.

Figure 10:
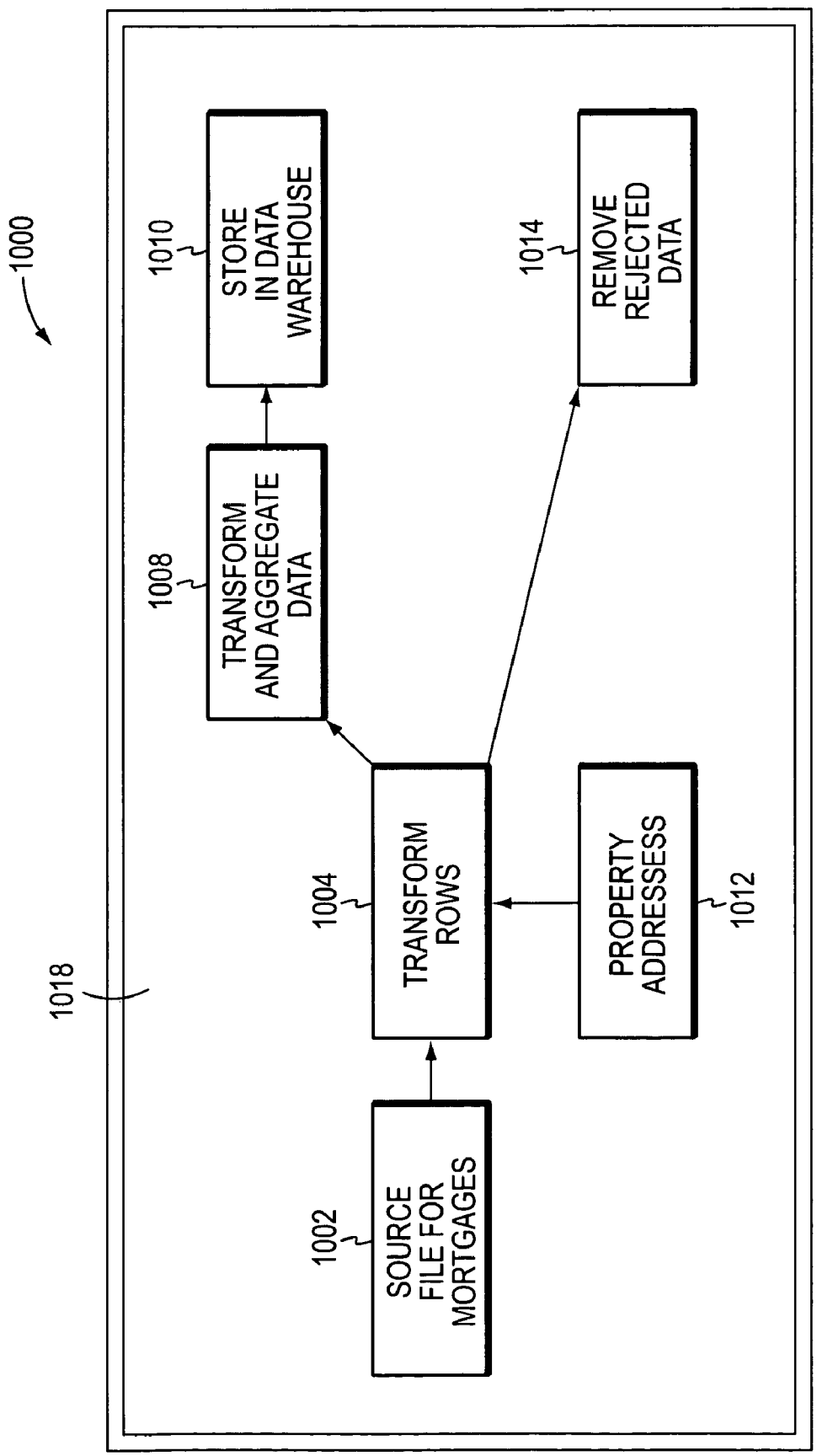
FIG. 10 is a flow diagram showing the steps of a transformation process for an example process.

FIG. 10 shows in the form of a block diagram an exemplary transformation process 1000 displayed on a graphical user interface 1018. For example, a business enterprise may want to generate a report relating to mortgages. The mortgage balance information may reside in a database 1002 while personal information about the borrower and the address of the property information may reside in another database 1012. With the help of the graphical user interface 1018, the user may select representations of the two databases 1002 and 1012 and a row transformation process 1004 in preparation for combining the rows. The user may with a mouse click direct data to flow from the database(s) to the row transformation process 1004. Any unmatched files may be removed and sent to storage 1014. The remaining matching files may be sent through another transformation and aggregation process 1008 to form an aggregate data set, which can be sent to a storage facility 1010.

Figure 11:
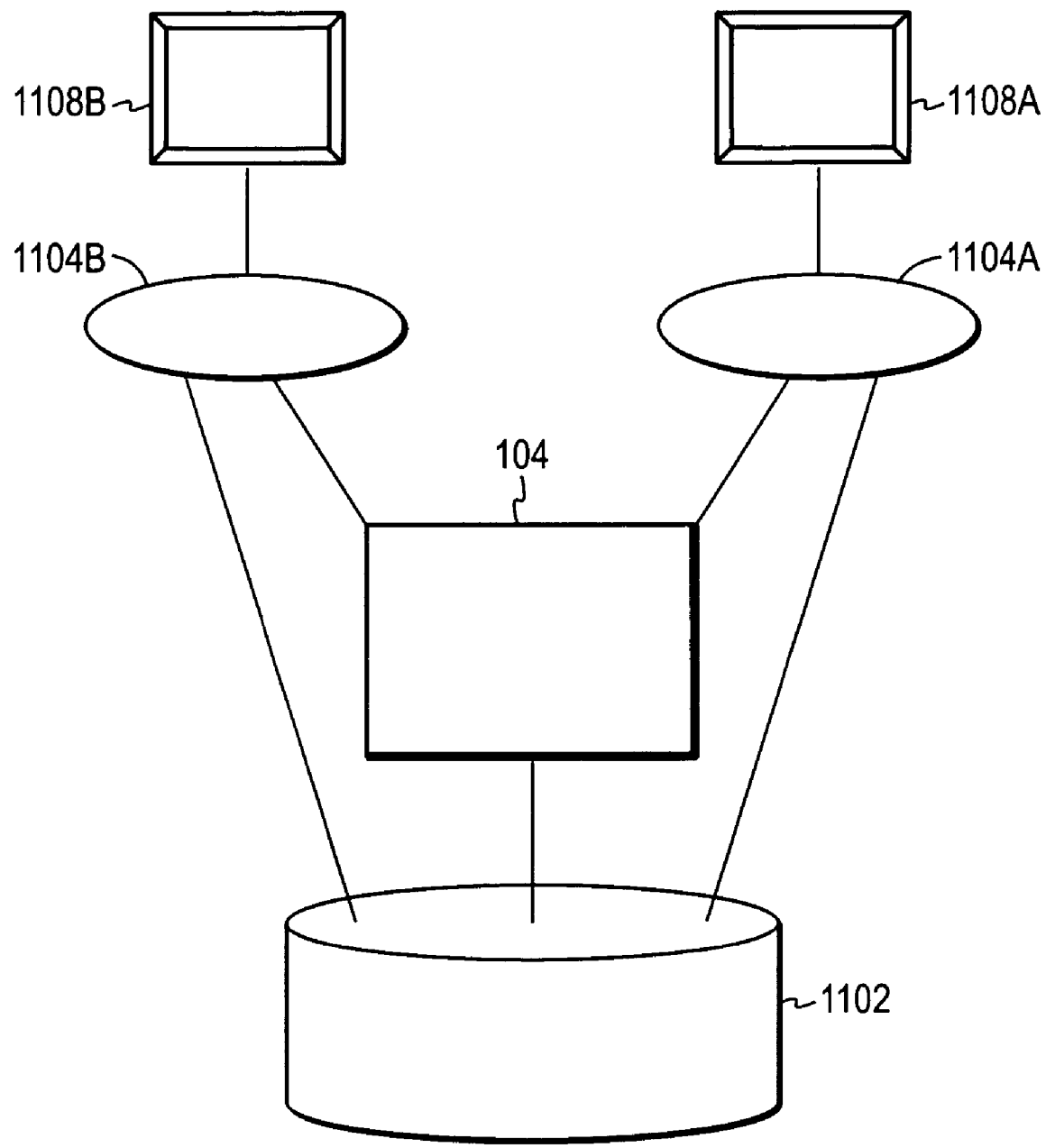
FIG. 11 is a schematic diagram showing a plurality of connection facilities for connecting a data integration process to other processes of a business enterprise.

FIG. 11 is a schematic diagram showing a plurality of connection facilities for connecting a data integration process to other processes of a business enterprise. In the depicted exemplary embodiment, the data integration system 104 may be associated with an integrated storage facility 1102. The integrated storage facility 1102 may contain data that has been extracted from several data sources and processed through the data integration system 104. The integrated data may be stored in a form that permits one or more computing platforms 1108A and 1108B to retrieve data from the integrated data storage facility 1102. The computing platforms 1108A and 1108B may request data from the integrated data facility 1102 through corresponding translation engines 1104A and 1104B. In one embodiment, each of the computing platforms 1108A and 1108B may be associated with a separate translation engine 1104A and 1104B. In another embodiment, the translation engines 1104A and 1104B may be associated with the data integration system 104. The translation engine 1104A and 1104B may be adapted to translate the integrated data from the storage facility 1102 into a form compatible with the associated computing platform 1108A and 1108B. This association may also be used to update the translation engines 1104A and 1104B with required information. The process may also handle metadata which will be further described below.

Figure 12:
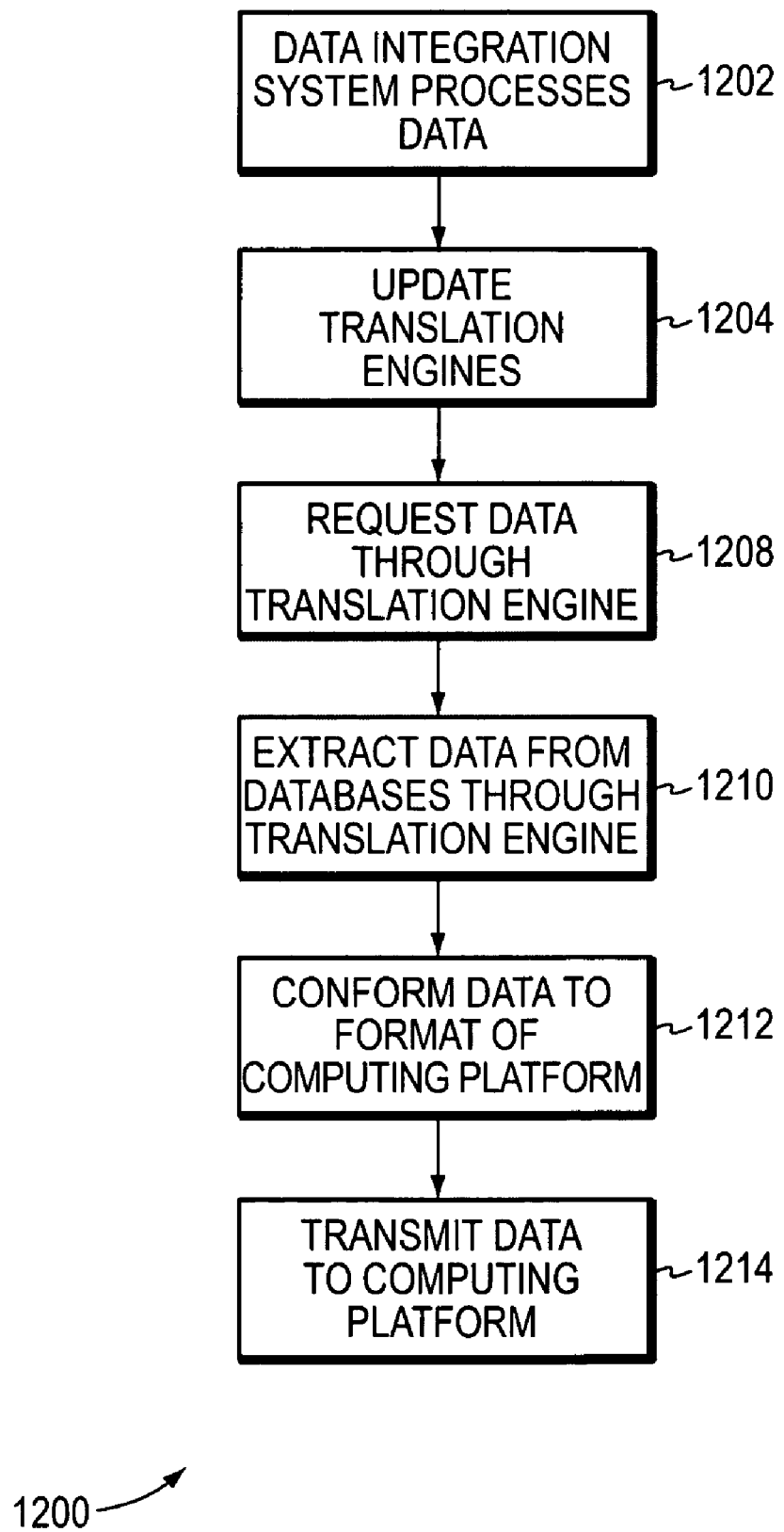
FIG. 12 is a flow diagram showing steps for connecting a data integration process to other processes of a business enterprise.

FIG. 12 is a flow diagram of a process 1200 for connecting a data integration process to other processes of a business enterprise. In one embodiment, the process 1200 may include where storing data processed by the data integration system in a central storage facility step 1202. The data integration system may also update one or more translation engines in step 1204, which can be done serially or in parallel. The process may involve a step 1208 where a computing platform generates a data request and the data request is sent to an associated translation engine, which extracts data from the storage facility, step 1210. The translation engine may also translate the data into a form compatible with the computing platform, step 1212, with the data may subsequently being communicated to the computing platform, step 1214.

Figure 13:
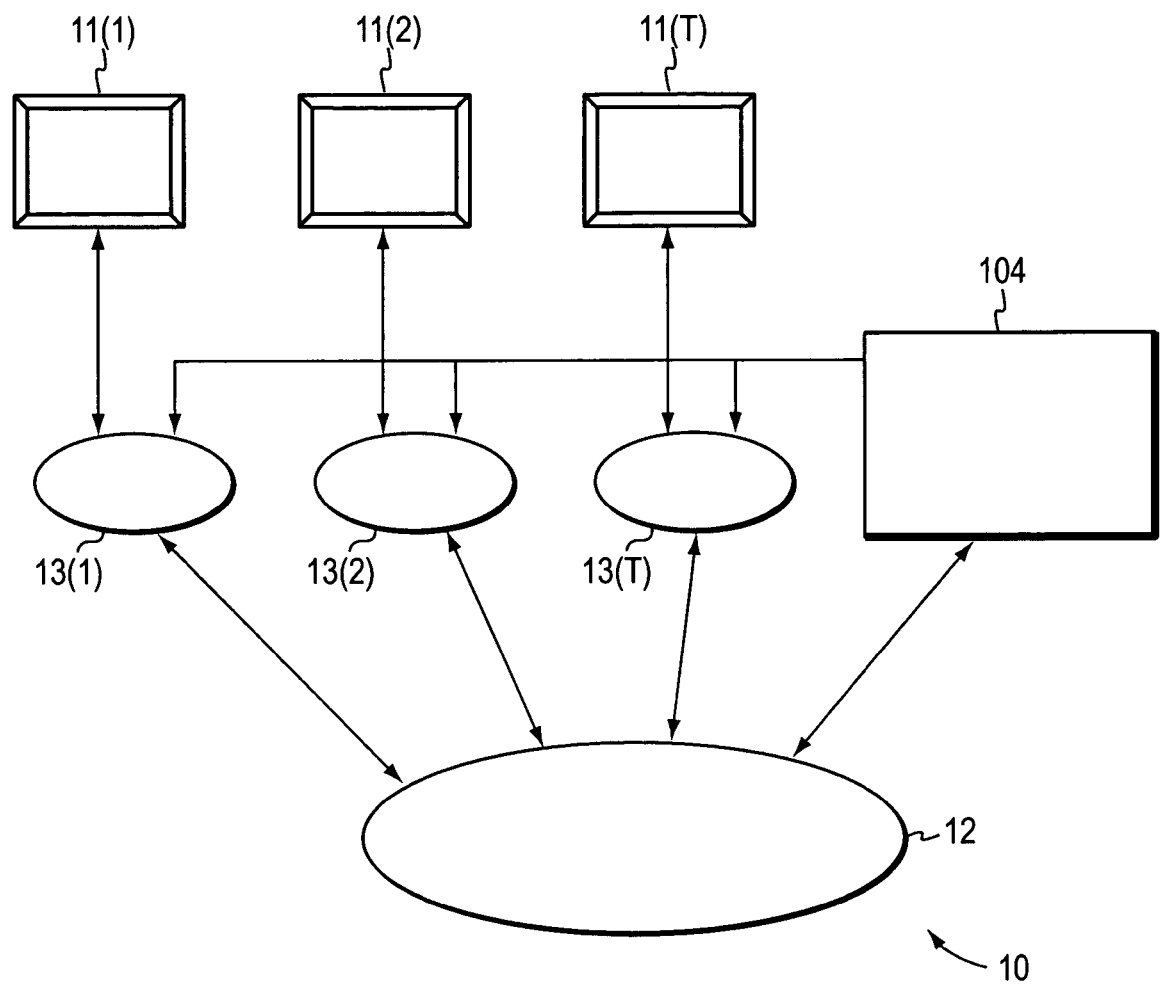
FIG. 13 is a functional block diagram of an enterprise computing system with an information repository.

FIG. 13 is a functional block diagram of an enterprise computing system 10 which includes an information repository. FIG. 13 shows the enterprise computing system 10 as including a plurality of "tools" 11($t$) ($t=1, \ldots, T$), which access a common data structure 12 referred to as a Repository Information Manager ("RIM") 12, through respective translation engines 13($t$) ($t=1, \ldots, T$). The tools 11($t$) can include diverse types of database management systems and other applications programs which access shared data stored in the RIM 12. The database management systems and application programs generally include computer programs which are executed in a conventional manner by a digital computer system. In addition, in one embodiment the translation engines 13($t$) may include computer programs executed by digital computer systems, which may be the same digital computer system on which the respective tools 11($t$) are executed. The RIM 12 can also be maintained on a digital computer system. It will be understood that the tools 11($t$), the RIM 12 and the translation engines 13($t$) may be processed and maintained on a single digital computer system, or alternatively they may be processed and maintained on a number of digital computer systems which may be interconnected by, for example, a network (not shown), which transfers data access requests, translates data access requests and responses between the computer systems on which the tools 11($t$) and translation engines 13($t$) are processed and which maintain the RIM 12.

While they are being processed, the tools 11($t$) may generate data access requests to initiate a data access operation, that is, a retrieval of data from or storage of data in the RIM 12. On the other hand, the data can be stored in the RIM 12 in an "atomic" data model and format which will be described below. Typically, the tools 11($t$) will "view" the data stored in the RIM 12 in a variety of diverse characteristic data models and formats, as will be described below, with each translation engine 13($t$), upon receiving a data access request, translating the data between respective tool's characteristic model and format and the atomic model format of RIM 12 as necessary. For example, during a retrieval access operation, where data items are to be retrieved from the RIM 12, the translation engine 13($t$) identifies one or more atomic data items in the RIM 12 that jointly make up the data item to be retrieved in response to the access request, and will enable the RIM 12 to provide the atomic data items to the translation engine 13($t$). The translation engine 13($t$), in turn, will aggregate the atomic data items that it receives from the RIM 12 into one or more data item(s) as required by the tool's characteristic model and format, and provide the aggregated data item(s) to the tool 11($t$) which issued the access request. Conversely, during a data storage access request, where data in the RIM 12 is to be updated or new data is to be stored in the RIM 12, the translation engine 13($t$) receives the data to be stored in the tool's characteristic model and format, translates the data into the atomic model and format for the RIM 12, and provides the translated data to the RIM 12 for storage. If the data storage access request enables data to be updated, the RIM 12 will replace the current data with the data newly supplied by the translation engine 13($t$). On the other hand, if the data storage access request represents new data, then the RIM 12 will add these data to the current data, which it is maintaining, in the atomic format as provided by the translation engine 13($t$).

Still referring to FIG. 13, the enterprise computing system 10 also includes a data integration system 104, which maintains and updates the atomic format of the RIM 12 and the translation engines 13(*t*) as tools 11(*t*) are added to the system 10. It will be appreciated that certain operations performed by the data integration system 104 may be under control of an operator. Briefly, when the system 10 is initially established or when one or more tools 11(*t*) with different data formats are added to the system 10, the data integration system 104 determines the differences and modifies the data model and format of the data in the RIM 12 to accommodate the data model and format of the new tool 11(*t*). In that operation, the data integration system 104 will, optionally under control of an operator, determine an atomic data model which is common to the data models of any tools 11(*t*) which are currently in the system 10 and the tool 11(*t*) to be added, and enable the data model of the RIM 12 to be updated to the new atomic data model. In addition, the data integration system 104 will update the translation engines 13(*t*) associated with any tools 11(*t*) currently in the system based on the updated atomic data model of the RIM 12, and will also generate a translation engine 13(*t*) for the new tool 11(*t*) to be added to the system. Accordingly, the data integration system 104 ensures that the translation engines 13(*t*) of all tools 11(*t*), including any tools 11(*t*) currently in the system as well as a tool 11(*t*) to be added, conform to the atomic data models and formats of the RIM 12 when the atomic data models and formats of the RIM are changed to accommodate addition of a tool 11(*t*) in the enterprise computing system 10.

Before proceeding further, it would be helpful to provide a specific example illustrating characteristic data models and formats which may be useful for various tools 11(*t*) and an atomic data model and format useful for the RIM 12. It will be appreciated that the specific characteristic data models and formats for the tools 11(*t*) will depend on the particular tools 11(*t*) which are present in a specific enterprise computing system 10. In addition, it will be appreciated that the specific atomic data models and formats for RIM 12 will depend on the atomic data models and formats which are used for tools 11(*t*), and will effectively represent the aggregate or union of the finest-grained elements of the data models and format for all of the tools 11(*t*) in the system 10.

Translation engines are one method of handling the data and metadata in an enterprise integration system. In an embodiment, the translation may be a custom constructed bridge where the bridge is constructed to translate information from one computing platform to another. In another embodiment, the translation may use a least common factor method where the data that is passed through is that data that is compatible with both computing systems. In yet a further embodiment, the translation may be performed on a standardized facility such that all computing platforms that conform to the standards can communicate and extract data through the standardized facility.

Figure 14:
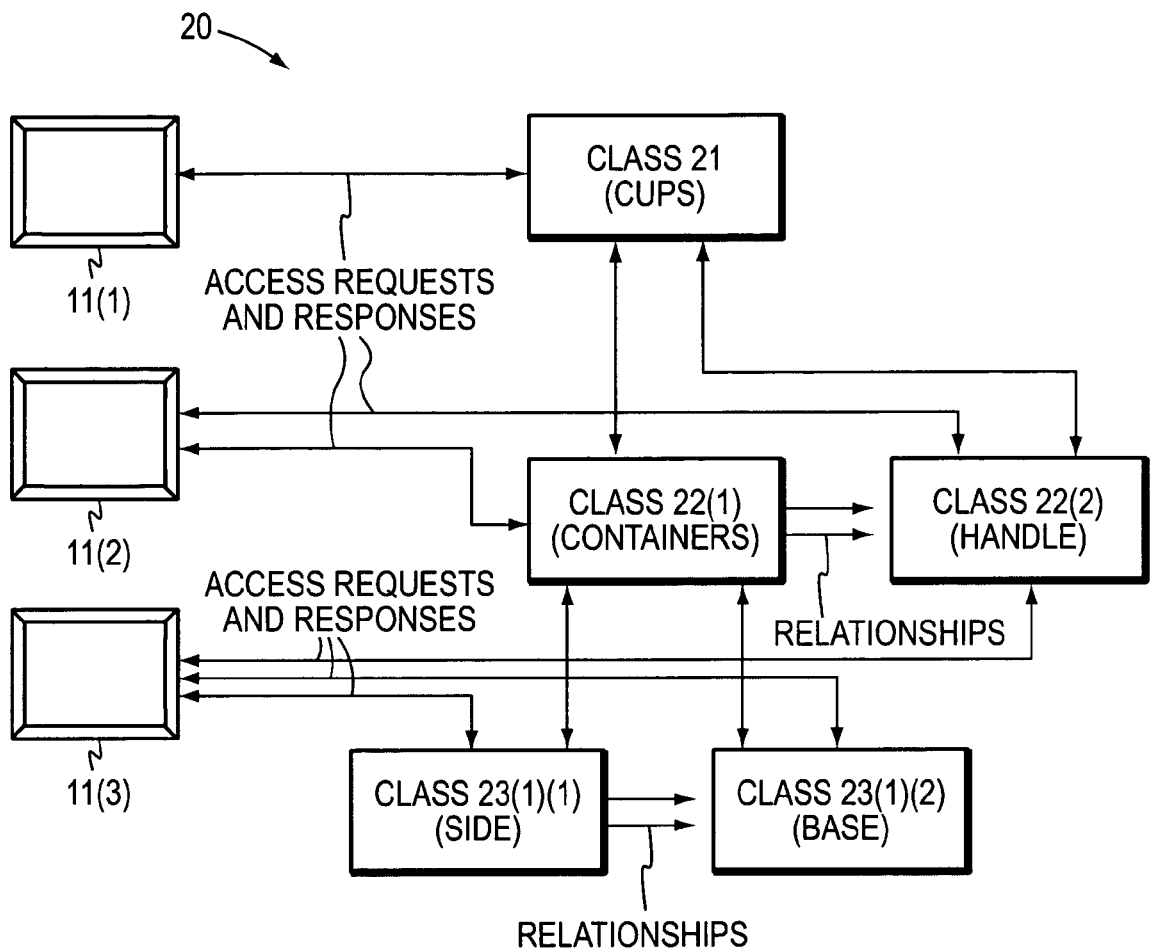
FIG. 14 is an example of managing metadata in a data integration job.

FIG. 14 illustrates an example of managing metadata in a data integration job. The example is directed to a design database for designing for, for example, a particular type of product, such as a cup or other vessel for holding liquids, which may be used in manufacturing. Using the exemplary database, the tools may be used to, for example, add cup design elements to RIM 12, modify cup design elements stored in the RIM 12, and reuse and associate particular cup design elements in the RIM 12 with other cup designs. The RIM 12 and translation engines 13(*t*) provide a mechanism by which a number of different tools 11(*t*) can share the elements stored in the RIM 12 without having to agree on a common schema or model or format arrangement for the elements.

In one embodiment, the RIM 12 can store data items in an "entity-relationship" format, with each entity being a data item and relationships reflecting relationships among data items, as will be illustrated below. The entities are in the form of "objects" which may, in turn, be members or instances of classes and subclasses, although it will be appreciated that other models and formats may be used for the RIM 12. FIG. 14 depicts an exemplary class structure 20 for the "cup" design database, which can include a main class 21, two sub-classes 22(1) and 22(2) depending from the main class 21, and two lower-level sub-classes 23(1)(1) and 23(1)(2), both of which depend from subclass 22(1). Using the above-referenced example, if the main class 21 represents data for "cup" as a unit or entity as a whole, then the two upper-level subclasses 22(1) and 22(2) may represent, for example, the "container" and "handle," respectively, whereby the "container" subclass represents data items for the container portion of cups in the inventory, and the "handle" subclass represents data items for the handle portion of cups in the inventory. Each data item in class 21, which is termed an "entity" in the entity-relationship format, may represent a specific cup or a specific type of cup in the inventory, and may have associated attributes that define various characteristics of the cup, with each attribute being identified by a particular attribute identifier and data value for the attribute.

Similarly, each data item in classes 22(1) and 22(2), which are also "entities" in the entity-relationship format, may represent container and handle characteristics of the specific cups or types of cups in the inventory. More specifically, each data item in class 22(1) may represent the container characteristic of a cup represented by a data item in class 21, such as color, sidewall characteristics, base characteristics and the like. In addition, each data item in class 22(2) may represent the handle characteristics of a cup that is represented by a data item in the class 21, such as curvature, color position and the like. In addition, it will be appreciated that there may be one or more relationships between the data items in class 22(1) and the data items in class 22(2), that correspond to the "relationship" in the entity-relationship format linking the data items in the classes 22(1) and 22(2). For example, there may be a "has" relationship, which indicates that a specific container represented by a data item in class 22(1) "has" a handle represented by a data item in class 22(2), which may be identified in the "relationship." In addition, there may be a "number" relationship, which indicates that a specific container represented by a data item in class 22(1) has a specific number of handles represented by the data item in class 22(2) specified by the "has" relationship. Further, there may be a "position" relationship, which specifies the position(s) on the container represented by a data item in class 22(1) where the handle(s) represented by the data item in class 22(2), as specified by the "has" relationship, are mounted. It will be appreciated that the "number" and "position" relationships may be viewed as being subsidiary to, and further defining, the "has" relationship. Other relationships will be apparent to those skilled in the art.

Similarly, the two lower-level subclasses 23(1)(1) and 23(1)(2) may represent various elements of the cups or types of cups in the inventory. In the illustration depicted in FIG. 14, the subclasses 23(1)(1) and 23(1)(2) may include "sidewall type" and "base type" attributes, respectively. Each data item in subclasses 23(1)(1) and 23(1)(2), which are also "entities" in the entity-relationship format, may represent sidewall and base handle characteristics of the containers, as represented by entities in subclass 22(1) of specific cups or types of cups in the inventory. More specifically, each data item in class 23(1)(2) can represent the sidewall characteristic of a container represented by a data item in class 22(1). In addition, each data item in subclass 23(1)(2) can represent the base characteristic of a cup that is represented by a data item in the class 21. In addition, it will be appreciated that there may be one or more relationships between the data items in subclass 23(1)(1) and the data items in class 23(1)(2), which correspond to the "relationship" in the entity-relationship format, which serves to link the data items in the classes 23(1)(1) and 23(1)(2). For example, there may also be a "has" relationship, which signifies that a specific container represented by a data item in subclass 23(1)(1) "has" a base represented by a data item in class 23(1)(2), which may be identified in the "relationship." Other relationships will be apparent to those skilled in the art.

It will be appreciated that certain tools, such as the tool 11(1) shown in FIG. 14, may have characteristic data models and formats that view the cups in the above illustration as entities in the class 21. That is, a data item is a "cup" and characteristics of the "cup" which are stored in the RIM 12 are respective attributes and attribute values for the cup design associated with the data item. For such a view, in response to an access request of the retrieval type, the tools 11(t) will provide the associated translation engines 13(t) with the identification of a "cup" data item in class 21 to be retrieved, and in response will expect to receive at least some of the data item's attribute data, which may be identified in the request. Similarly, in response to an access request of the storage type, the tools 11(t) will provide the associated translation engines 13(t) with the identification of the "cup" data item to be created and/or updated. The associated attribute information is also updated and/or be used for creating a new data item.

Conversely, other tools, such as tool 11(2) as shown in FIG. 14, may have characteristic data models and formats that view the cups separately as container and handle entities in classes 22(1) and 22(2). In that view, there are two data items, namely "container" and "handle" associated with each cup, each of which has attributes that describe the respective container and handle. In that case, each data item each may be independently retrievable and updateable and new data items may be separately created for each of the two classes. For such a view, the tools 11(t) will, in an access request of the retrieval type, provide their associated translation engines 13(t) with the identification of a container or a handle to be retrieved, and will expect to receive the data item's attribute data in response. Similarly, in response to an access request of the storage type, such tools 11(t) will provide their associated translation engines 13(t) with the identification of the "container" or "handle" data item to be created and/or updated and with the associated attribute data. Accordingly, these tools 11(t) view the container and handle data separately, and can retrieve, update and store container and handle attribute data separately.

Figure 15:
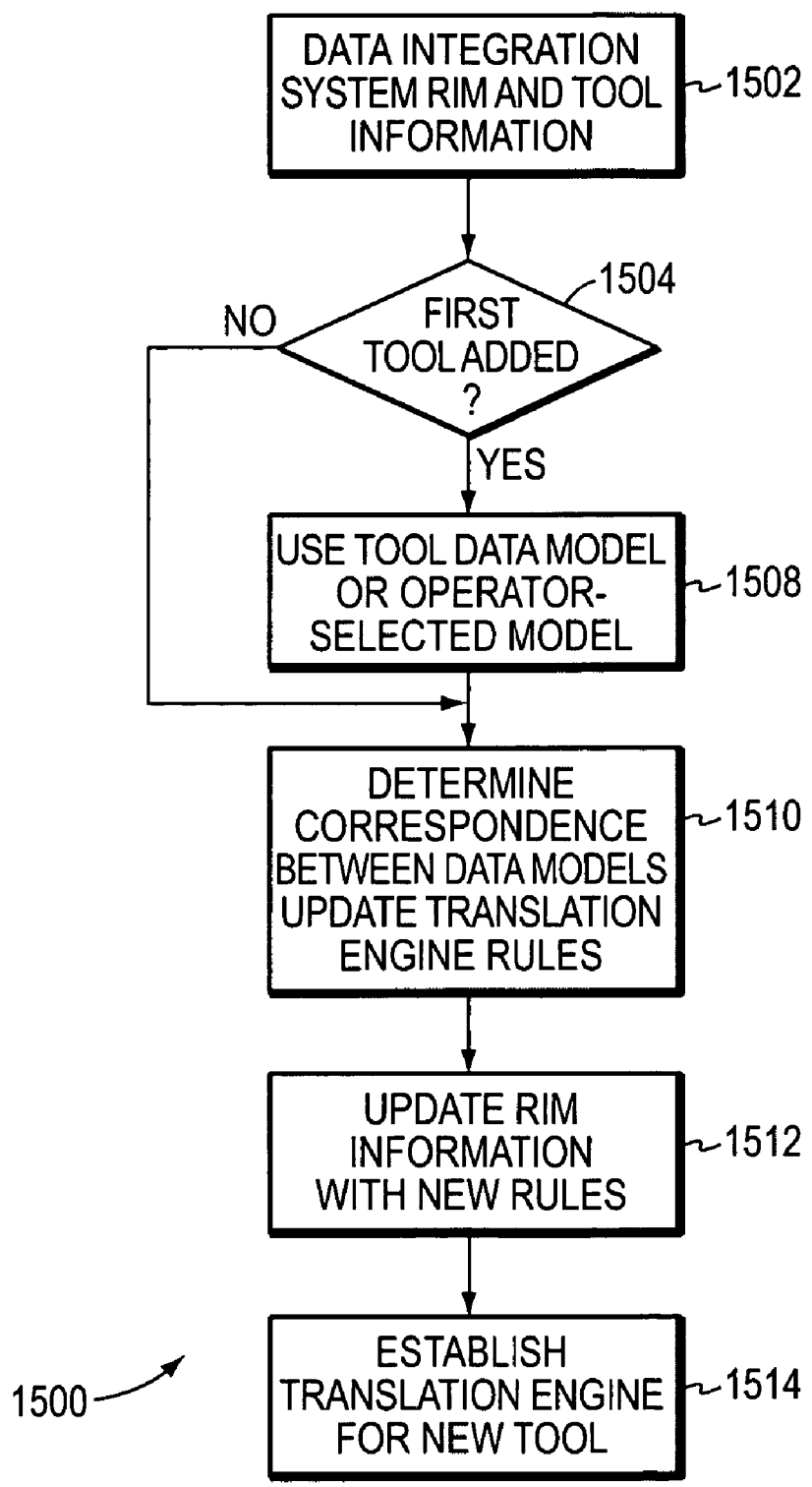
FIG. 15 is a flow diagram showing addition of tools in a data integration job.

FIG. 15 is a flow diagram showing additional steps for using a metadata facility in connection with a data integration job. In addition, other tools, such as tool 11(3) shown in FIG. 15, may have characteristic formats which view the cups separately as sidewall, base and handle entities in classes 23(1)(1), 23(1)(2) and 22(2). In that view, there are three data items, namely, "sidewall," "base" and "handle" associated with each cup, each of which has attributes which describe the respective sidewall, base and handle. In that case, each data item each may be independently retrievable, updateable and new data items may be separately created for each of the three classes 23(1)(1), 23(1)(2) and 22(2). For such a view, these tools 11(t) will, in an access request of the retrieval type, provide their associated translation engines 13(t) with the identification of a sidewall, base or a handle whose data item is to be retrieved, and will expect to receive the data item's attribute data in response. Similarly, in response to an access request of the storage type, such tools 11(t) will provide their associated translation engines 13(t) with the identification of the "sidewall," "base" or "handle" data item whose attribute(s) is (are) to be updated, or for which a data item is to be created, along with the associated data. Accordingly, these tools 11(t) view the cup's sidewall, base and handle data separately, and can retrieve, update and store container and handle data separately.

As described above, the RIM 12 stores data in an "atomic" data model and format. That is, with the class structure 20 for the "cup" design base as depicted in FIG. 14, the RIM 12 will store the data items in the most detailed format as required by the class structure. Accordingly, the RIM 12 will store data items as entities in the atomic format "sidewall," "base," and "handle," since that is the most detailed format for the class structure 20 depicted in FIG. 14. With the data in the RIM 12 stored in such atomic format, the translation engines 13(t) associated with the tools 11(t) that view the cups as entities in class 21, in response to an access request related to a cup, translate the access request into three access requests, one for the "sidewall," one for the "base" and the last for the "handle" for processing by the RIM 12. For an access request of the retrieval type, the RIM 12 can provide the translation engine 13(t) with appropriate data items for the "sidewall," "base" and "handle" access requests. In addition, if a tool 11(t) uses a name for a particular attribute that differs from the name of the corresponding attribute used for the data items stored in the RIM 12, then the associated translation engine 13(t) will translate the attribute names in the request into the attribute names used in the RIM 12. The RIM 12 provides the requested data items for each request, and the translation engine 13(t) then combines the data items from the RIM 12 into a single data item for transfer to the tool 11(t). For this process, the translation engine 13(t) performs an inverse translation in connection with attribute name(s) in the data item(s) provided by the RIM 12, to provide the tool 11(t) with data items using attribute name(s) used by the tool 11(t). Similarly, for an access request of the storage type, the translation engine 13(t) will generate, in response to the data item which it receives from the tool 11(t), storage requests for each of the sidewall, base and handle entities to be updated or generated, which it will provide to the RIM 12 for storage, in the process performing attribute name translation as required.

Likewise, the translation engines 13(t) associated with the tools 11(t) that view the cups as entities in classes 22(1)) ("container") and 22(2) ("handle") will, in response to an access request related to a container, translate the access request into two access requests, one for the "sidewall," and the other for the "base" for processing by the RIM 12, in the process performing attribute name translation. For an access request of the retrieval type, the RIM 12 will provide the translation engine 13(t) with appropriate data items for the "sidewall" and "base" access requests, and the translation engine 13(t) then combines the two data items from the RIM 12 into a single data item for transfer to the tool 11(t), also performing attribute name translation as required. Similarly, for an access request of the storage type, the translation engine 13(t) will, in response to the data item which it receives from the tool 11(t), generate storage requests for each of the sidewall and base entities to be generated or updated, in the process performing attribute name translation as required, which it will provide to the RIM 12 for storage. It will be appreciated that the translation engines 13(t) associated with tools 11(t) that view the cups as entities in classes 22(1) and 22(3), in response to access requests related to a handle, need only perform attribute name translation, since the RIM 12 stores handle data in "atomic" format.

On the other hand, translation engines 13(*t*) which are associated with the tools 11(*t*) that view the cups as separate entities in classes 23(1)(1) ("sidewall"), 23(1)(2) ("base"), and 22(2) ("handle"), may, when working with RIM 12, only have to perform attribute name translation, since these classes already reflect the atomic format of the RIM 12.

As noted above, the data integration system 104 operates to maintain and update the RIM 12 and the translation engines 13(*t*) whenever tools 11(*t*) are added to the system 10 (see FIG. 13). For example, if the RIM 12 is initially established based on a system 10 that includes a tool 11(*t*) which views the cups as entities in class 21, then the atomic data model and format of the RIM 12 will be based on that class. Accordingly, data items in the RIM 12 will be directed to the respective "cups" in the design base and the attributes associated with each data item may include such information as container, sidewall, base, and handle (not as separate data items, but as attributes of the "cup" data item), as well as color and so forth. In addition, the translation engine 13(*t*) which is associated with that tool 11(*t*) will be established based on the initial atomic format for RIM 12. If the RIM 12 is initially established based on a single such tool, based on identifiers for the various attributes as specified by that tool, and if additional tools 11(*t*) that also view the cups as entities in class 21, but have different identifiers for the various attributes, are thereafter added, then the translation engines 13(*t*) for such additional tools will be provided with correspondences between the attribute identifiers, as used by their respective tools, and the attribute identifiers used by the RIM 12. The attributes for the additional tools correspond to the original tool's attributes but are identified differently. It will be appreciated that, if an additional tool has an additional attribute which does not correspond to an attribute used by a tool previously added to the system 10 and in RIM 12, the attribute can merely be added to the data items in the RIM 12, and no change will be necessary to the pre-existing translation engines 13(*t*) since the tools 11(*t*) associated therewith will not access the new attribute. Similarly, if a new tool 11(*t*) has an additional class for data which is not accessed by the previously-added tools in the system 10, then the class can merely be added without requiring changes to the preexisting translation engines 13(*t*) since the tools 11(*t*) associated therewith will not access data items in the new class.

If, after the RIM 12 has been established based on tools 11(*t*), which views the cups as entities in class 21, and a tool 11(*t*) is added to the system 10 that views the cups as entities in classes 22(1) and 22(2), the data integration system 104 will perform two general operations. In one operation, the system 14 will determine a reorganization of the data in the RIM 12 so that the atomic data model and format will correspond to classes 22(1) and 22(2), in particular any existing identifying attributes in each data item associated with class 22(1) and any existing attributes associated with class 22(2). The system manager will establish two data items, one corresponding to class 22(1) and the other corresponding to class 22(2), and provide the attribute data for attributes associated with class 22(1) in the data item that corresponds to class 22(1) and the attribute data for attributes associated with class 22(2) in the data item that corresponds to class 22(2). In the second general operation, the data integration system 104 will generate new translation engines 13(*t*) for the preexisting tools 11(*t*) based on the new organization that determines the new data item and attribute organization for the atomic format for the RIM 12. In addition, the data integration system 104 will generate a translation engine 13(*t*) for the new tool 11(*t*) based on the attribute identifiers used by the new tool and the pre-existing attribute identifiers.

If a tool 11(*t*) is added to the system 10 that views the cups as entities in classes 23(1)(1), 23(1)(2) and 22(2), as described above in connection with FIG. 14, then the data integration system 104 will similarly perform two general operations. In one operation, the system 14 will determine a reorganization of the data in the RIM 12 so that the atomic format will correspond to classes 23(1)(1), 23(1)(2) and 22(2), in particular identifying any existing attributes in each data item associated with class 23(1)(1), any existing attributes associated with class 23(1)(2), and any existing attributes associated with class 22(2). In addition, the system manager will establish three data items, one corresponding to class 23(1)(1), one corresponding to class 23(1)(2), and the third corresponding to class 22(2). It will be appreciated that the data integration system 104 need only establish the data items corresponding to classes 23(1)(1) and 23(1)(2) that were not previously established for class 22(2). In addition, the data integration system 104 will provide the attribute data for attributes associated with class 22(1) in the data item which corresponds to class 22(1) and optionally the attribute data for attributes associated with class 22(2) in the data item which corresponds to class 22(2). After the data integration system 104 determines the new data item and attribute organization for the atomic format for the RIM 12, it can generate new translation engines 13(*t*) for the preexisting tools 11(*t*) based on the new organization. In addition, the data integration system 104 can generate a translation engine 13(*t*) for the new tool 11(*t*) based on the attribute identifiers used by the new tool and the pre-existing attribute identifiers used in connection with the RIM 12.

As tools 11(*t*) are added to the system, the data integration system 104 essentially creates new atomic models by which previously defined atomic components are decomposed into increasingly-detailed atomic components. In addition, the data integration system 104, by revising the translation engines 13(*t*) associated with the tools 11(*t*) currently in the system 10, essentially remaps the tools 11(*t*) to the new RIM organization based on the atomic decomposition. Indeed, only the portion of the translation engines 13(*t*) which are specifically related to the further atomic decomposition will need to be modified or updated based on the new decomposition, and the rest of the respective translation engines 13(*t*) can continue to run without modification.

The detailed operations performed by the data integration system 104 in updating the RIM 12 and translation engines 13(*t*) to accommodate addition of a new tool to system 10 will depend on the relationships, i.e., mapping, between the particular data models and formats of the existing RIM 12 and current tools 11(*t*), on the one hand, and the data model and format of the tool to be added. In one embodiment, the data integration system 104 can establish the new format for the RIM 12 and generate updated translation engines 13(*t*) using a rule-based methodology which is based on relationships between each class and subclasses generated during the update procedure, on attributes which are added to objects or entities in each class and in addition on the correspondences between the attribute identifiers used for existing attributes by the current tool(s) 11(*t*) and the attribute identifiers as used by the new tool 11(*t*). An operator, using the data integration system 104, can determine and specify the mapping relationships between the data models and formats used by the respective tools 11(*t*) and the data model and format used by the RIM 12, and can maintain a rule base from the mapping relationships which can be used to generate and update the respective translation engines 13(*t*).

To ensure that the data items in the RIM 12 can be updated in response to an access request of the storage type, the data integration system 104 will associate each tool object 11(*t*) with a class whose associated data item(s) will be deemed "master physical items," and a specific relationship, if any, to other data items. Preferably, the data integration system 104 will select as the master physical item the particular class which is deemed the most semantically equivalent to the object of the tool's data model. Other data items, if any, which are related to the master physical item, are deemed secondary physical items in the graph. For example, referring back to FIG. 14, for tool 11(1), the data integration system 104 will identify the data items associated with class 21 as the master physical items, since this is the only class associated with the tool 11(1). Since there are no other classes associate with tool 11(1), there are no secondary physical items; the directed graph associated with tool 11(1) effectively has one node, namely, the node associated with class 21.

On the other hand, for tool 11 (2), the data integration system 104 may identify class 22(1) as the class whose data items will be deemed "master physical items." In that case, data items associated with class 22(2) will be identified as "secondary physical items." In addition, the data integration system 104 will select one of the relationships, as identified by the arrows identified by the legend "Relationships" between classes 22(1) and 22(2) in FIG. 14, as a selected relationship. In that case, the data items in RIM 12 that are associated with class 22(1) as a master physical item, and data items associated with class 22(2) as a secondary physical item, that are interconnected by the arrow representing the selected relationship, form respective directed graphs. In performing an update operation in response to an access request from tool 11(2), the directed graph that is associated with the data items to be updated is traversed from the master physical item and the appropriate attributes and values updated. In traversing the directed graph, conventional graph-traversal algorithms can be used to ensure that each data item in the graph, can, as a graph node, be appropriately visited and updated, thereby ensuring that the data items are updated.

Similarly, for tool 11(3) (see FIG. 14) the data integration system 104 may identify class 23(1)(1) as the class whose data items will be deemed "master physical items." In that case, the data items associated with classes 23(1)(2) and 22(2) will be deemed secondary physical items, and the data integration system 104 may select one of the direct relationships represented by arrows identified by the legend "Relationships" between class 23(1)(1) and class 23(1)(2)) as the specified relationship. Although there is no direct relationship shown in FIG. 14 between class 23(1)(1) and class 22(2), it will be appreciated that, since the class 23(1)(1) is a subclass of class 22(1), the class 23(1)(1) will inherit certain features from its parent class 22(1), including the parent class' relationships. Accordingly, at least inferentially, there exists a relationship between class 23(1)(1) and class 22(2) which is used in establishing the directed graphs for tool 11(3). When performing an update operation in response to an access request from tool 11 (3), the directed graph associated with the data items to be updated is traversed from the master physical item associated with class 23(1), and the appropriate attributes and values are updated. In traversing the directed graph, conventional graph-traversal algorithms can be used to ensure that each data item in the graph, can, as a graph node, be appropriately visited and updated, thereby ensuring that the data items are updated.

Figure 16:
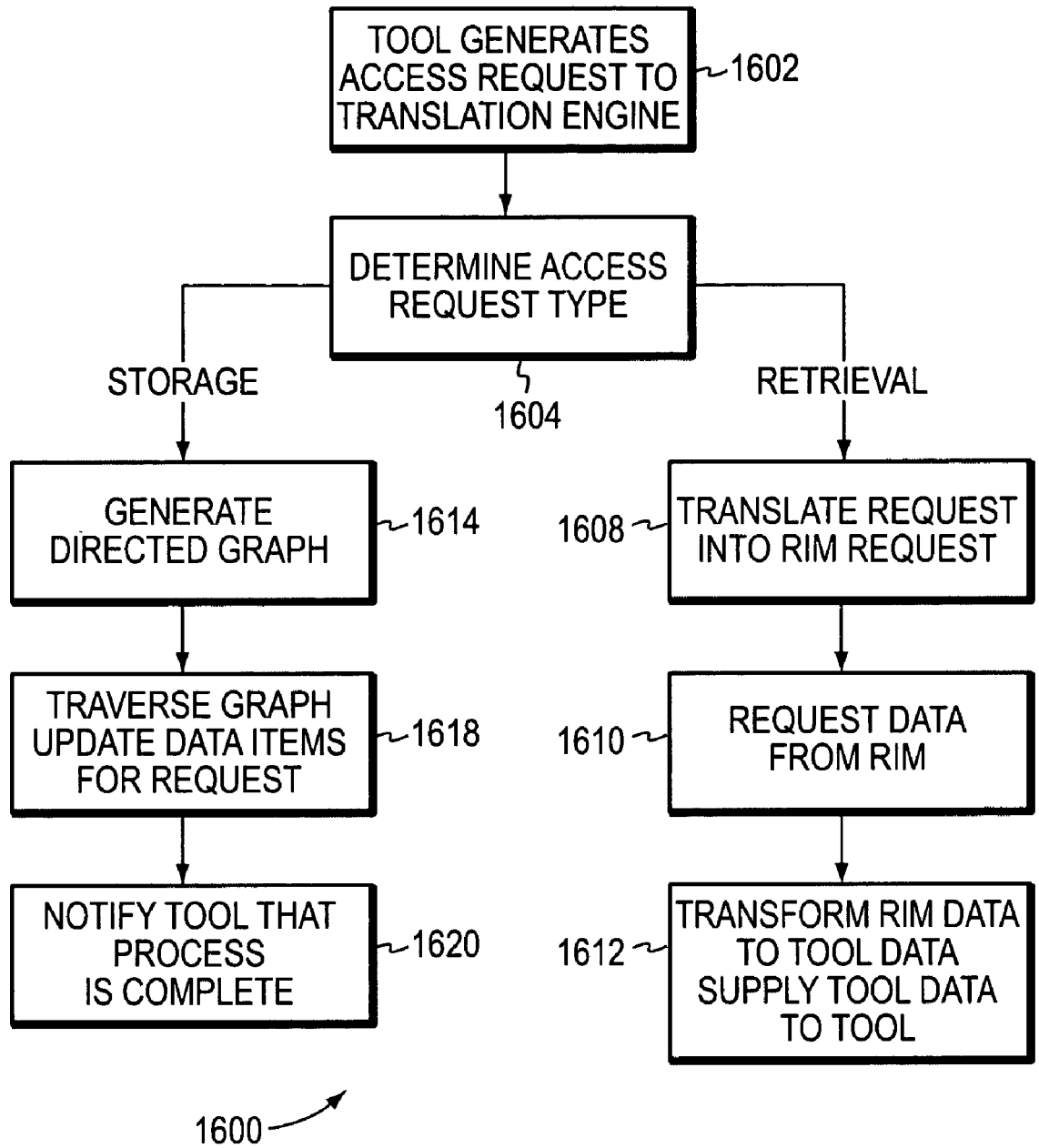
FIG. 16 shows a flow diagram for processing access requests for a data integration job.

FIGS. 15 and 16 describe processes performed by the data integration system 104 and translation engines 13(*t*). Initially, with reference to FIG. 15, in a process 1500 for establishing or updating the RIM 12 when a new tool 11(*t*) is to be added to the system 10, the data integration system 104 initially receives information as to the current atomic data model and format of the RIM 12 and the data model and format of the tool 11(*t*) to be added, step 1502. If this is the first tool 11(*t*) to be added, as determined in step 1504, then the data integration system 104 can use the tool's data model and format, or any finer-grained data model and format which may be selected by an operator, as the atomic data model and format, step 1508. On the other hand, if the data integration system 104 determines that the tool is not the first tool 11(*t*) to be added, correspondences between the new tool's data model and format, including the new tool's class and attribute structure and associations between that class and attribute structure and the class and attribute structure of the RIM's current atomic data model and format will be determined and the RIM and translation engine will be updated according to a generated rule base, step 1510. After the rule base has been generated, the data integration system 104 can use the rule base to update the RIM's atomic data model and format and the existing translation engines 13(*t*) as described above, step 1512, and can also establish the translation engine 13(*t*) for the tool to be added, step 1514.

Referring now to FIG. 16, which shows a process flow 1600 for handling a request for a translation engine, once a translation engine 13(*t*) has been generated or updated for a tool 11(*t*), it can be used in connection with access requests generated by the tool 11(*t*). The generated access request is transferred from tool 11(*t*) to its associated translation engine 13(*t*), step 1602. The translation engine 13(*t*) then determines the request type, that is, if it is a retrieval request or a storage request, as discussed above, step 1604. If the request is a retrieval request, the translation engine 13(*t*) will use its associations between the tool's data models and format and the RIM's data models and format to translate the request into one or more requests for the RIM 12, step 1608, to facilitate retrieval by it of the required data items, step 1610. The translation engine 13(*t*) converts the data items from the model and format received from the RIM 12 to the model and format required by the tool 11(*t*), which it provides to the tool 11(*t*), step 1612.

Conversely, if the translation engine determines in step 1604 that the request is a storage request, including a request to update a previously-stored data item, the translation engine 13(*t*) will, with the RIM 12, generate a directed graph for the respective classes and subclasses from the master physical item associated with the tool 11(*t*), step 1614. If the operation is an update operation, the directed graph will include, as graph nodes, existing data items in the respective classes and subclasses. If the operation relates to storing new data, then the directed graph will include, as graph nodes, empty data items which can be used to store new data included in the request. After the directed graph has been established, the translation engine 13(*t*) and RIM 12 operate to traverse the graph and establish or update the contents of the data items as required in the request, step 1618. After the graph traversal operation has been completed, the translation engine 13(*t*) can notify the tool 11(*t*) that the storage operation has been completed, step 1620.

It will be appreciated that the aforedescribed process advantageously provides for efficient sharing and updating of information by a number of tools 11(*t*) in an enterprise computing environment, without the need for constraining the tools 11(*t*) to any predetermined data model, and further without requiring the tools 11(*t*) to use information exchange programs for exchanging information between pairs of respective tools. An atomic repository information manager ("RIM") 12 maintains data in an atomic data model and format which may be used for any of the tools 11(*t*) in the system, which may be readily updated and evolved in a convenient manner when a new tool 11(*t*) is added to the system to respond to new system and market requirements.

Furthermore, by associating each tool 11(*t*) with a "master physical item" class, directed graphs are established among data items in the RIM 12, and so updating of information in the RIM 12 in response to an update request can be efficiently accomplished using conventional directed graph traversal procedures.

Figure 17:
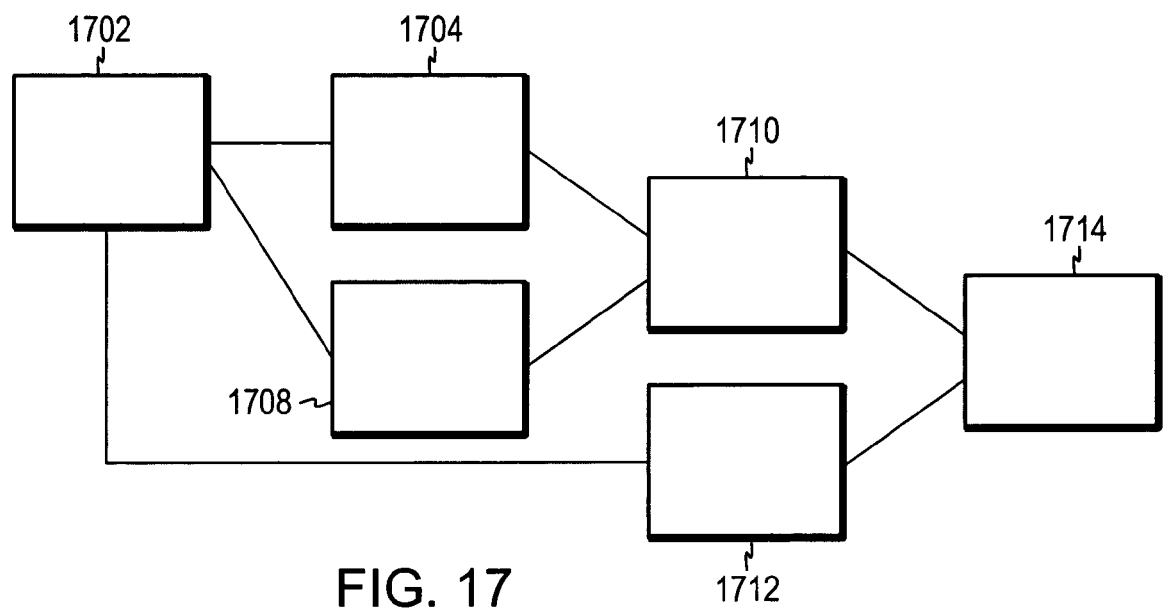
FIG. 17 is a schematic diagram of a facility for parallel execution of a plurality of processes of a data integration process.

FIG. 17 is a schematic diagram showing a facility for parallel execution of a plurality of processes of a data integration process. In an embodiment, a process initiation facility 1702 may determine the scope of the job that needs to be run and determine that a first and second process, for example, independent processes, may be run simultaneously, in which processing facility 1704 may run process job 1, while processing facility and 1708 may run process job 2. Following execution of the two jobs, a third process may be processed on processing facility 1710, with process facility 1710 communicating information to a transformation facility 1714. In an embodiment, the transformation facility may not begin the transformation process until it has received information from another parallel process 1712. Once all of the information is presented, the transformation facility 1714 may perform the transformation. This parallel process flow minimizes run time by running several (independent) processes at one time and then presenting the information from the two or more parallel executions to a common facility (e.g. where the common facility is dependent on the results of the two parallel facilities). In this embodiment, the several process facilities are depicted as separate facilities for ease of explanation, it should be understood that two or more of these facilities may be the same physical facilities. It should also be understood that two or more of the processing facilities may be different physical facilities and may reside in different physical locations.

Figure 18:
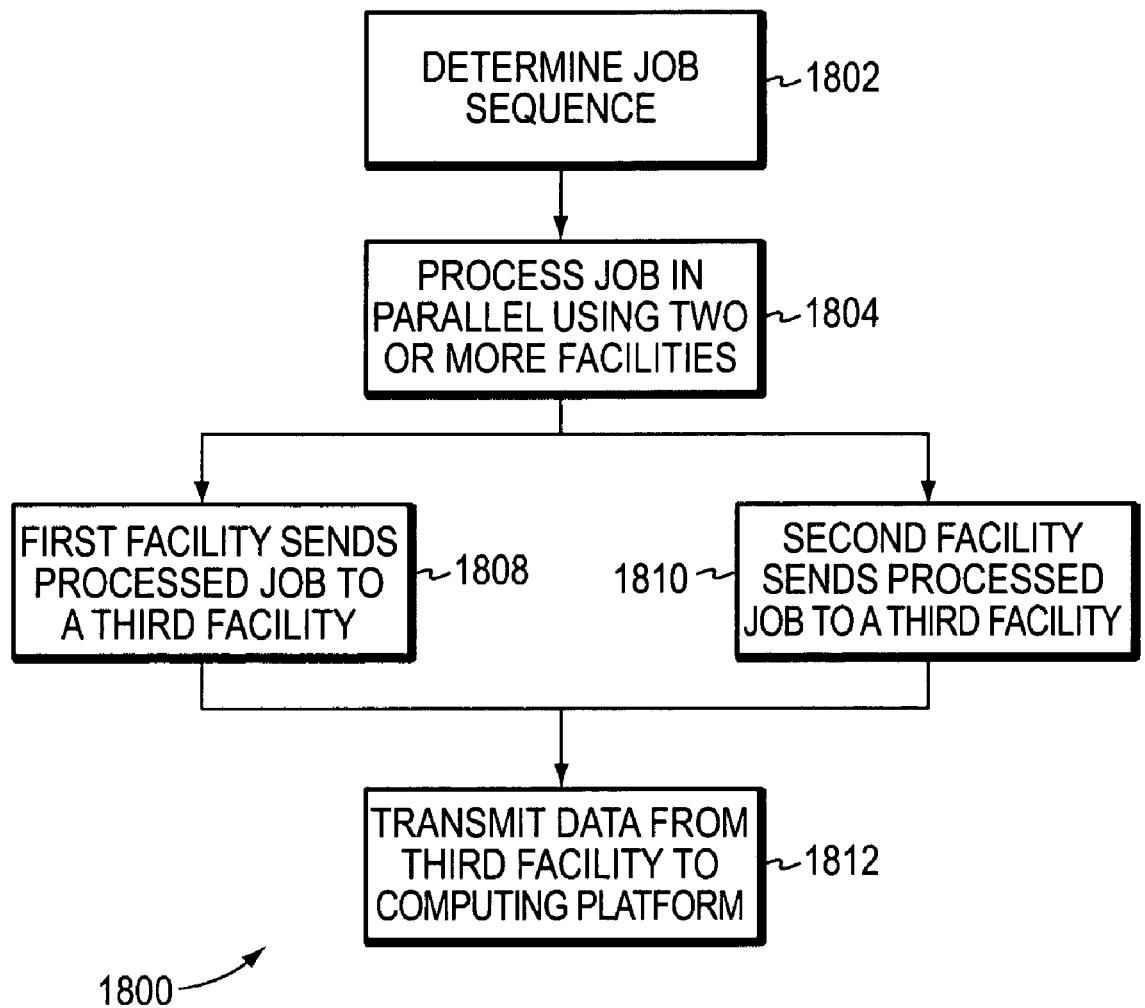
FIG. 18 is a flow diagram showing steps for parallel execution of a plurality of processes of a data integration process.

FIG. 18 is a flow diagram showing steps for parallel execution of a plurality of processes of a data integration process running on the facility described in FIG. 17. In an embodiment, a parallel process flow may involve step 1802 wherein the job sequence is determined. Once the job sequence is determined, the job may be sent to two or more process facilitates, step 1804. In step 1808, a first process facility may receive and execute certain routines and programs and once complete communicate the processed information to a third process facility. In step 1810, a second process facility may receive and execute certain routines and programs and once complete communicate the processed information to the third process facility. The third process facility may wait to receive the processed information from the first two process facilities before running its own routines on the two sources of information, step 1812.

Figure 19:
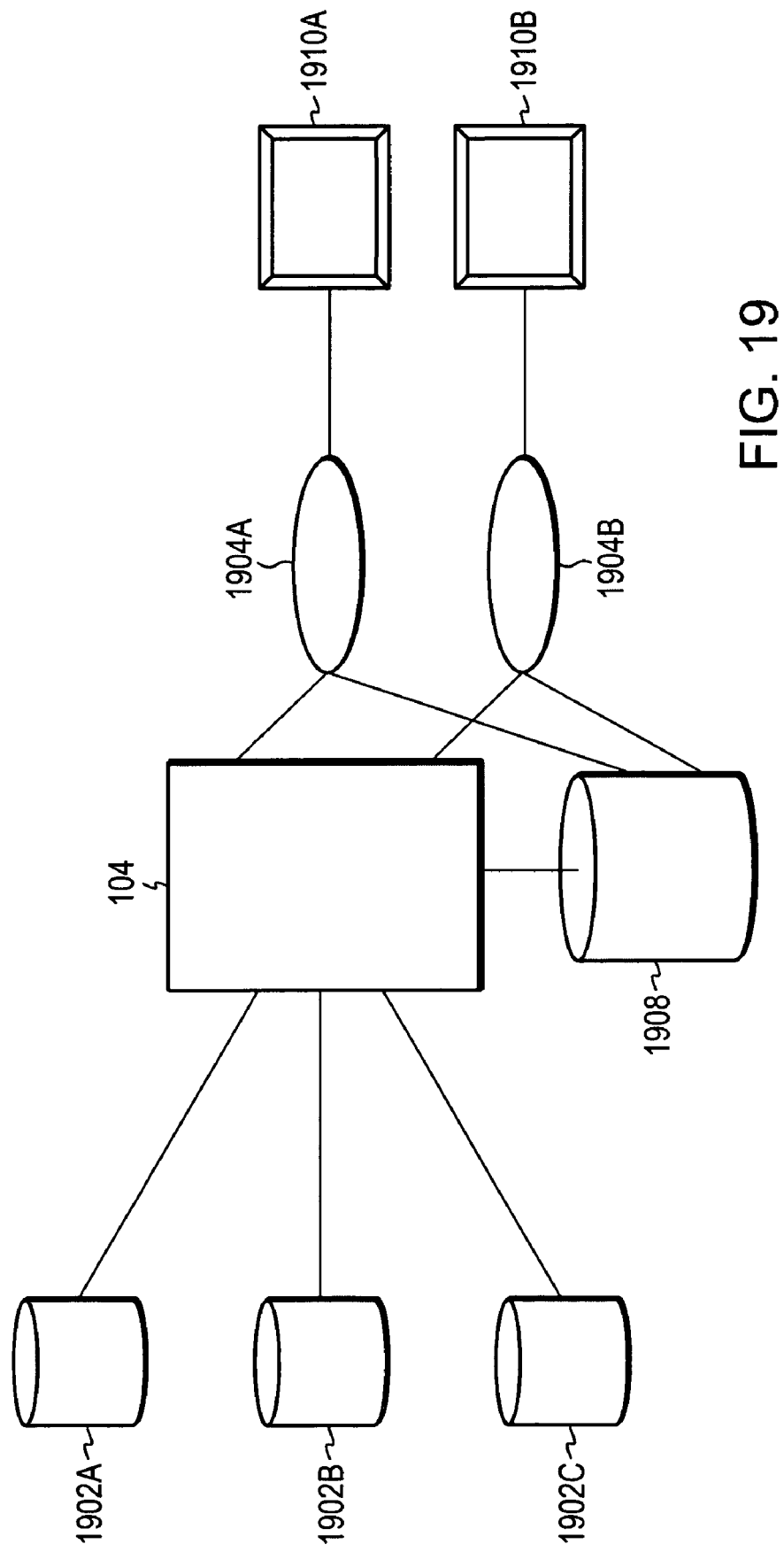
FIG. 19 is a schematic diagram of a data integration job, comprising inputs from a plurality of data sources and outputs to a plurality of data targets.

FIG. 19 is a schematic diagram showing a data integration job, receiving inputs from a plurality of data sources and providing outputs to a plurality of data targets. For example, it may be desirable to collect data from several data sources 1902A, 1902B and 1902C and use the combination of the data in a business enterprise. In an embodiment, a data integration system 104 may be used to collect, cleanse, transform or otherwise manipulate the data from the several data sources 1902A, 1902B and 1902C to store the data in a common data warehouse or database 1908 such that it can be accessed from various tools, targets, or other computing systems. The data integration system 104 may store the collected data in the storage facility 1908 such that it can be directly accessed from the various tools 1910A and 1910B or the tools may access the data through data translators 1904A and 1904B, whether automatically, manually or semi-automatically generated as described herein. The data translators 1904A and 1904B are illustrated as separate facilities; however, it should be understood that they may be incorporated into the data integration system 104, into a tool or otherwise located to accomplish the desired tasks.

Figure 20:
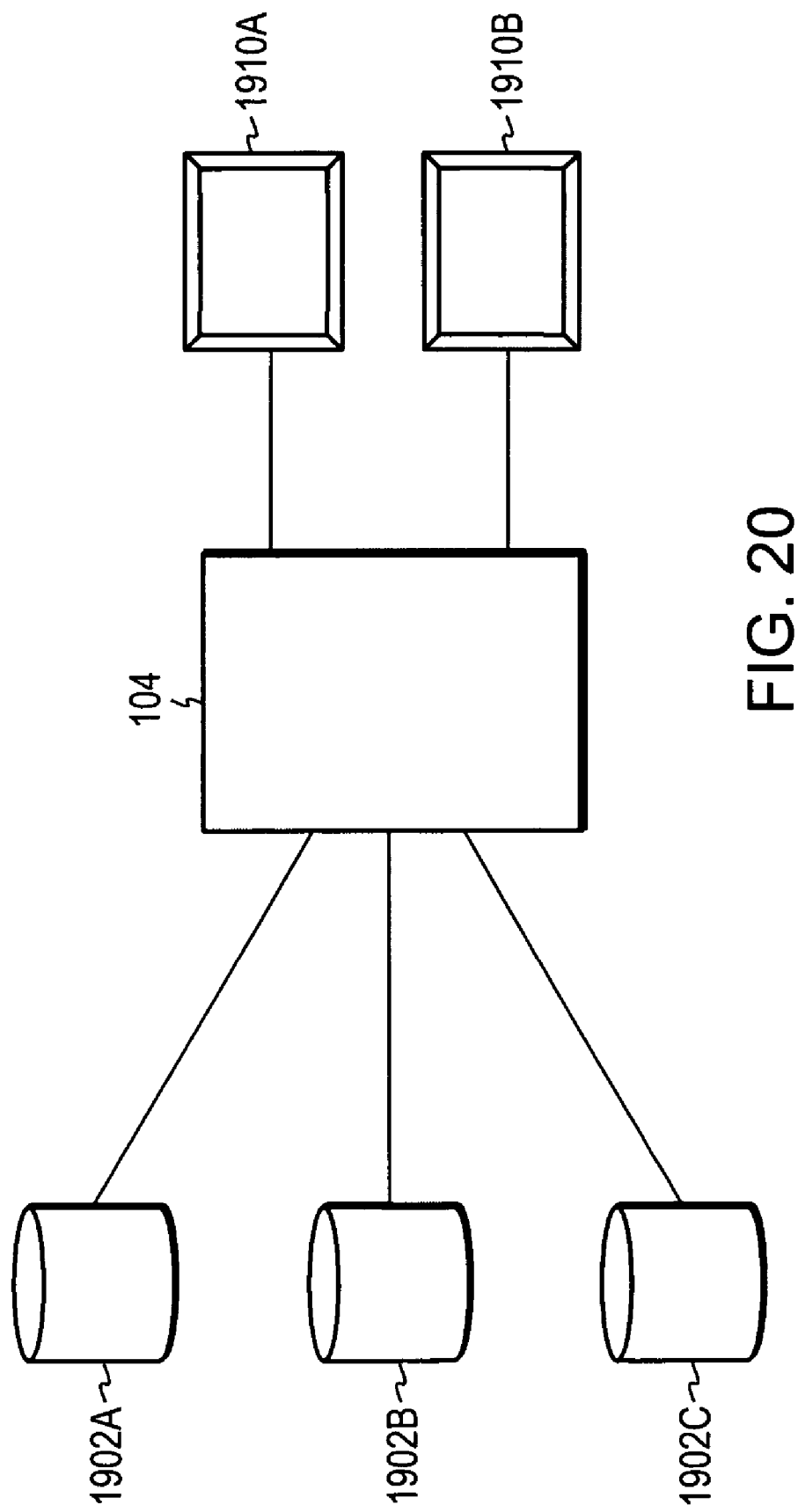
FIG. 20 is a schematic diagram of a data integration job, with inputs from a plurality of data sources and outputs to a plurality of data targets.

FIG. 20 is a schematic diagram showing a data integration job similar to that depicted in FIG. 19, except that the embodiment of FIG. 20 does not include the central database 1908 and the combined collected information, instead of being stored in database 1908, is directly passed on to several targets 1910A and 1910B. Rather than storing all of the collected information in a central database to be accessed at some point in the future, the data integration system 104 may collect and process the data from the data sources 1902A, 1902B and 1902C at or near the time the request for data is made by the targets 1910A and 1910B. This may be accomplished in real time or in a batch mode for example. It should be understood that the data integration system might still include memory for temporarily storing data to be passed to the targets when the processing is completed.

Figure 21:
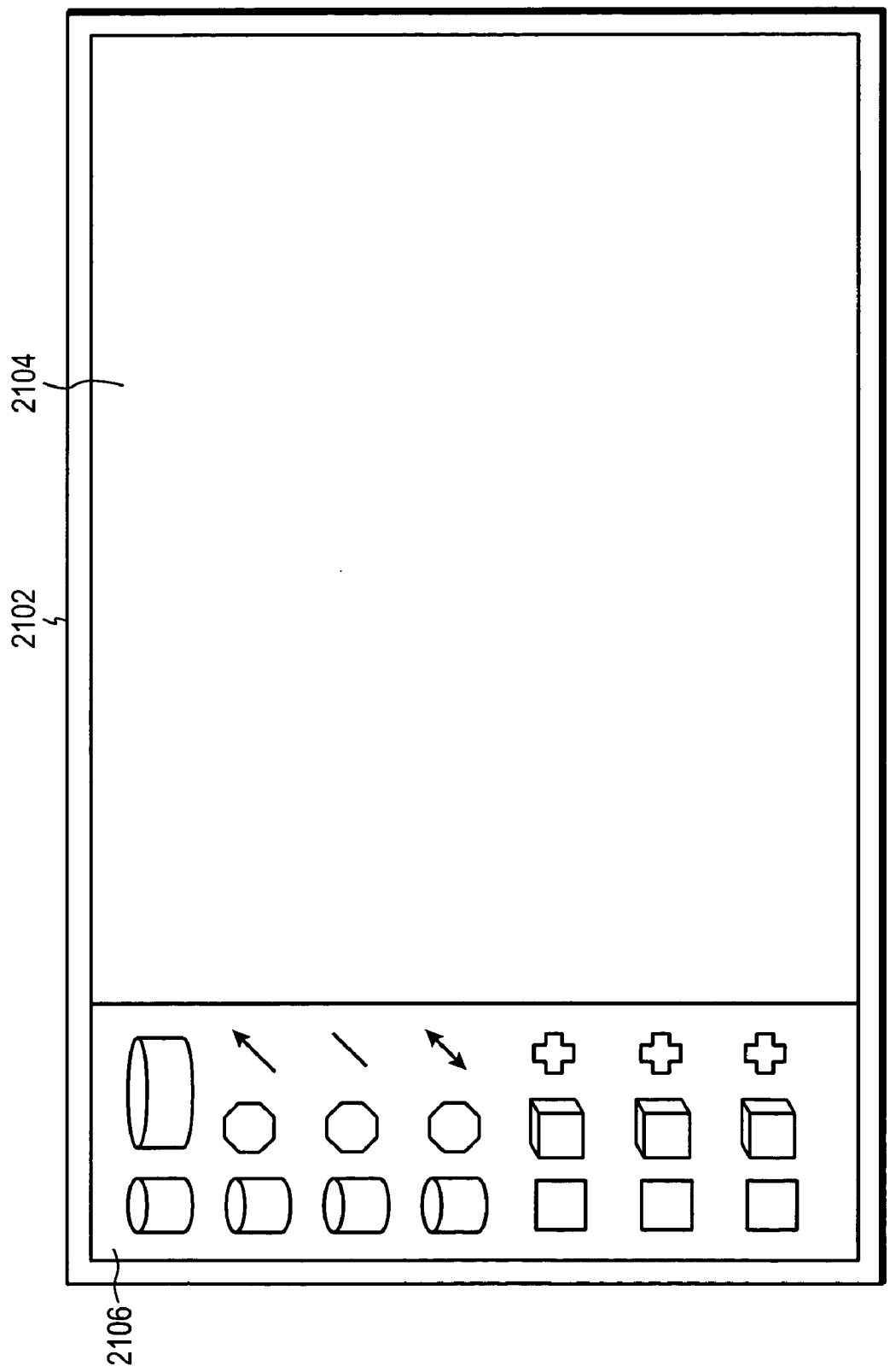
FIG. 21 shows one embodiment of a graphical user interface, allowing a data manager for a business enterprise to design a data integration job.

FIG. 21 shows a graphical user interface 2102 presented to a user to facilitate setting up a data integration job. The user interface may include a palette of tools 2106 including databases, transformation tools, targets, path identifiers, and other suitable user-selectable tools. The user may click on the tools and drop the tools from the palette of tools 2106 into a workspace 2104. The workspace 2104 may be used to lay out the databases, data flow paths, transformation steps and the like to facilitate setting up a data integration job. Once the job is set up, it may be run from this or another user interface.

Figure 22:
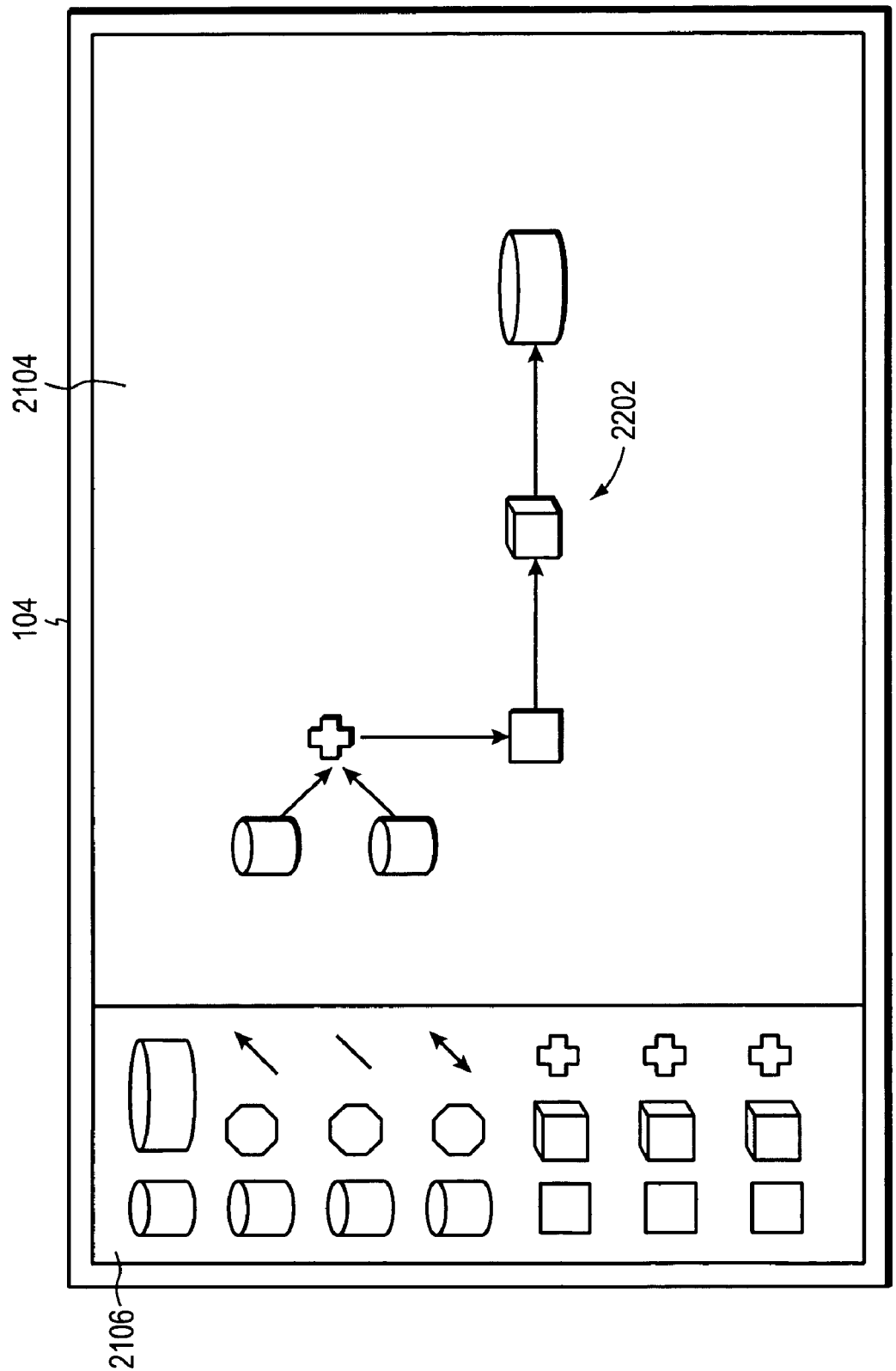
FIG. 22 shows another embodiment of a graphical user interface, allowing a data manager to design a data integration job.

As shown in FIG. 22, a user may use the graphical user interface 104 to align icons, or representations of targets, sources, functions and the like. The user may also create association or command structures between the several icons to create a data integration job 2202.

Figure 23:
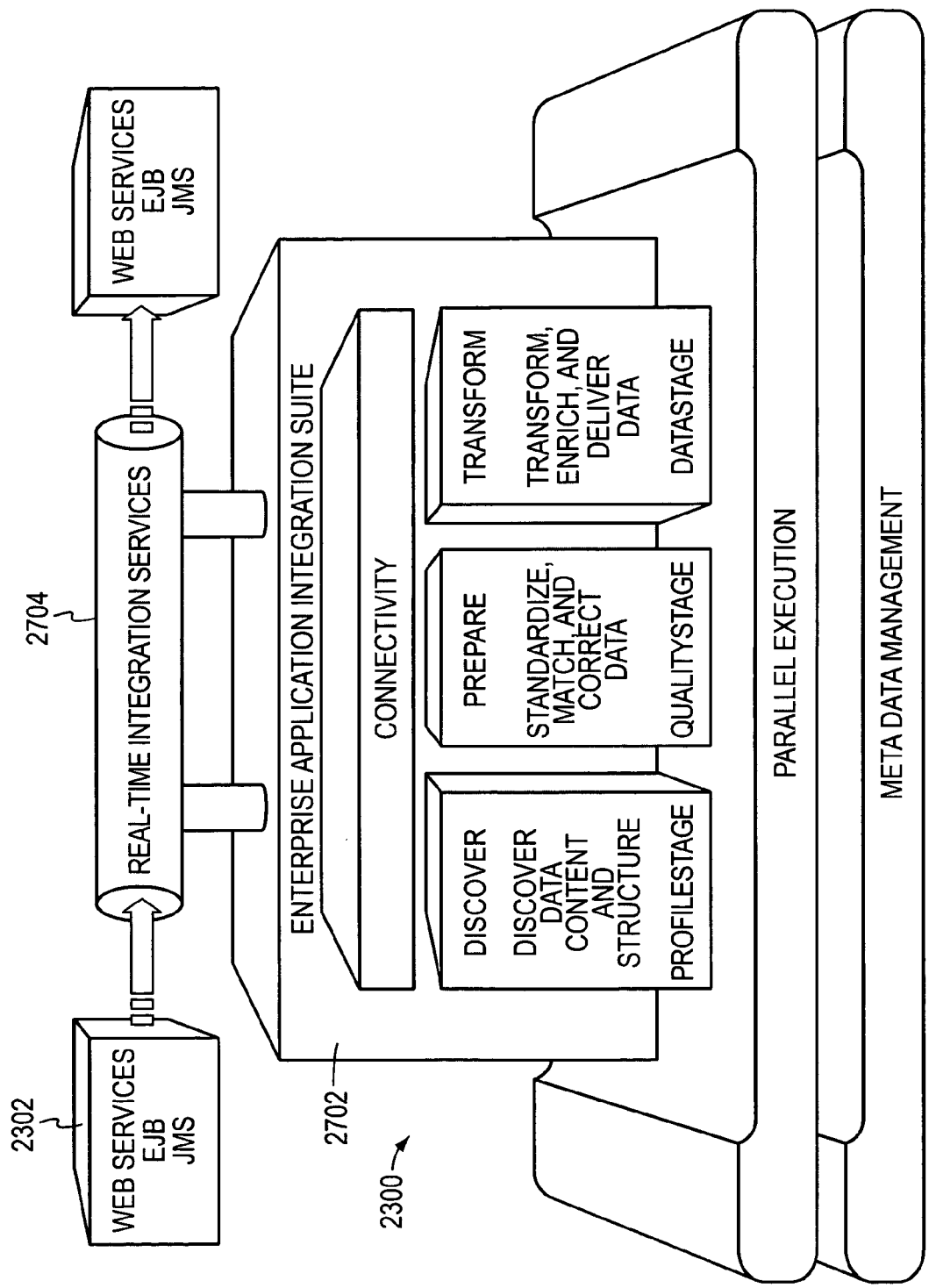
FIG. 23 is a schematic diagram of an architecture for integrating a real time integration (RTI) service facility with a data integration process.

FIG. 23 represents a platform 2300 for facilitating real time integration (RTI) of various data of a business enterprise. The platform includes an enterprise application integration (EAI) suite 2702 capable of providing enterprise application integration (EAI) services, including those that involve extraction of data from various sources, transformation of the data into desired formats and loading of data into various targets, sometimes referred to as ETL (Extract, Transform, Load). The platform 2300 includes an RTI service 2704 that can expose a conventional EAI suite or platform 2702 as a service that can be accessed by computer applications of the enterprise, including through web service protocols 2302.

Figure 24:
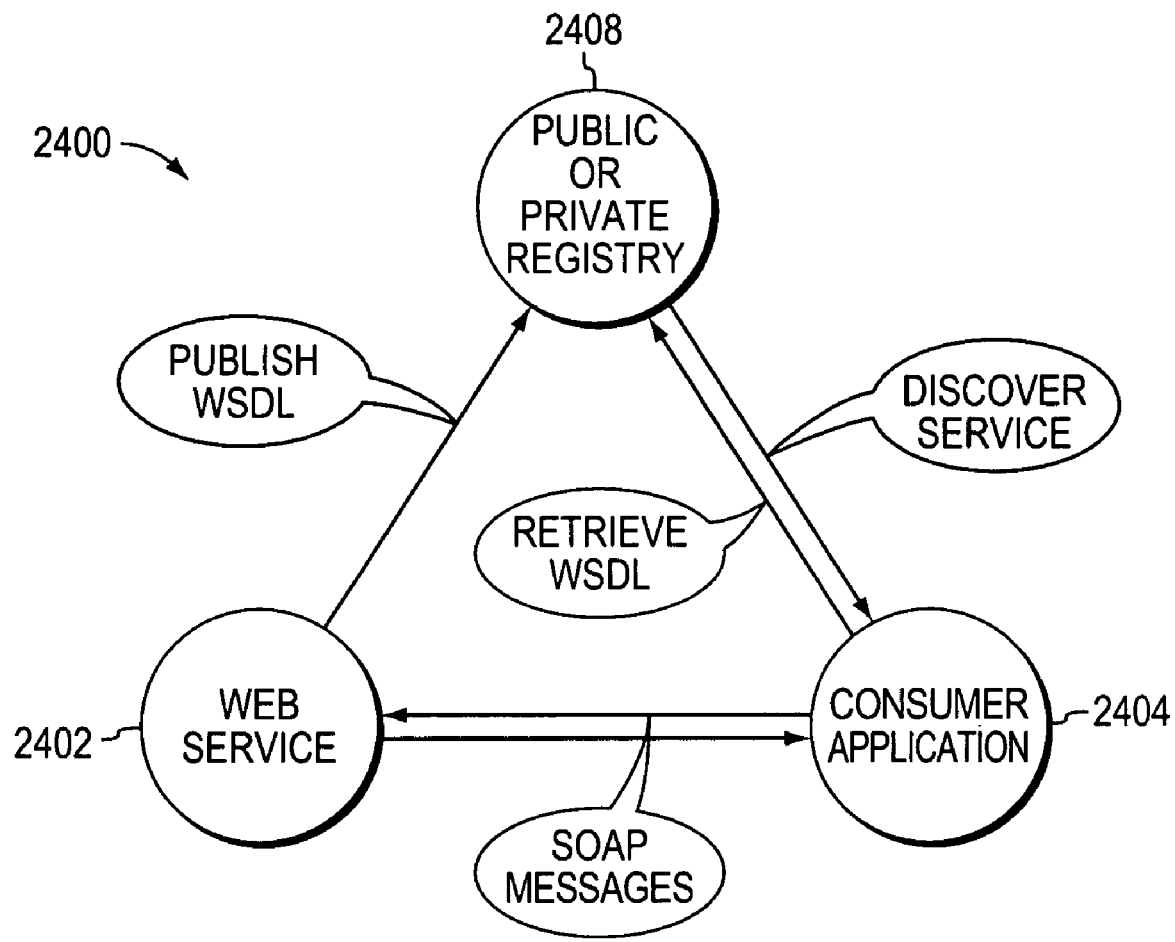
FIG. 24 is a schematic diagram showing a services-oriented architecture for a business enterprise.

FIG. 24 shows a schematic diagram 2400 of a services oriented architecture (SOA), in particular for a web service. The SOA can be part of the infrastructure of a business enterprise. In the SOA, services become building blocks for application development and deployment, allowing rapid application development and avoiding redundant code. Each service embodies a set of business logic or business rules that can be blind to the surrounding environment, such as the source of the data inputs for the service or the targets for the data outputs of the service. As a result, services can be reused with different applications, provided that appropriate inputs and outputs are established between the service and the applications. The services-oriented architecture allows the service to be protected against environmental changes, so that it still functions even if the surrounding environment is changed. As a result, services do not need to be recoded as a result of infrastructure changes, resulting in a substantial savings of time and effort.

In the SOA 2400 of FIG. 24, there are three entities, a service provider 2402, a service requester 2404 and a service registry 2408. The service registry 2408 may be public or private. The service requester 2404 may search a service registry 2408 for an appropriate service. Once an appropriate service is discovered, the service requester 2404 may receive code, such as Web Services Description Language (WSDL) code, required to invoke the service. WSDL is the language conventionally used to describe web services. The service requester 2404 may then interface with the service provider 2402, for example, through messages in appropriate formats (such as the Simple Object Access Protocol (SOAP) format for web service messages), to invoke the service. The SOAP protocol is a preferred protocol for transferring data in web services. SOAP defines the exchange format for messages between a web services client and a web services server. SOAP is an XML schema, with XML being the language typically used in web services for tagging data, although other markup languages may also be used.

Figure 25:
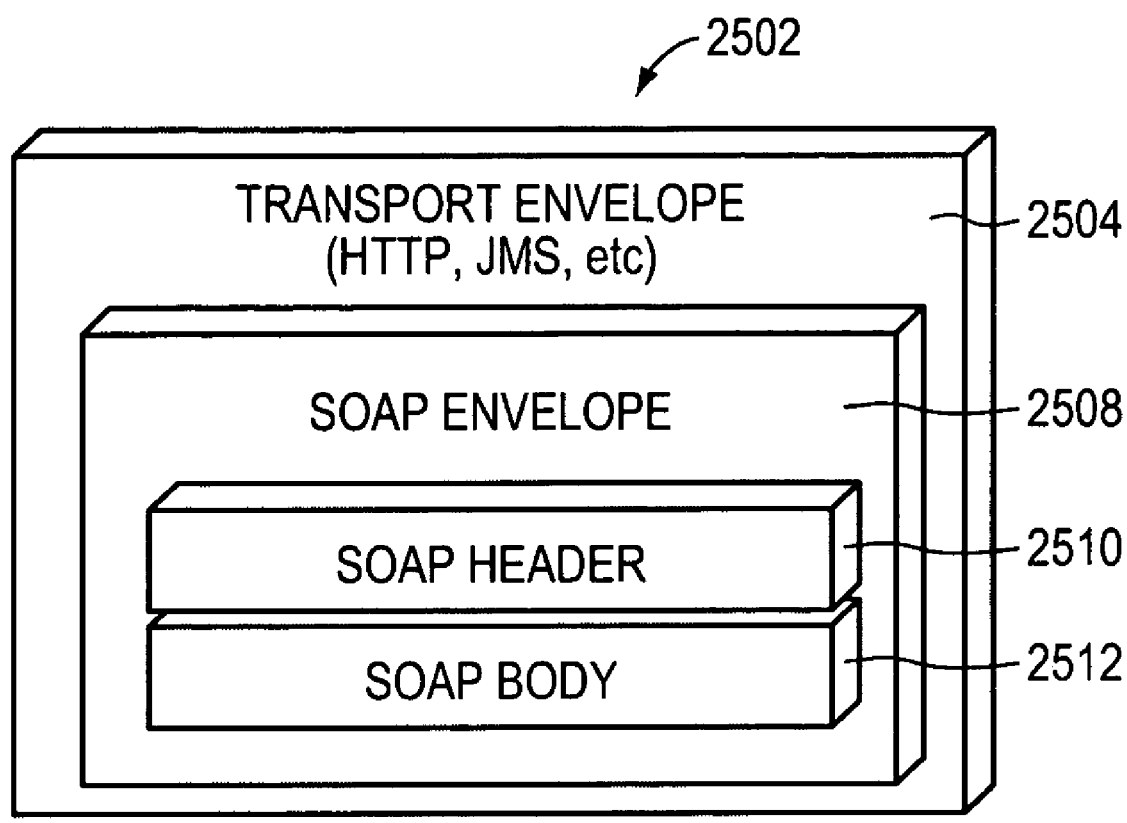
FIG. 25 is a schematic diagram showing a SOAP message format.

Referring to FIG. 25, a SOAP message 2502 includes a transport envelope 2504 (such as an HTTP or JMS envelope, or the like), a SOAP envelope 2508, a SOAP header 2510 and a SOAP body 2512. The following is an example of a SOAP-format request message and a SOAP-format response message:

include a browsing facility and a search facility, and may store the WSDL documents and their metadata.

To invoke the web service, the service requester 2404 sends the service provider 2402 a SOAP message as described in the WSDL, receives a SOAP message in response, and decodes the response message as described in the WSDL. Depending on their complexity, web services can provide a wide array of functions, ranging from simple operations, such as requests for data, to complicated business process operations. Once a web service is deployed, other applications (including other web services) can discover and invoke the web service. Other web services standards are being defined by the Web Services Interoperability Organization (WS-I), an open industry organization chartered to promote interoperability of web services across platforms. Examples include WS-Coordination, WS-Security, WS-Transaction, WSIF, BPEL and the like, and the web services described herein should be understood to encompass services contemplated by any such standards.

Figure 26:
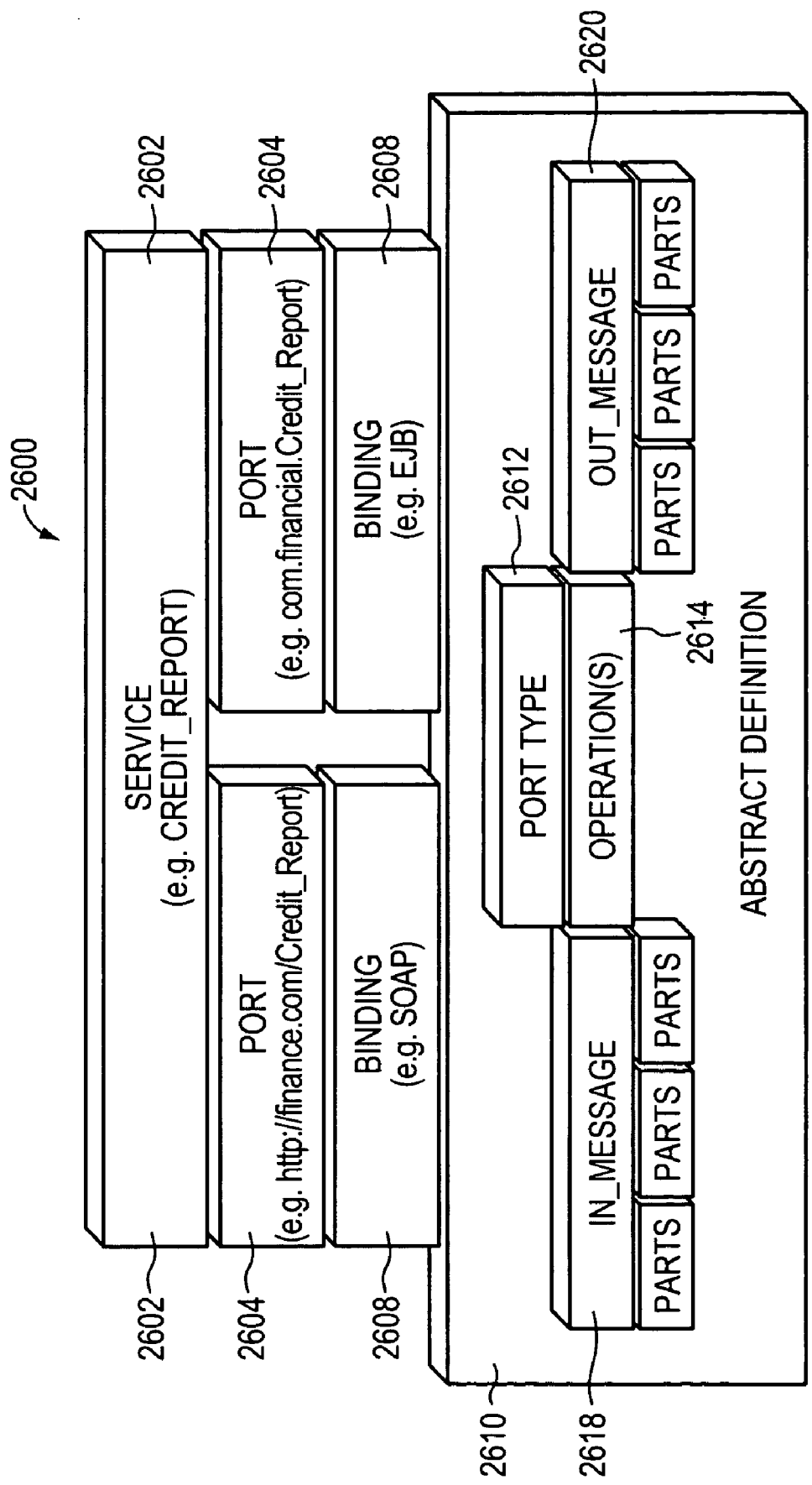
FIG. 26 is a schematic diagram showing elements of a WSDL description for a web service.

Referring now to FIG. 26, a WSDL definition 2600 is an XML schema that defines the interface, location and encoding scheme for a web service. The definition 2600 defines the service 2602, identifies the port 2604 through which the service 2602 can be accessed (such as an Internet address), defines the bindings 2608 (such as Enterprise Java Bean or SOAP bindings) that are used to invoke the web service and communicate with it. The WSDL definition 2600 may include an abstract definition 2610, which may define the port type 2612, incoming message parts 2618 and outgoing mes-

```
request    <SOAP-ENV:Envelope
           xmlns:SOAP-ENV="http://schemas.xmlsoap.org/soap/envelope/"
           xmlns:xsi="http://www.w3.org/2001/XMLSchema-instance"
           xmlns:xsd="http://www.w3.org/2001/XMLSchema"
           SOAP-ENV:encodingStyle="http://schemas.xmlsoap.org/soap/encoding/">
           <SOAP-ENV:Header></SOAP-ENV:Header>
           <SOAP-ENV:Body>
           <ns:getAddress xmlns:ns="PhoneNumber">
           <name xsi:type="xsd:string"> Ascential Software </name>
           </ns:getAddress>
           </SOAP-ENV:Body>
           </SOAP-ENV:Envelope>
response   <SOAP-ENV:Envelope
           xmlns:SOAP-ENV="http://schemas.xmlsoap.org/soap/envelope/"
           xmlns:xsi="http://www.w3.org/2001/XMLSchema-instance"
           xmlns:xsd="http://www.w3.org/2001/XMLSchema"
           SOAP-ENV:encodingStyle="http://schemas.xmlsoap.org/soap/encoding/">
           <SOAP-ENV:Header></SOAP-ENV:Header>
           <SOAP-ENV:Body>
           <getAddressResponse xmlns="http://schemas.company.com/address">
               <number> 50 </number>
               <street> Washington </street>
               <city> Westborough </city>
               <zip> 01581 </zip>
               <state> MA </state>
           </getAddressResponse>
           </SOAP-ENV:Body>
           </SOAP-ENV:Envelope>
```

Web services can be modular, self-describing, self-contained applications that can be published, located and invoked across the web. For example, in the embodiment of the web service of FIG. 24, the service provider 2402 publishes the web service to the service registry 2408, such as the Universal Description, Discovery and Integration (UDDI) registry, which provides a listing of available web services, or a private or other public registry. The web service can be published, for example, in WSDL format. To discover the service, the service requester 2404 browses the service registry 2408 and retrieves the WSDL document. The service registry 2408 may sage parts 2620 for the web service, as well as the operations 2614 performed by the service.

There are a variety of web services clients that can invoke web services from various providers. Web services clients include .Net applications, Java applications (e.g., JAX-RPC), applications in the Microsoft SOAP toolkit (Microsoft Office, Microsoft SQL Server, and others), applications from SeeBeyond, WebMethods, Tibco and BizTalk, as well as Ascential's DataStage (WS PACK). It should be understood that other web services clients not included in this list can be used in the enterprise data integration methods and systems described herein. Similarly, there are various web services providers, including Net applications, Java applications, applications from Seibel and SAP, I2 applications, DB2 and SQL Server applications, enterprise application integration (EAI) applications, business process management (BPM) applications, and Ascential Software's Real Time Integration (RTI) application.

In embodiments, the RTI services described herein can use an open standard specification such as WSDL to describe a data integration process service interface. When a data integration service definition is complete, it can use WSDL web service definition language (a language that is not necessarily specific to web services), which is an abstract definition that gives what the name of the service is, what the operations of the service are, what the signature of each operation is, and the bindings for the service. Within a WSDL file, such as an XML document, there are various tags, with the structure described in connection with FIG. 26. For each service, there can be multiple ports, with each port having a binding. The port type is an entry point for a set of operations, each of which has a set of input arguments and output arguments.

WSDL was originally defined for web services, but with only one binding defined (SOAP defined over HTTP). WSDL has since been extended by industry standards bodies to include WSDL extensions for various other bindings, such as EJB, JMS, and the like. Accordingly, an RTI service can use WSDL extensions to create bindings for various other protocols. Thus, a single RTI data integration service can support multiple bindings at the same time to the single service. As a result, a business can take a data integration process, expose it as a set of abstract processes (completely agnostic to protocols) and thereafter add the bindings. A service can support any number of bindings.

In embodiments, a user may take a preexisting data integration job, add appropriate RTI input and output phases, and expose the job as a service that can be invoked by various applications that use different native protocols.

Figure 27:
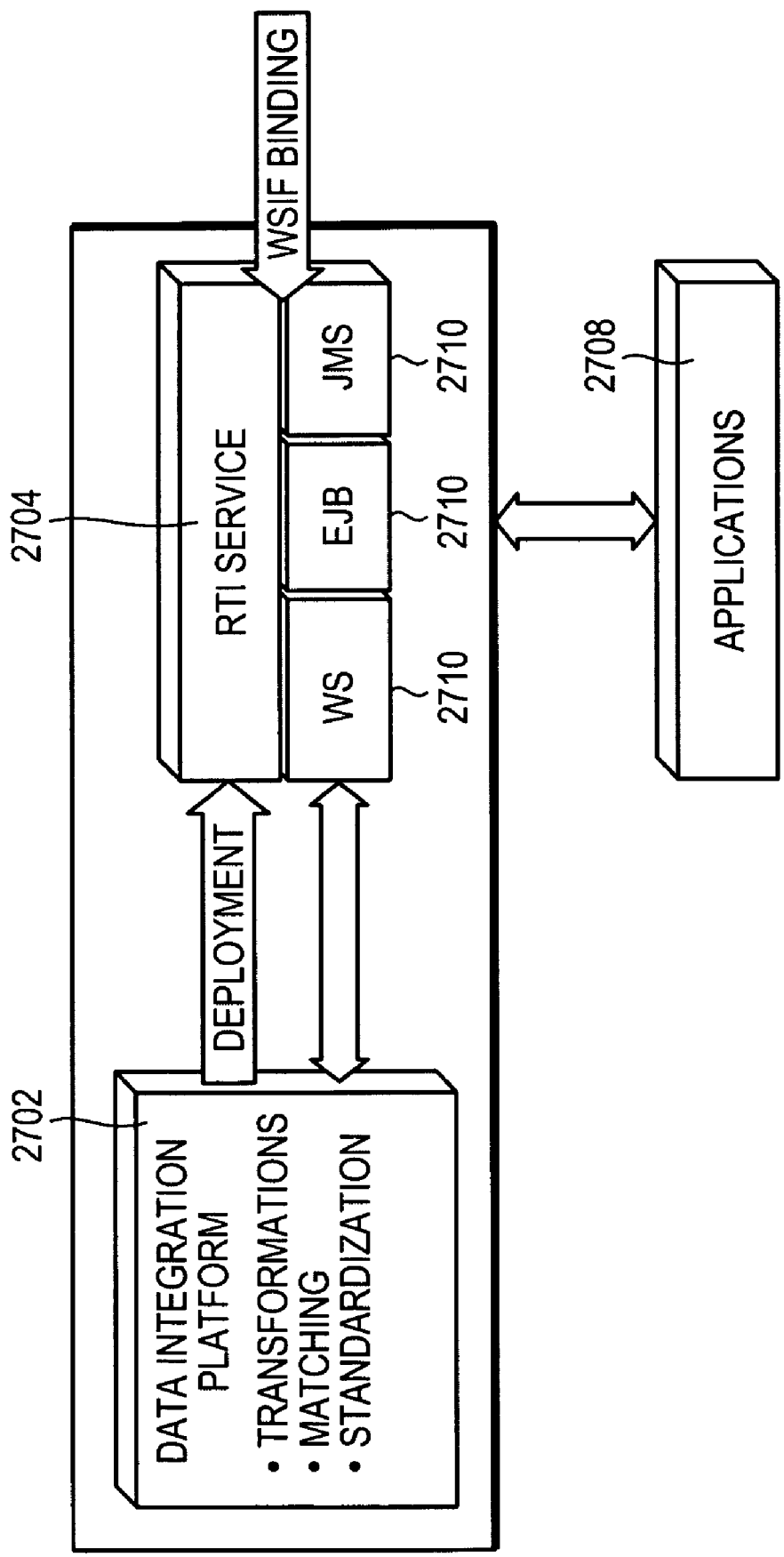
FIG. 27 is a schematic diagram showing elements for enabling an RTI process for an enterprise.

Referring now to FIG. 27, a high-level architecture is represented for a data integration platform for real time integration (RTI). A conventional data integration facility 2702 provides methods and systems for data integration jobs, as described in connection with FIGS. 1-22. The data integration facility 2702 connects to one or more applications through a real time integration (RTI) facility, or RTI service 2704, in a service-oriented architecture. The RTI service 2704 can invoke or be invoked by various applications 2708 of the enterprise. The data integration facility 2702 can provide matching, standardization, transformation, cleansing, discovery, metadata, parallel execution, and similar facilities that are required to perform data integration jobs. In embodiments, the RTI service 2704 exposes the data integration jobs of the data integration facility 2702 as services that can be invoked in real time by applications 2708 of the enterprise. The RTI service 2704 exposes the data integration facility 2702, so that data integration jobs can be used as services, synchronously or asynchronously. The jobs can be called, for example, from enterprise application integration platforms, application server platforms, as well as Java and .Net applications. The RTI service 2704 allows the same logic to be reused and applied across batch and real time services. The RTI service 2704 may be invoked using various bindings 2710, such as Enterprise Java Bean (EJB), Java Message Service (JMS), or web service bindings.

Figure 28:
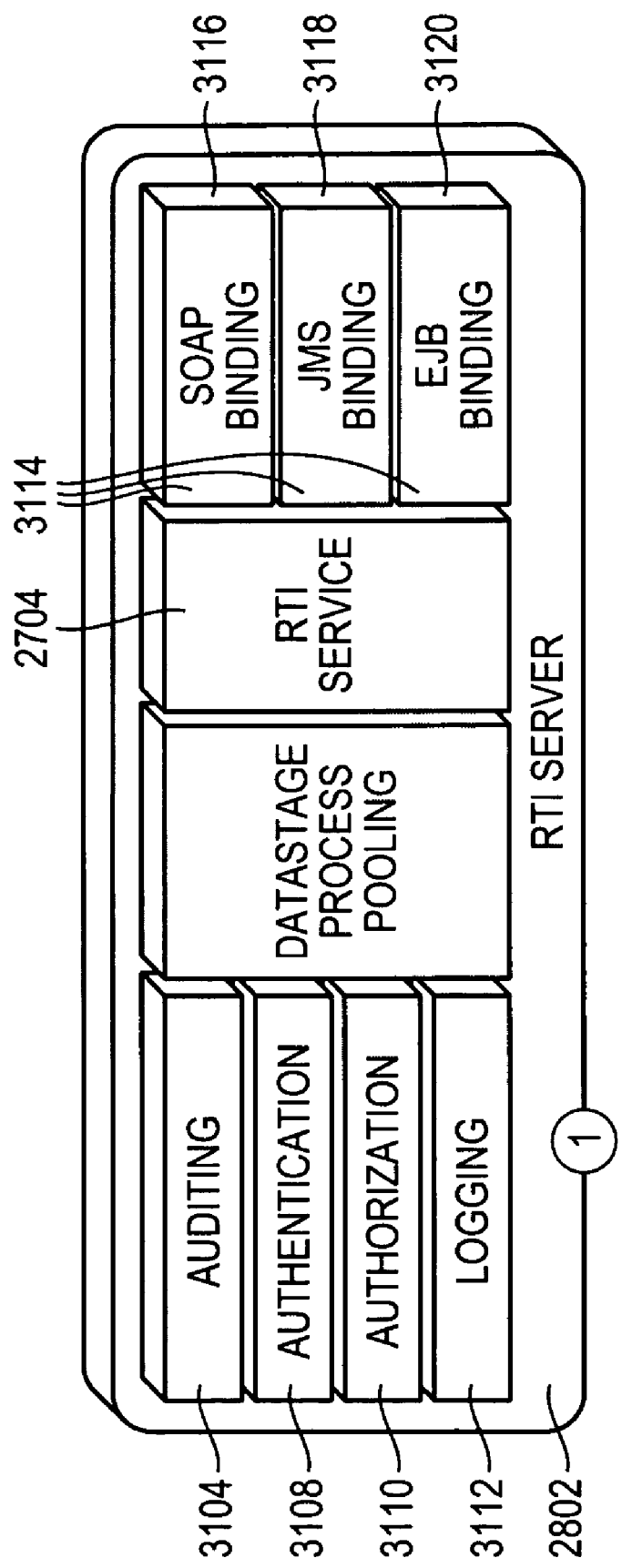
FIG. 28 is an embodiment of a server for enabling an RTI service.
Figure 31:
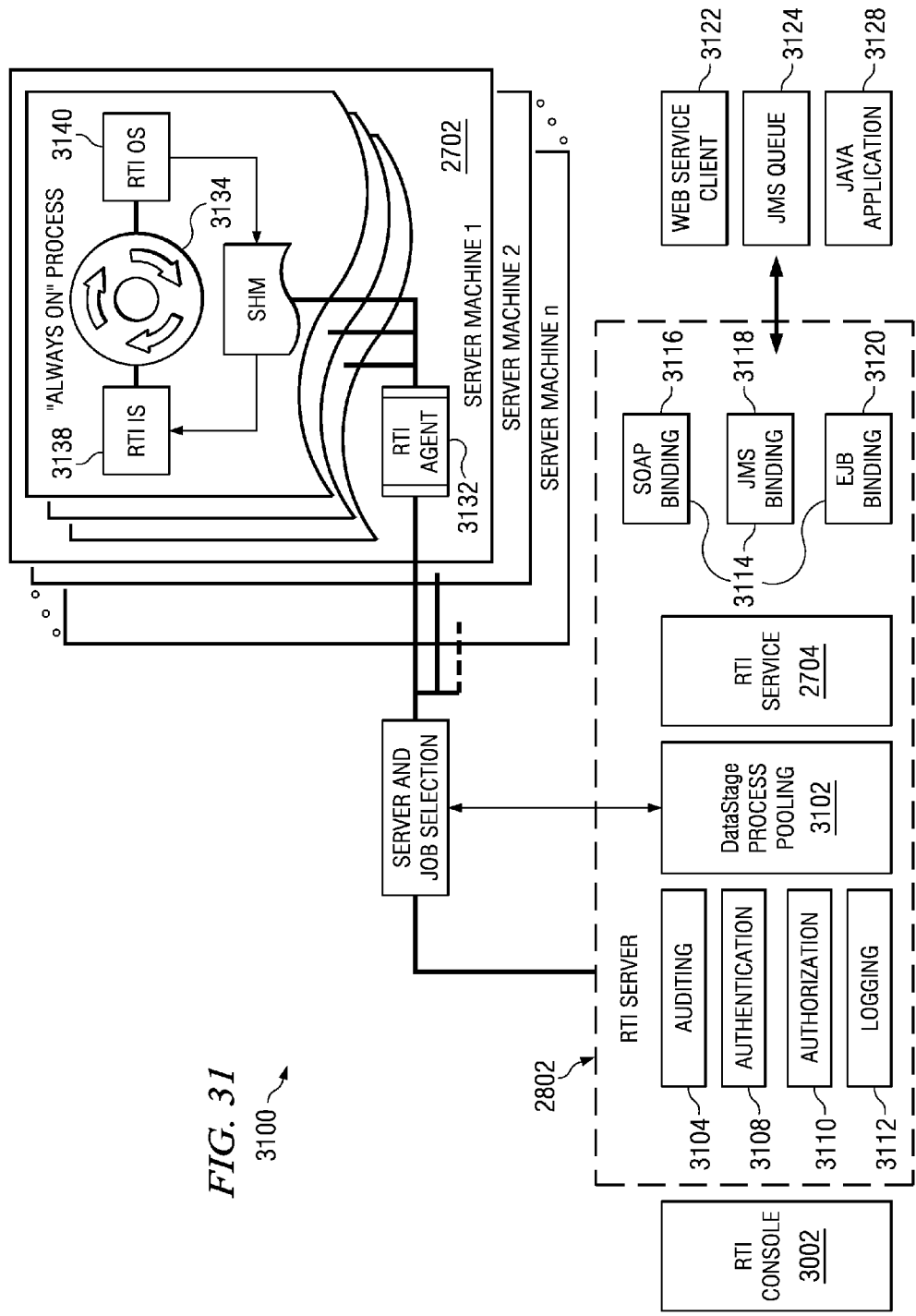
FIG. 31 shows a further detail of an architecture for enabling an RTI service.

Referring now to FIG. 28 and also to FIG. 31, in an exemplary embodiment, the RTI service 2704 runs on an RTI server 2802, which operates as a connection facility for various elements of the RTI process. For example, the RTI server 2802 can connect a plurality of enterprise application integration servers, such as DataStage servers from Ascential Software of Westboro, Mass., so that the RTI server 2802 can provide pooling and load balancing among the other servers.

The RTI server 2802 can include a separate J2EE application running on a J2EE application server. More than one RTI server 2802 may be included in a data integration process. J2EE provides a component-based approach to design, development, assembly and deployment of enterprise applications. Among other things, J2EE offers a multi-tiered, distributed application model, the ability to reuse components, a unified security model, and transaction control mechanisms. J2EE applications are made up of components. A J2EE component is a self-contained functional software unit that is assembled into a J2EE application with its related classes and files and that communicates with other components. The J2EE specification defines various J2EE components, including: application clients and applets, which are components that run on the client side; Java Servlet and JavaServer Pages (JSP) technology components, which are Web components that run on the server; and Enterprise JavaBean (EJB) components (enterprise beans), which are business components that run on the server. J2EE components are written in Java and are compiled in the same way as any program. The difference between J2EE components and "standard" Java classes is that J2EE components are assembled into a J2EE application, verified to be well-formed and in compliance with the J2EE specification, and deployed to production, where they are run and managed by a J2EE server.

There are three kinds of EJBs: session beans, entity beans, and message-driven beans. A session bean represents a transient conversation with a client. When the client finishes executing, the session bean and its data are gone. In contrast, an entity bean represents persistent data stored in one row of a database table. If the client terminates or if the server shuts down, the underlying services ensure that the entity bean data is saved. A message-driven bean combines features of a session bean and a Java Message Service ("JMS") message listener, allowing a business component to receive JMS messages asynchronously.

The J2EE specification also defines containers, which are the interface between a component and the low-level platform-specific functionality that supports the component. Before a Web, enterprise bean, or application client component can be executed, it must be assembled into a J2EE application and deployed into its container. The assembly process involves specifying container settings for each component in the J2EE application and for the J2EE application itself. Container settings customize the underlying support provided by the J2EE server, which includes services such as security, transaction management, Java Naming and Directory Interface (JNDI) lookups, and remote connectivity.

Figure 29:
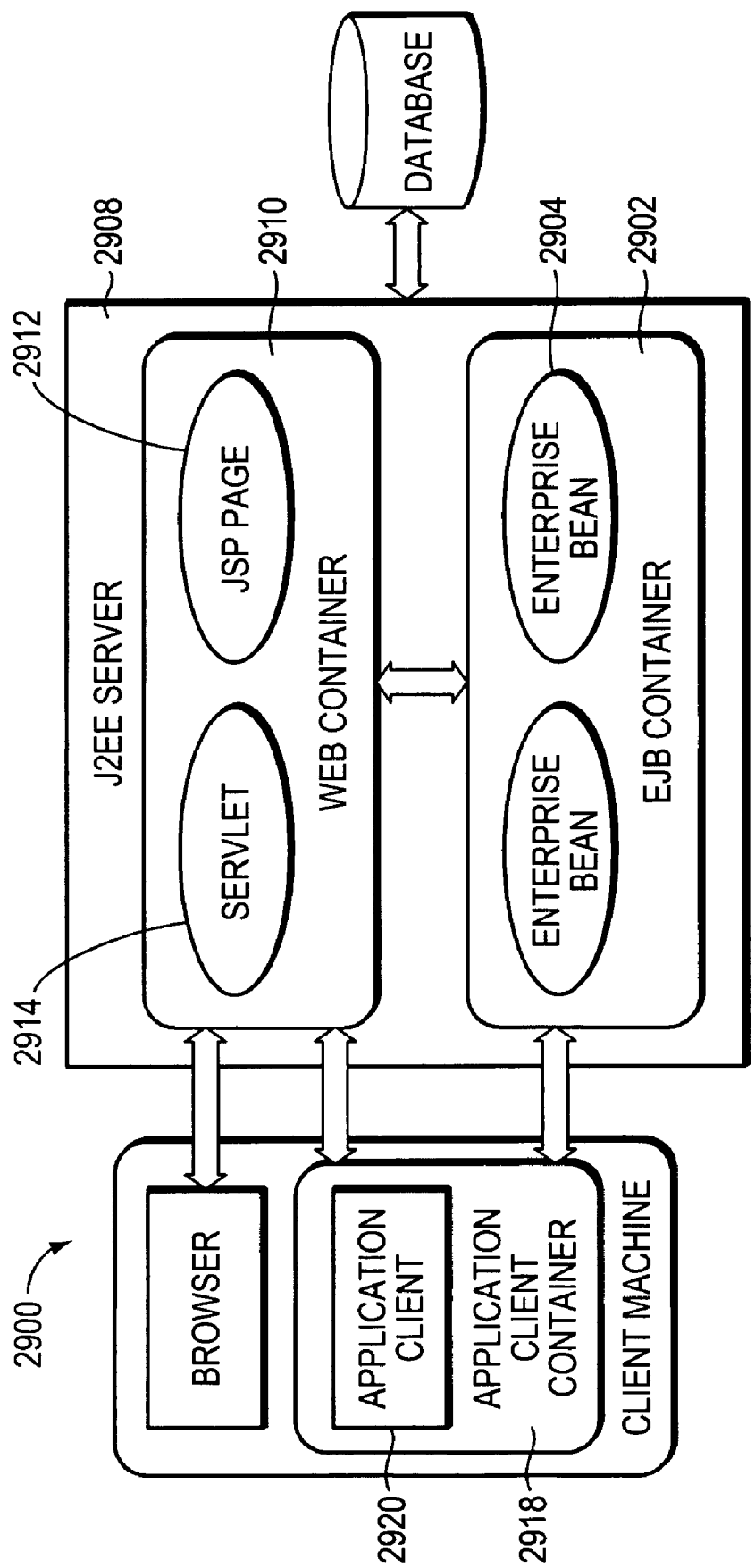
FIG. 29 shows an architecture and functions of a typical J2EE server.

FIG. 29 depicts an architecture 2900 for a typical J2EE server 2908 and related applications. The J2EE server 2908 comprises the runtime aspect of a J2EE architecture. A J2EE server 2908 provides EJB and web containers. The EJB container 2902 manages the execution of enterprise beans 2904 for J2EE applications. Enterprise beans 2904 and their container 2902 run on the J2EE server 2908. The web container 2910 manages the execution of JSP pages 2912 and servlet components 2914 for J2EE applications. Web components and their container 2910 also run on the J2EE server 2908. Meanwhile, an application client container 2918 manages the execution of application client components. Application clients 2920 and their containers 2918 run on the client side. The applet container manages the execution of applets. The applet container may consist of a web browser and a Java plug-in running together on the client.

J2EE components are typically packaged separately and bundled into a J2EE application for deployment. Each component, its related files such as GIF and HTML files or server-side utility classes, and a deployment descriptor are assembled into a module and added to the J2EE application. A J2EE application and each of its modules has its own deployment descriptor. A deployment descriptor is an XML document with an .xml extension that describes a component's deployment settings. A J2EE application with all of its modules is delivered in an Enterprise Archive (EAR) file. An EAR file is a standard Java Archive (JAR) file with an ear extension. Each EJB JAR file contains a deployment descriptor, the enterprise bean files, and related files. Each application client JAR file contains a deployment descriptor, the class files for the application client, and related files. Each file contains a deployment descriptor, the Web component files, and related resources.

The RTI server 2802 acts as a hosting service for a real time enterprise application integration environment. In a preferred embodiment the RTI server 2802 is a J2EE server capable of performing the functions described herein. The RTI server 2802 can also provide a secure, scaleable platform for enterprise application integration services. The RTI server 2802 can provide a variety of conventional server functions, including session management, logging (such as Apache Log4J logging), configuration and monitoring (such as J2EE JMX), security (such as J2EE JAAS, SSL encryption via J2EE administrator). The RTI server 2802 can serve as a local or private web services registry, and it can be used to publish web services to a public web service registry, such as the UDDI registry used for many conventional web services. The RTI server 2802 can perform resource pooling and load balancing functions among other servers, such as those used to run data integration jobs. The RTI server 2802 can also serve as an administration console for establishing and administering RTI services. The RTI server can operate in connection with various environments, such as JBOSS 3.0, IBM Websphere 5.0, BEA WebLogic 7.0 and BEA WebLogic 8.1.

Once established, the RTI server 2802 allows data integration jobs (such as DataStage and QualityStage jobs performed by the Ascential Software platform) to be invoked by web services, enterprise Java beans, Java message service messages, or the like. The approach of using a service-oriented architecture with the RTI server 2802 allows binding decisions to be separated from data integration job design. Also, multiple bindings can be established for the same data integration job. Because the data integration jobs are indifferent to the environment and can work with multiple bindings, it is easier to reuse processing logic across multiple applications and across batch and real time modes.

Figure 30:
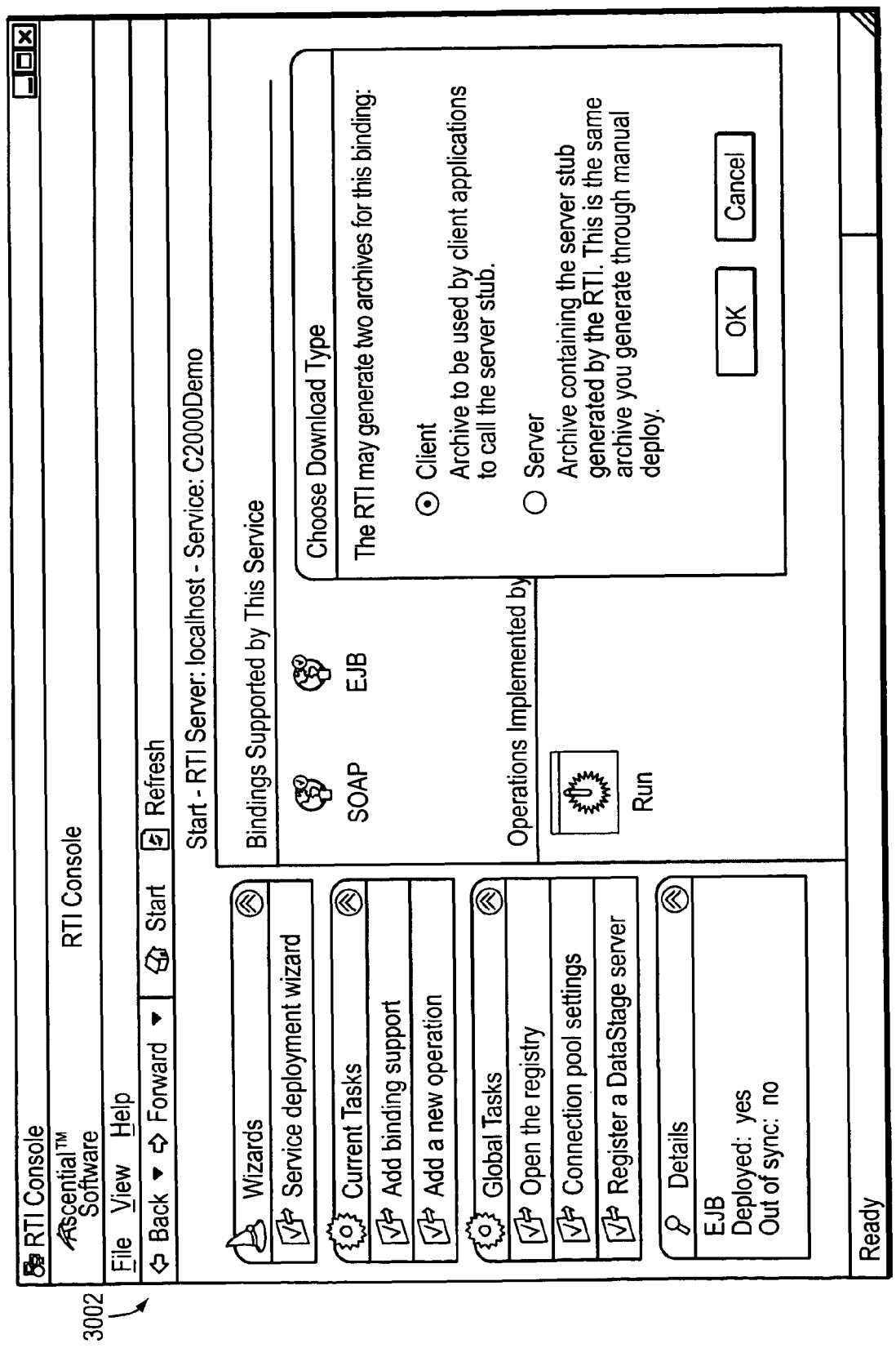
FIG. 30 represents an RTI console for administering an RTI service.

Referring to FIG. 30 an RTI console 3002 is provided for administering an RTI service. The RTI console 3002 enables the creation and deployment of RTI services. Among other things, the RTI console 3002 allows the user to establish bindings to be used for providing an interface to a given RTI service and to establish parameters for runtime usage of the RTI service. The RTI console 3002 may be provided with a graphical user interface and run in any suitable environment for supporting such an interface, such as a Microsoft Windows-based environment. Further details for using the RTI console will be provided below. The RTI console 3002 can be used by a designer to create the service, create the operations of the service, attach a job to the operation of the service and create the bindings that the user wants to use to embody the service with various protocols.

Referring back to FIG. 27, the RTI service 2704 is located between the data integration platform 2702 and various applications 2708. The RTI service 2704 allows the applications to access the data integration program in real time or in batch mode, synchronously or asynchronously. Data integration rules established in the data integration platform 2702 can be shared across the enterprise, anytime and anywhere. The data integration rules can be written in any language, without requiring knowledge of the platform itself. The RTI service 2704 leverages web service definitions to facilitate real time integration. A typical data integration job expects some data at the beginning and puts some out at the outside. The flow of the data integration job can, in accordance with the methods and systems described herein, be connected to a batch environment or the real time environment. The methods and systems disclosed herein include the concept of a container, which is defined as a piece of business logic placed between a defined entry point and a defined exit point. By placing a data integration process as the business logic in a container, the data integration can be used in batch and real time mode. Once business logic is in a container, moving between batch and real time modes is extremely simple. A data integration job can be accessed as a real time service, and the same data integration job can be accessed in batch mode, such as to process a large batch of files, performing the same transformations as in the real time mode.

Referring to FIG. 31, further detail is provided of an architecture 3100 for enabling an embodiment of the RTI service 2704 depicted in FIG. 28. The RTI server 2802 includes various components, including facilities for auditing 3104, authentication 3108, authorization 3110 and logging 3112, which are typically provided by a J2EE-compliant server. The RTI server 2802 can also include a process pooling facility 3102, which can operate to pool and allocate resources, such as resources associated with data integration jobs running on data integration platforms 2702. The process pooling facility 3102 can provide server and job selection across various servers that are running data integration jobs. Selection may be based on balancing the load among machines, or based on which data integration jobs are capable of running (or running most effectively) on which machines. The RTI server 2802 can also include binding facilities 3114, such as a SOAP binding facility 3116, a JMS binding facility 3118, and/or an EJB binding facility 3120. The binding facilities 3114 provide an interface between the RTI server 2802 and various applications, such as the web service client 3122, the JMS queue 3124 or a Java application 3128.

Referring still to FIG. 31, the RTI console 3002 is the administration console for the RTI server 2802. The RTI console 3002 allows an administrator to create and deploy an RTI service, configure the runtime parameters of the service, and define the bindings or interfaces to the service.

The architecture 3100 includes one or more data integration platforms 2702, which may comprise servers, such as DataStage servers provided by Ascential Software of Westboro, Mass. The data integration platforms 2702 may include facilities for supporting interaction with the RTI server 2802, including an RTI agent 3132, which is a process running on the data integration platform 2702 that manages requests to and from the RTI server 2802. Thus, once the process pooling facility 3102 selects a particular machine as the data integration platform 2702 for a real time integration job, it hands the request to the RTI agent 3132 for that data integration platform 2702. On the data integration platform 2702, one or more data integration jobs 3134, such as those described in connection with FIGS. 1-22, may be running. In embodiments, the data integration jobs 3134 are optionally always on, rather than having to be initiated at the time of invocation. For example, the data integration jobs 3134 may have already-open connections with databases, web services, and the like, waiting for data to come and invoke the data integration job 3134, rather than having to open new connections at the time of processing. Thus, an instance of the already-on data integration job 3134 is invoked by the RTI agent 3132 and can commence immediately with the execution of the data integration job 3134, using the particular inputs from the RTI server 2802, which might be a file, a row of data, a batch of data, and the like.

Still referring to FIG. 31, each data integration job 3134 may include an RTI input stage 3138 and an RTI output stage 3140. The RTI input stage 3138 is the entry point to the data integration job 3134 from the RTI agent 3132, and the RTI output stage 3140 is the output stage back to the RTI agent 3132. With the RTI input and output stages, the data integration job 3134 can be a platform-independent piece of business logic. The RTI server 2802 knows the inputs that are required for the RTI input stage 3138 of each RTI data integration job 3134. For example, if the business logic of a given data integration job 3134 takes a customer's last name and age as inputs, then the RTI server 2802 will pass inputs in the form of a string and an integer to the RTI input stage 3138 of that data integration job 3134. The RTI input stage takes the input and formats it appropriate for whatever native application code is used to execute the data integration job 3134.

The methods and systems described herein enable a designer to define automatic, customizable mapping techniques from a data integration process to an RTI service interface. In particular, the RTI console 3002 allows the designer to create an automated service interface for the data integration process. Among other things, it allows a user (or a set of rules or a program) to customize the generic service interface to fit a specific purpose. In a data integration job, which can include a flow of transactions, such as transformations, between the RTI input stage 3138 and RTI output stage 3140, metadata for the job may indicate, for example, the format of data exchanged between components or stages of the job. A table definition can describe what the RTI input stage 3138 may expect to receive; for example, the input stage of the data integration job may expect to receive three calls: one string and two integers. Meanwhile, at the end of the data integration job flow, the output stage may return calls that are in the form of one string and one integer. When the user creates an RTI service, it is desirable to define the type of data expected at the input and the type of data to be returned at the output. Compared to a conventional object-oriented programming method, a service corresponds to a class, and an operation to a method, where a job defines the signature of the operation based on metadata, such as an RTI input table 3414 associated with the RTI input stage 3138 and an RTI output table 3418 associated with the RTI output stage 3140.

Following the above example, a user might define (string, int, int) as the input arguments for a particular RTI operation at the RTI input table 3414, and the outputs in the RTI output table 3418 as (string; int). In other embodiments, the input and output might be single strings. If there are other fields (more calls), the user can customize the input mapping. Instead of having an operation with fifteen integers, the user can create a command "struct" (a complex type with multiple fields, each field corresponding to a complex operations), such as an operator Opt (struct(string, int, int)):struct (string, int). The user can group the input parameters so that they are grouped as one complex input type. As a result, it is possible to handle an array, so that the transaction is defined as: Opt1 (array(struct(string, int, int))). For example, the input structure could be (Name, SSN, age) and the output structure could be (Name, birthday). The array can be passed through the RTI service. At the end, the RTI service outputs the corresponding reply for the array. Arrays allow grouping of multiple rows into a single transaction. In the RTI console 3002, a checkbox 5308 allows the user to "accept multiple rows" in order to enable arrays. To define the inputs, in the RTI console 3002, a particular row may be checked or unchecked to determine whether it will become part of the signature of the operation as an input. A user may not want to expose a particular input column to the operation, for example because it tends to be always be the same for a particular operation, in which case the user can fix a static value for the input, so that the operation only sees the variables that are not static values.

A similar process may be used to map outputs for an operation, such as using the RTI console to ignore certain columns of output, an action that can be stored as part of the signature of a particular operation.

Still referring to FIG. 31, RTI service requests that pass through the data integration platform 2702 from the RTI server 2802 can be delivered in a pipeline of individual requests, rather than in a batch or large set of files. The pipeline approach allows individual service requests to be picked up immediately by an already-running instance of a data integration job 3134, resulting in rapid, real time integration, rather than requiring the enterprise to wait for completion of a batch integration job. Service requests passing through the pipeline can be thought of as waves, and each service request can be marked by a start of wave marker and an end of wave marker, so that the RTI agent 3132 recognizes the initiation of a new service request and the completion of a data integration job 3134 for a particular service request.

The end of wave marker explains why a system can do both batch and real time operations with the same service. In a batch environment, a data integration user typically wants to optimize the flow of data, such as to do the maximum amount of processing at a given stage, then transmit to the next stage in bulk, to reduce the number of times data has to be moved, because data movement is resource-intensive. In contrast, in a real time process, the data integration user wants to move each transaction request as fast as possible through the flow. The end of wave marker sends a signal that informs the job instance to execute the particular request through the data integration job, rather than waiting for more data to start the processing, as a system typically would do in batch mode. A benefit of end of wave markers is that a given job instance can perform multiple transactions at the same time, each of which is separated from other transactions by end of wave markers. Two end of wave markers always enclose a transaction. So the end of wave markers delineate a succession of units of work, each unit being separated by end of wave markers.

Pipelining allows multiple requests to be processed simultaneously by a service. The load balancing algorithm of the process pooling facility 3102 of FIG. 31 works in a way that the service first fills a single instance to its maximum capacity (filling the pipeline) before to start a new instance of the data integration job. In a real time integration model, when a recall is processed in real time (unlike in a batch mode where the system typically fills a buffer before processing the batch), the end of wave markers allow pipelining the multiple transactions into the flow of the data integration job. For load balancing, the balance cannot be based only on whether a job is busy or not, because a job can handle more than one request.

It is desirable to avoid starting new data integration job instances before the capacity of the pipeline has reached its maximum. This means that load balancing needs to be dynamic and based on additional properties. In the RTI agent process, the RTI agent 3132 knows about the instances running on each data integration platform 2702 accessed by the RTI server 2802. In the RTI agent 3132, the user can create a buffer for each of the job instances running on the data integration platform 2702. Various parameters can be set in the RTI console 3002 to help with dynamic load balancing. One parameter is the maximum size for the buffer (measured in number of requests) that can be placed in the buffer waiting for handling by the job instance. It may be preferable to have only a single request, resulting in constant throughput, but in practice there are usually variances in throughput, so that it is often desirable to have a buffer for each job instance. A second parameter is the pipeline threshold, which is a parameter that says at what point it may be desirable to initiate a new job instance. The threshold can be a warning indicator, rather than automatically starting a new instance, because the delay may be the result of an anomalous increase in traffic. A third parameter can determine that if the threshold is exceeded for more than a specified period of time, then a new instance will be started. Accordingly, pipelining properties, such as the buffer size, threshold, and instance start delay, are parameters that the user can set so that the system knows whether to set up new job instances or to keep using the same ones for the pipeline.

The data integration platforms 2702 can be implemented as Data Stage server machines. Each of them can run data integration jobs 3134, which may be Data Stage jobs. The presence of the RTI input stage 3138 means that a job 3134 is always up and running and waiting for a request, unlike in a batch mode, where a job instance is initiated at the time of batch processing. In operation, the data integration job 3134 is running with the requisite connections with databases, web services, and the like, and the RTI input stage 3134 is listening, waiting for data to arrive. For each transaction, the end of wave marker travels through the stages of the data integration job 3134. RTI input stage 3138 and RTI output stage 3140 are the communication points between the data integration job 3134 and the rest of the RTI service environment. For example, a computer application of the business enterprise may send a request for a transaction. The RTI server 2802 knows that RTI data integration jobs 3134 are running on various data integration platforms 2702, which in an embodiment are DataStage servers from Ascential Software. The RTI server 2802 maps the data in the request from the computer application into a form required by the RTI input stage 3138 for the particular data integration job 3134. The RTI agent 3132 is aware of the applications running on each of the data integration platforms 2702. The RTI agent 3132 operates with shared memory with the RTI input stage 3138 and the RTI output stage 3140. The RTI agent 3132 marks a transaction with end of wave markers, sends the transaction into the RTI input stage 3138, then, recognizing the end of wave marker as the data integration job 3134 is completed, takes the result out of the RTI output stage 3140 and sends the result back to the computer application that initiated the transaction.

The RTI methods and systems described herein allow exposition of data integration processes as a set of managed abstract services, accessible by late binding multiple access protocols. Using the data integration platform 2702, a user can create via a graphical user interface a process flow representing one or more data integration processes. The user can then expose the processes defined by the flow as a service that can be invoked in real time, synchronously or asynchronously, by various applications. An RTI service can advantageously support various protocols, such as JMS queues, Java classes, and web services. Binding multiple access protocols allows various applications to access the RTI service. Since the bindings can handle application-specific protocol requirements, the RTI service can be defined as an abstract service, which refers to the function of the service, rather than to a specific protocol or environment.

An RTI service can have multiple operations, with each operation implemented by a job. A user doesn't need to know about the particular web service, java class and the like, or the name of the service when creating the service. Instead, the system generates an operation of the RTI service for a given data integration request. At some point during the data integration request, the user can bind the RTI service to one or more protocols, which could be a web service, Enterprise Java Bean (EJB), JMS, JMX, C++ or any other suitable protocol that can embody the service. A particular RTI service may have several bindings which can be invoked at the same time, so that the service can be accessed by different applications using different protocols.

For example, the service definition of a WSDL document can include a type, and a user can define the port types that can be attached to the particular WSDL-defined jobs. Examples include SOAP over HTTP, EJB, Text Over JMS, and others. For example, to create an EJB binding, the RTI server 2802 generates Java source code of an Enterprise Java Bean. At service deployment the user uses the RTI console 3002 to define properties, compile code, create a Java archive file, and then give the Java archive file to the user of an enterprise application to deploy in the user's Java application server, so that each operation is one method of the Java class. As a result, there is a one-to-one correspondence between an RTI service name and a Java class name, as well as a one-to-one correspondence between an RTI operation name and a Java method name. As a result, Java application method calls will call the operation in the RTI service. A web service using SOAP over HTTP and a Java application using an EJB can then go to that particular data integration job via the RTI service. The entry point and exit points are unaware of the protocol, so the same job can work on multiple protocols.

While SOAP and EJB bindings support synchronous processes, other bindings, such as SOAP over JMS and Text over JMS, support asynchronous processes. For example, a message can be attached to a queue, with the RTI service listening to the queue and posting the output to another queue. The process is asynchronous because the client posting the message to the queue does not wait for the output of the queue.

Figure 32:
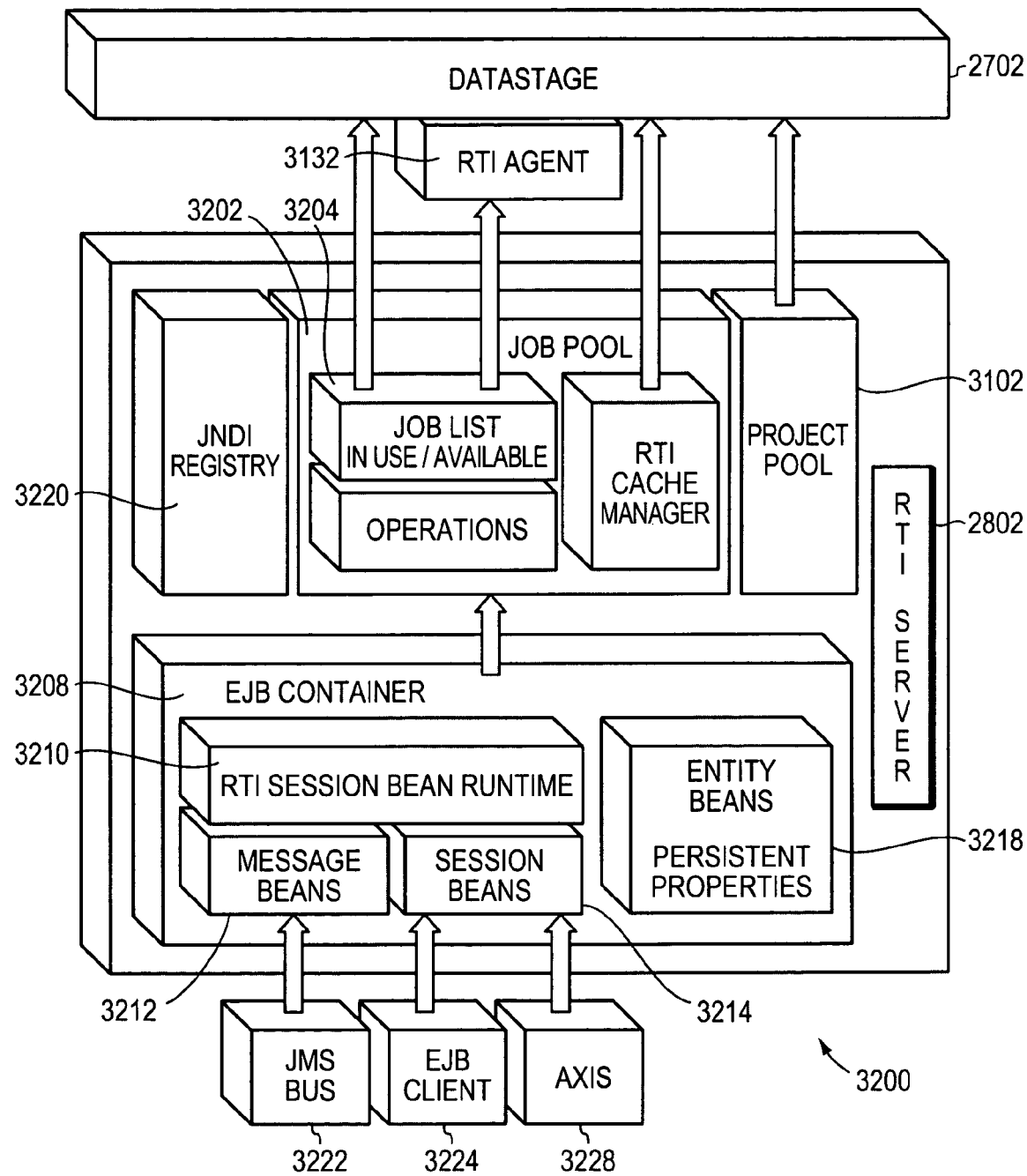
FIG. 32 is a schematic diagram of the internal architecture for an RTI service.

FIG. 32 is a schematic block diagram 3200 of the internal architecture for an RTI service. The architecture includes the RTI server 2802, which can be a J2EE-compliant server. The RTI server 2802 interacts with the RTI agent 3132 of the data integration platform 2702. The project pool facility 3102 manages projects by selecting the appropriate data integration platform 2702 to which a data integration job will be passed. The RTI server 2802 includes a job pool facility 3202 with a job list 3204 for handling data integration jobs. A status in use/available for each job can be assigned to the job list 3204. The job pool facility can also include an RTI cache manager and an operations facility for handling jobs that are passed to the RTI server 2802. The RTI server 2802 can also include a JNDI registry facility 3220 for managing interactions with an appropriate public or private registry, such as publishing WSDL descriptions to the registry for services that can be accessed through the RTI server 2802.

The RTI server 2802 can also include an EJB container 3208, which includes an RTI session bean runtime facility 3210 for the RTI services, in accordance with the J2EE protocol. The EJB container 3208 can include message beans 3212, session beans 3214, and entity beans 3218 for enabling the RTI service. The EJB container 3208 facilitates various interfaces, including a JMS bus interface 3222, an EJB client interface 3224 and an axis interface 3228.

Figure 33:
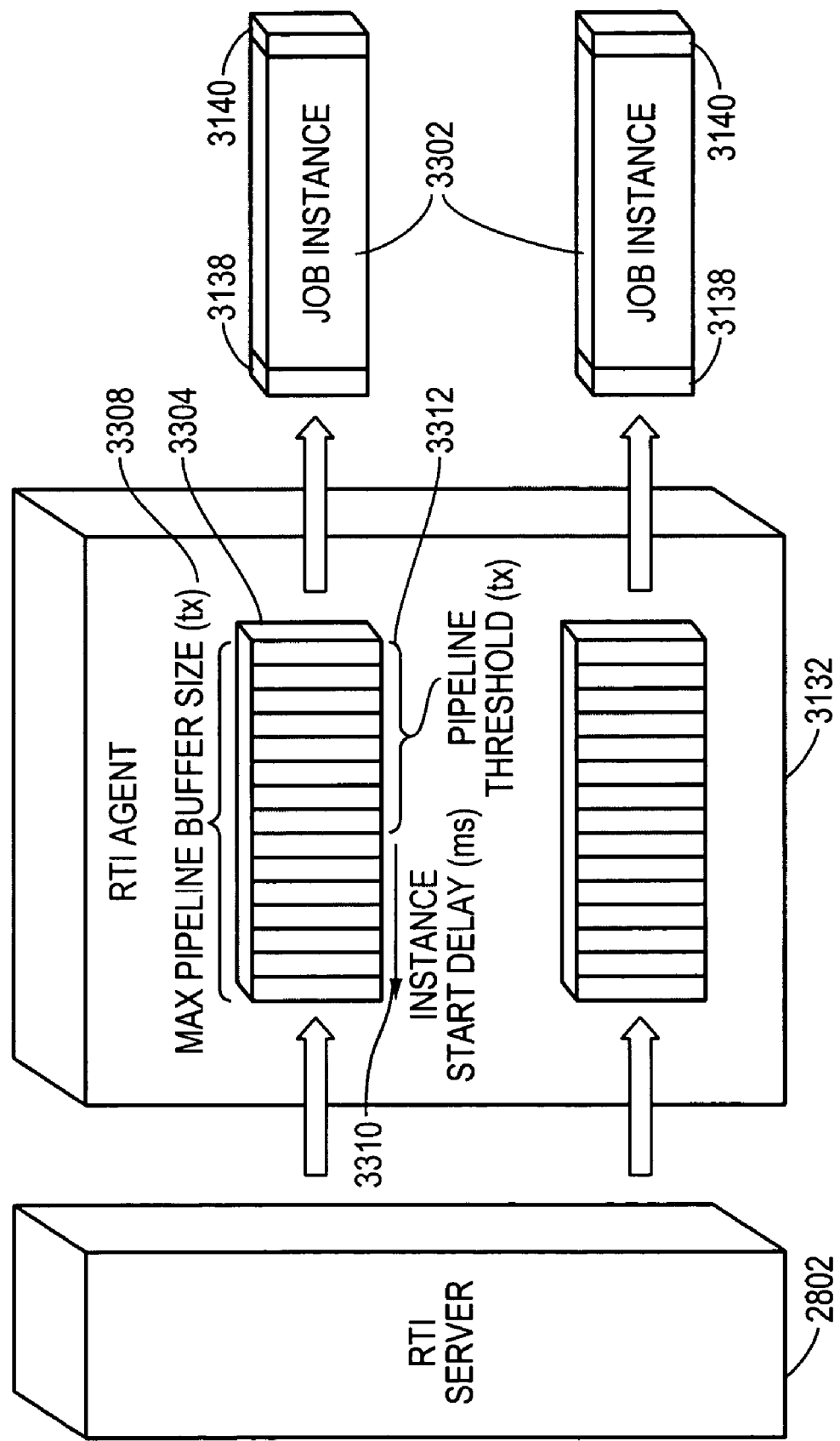
FIG. 33 illustrates an aspect of the interaction of the RTI server and an RTI agent.

Referring to FIG. 33, in one aspect of the interaction of the RTI server 2802 and the RTI agent 3132, the RTI agent 3132 manages a pipeline of service requests, which are then passed to one or more job instances 3302 for the data integration job. The job instance 3302 can run on the data integration platform 2702, and can have an RTI input stage 3138 and RTI output stage 3140. The RTI agent 3132 manages the opening and closing of job instances as service requests are passed to it from the RTI server 2802. In contrast to traditional batch-type data integration, each request for an RTI service travels through the RTI server 2802, RTI agent 3132, and data integration platform 2702 in a pipeline 3304 of jobs. The pipeline 3304 can be managed in the RTI agent 3132, such as by setting various parameters of the pipeline 3304. For example, the pipeline 3304 can have a buffer, the size of which can be set by the user using a maximum buffer size parameter 3308. The administrator can also set other parameters, such as a delay that the RTI agent 3132 will accept before starting a new job instance 3302, i.e., an instance start delay 3310. The administrator can also set a threshold 3312 for the pipeline, representing the number of service requests that the pipeline can accept for a given job instance 3302.

Figure 34:
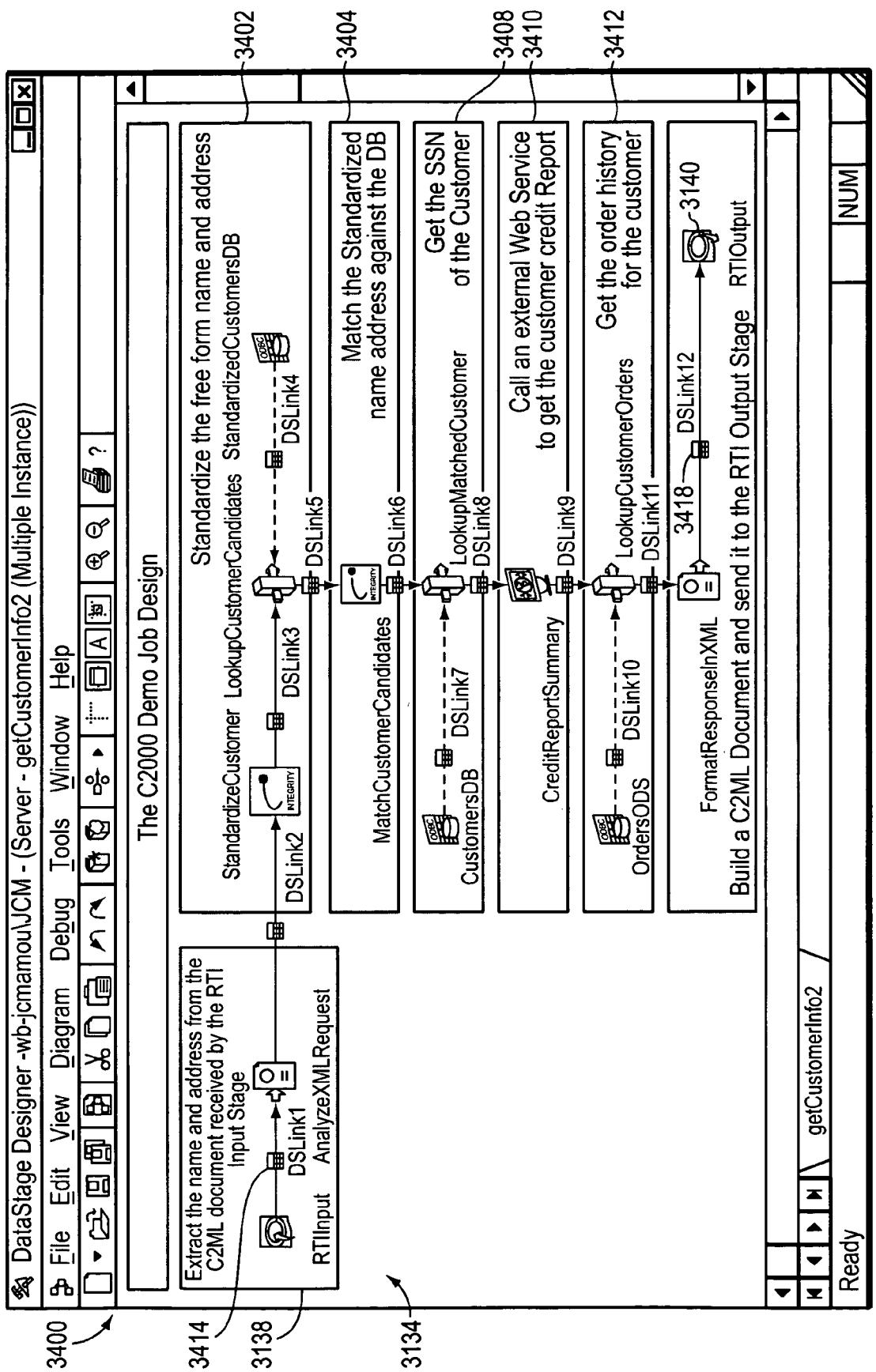
FIG. 34 represents a graphical user interface allowing a designer to design a data integration job.
Figure 94:
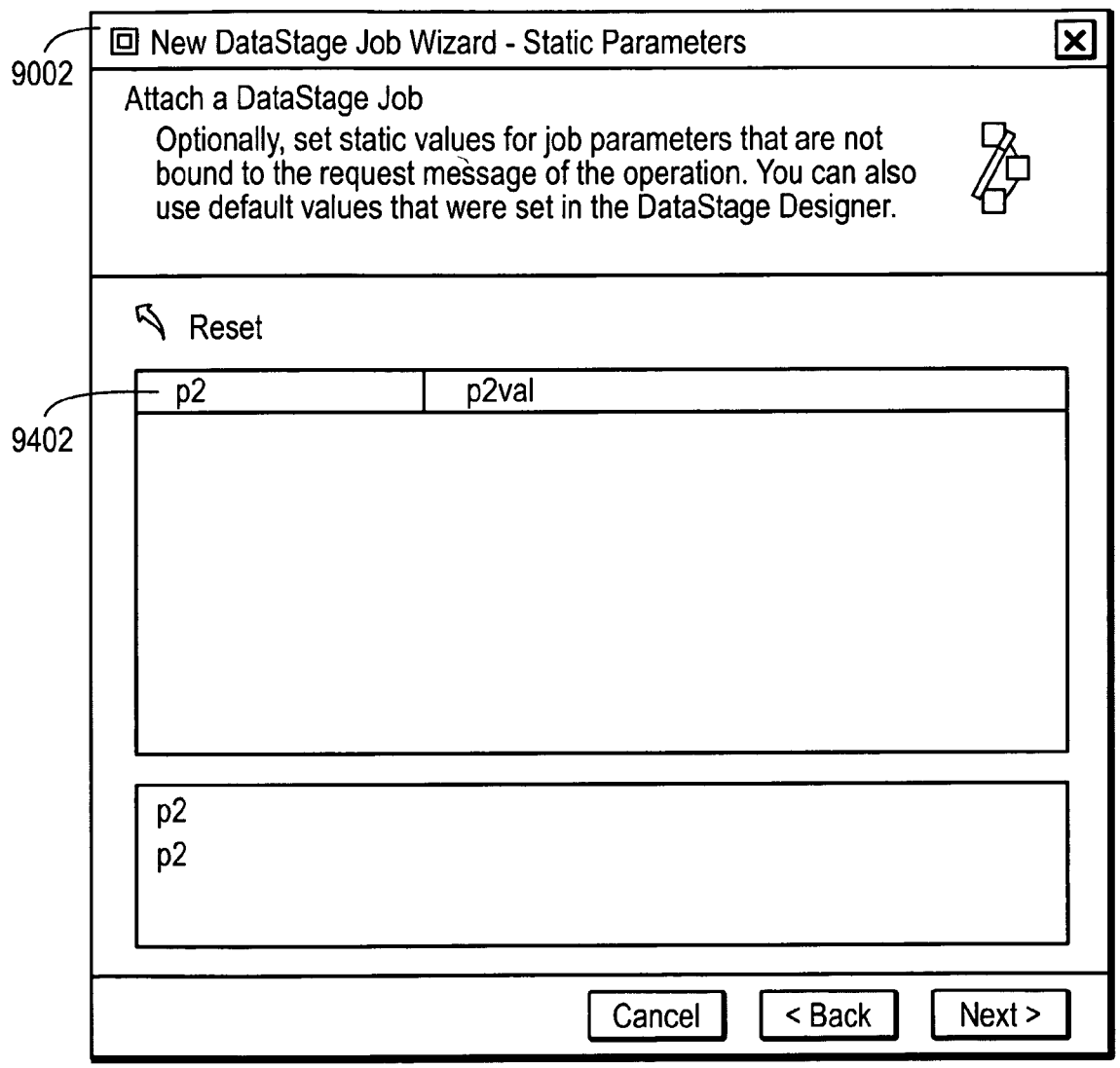
FIG. 94 shows a window that allows a user to set static values that are not bound to a request message.

FIGS. 34-94 show screen shots of various graphical user interfaces presented to a user that can be used to design particular data integration jobs and specify parameters for their execution. Referring first to FIG. 34, a graphical user interface 3400 includes icons representing data integration tasks. The icons are connected as a process flow that produces a data integration job 3134. For example, the data integration task 3402 can standardize the free form name and address of a data item; task 3404 matches the standardized name against a database; task 3408 retrieves the social security number of a customer; task 3410 calls an external web service to retrieve the customer's credit report; and task 3412 retrieves an order history for the customer. The various steps are represented in the user interface 3400 by graphical icons, each of which represents an element of business logic and each of which can trigger the code necessary to execute a task, such as a transformation, of the data integration job 3134, as well as connectors, which represent the flow of data into and out of each of the tasks. Different types of icons represent, for example, retrieving data from a database, pulling data from a message queue, or requesting input from an application. The data integration job 3134 can access any suitable data source and deliver data to any suitable data target, as described above in connection with FIGS. 1-22.

The user interface 3400, in addition to the elements of a conventional data integration job 3134, includes the RTI input stage 3138 and the RTI output stage 3140. The RTI input stage 3138 precedes the first steps of the data integration job 3134. In this case, it is designed to accept a request from the RTI server 2802 in the form of a document and to extract the customer name from the document. The RTI input stage 3138 includes the RTI input table 3414, which defines the metadata for the RTI input stage 3138, such as what format of data is expected by the stage. The RTI output stage 3140 formats the data retrieved at the various steps of the data integration job 3134 and creates the document that is delivered out of the job at the RTI output stage 3140. The RTI output stage 3140 includes an RTI output table, which defines metadata for the RTI output stage 3140, such as the format of the output. In this embodiment, the document delivered to the RTI input stage 3138 and from the RTI output stage 3140 is a C2ML document. The graphical user interface 3400 is very similar to an interface for designing a convention batch-type data integration job, except that instead of accepting a batch of data, such as a large group of files, the job 3134 is designed to accept real time requests. In other words, the job 3134, by including the RTI input stage 3138 and the RTI output stage 3140, can be automatically exposed as a service to the RTI server 2802, for access by various applications of the business enterprise. A data integration job designer can then easily change the user interface 3400 to allow the job to execute in real time, rather than in batch mode. The same process flow can be used in batch and real time mode.

The example of FIG. 34 can advantageously relate to a scenario where a company does repeat business with a customer, where a business enterprise may want to be able to do real time queries against databases that contain relevant customer data. For example, a store clerk may ask a customer for the customer's name and address. A point-of-purchase application in the store then executes a transaction, such as sending an XML document with the name and address. The data integration job 3134 is triggered at the RTI input stage 3138, extracts and standardizes name and address at step 3402, matches this information against a database to ensure that the correct customer has been identified, steps 3404 and 3408, calls an external web service to get a credit report at step 3410, and searches a database for past orders for the customer in process 3412. The data integration job 3134 finishes by building an XML document to send information back to the store clerk at the RTI output stage 3140.

Figure 35:
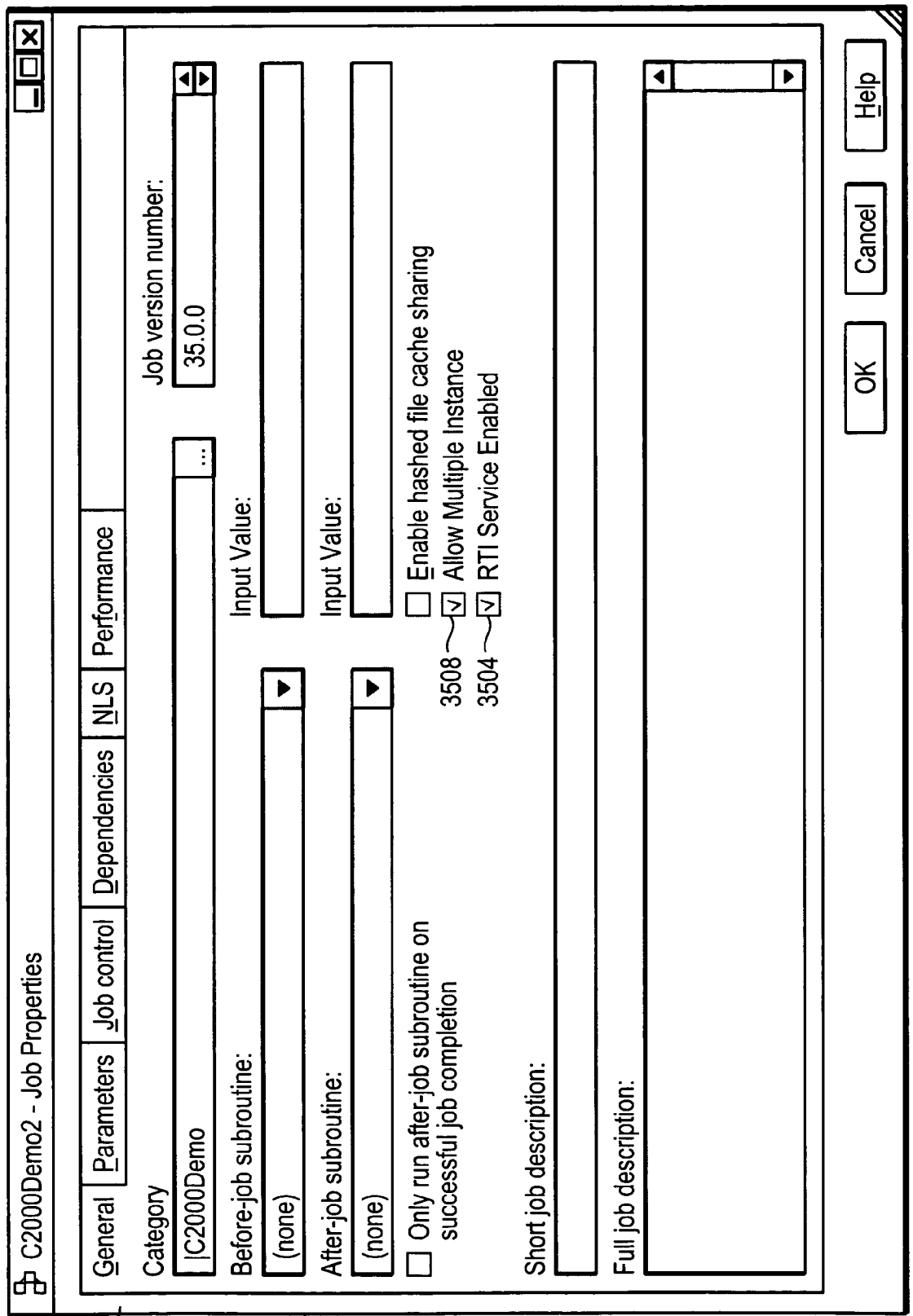
FIG. 35 represents a graphical user interface for a job properties console for a data integration platform.

FIG. 35 shows a graphical user interface 3502 specifying job properties for a data integration platform 2702. The job designer can enable an RTI service for a specified job by checking the box RTI Service Enabled 3504 and also allow multiple instances via the box 3508. RTI enablement may only be available if the multiple instance box 3508 has been checked.

Figure 36:
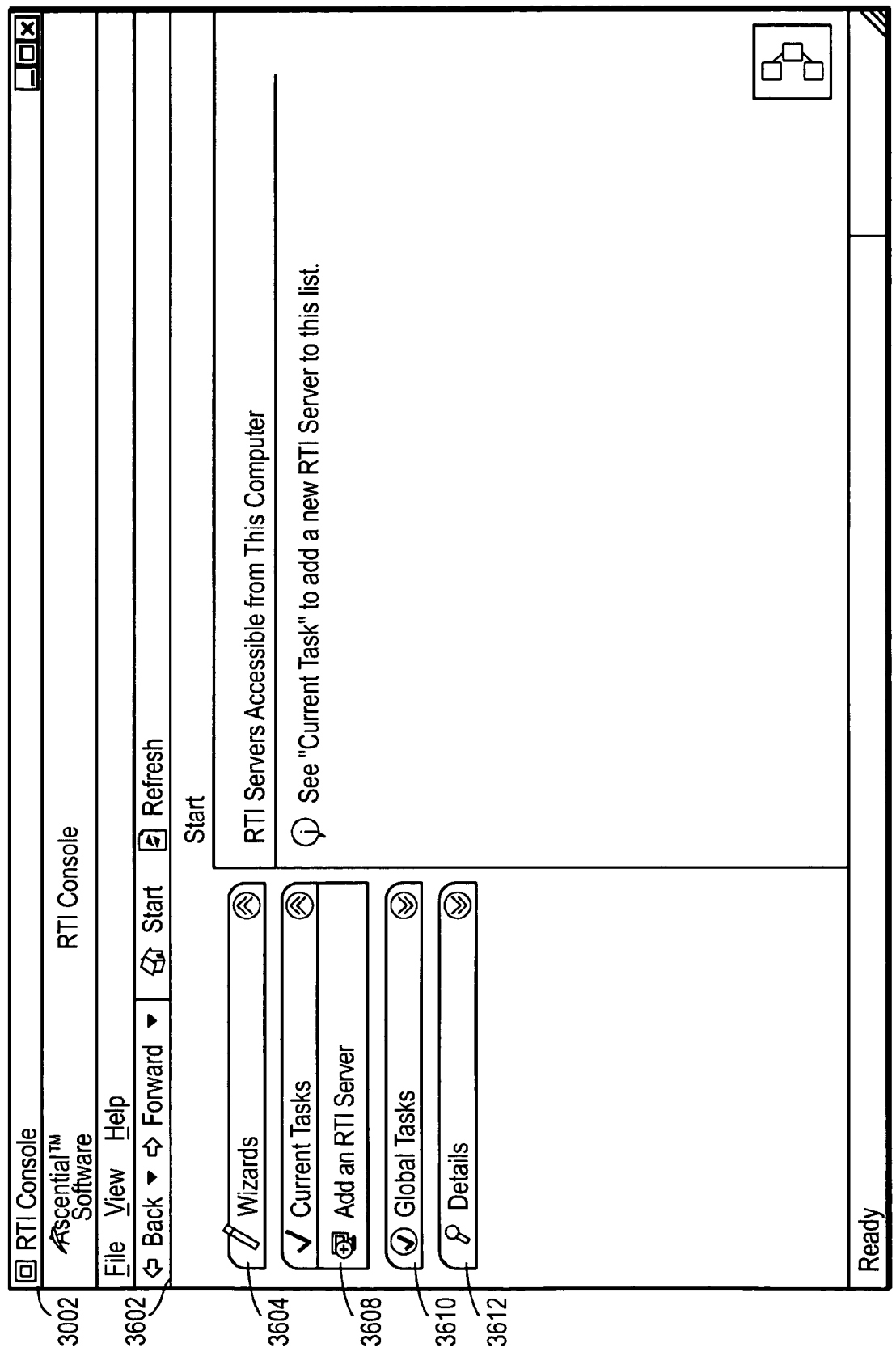
FIG. 36 represents a graphical user interface for an empty RTI console.

FIG. 36 represents a graphical user interface with an empty RTI console 3002, which can include wizards 3604, and a contextual pane 3608 displaying the tasks that are available at any given time, such as a task for adding an RTI server. The console 3002 can also display a set of global tasks 3610 as well as details 3612 about the current selection.

Figure 37:
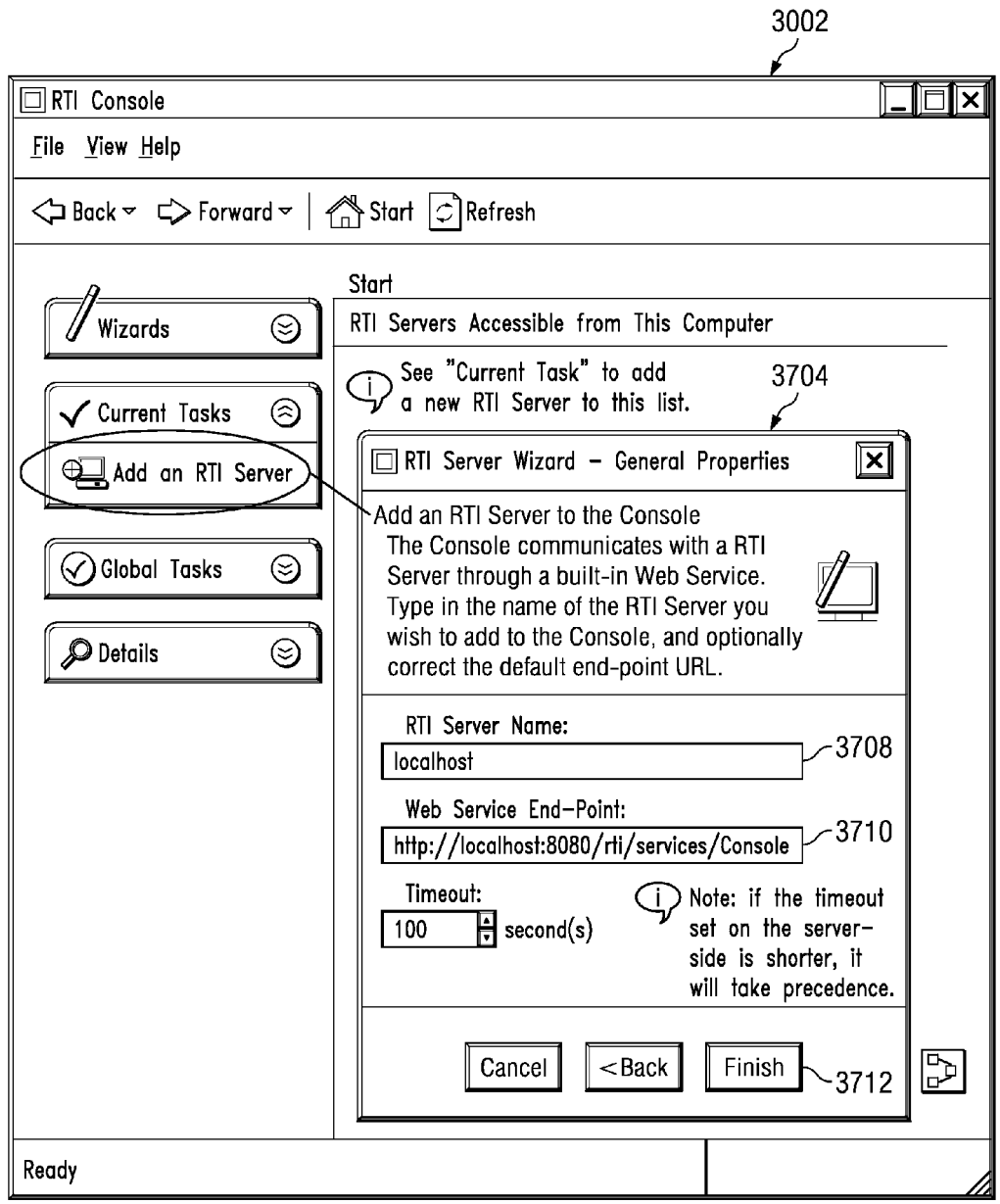
FIG. 37 represents a graphical user interface for an RTI console to be used for managing an RTI server.

FIG. 37 shows an additional pane 3704 that can be opened in the RTI console 3002 by clicking on pane 3608 (FIG. 36). Pane 3704 includes a field 3708 for the host name for the RTI server 2802, a field 3710 for the location of a web service being used by the RTI console 3002 to communicate with the RTI server 2802. Clicking the finish button 3712 will place the indicated RTI server 2802 on the RTI console 3002 for further management.

Figure 38:
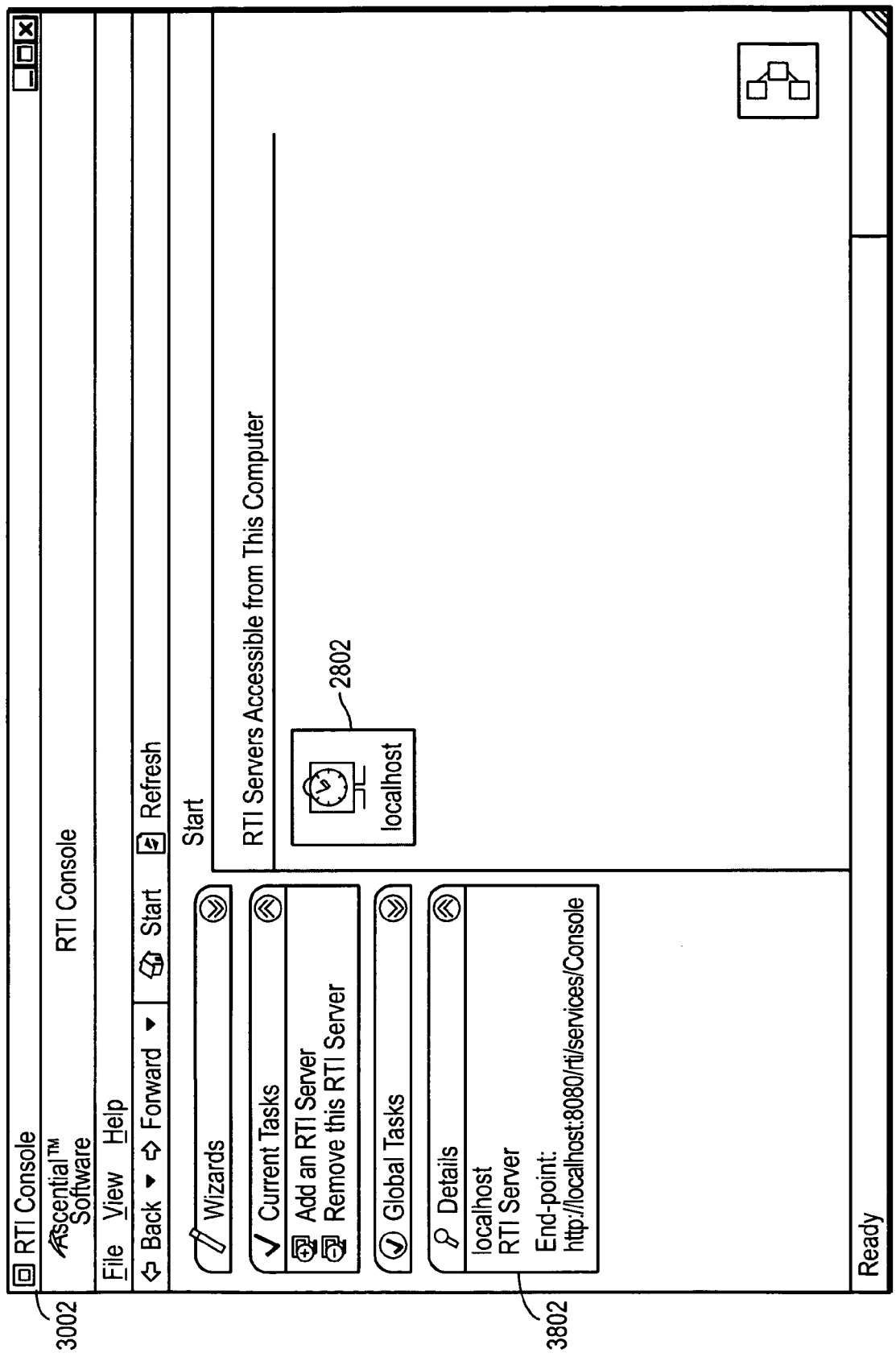
FIG. 38 represents a graphical user interface for an RTI console for accessing a selected RTI server.
Figure 39:
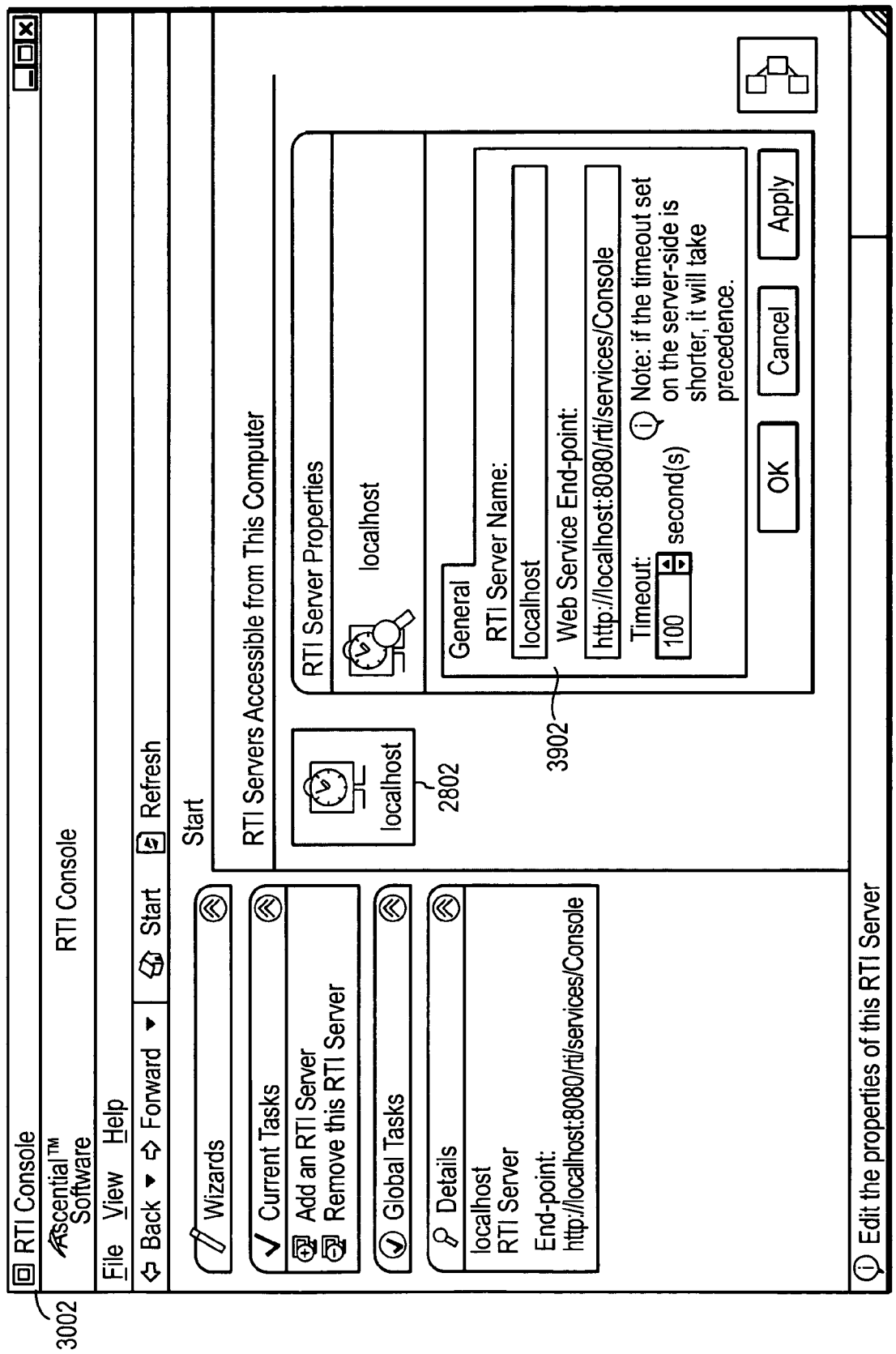
FIG. 39 illustrates a graphical user interface for an RTI console with a properties window that displays properties of the RTI server represented by the icon.

FIG. 38 shows the information about the current selection from pane 3704 in FIG. 37 incorporated in the details pane 3802. Referring to FIG. 39, a separate properties pane 3902 is opened by right clicking the localhost/RTI server icon 2802, which displays properties of the RTI server 2802 represented by the icon 2802.

Figure 40:
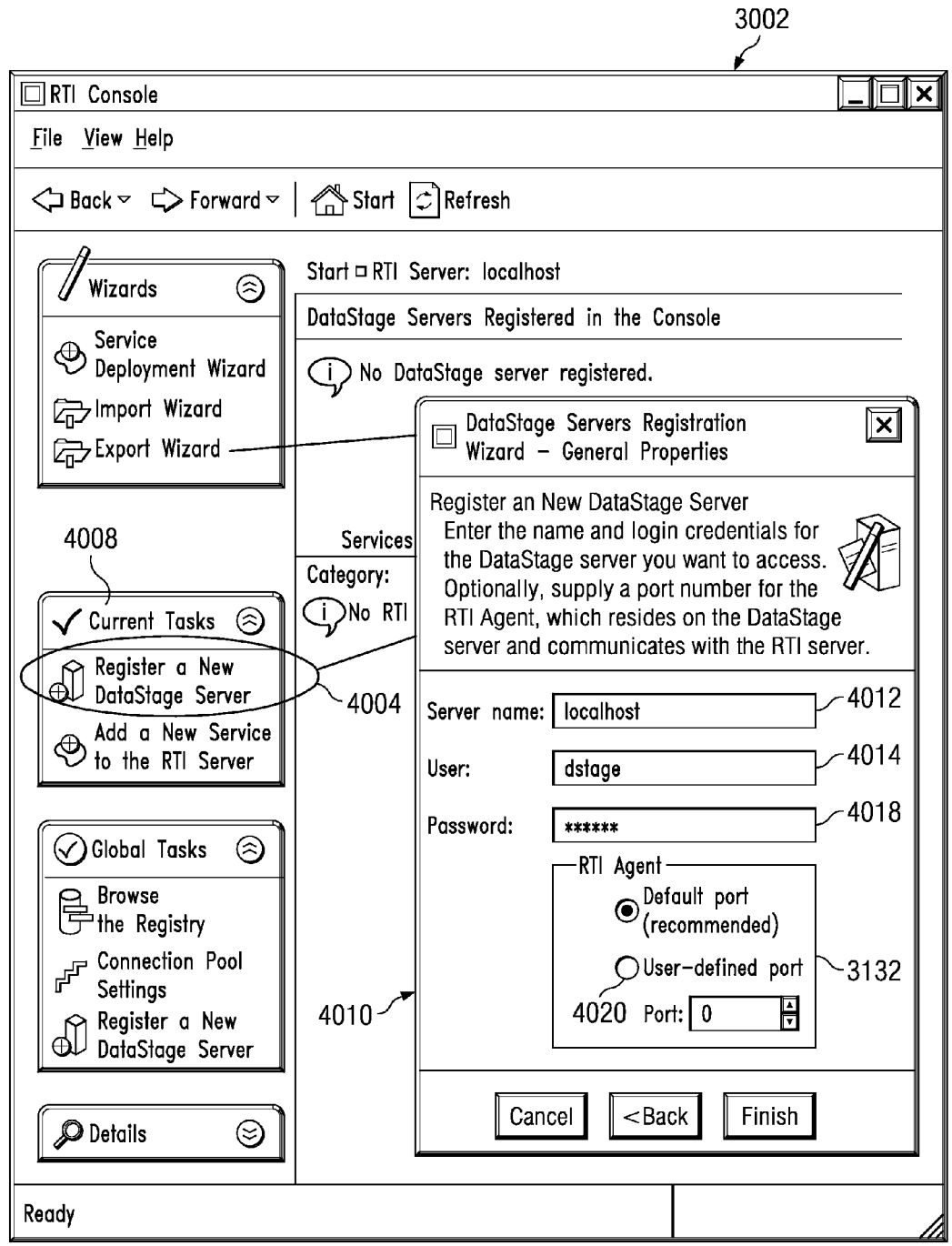
FIG. 40 shows a graphical user interface for the RTI console being used to register a new data integration platform, such as a DataStage server.

FIG. 40 shows an additional pane 4010 that can be opened in the RTI console 3002 by selecting from the current task menu 4008 the item 4004 for registering one or more new servers, such as a DataStage server. A user can enter data in the fields of the pane 4010, such as the server name 4012, as well as the user name 4014 and a password 4018. In some embodiments, only servers that include an RTI agent 3132 can be registered. The default port can be changed by the user by selecting the box 4020 for a user-defined port.

Figure 41:
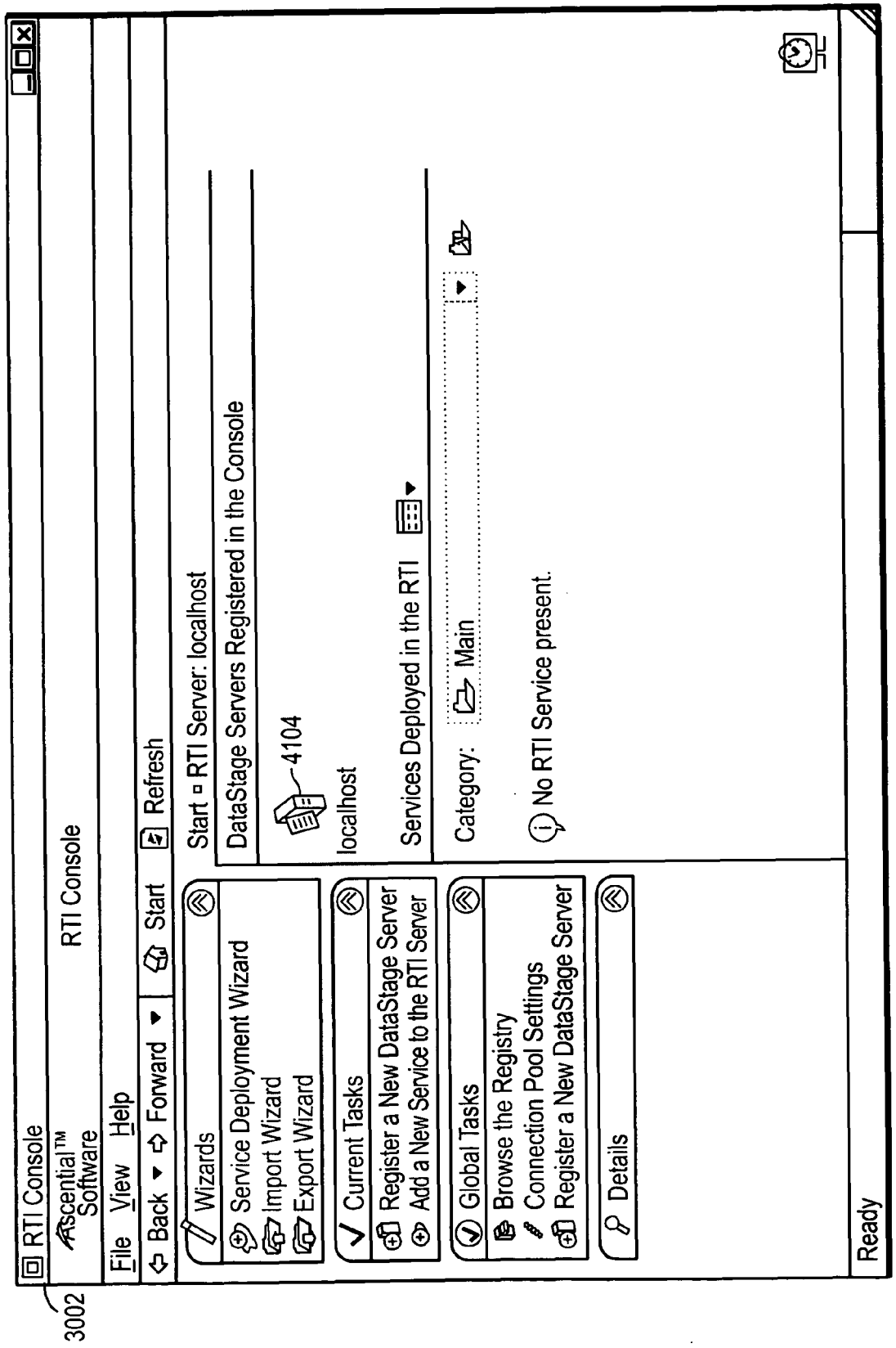
FIG. 41 shows an RTI console with a data integration platform registered as a server.

FIG. 41 shows the RTI console 3002 with the data integration platform 2702 registered as a server 4104.

Figure 42:
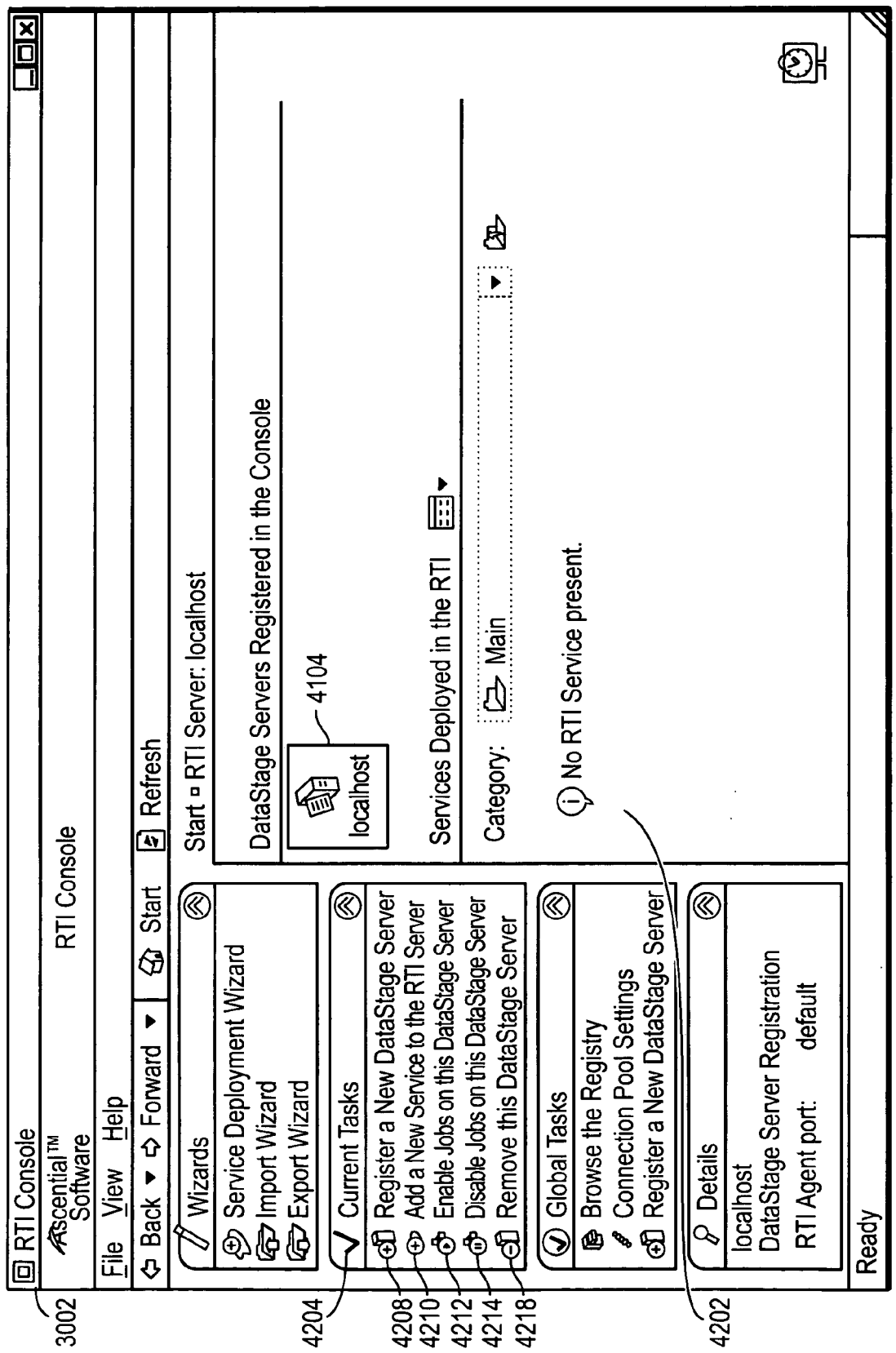
FIG. 42 shows the RTI console of FIG. 41 after the server has been registered.

FIG. 42 shows the RTI console 3002 after a server 4104 has been registered, with a pane 4202 showing details of the registered server. The current task menu 4204 shows additional tasks. For example, a user can register an additional RTI server at a task 4208, add a new service to the RTI server at a task 4210, enable jobs on the selected RTI server at a task 4212, disable jobs on the selected RTI server at a task 4214 and/or remove the data integration server at a task 4218.

Figure 43:
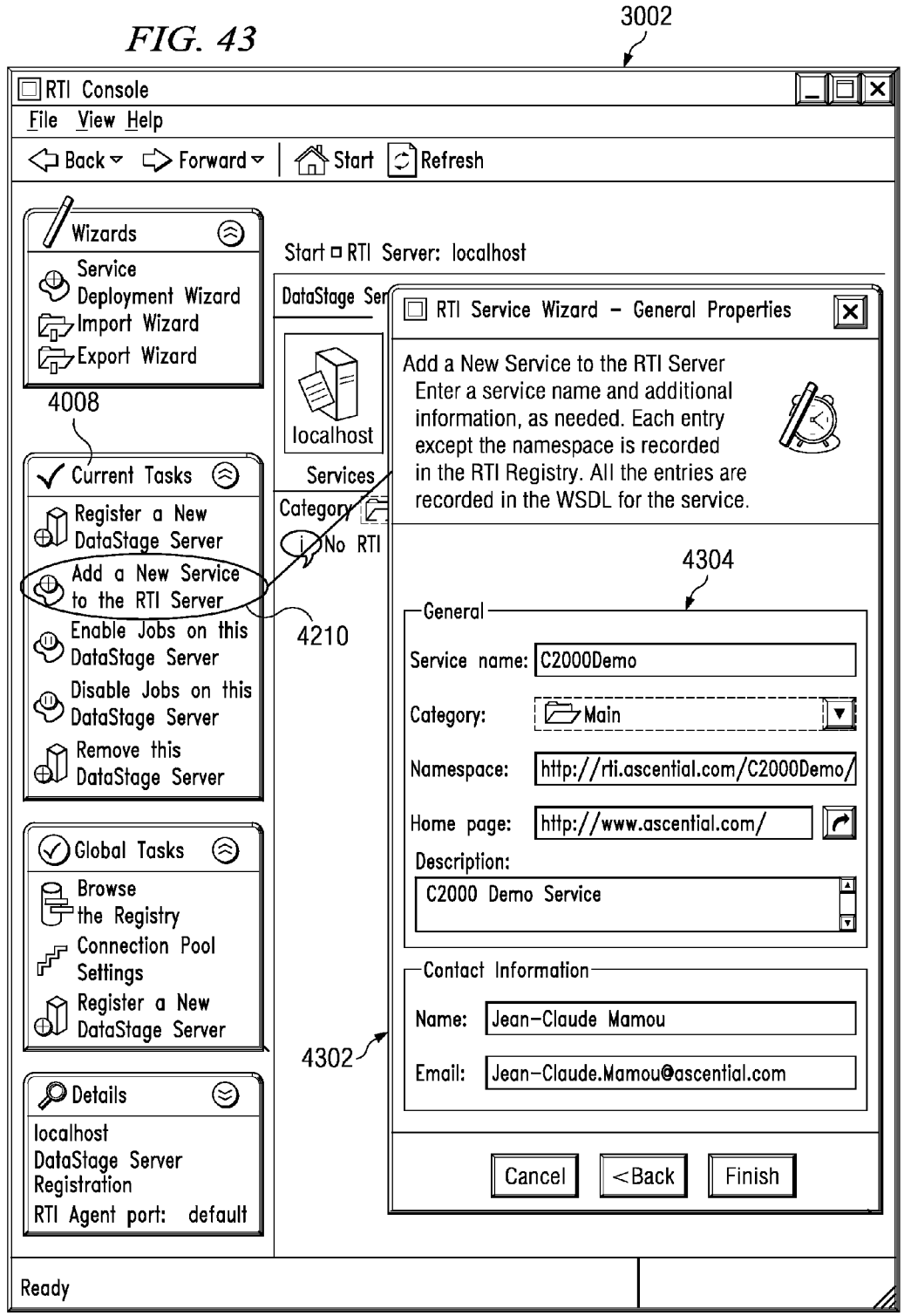
FIG. 43 represents a graphical user interface for adding a new RTI service via the RTI console.

FIG. 43 shows an additional wizard pane 4302 that can be opened in the RTI console 3002 by selecting from the current task menu 4008 the item 4210. Certain metadata 4304 are associated with an RTI service, including a description, home page, and contact information. The wizard 4302 takes the user through the steps necessary to establish the new RTI service 2704. Entries in the wizard 4302 are recorded in the RTI registry, so that applications can search for the service in the registry. Entries in the wizard 4302 are also recorded in the WSDL for the particular RTI service 2704.

Figure 44:
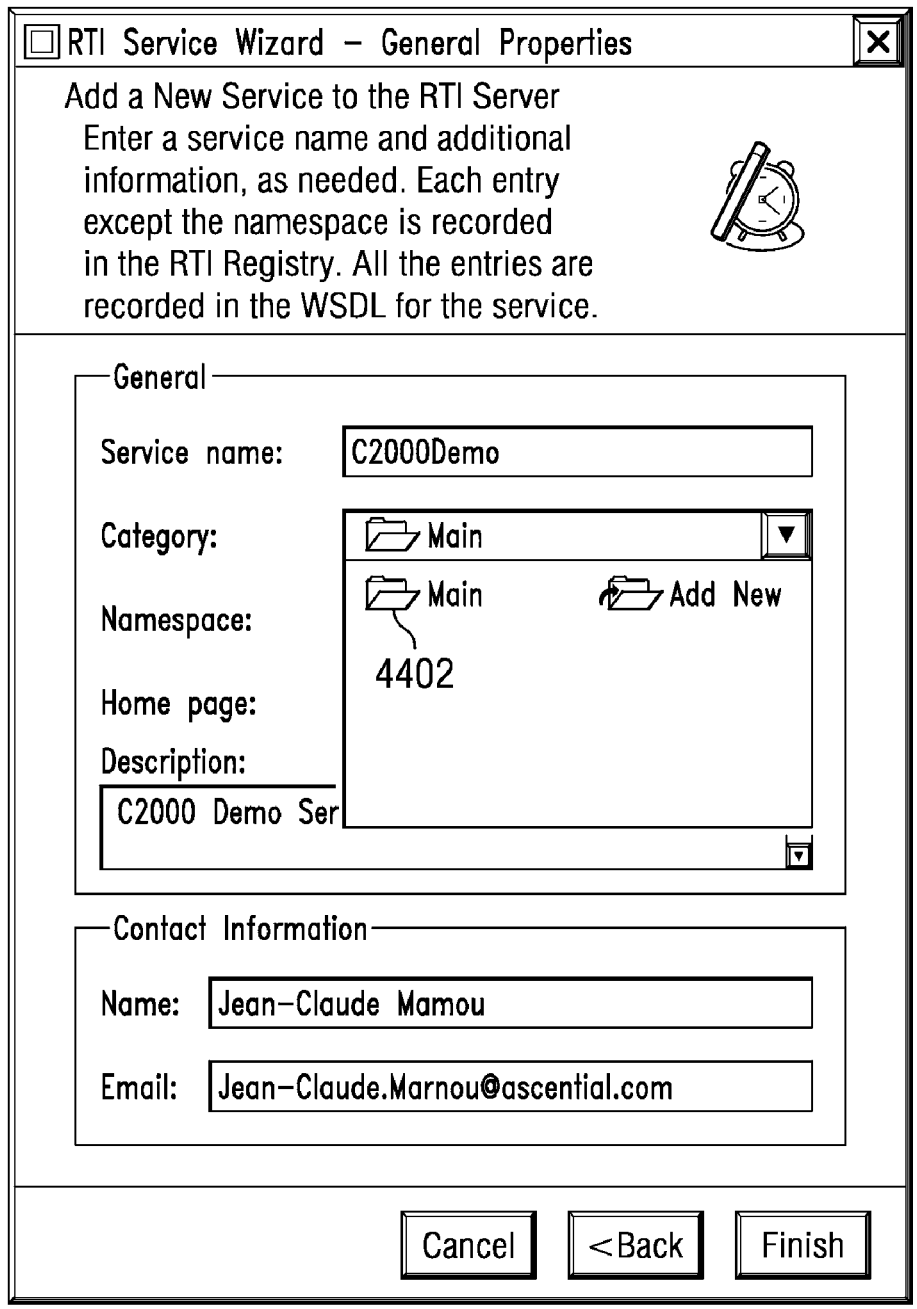
FIG. 44 illustrates a graphical user interface placing a service into categories using the RTI console.

As indicated in FIG. 44, a service can be placed into an existing category 4402, or a new category can be created. The category 4402 is recorded in the RTI registry, so that applications can search for services by category 4402. The category is also recorded in the WSDL for the service.

Figure 45:
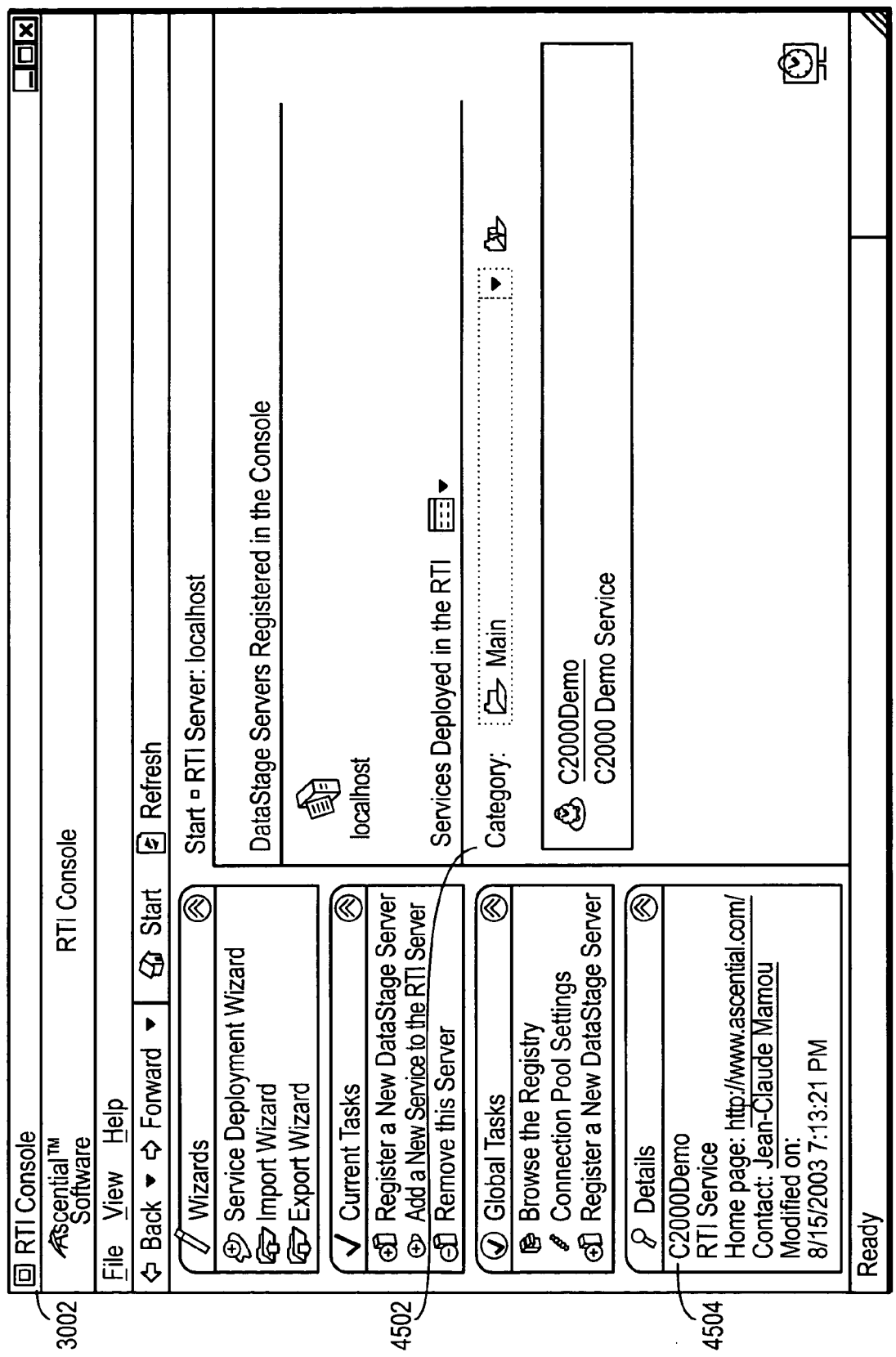
FIG. 45 represents an RTI console with details of the selected service.

FIG. 45 now shows on the RTI console 3002 in panes 4502 and 4504 the details of the service selected above. The user can change the layout to see details in lists, icons and the like.

Figure 46:
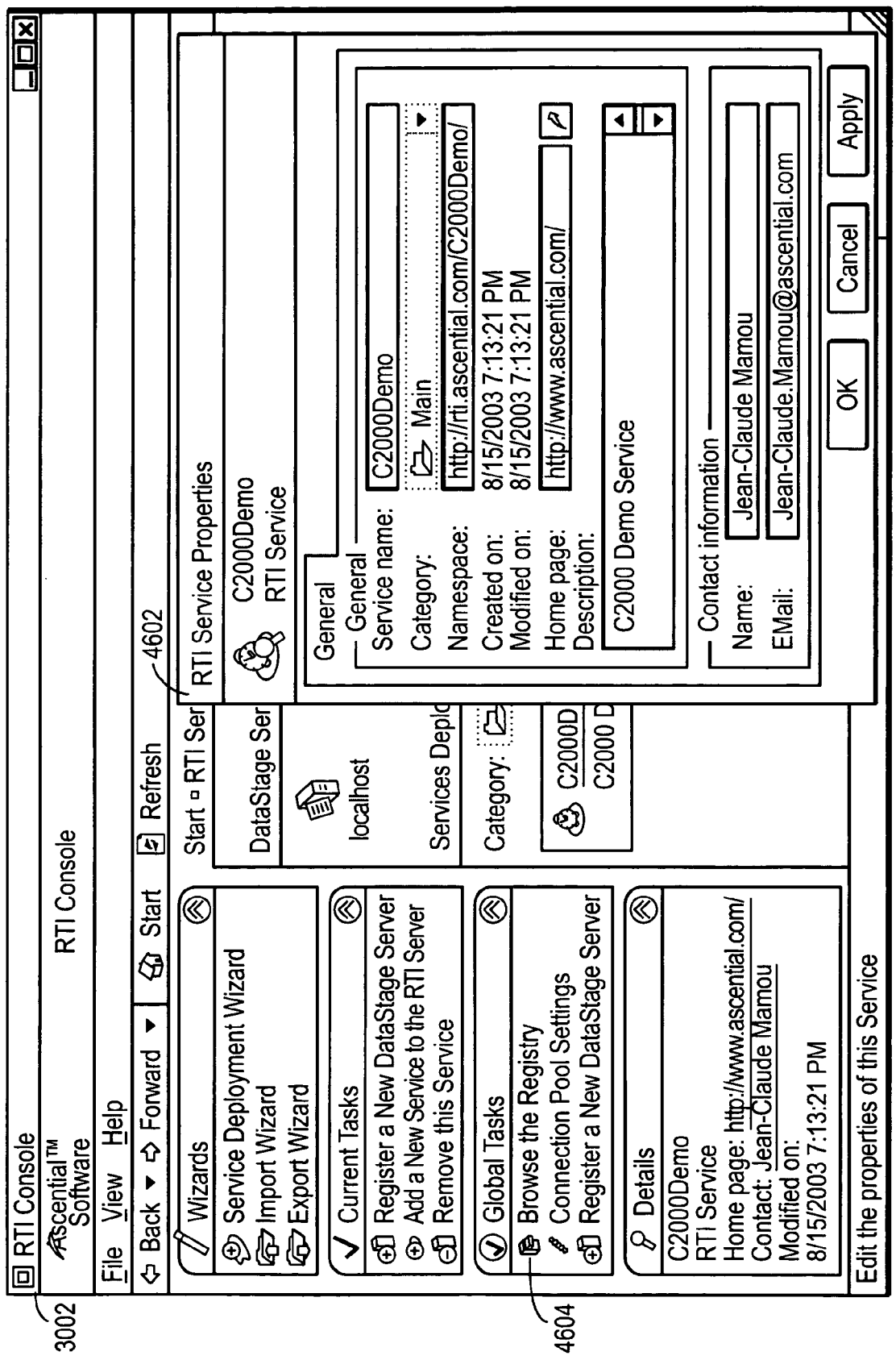
FIG. 46 shows an RTI service properties window showing metadata associated with the service.
Figure 47:
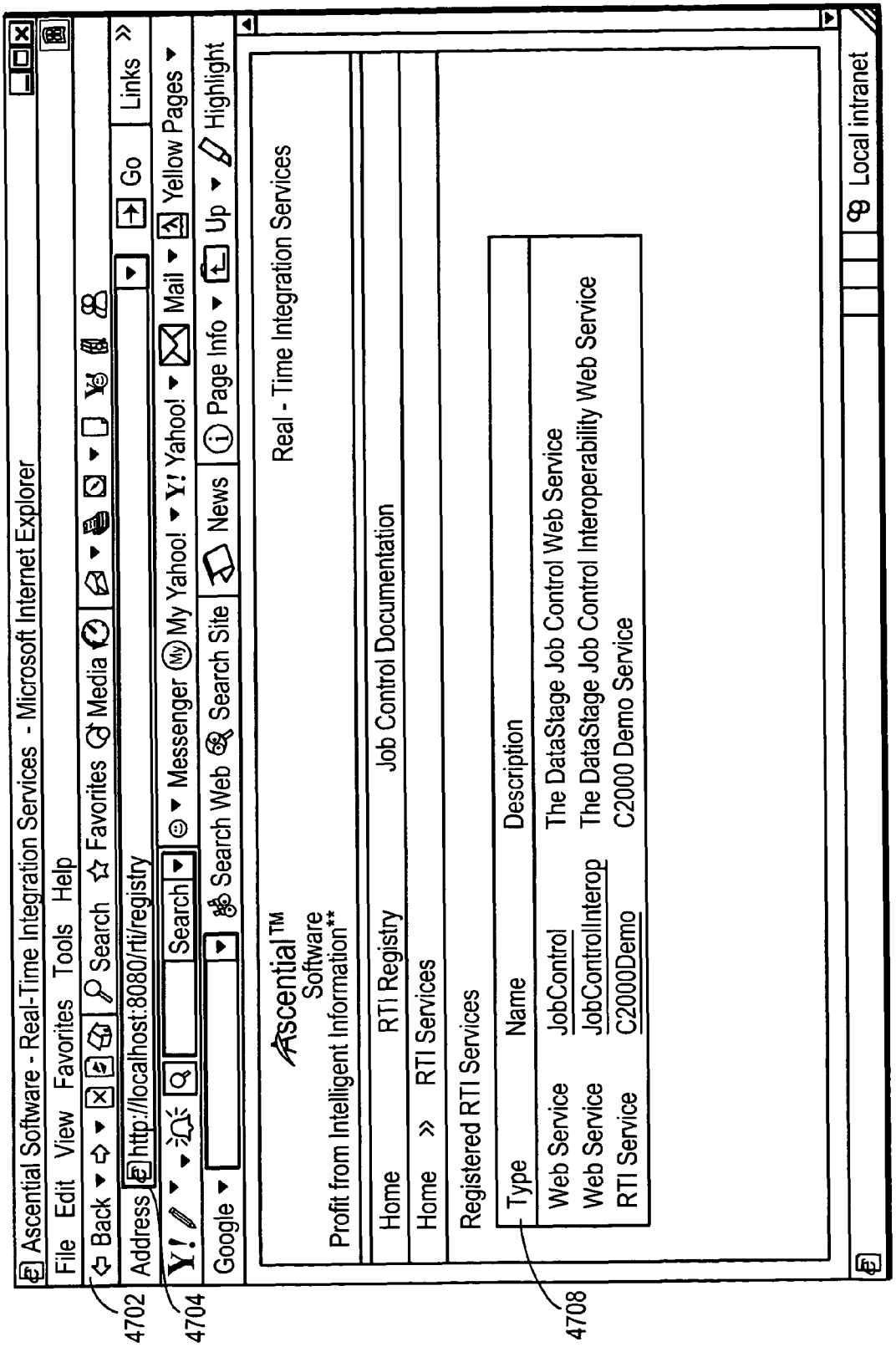
FIG. 47 shows an entry point for a service created with an RTI console.

FIG. 46 shows an additional pane 4602 that can be opened in the RTI console 3002 by selecting from the current task menu the item Browse the Registry 4604. The user can change properties, such as the category of the service. When selecting the item Browse the Registry 4604 in the interface 4604 shown in FIG. 46, the user can also be presented with the interface for the RTI registry 4702 depicted in FIG. 47. The RTI registry 4702 is a web-based directory for all services managed by an RTI server 2802. The RTI registry 4702 is not a public UDDI registry, but rather a private registry. However, the user can publish entries to the UDDI directory that point to the RTI registry, so that the RTI service can be accessed publicly. The representation of FIG. 47 shows the entry point 4704 for the service just created using the RTI console 3002. The RTI registry 4702 includes a table 4708 that lists the registered RTI services.

Figure 48:
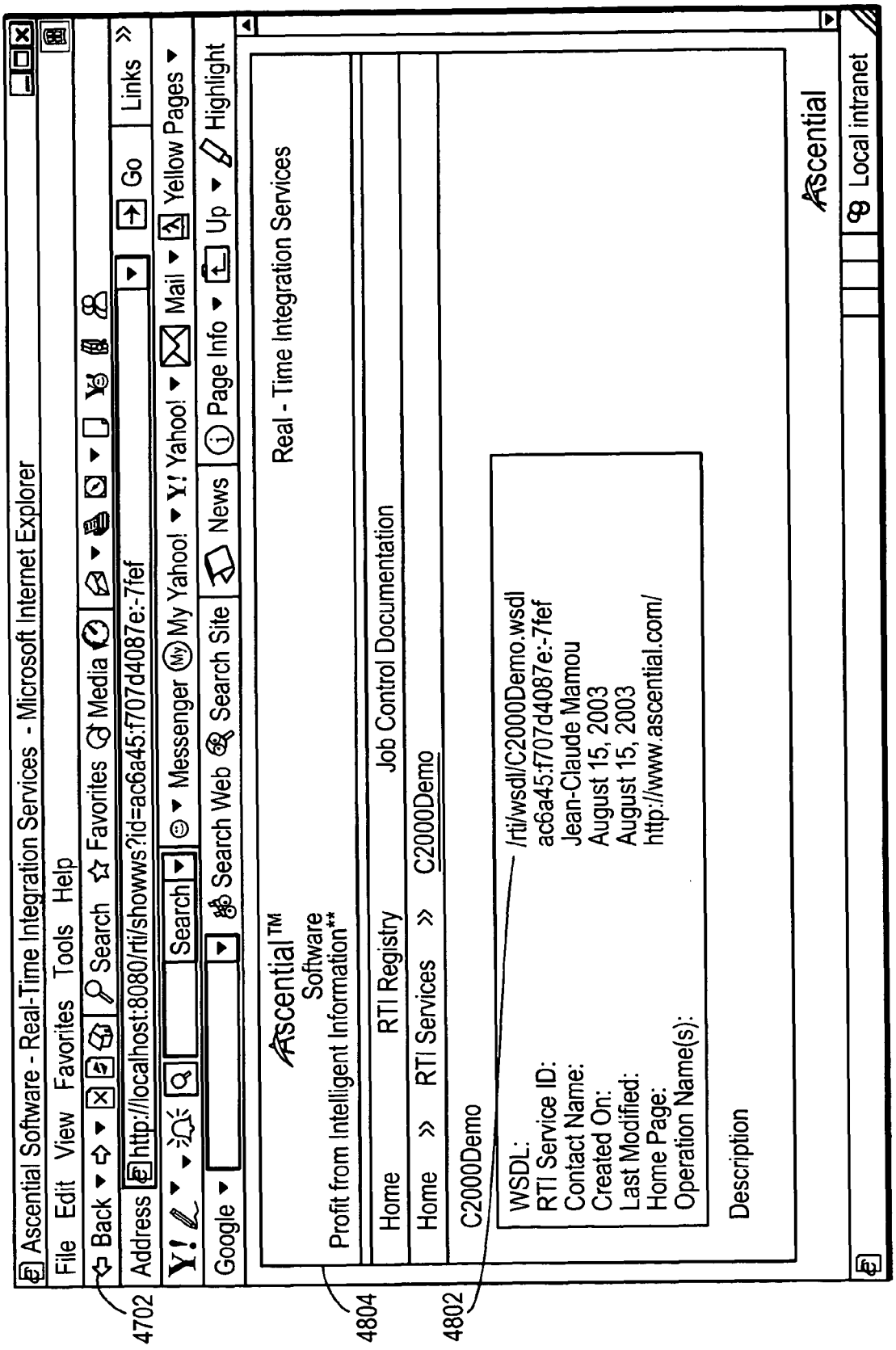
FIG. 48 shows an RTI registry service page, which includes the entry point to a WSDL document for the service.

FIG. 48 shows the RTI registry service page 4804 for the RTI service "C2000Demo" in FIG. 47, which includes entry point 4802 to the WSDL document for the particular service.

Figure 49:
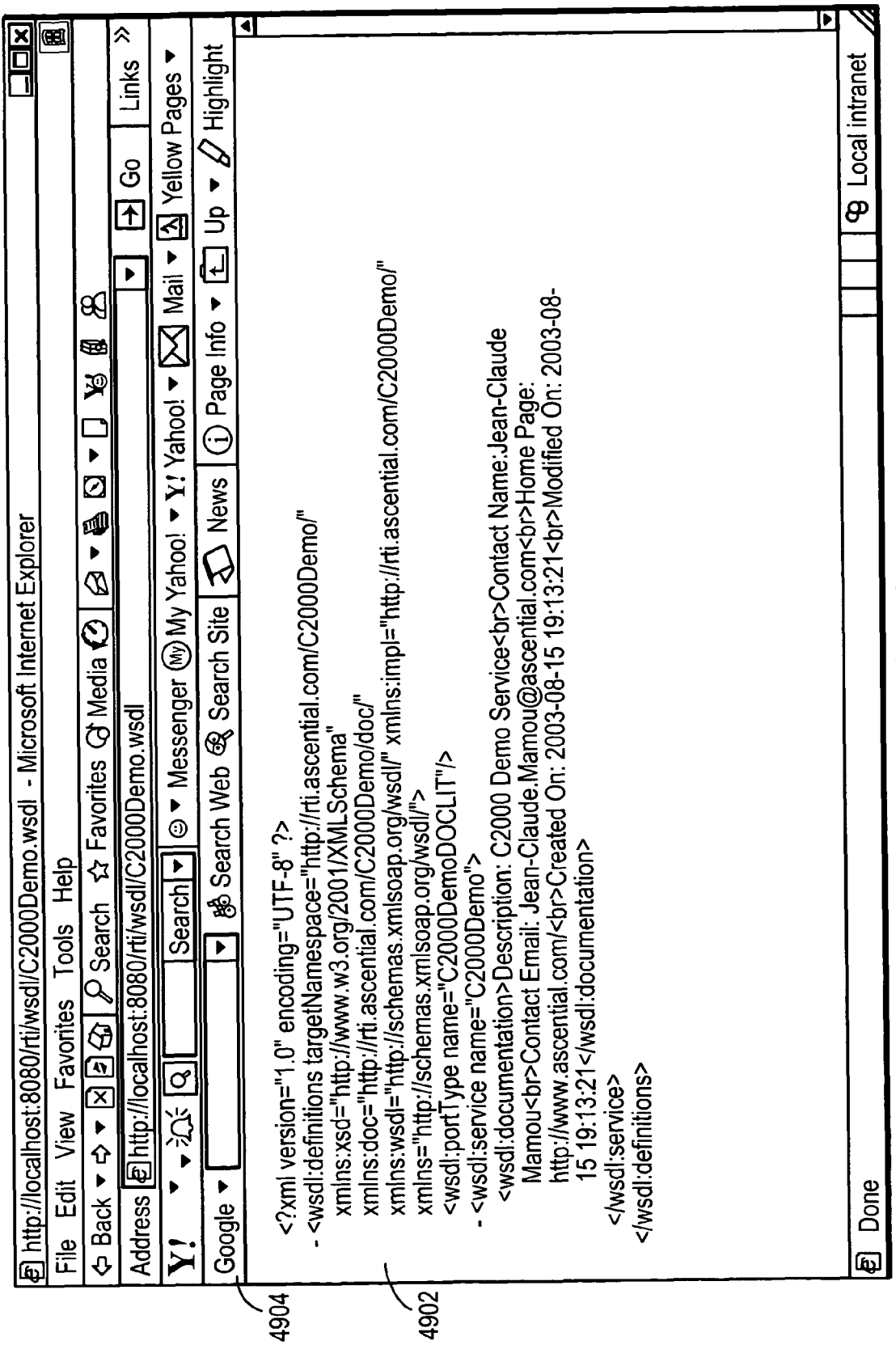
FIG. 49 shows an RTI registry page with a WSDL description for a service.

FIG. 49 shows the RTI registry WSDL page 4904, which shows the WSDL description 4902 for the service. The WSDL for the service is dynamically updated whenever the user changes information related to the service in the RTI console 3002. The WSDL description 4902 contains only the service definition. In the example of FIG. 49, the port type is empty, because no operations have yet been created, and no binding has been selected yet.

Figure 50:
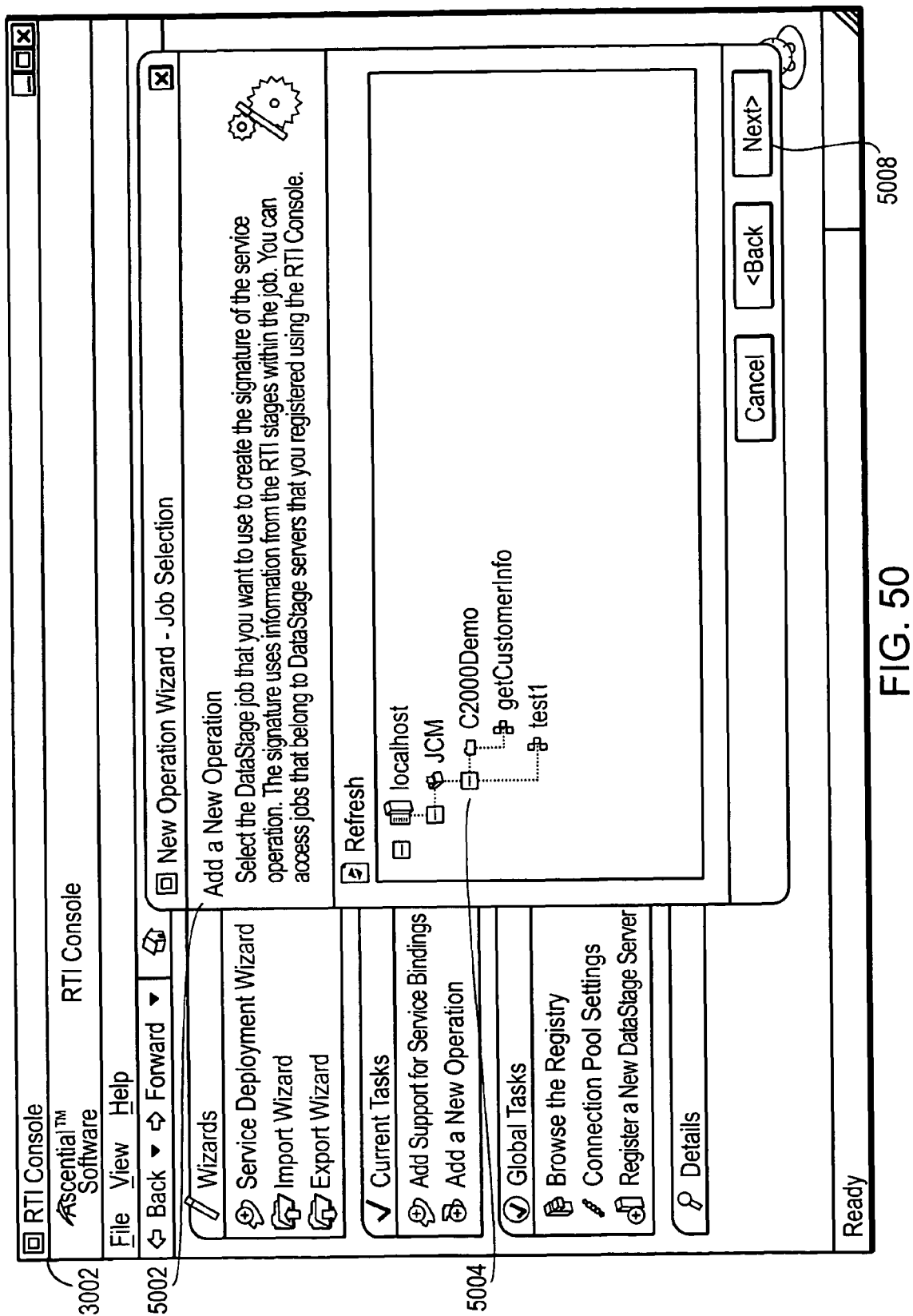
FIG. 50 shows an RTI console with an initial window for adding a new operation.

FIG. 50 shows the RTI console 3002 with a window 5002 for adding a new operation. A data integration job, such as a DataStage job, can be used to drive the discovery of the signature of the operation. All registered data integration platform servers appear as roots in a tree 5004 in the window 5002. The window 5002 can be used to access jobs that run on the servers selected on the RTI console 3002. Clicking the Next button 5008 closes this window.

Figure 51:
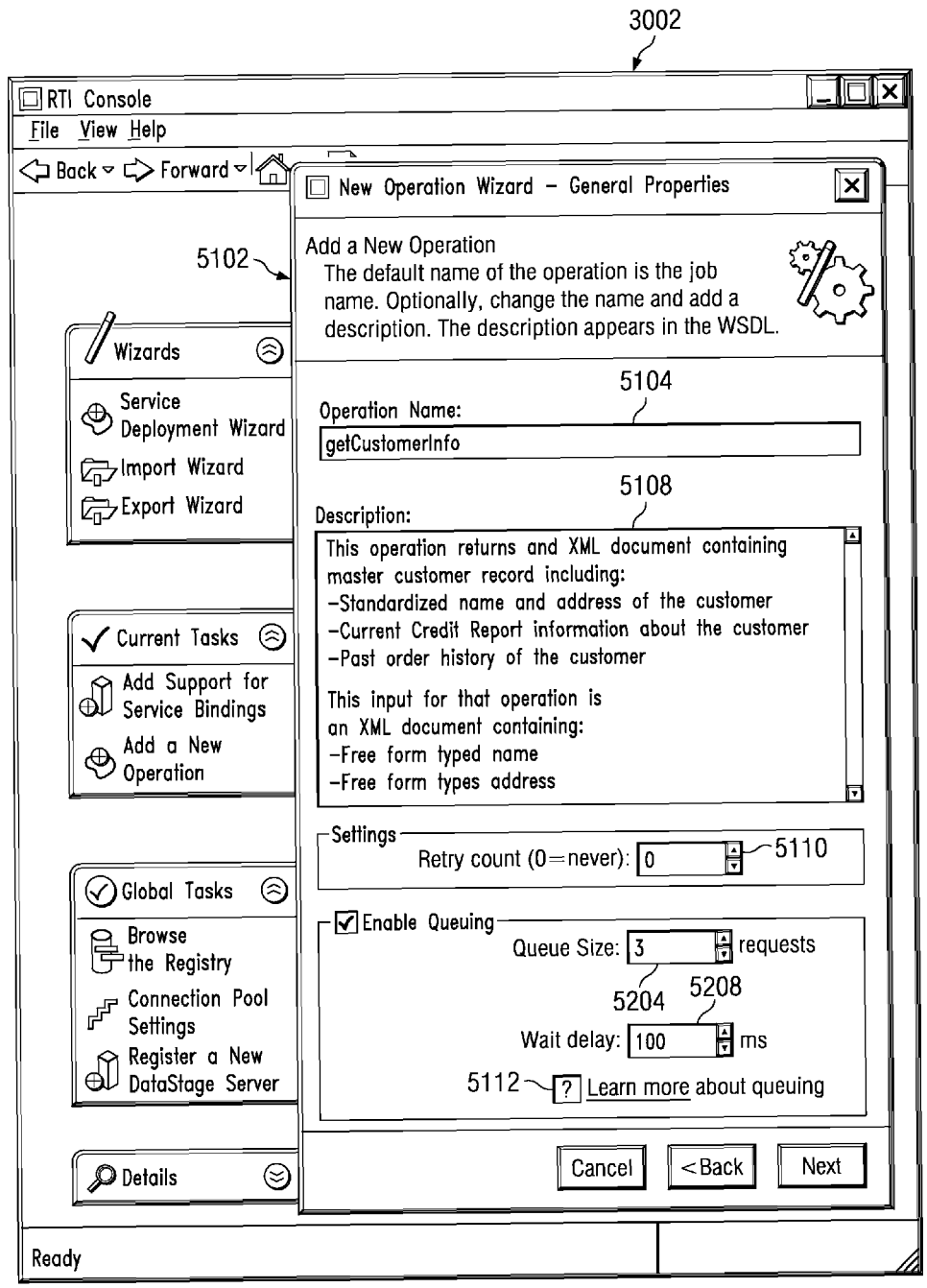
FIG. 51 shows a subsequent window of the RTI console of FIG. 50.
Figure 52:
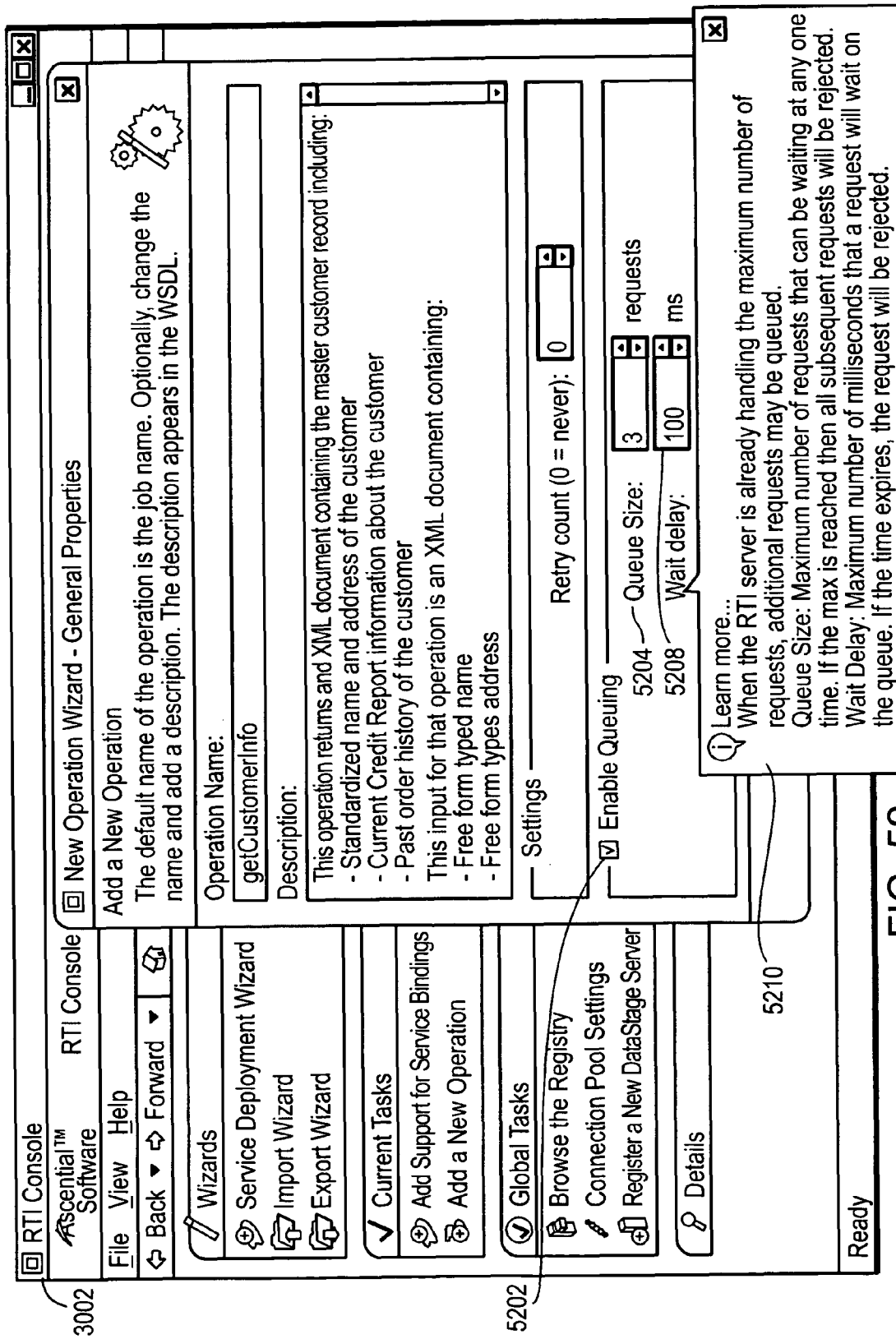
FIG. 52 shows another window of the RTI console of FIG. 50 for enabling queuing.

FIG. 51 shows the RTI console 3002 with a new window 5102 for adding additional information for the new operation. The window 5102 includes a field 5104 for naming the operation. The default name of the operation is the name of the job used to drive the operation creation process, but the user can provide any other name if desired. In the field 5108 the user can insert a description for the operation. The description will appear in the WSDL description for the service. In a field 5110, a user can select or input how many times the RTI server 2802 will resubmit a request if the request fails. If several instances of appropriate jobs are running, perhaps on different servers, this allows fail-over capability. The user can also enable queuing for the operation. Queuing allows requests to be held in queue if no appropriate job instances are running. When the queue capacity is reached, the request may be dropped, although not necessarily on the client side. The user can set the queue size at the field 5204, which is the number of operation requests supported by the queue at any given time. The user can also set the wait delay at the field 5208, which is the time that a request will stay in the queue before being dropped.

Figure 53:
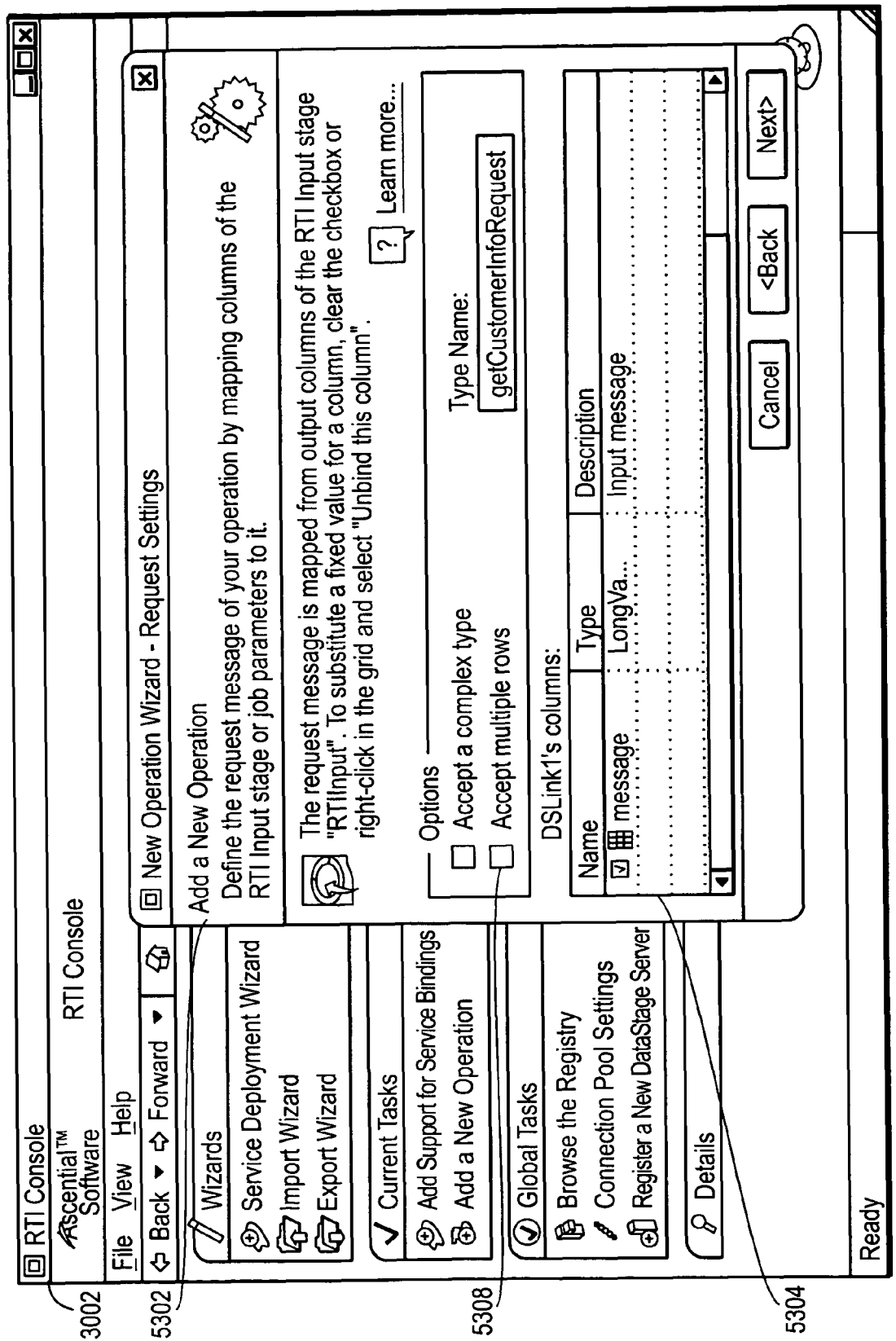
FIG. 53 shows another window of the RTI console of FIG. 50 for defining input arguments.

FIG. 53 shows a new window 5302, which is used to define the input arguments for the operation. The input arguments represent the structure of the request message for the operation. The window 5302 allows the user to map columns of the RTI input stage 3138 or job parameters to the operation. By default, all of the columns of the RTI input stage 3138 (all possible inputs) for the data integration job used during initiation of the operation are be mapped to an input argument for the operation. However, in embodiments, the user can customize the mapping. By default, all of the columns in the RTI input stage 3138 appear in the list 5304 for the operation. The checkbox 5308 allows the user to accept multiple rows. This function allows the user to define an array as the input for the RTI service, rather than a simple row. To define the inputs, in the RTI console 3002, a particular row may be checked or unchecked at the box 5304 to determine whether it will become part of the signature of the operation as an input. A user may not want to expose a particular input row to the operation, for example because it may always be the same for a particular operation. In this case, the user can set a fixed static value for the input, so that the operation only sees the non-static values. For example, the operation may be intended to be used only for people of age 21, so that an age variable is set at a static 21.

Figure 54:
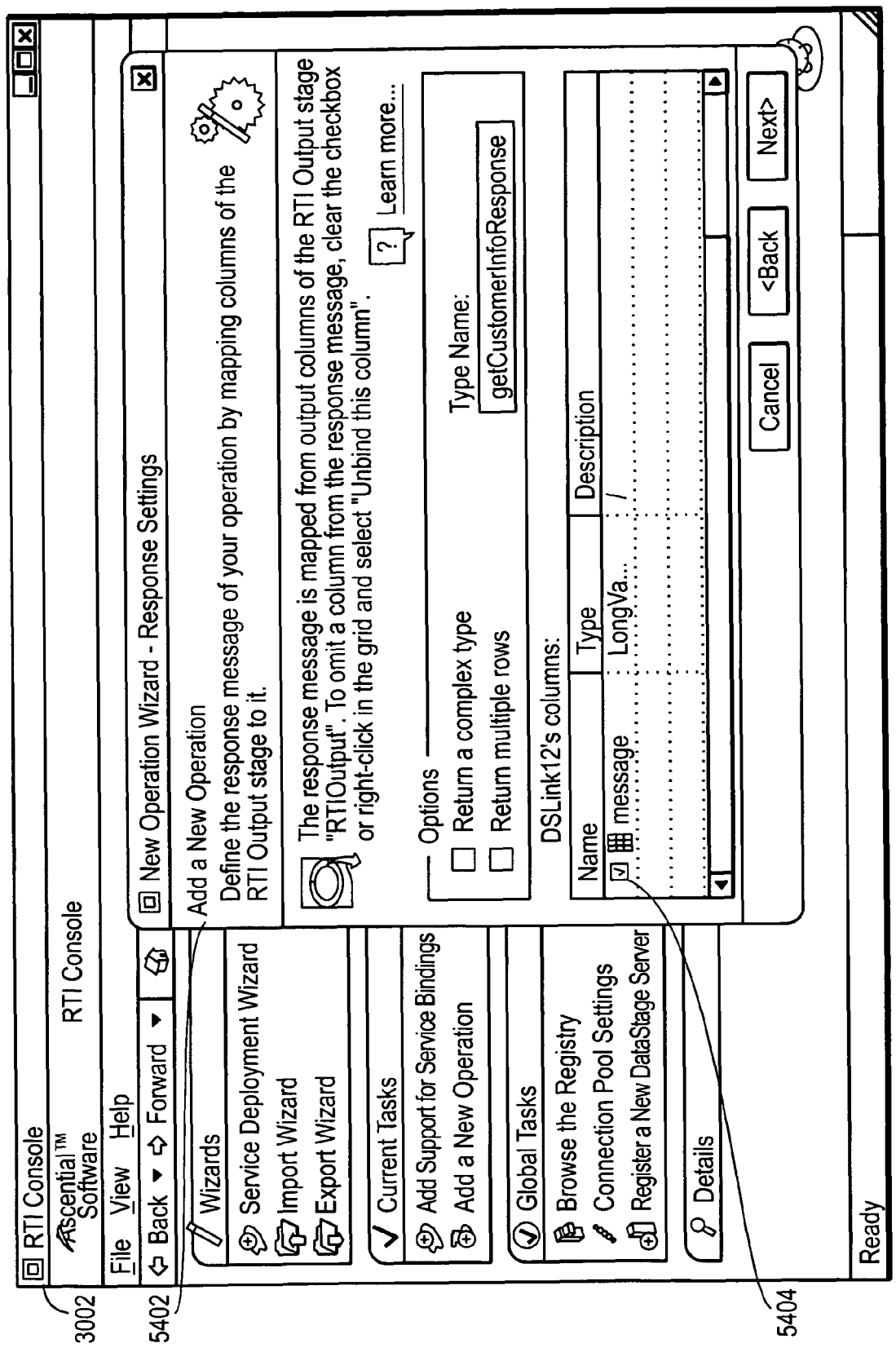
FIG. 54 shows another window of the RTI console of FIG. 50 for defining output arguments of a response message.

FIG. 54 shows a window 5402 that is used to define the output arguments for the operation. The output arguments define the type of response message that will return from the operation. By default, the response message is mapped from the output of the RTI output stage 3140. All of the columns from the RTI output stage for the data integration job 3134 in question appear by default in the list 5404. The user can omit columns from the response message by right-clicking anywhere on the grid and selecting "Unbind this column" from a displayed drop-down menu. By default, if only one column is defined, it will be mapped into the output argument of the operation. If multiple columns are defined, a complex type containing all the columns will be created for the operation output argument. This is customizable and will be described in more detail below. Once defined, the output arguments are part of the signature of the operation.

Figure 55:
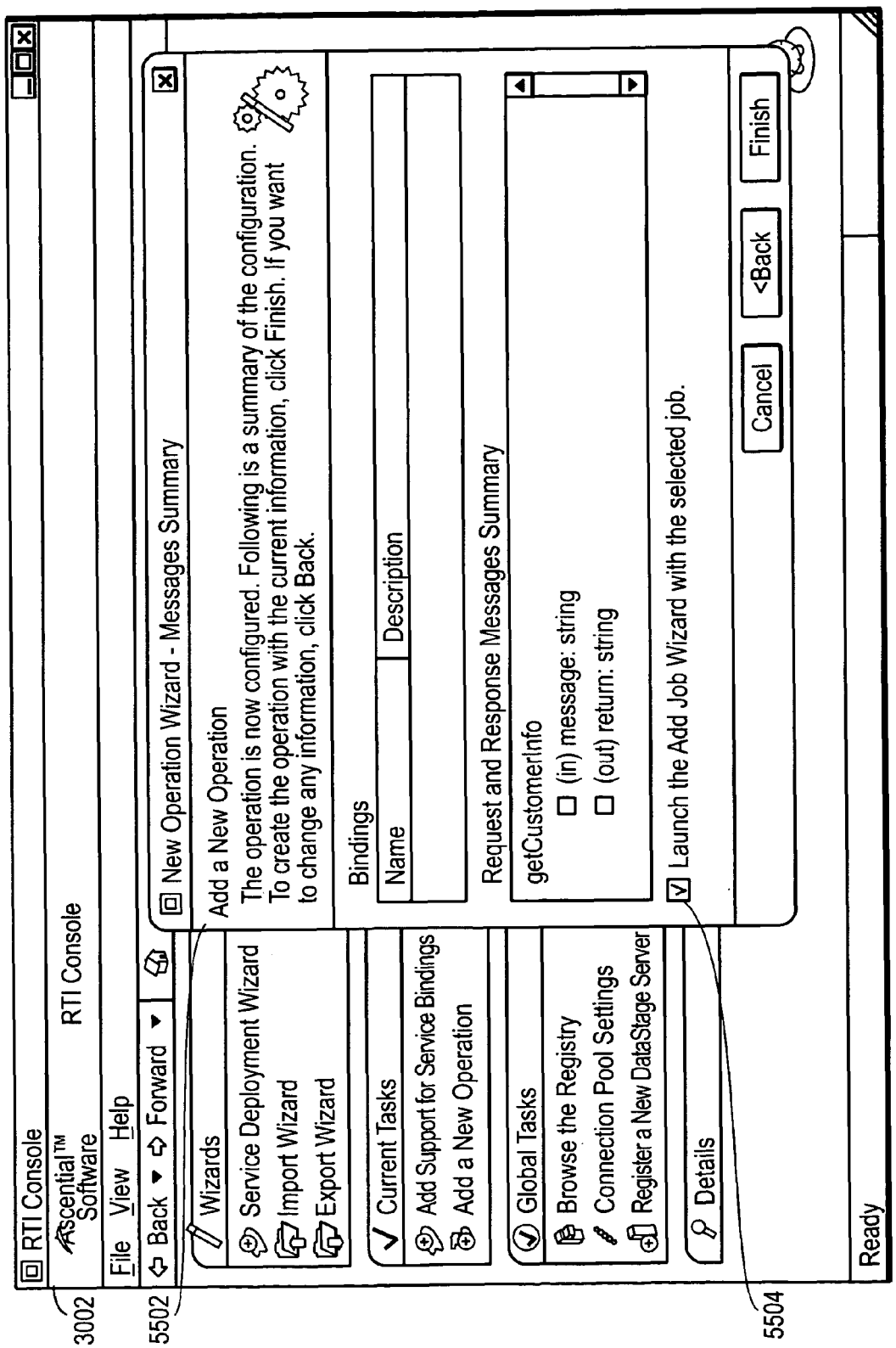
FIG. 55 shows another window of the RTI console of FIG. 50 after configuration is complete.

FIG. 55 shows a new window 5502 with a summary of the operation signature for the now completed operation. The next step in adding the operation is to add the actual data integration job to the operation. A job creation wizard is automatically started by checking the checkbox 5504, with the data integration job that was initially used to create the process being implicitly used as the data integration job for the operation.

A user can attach various items to a job attached to an operation. For example, when multiple instances of a job are running on a machine, the user can specify the minimum number and maximum number of instances that can be running simultaneously. Likewise, the user can define load balancing parameters for handling requests among a pool of pipelined, always-running integration processes. When a minimum is specified, at least that many jobs will be up and running to be ready to process requests. When more jobs are needed, the RTI server will start new instances up to the maximum specified at deployment time. The RTI server dynamically starts multiple integration processes commensurate with the load to cope with the load and load balance requests among the multiple data integration processes running on the data integration platforms 2702.

Figure 56:
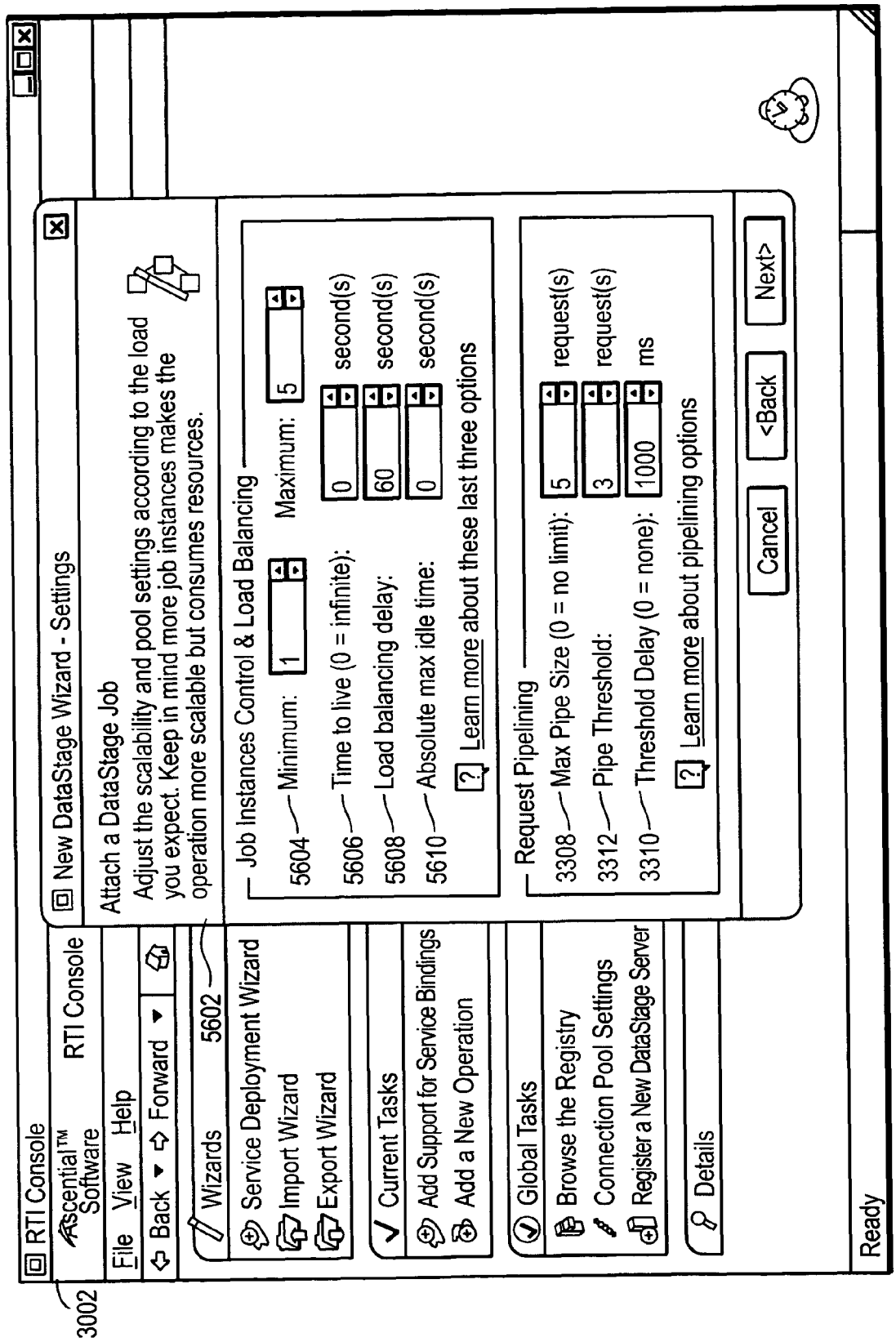
FIG. 56 shows a window of an RTI console that enables a user to add a job.
Figure 57:
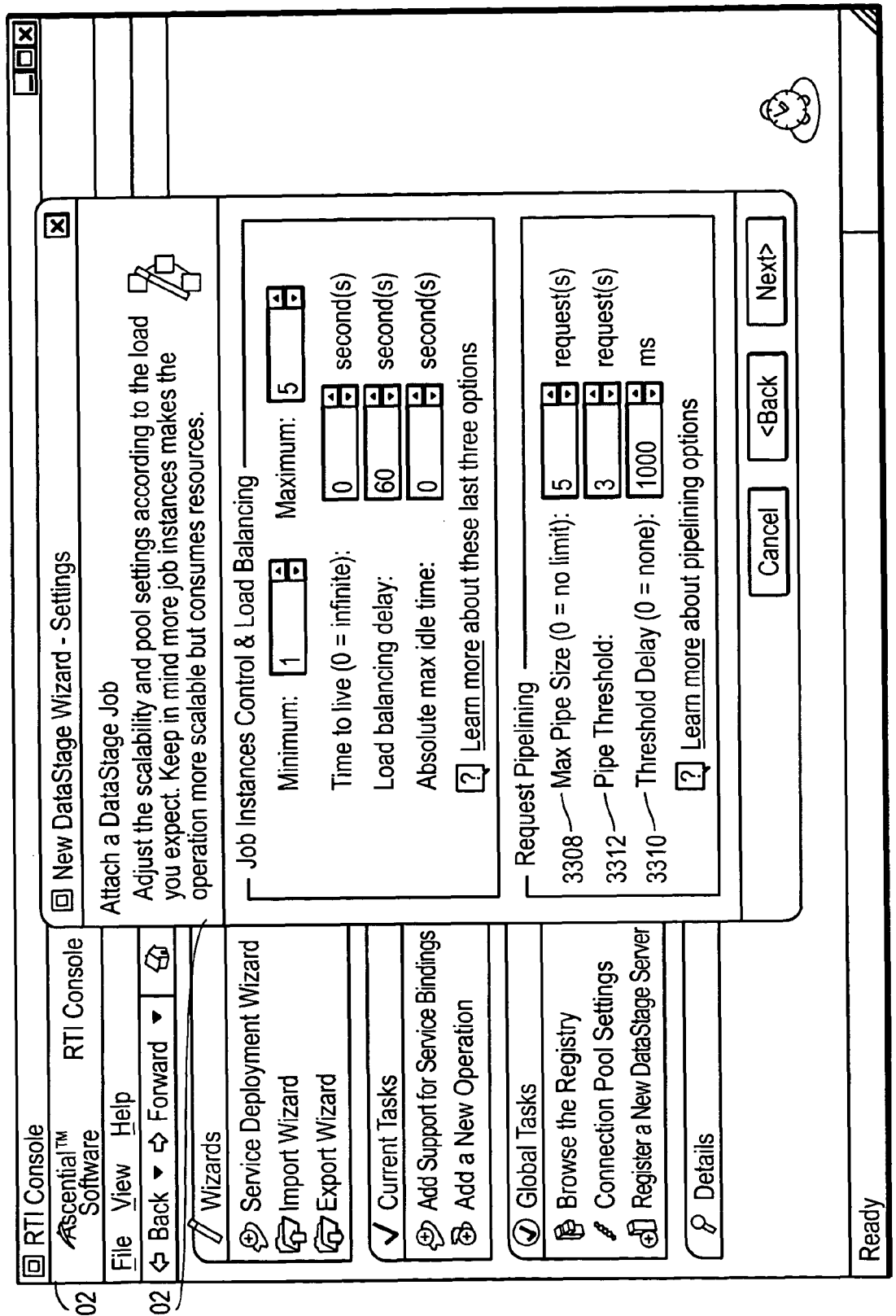
FIG. 57 shows a window with fields that allow a user to set parameters for pipelining an added job.

FIGS. 56 and 57 show a graphical user interface 3002 with a window 5602 that enables a user to initiate steps for attaching a job. Some instances will continue to run on the RTI server 2802 for processing incoming requests. A field 5604 allows the user to specify a parameter that sets the minimum and maximum number of instances allowed. Another parameter can be set in the field 5606, which is the lifetime (time to live) of instances. After the delay. The load balancing delay parameter in the field 5608 specifies the time before a job instance is terminated and a new one started. If the minimum number of instances has not been exceeded, a job instance not used for that delay will be reclaimed. Field 5610 sets a parameter for the absolute maximum idle time. Likewise, if an instance is not used for the maximum idle time specified in field 5610, the instance is terminated and a new one is started.

The window 5602 also contains fields that allow the user to set parameters for pipelining for the job that is being added. Pipelining allows more than one request to be submitted to a single job instance, even if the processing of the previous one is not finished. As described above in connection with FIG. 33, the maximum pipeline size parameter 3308, the pipeline threshold parameter 3312 and the threshold delay 3310 control how the load balancing algorithm of the process pooling facility 3102 of the RTI server 2802 determines the maximum pipelining capacity of an instance of the job and help use the job at its full potential before starting a new instance.

Figure 58:
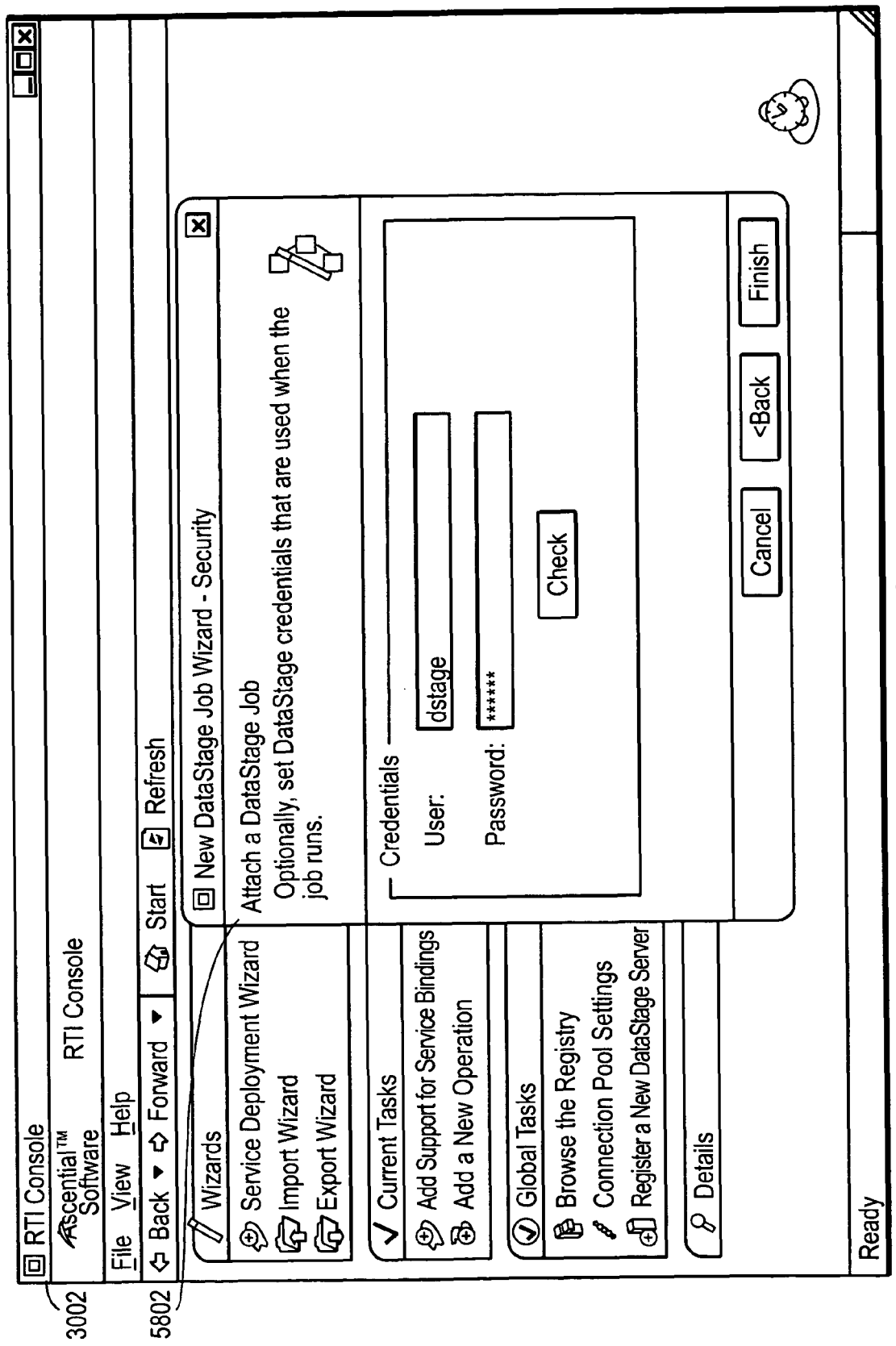
FIG. 58 shows a window of the RTI console that allows a user to enter a user name and password for a job.
Figure 59:
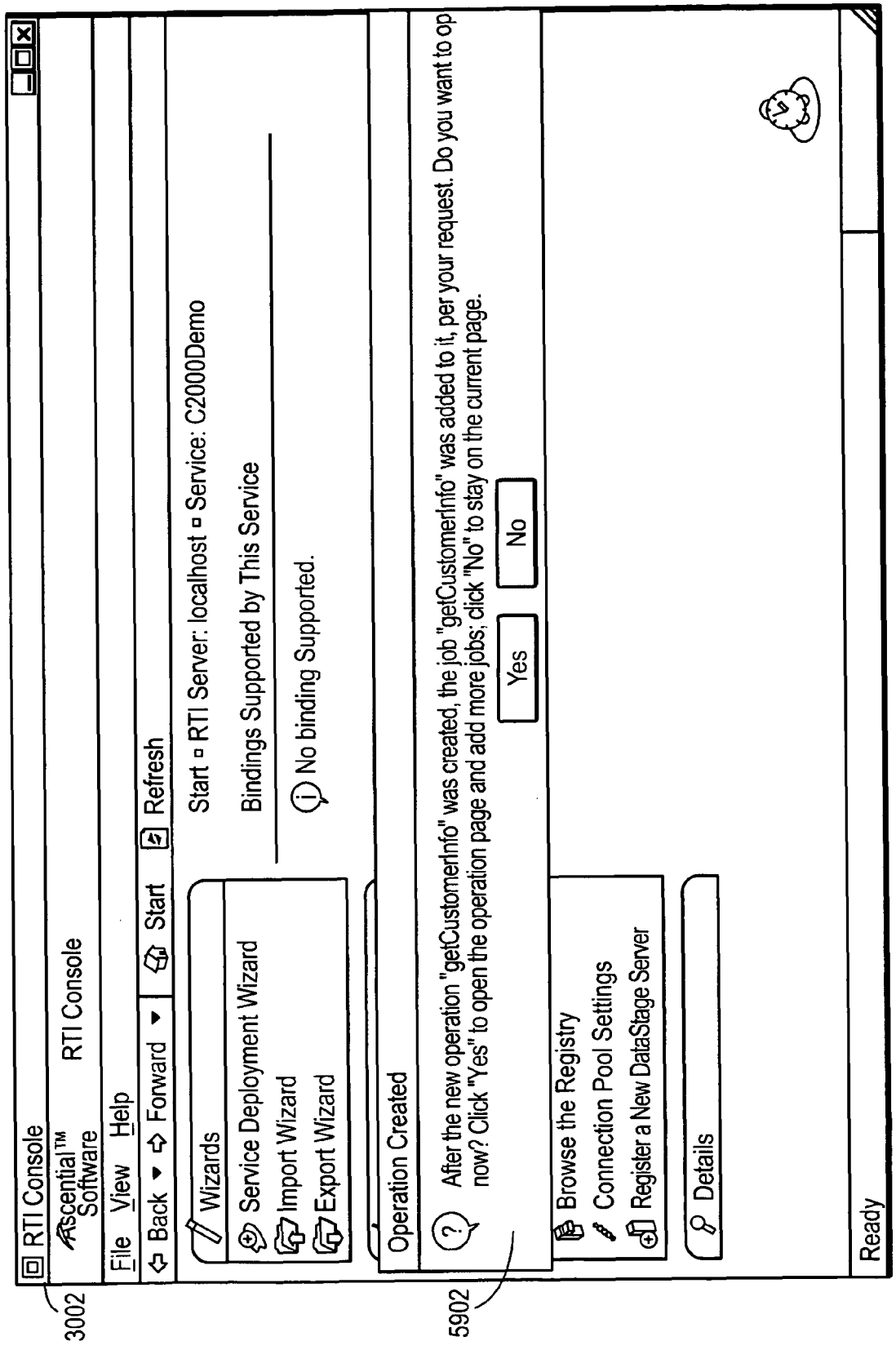
FIG. 59 shows a window of the RTI console which enables the user to add another job.

FIG. 58 shows a window 5802 of the RTI console 3002 that allows a user to enter a user name and password for the job. Instead of entering the user name/password, user and password attributes can be initialized with the credentials used when registering the data integration platform 2702 server. The credentials are used when starting or stopping the job. Additional jobs, for example whether to remain on the page, such as to add a binding for the job, or to go onto the operation page, such as to add another job to the operation, can be added by mouse-click on pane 5902, as shown in FIG. 59.

Figure 60:
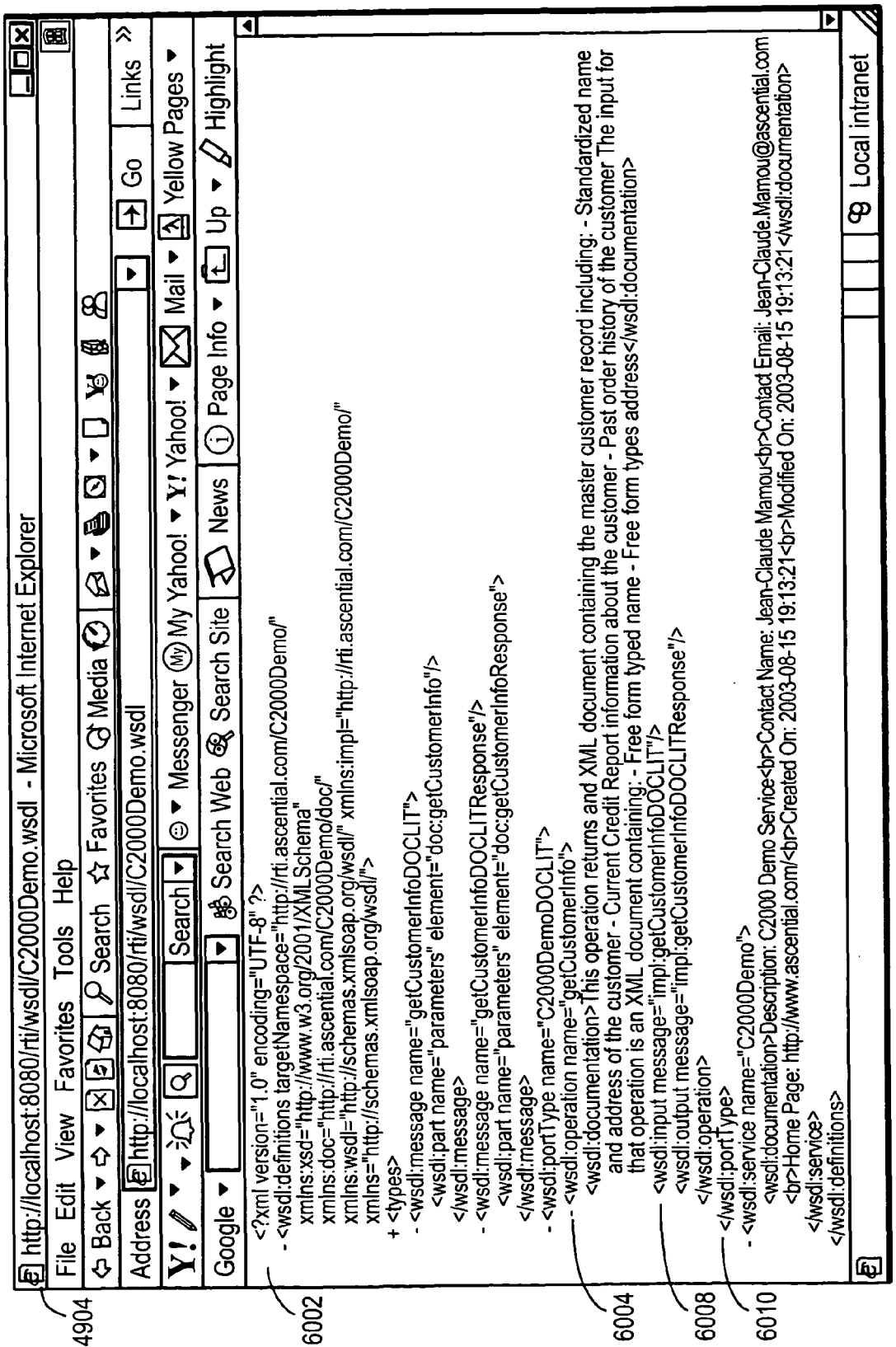
FIG. 60 represents a WSDL registry showing the WSDL description for the operation, which includes an operation section, as well as an associated message section and type section.

Referring to FIG. 60, the WSDL registry 4904 shows the WSDL description 6002 for the operation, which now includes an operation section 6004, as well as an associated message section 6008 and types section 6010. It should be noted that there is still no binding section for the operation in the WDSL description.

Figure 61:
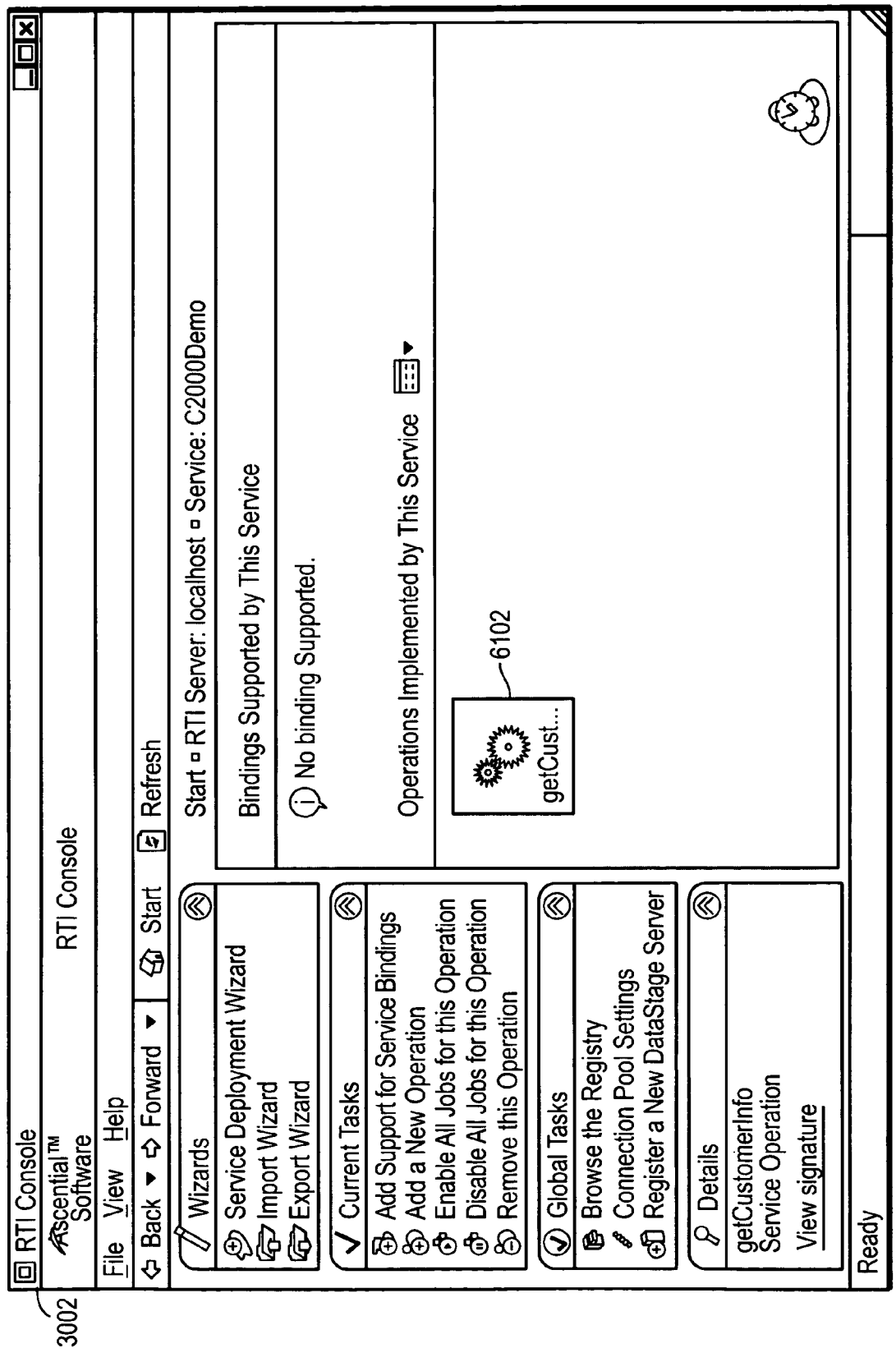
FIG. 61 shows a window of the RTI console with one operation and a data integration job attached to the operation.

Referring to FIG. 61, the window 6102 of the RTI console 3002 shows that the RTI service has a single operation, with a data integration job, attached to the operation. Although the date integration job running, but it cannot be used yet, because at least one binding is needed.

Figure 62:
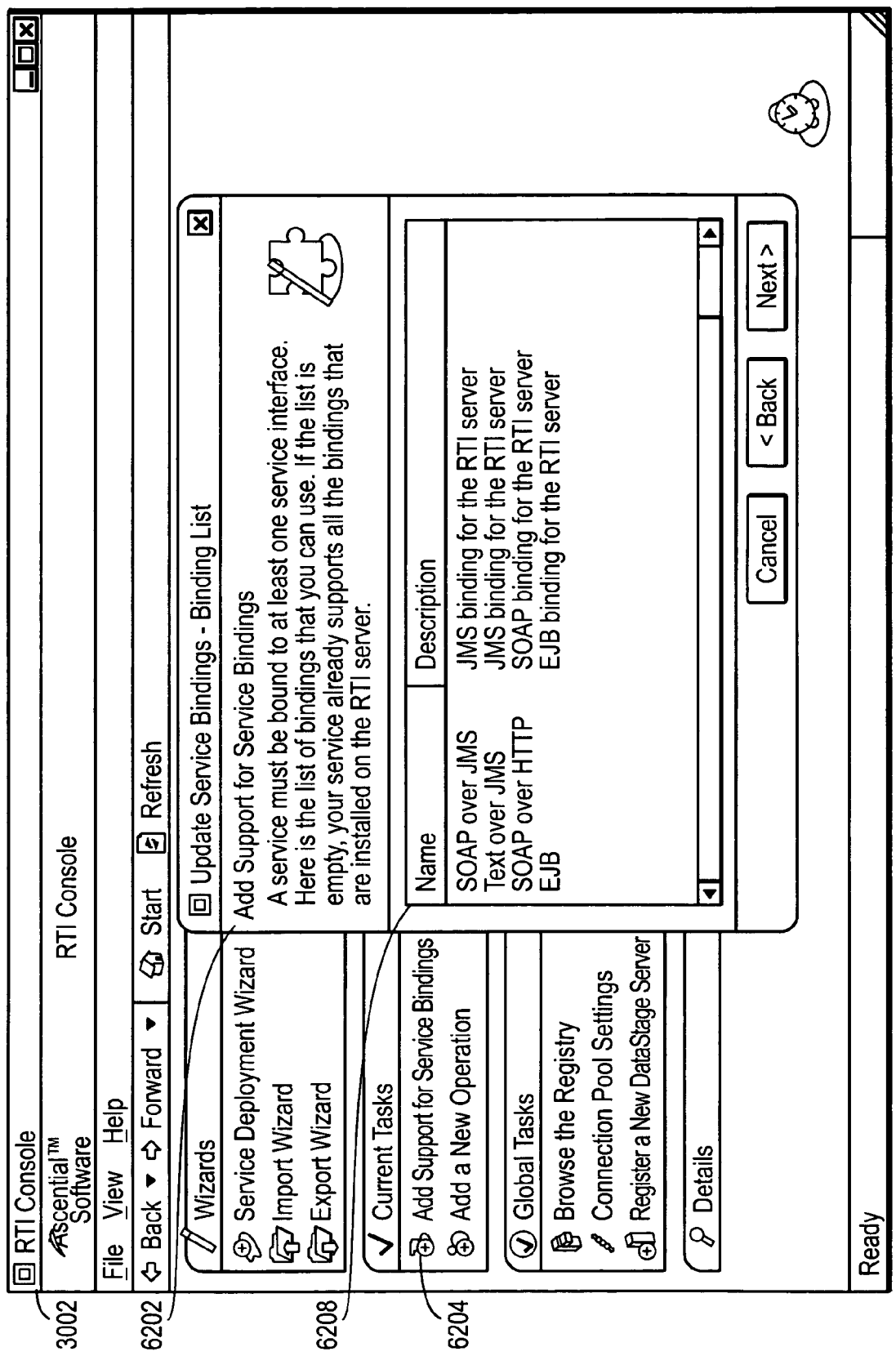
FIG. 62 shows a window of the RTI console that supports web service binding.

FIG. 62 shows a window 6202 of the RTI console 3002 that is displayed when the user clicks "Add Support for Service Binding" at the icon 6204 on the RTI console menu. Window 6202 shows various available web-enabled bindings 6208, such as SOAP over JMS, Text over JMS, SOAP over HTTP, and EJB, as well as the description associated with each binding. A user can select a particular binding, such as SOAP over HTTP, and click "Next" to enable that binding.

Figure 63:
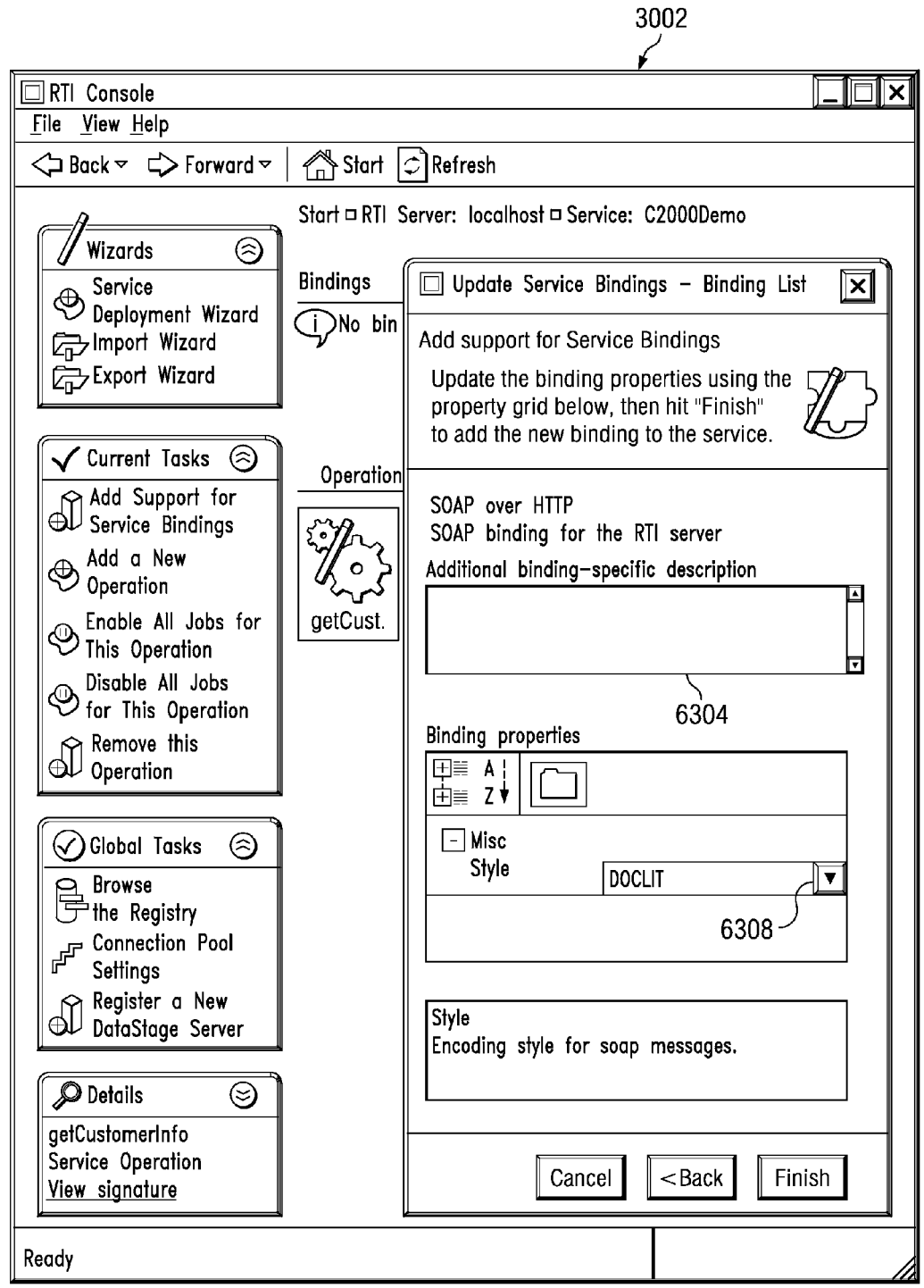
FIG. 63 shows another window of the RTI console that supports web service binding.

FIG. 63 shows a window 6302 of the RTI console 3002 for updating the binding properties defined in window 6202 of FIG. 62. The user can add in field 6304 a description specific to the binding and define binding styles by using menu 6308. For example, when creating a SOAP over HTTP binding, the generated web service can be selected by the user as an RPC-style (SOAP-encoded) web service or a document-style (literal encoded) web service. Advantageously, a document, literal encoded (doclit) web service is used.

Figure 64:
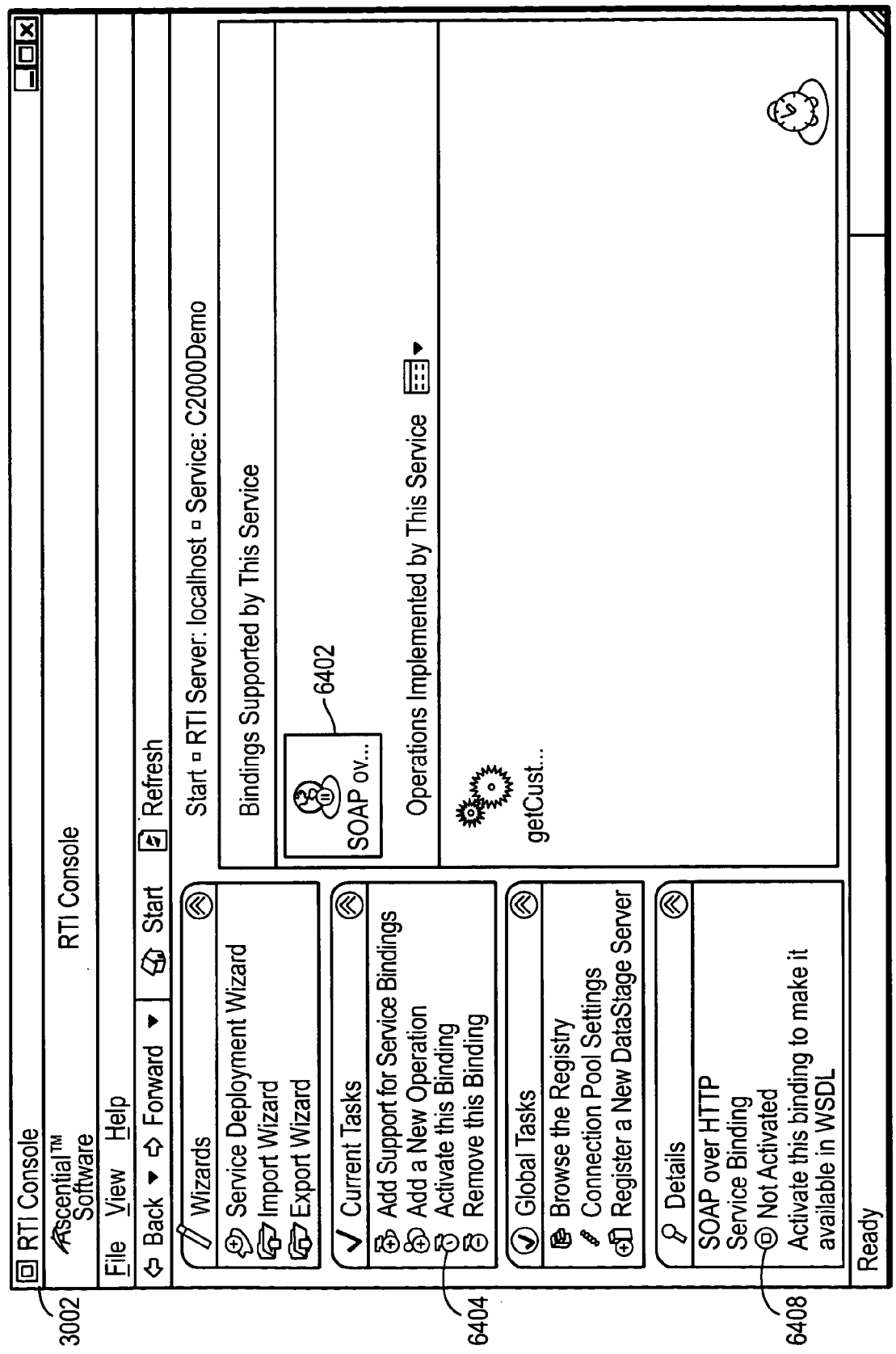
FIG. 64 illustrates a display window that shows that a SOAP binding is created, but not activated.
Figure 65:
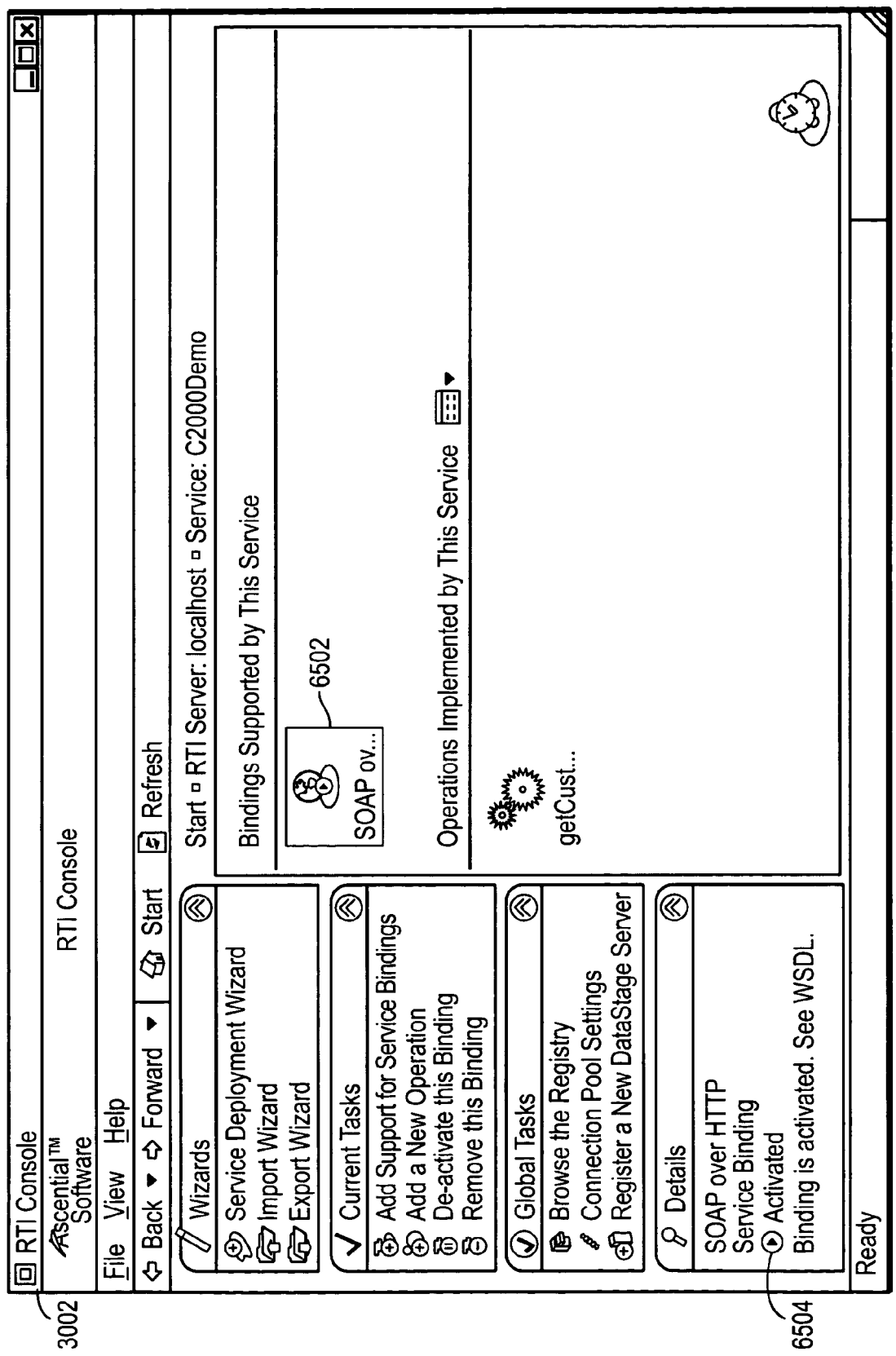
FIG. 65 shows the display window of FIG. 64 with the SOAP binding activated.

Referring to FIG. 64, the display window 6402 shows that the SOAP binding has been created, but is not activated, or published, as indicated by the icon shows a "Pause" button. The user can use "Activate this Binding" link 6404 (or the contextual menu on the binding) to activate the binding. Until activated, the details window 6408 highlights the fact that the binding is not activated. Upon activation via link 6404 in FIG. 64, the RTI console 3002 is refreshed to show the display window 6502 of FIG. 65, and the details window 6504 highlights "Activated."

Figure 66:
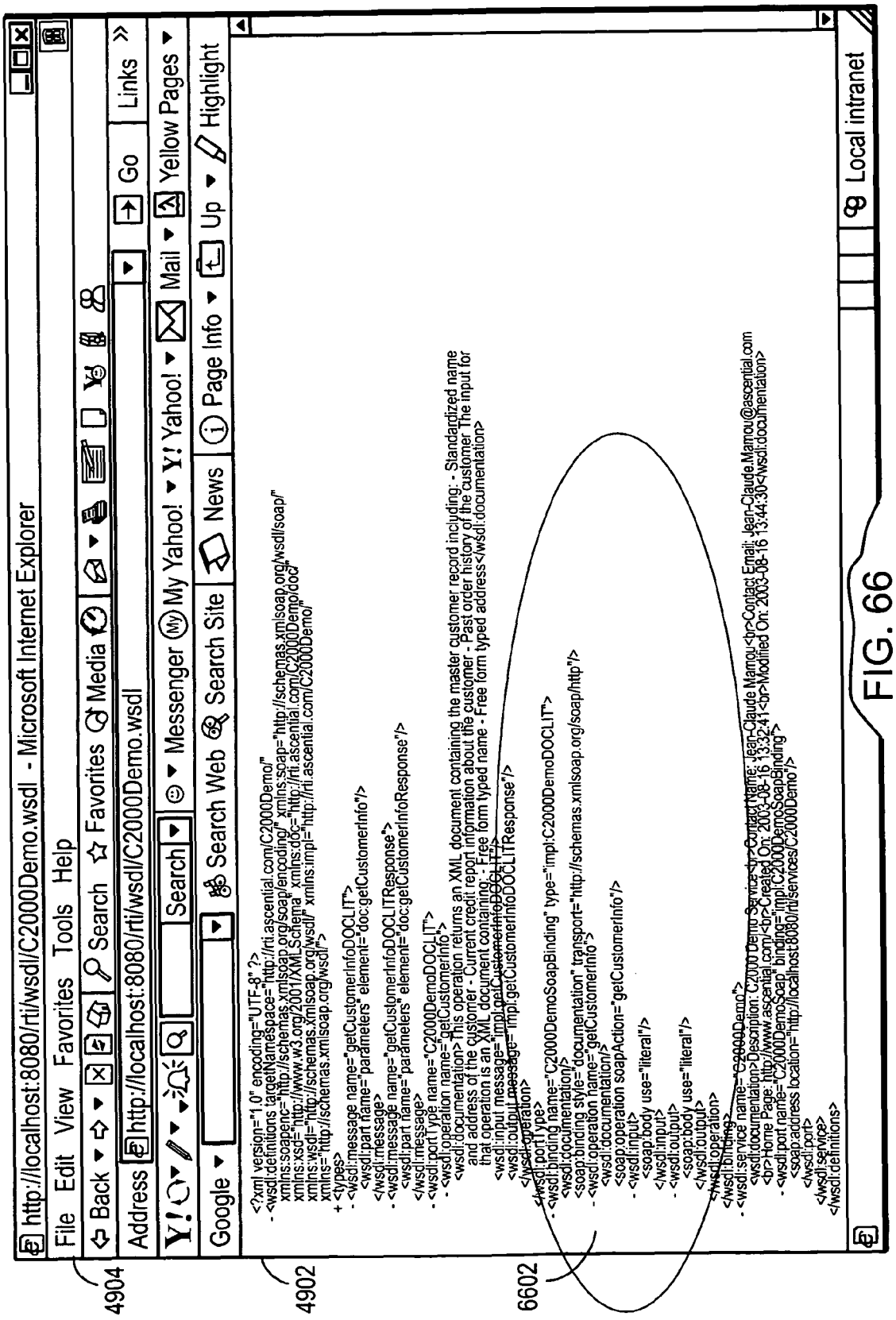
FIG. 66 represents an RTI registry view that shows a binding section in the WDSL description.

Referring to FIG. 66, the RTI registry view 4904 now shows a binding section 6602 in the WDSL description 4902. The binding section maps the service and its operation to the physical protocol used to invoke the service, here the SOAP protocol, but optionally any other suitable service protocol.

Figure 67:
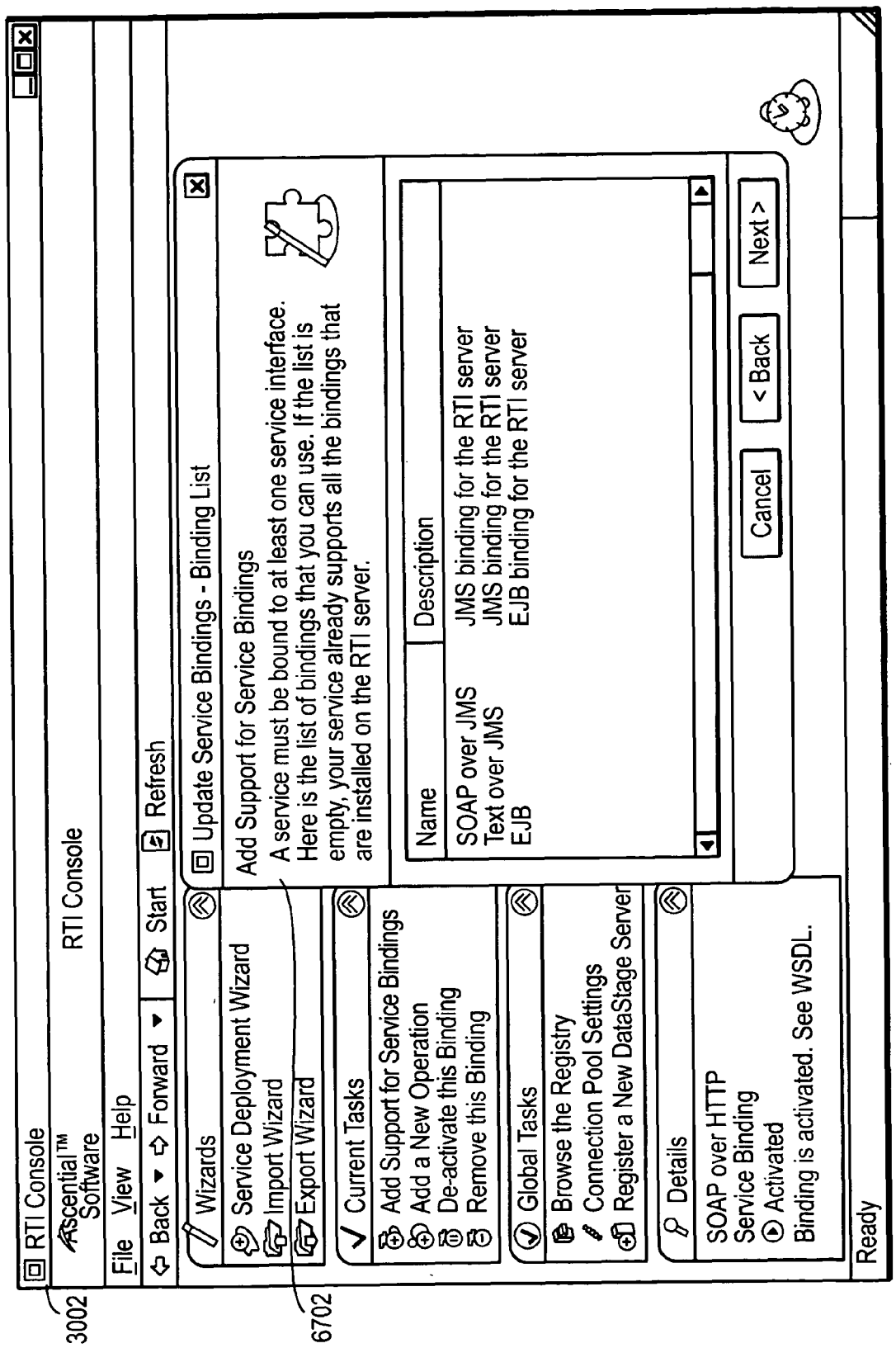
FIG. 67 shows adding a binding after returning to an RTI console.
Figure 68:
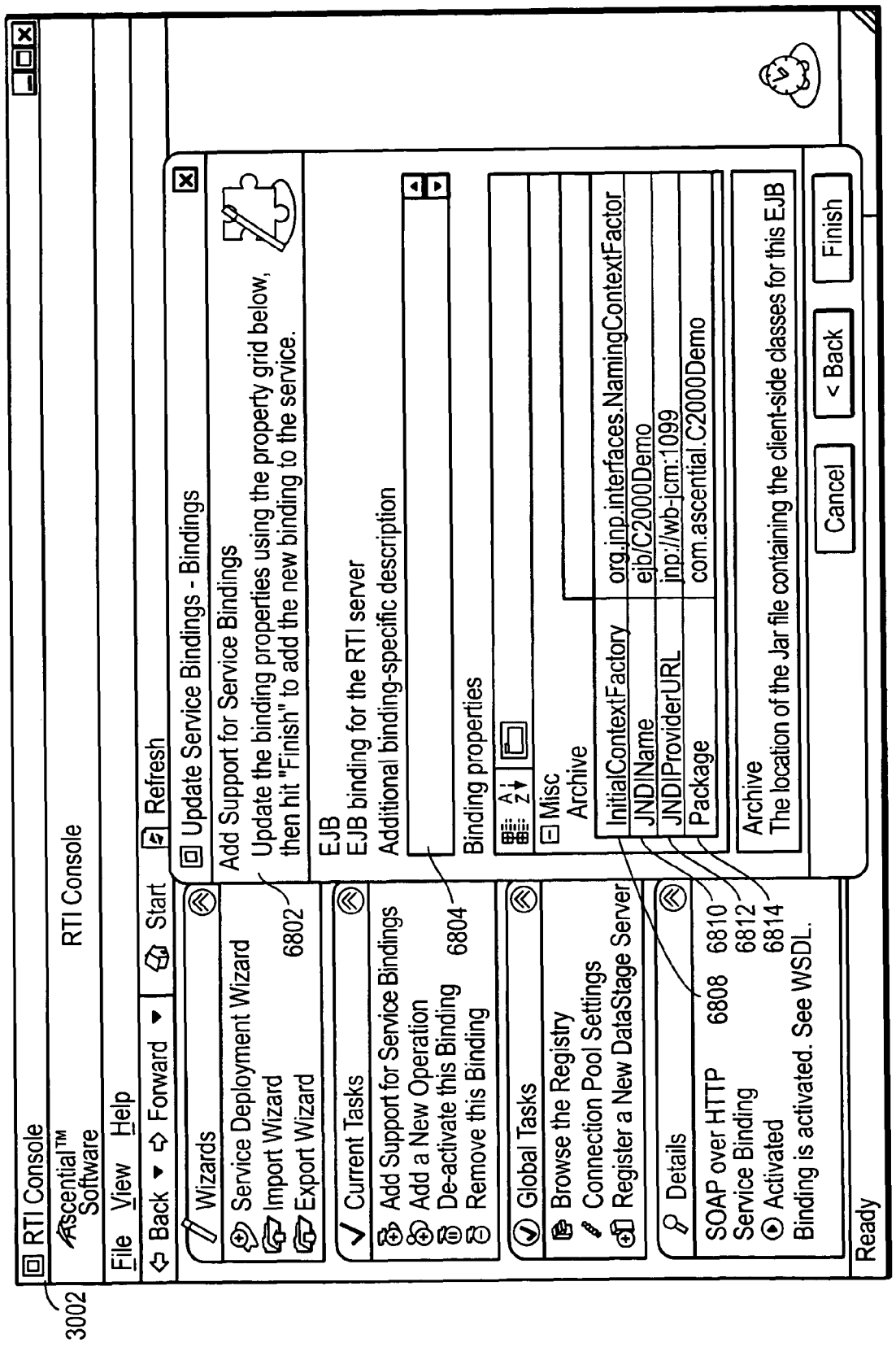
FIG. 68 shows a window of the RTI console allowing addition of EJB binding.

Referring to FIG. 67, returning to the RTI console 3002, it is still possible to add a binding. The display window 6702 shows three more bindings, such as an EJB binding, that can be added. If the user elects to add an EJB binding from the menu in the window 6702 of FIG. 67, then a window 6802 is displayed, as shown in FIG. 68, which allows the user to add an EJB binding. Additional description to the binding, which will be included in the published WSDL description for the service, can be added in field 6804. The display 6802 also includes other elements for the EJB binding, including the InitialContextFactory field 6808, which is the class to create application server-specific JNDI context. TheJNDIName field 6810 sets the name of the EJB in the JNDI directory. The JNDIProviderURL field 6812 sets the URL that points to the JNDI provider, which is application server-specific. The package field 6814 sets the Java package name that will be used for the generated EJB.

Figure 69:
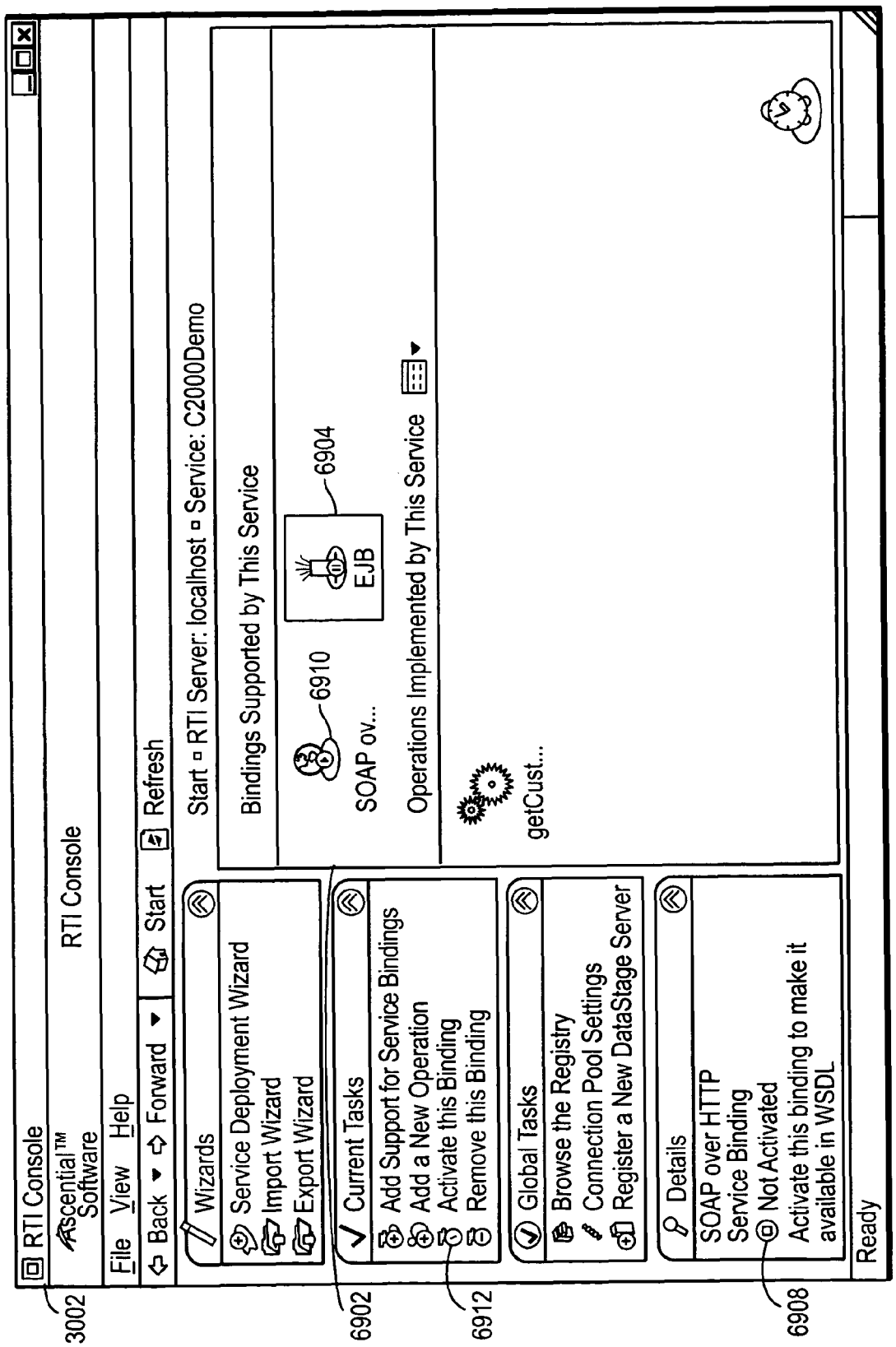
FIG. 69 shows a window of the RTI console with completed SOAP and EJB bindings.

Referring to FIG. 69, window 6902 in the RTI console 3002 now displays the EJB, showing a "Pause" icon 6904, since the EJB, although created, has not yet been activated or published to a registry. The details pane 6908 also shows that the EJB binding is not activated. Conversely, the SOAP binding icon 6910 shows a "Play" icon, indicating that the binding has been activated and published to the RTI registry. Upon activation via link 6904 in FIG. 68, the RTI console 3002 is refreshed to show the display window 6902 of FIG. 69, and the details window 6908 highlights "Activated."

Figure 70:
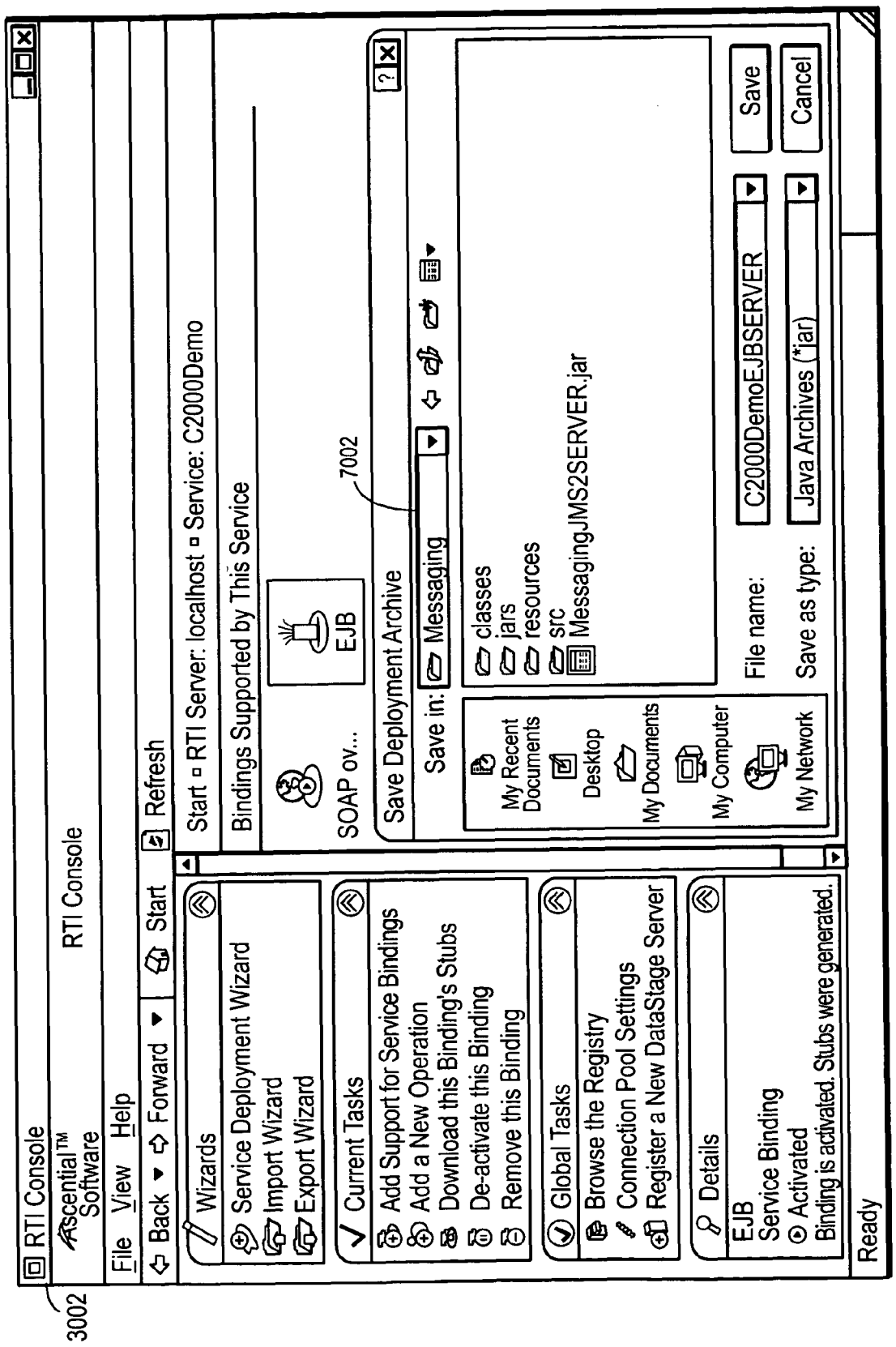
FIG. 70 illustrates an RTI display window with additional options for activating an EJB binding.

Referring to FIG. 70, the display 7002 shows an additional step for activating the EJB binding, initiated with the "Activate this Binding" link 6912 of FIG. 69. When activating the binding, the RTI server 2802 creates the Java code for the EJB, compiles it, creates a JAR and finally proposes to the user to save this JAR with the window 7002. This JAR needs to be deployed in the application server like any other regular EJB. If the user does not deploy the JAR, the binding will not work, even if shown as activated in the console. If the binding (or the service) is removed, then the user needs to un-deploy the associated JAR.

Figure 71:
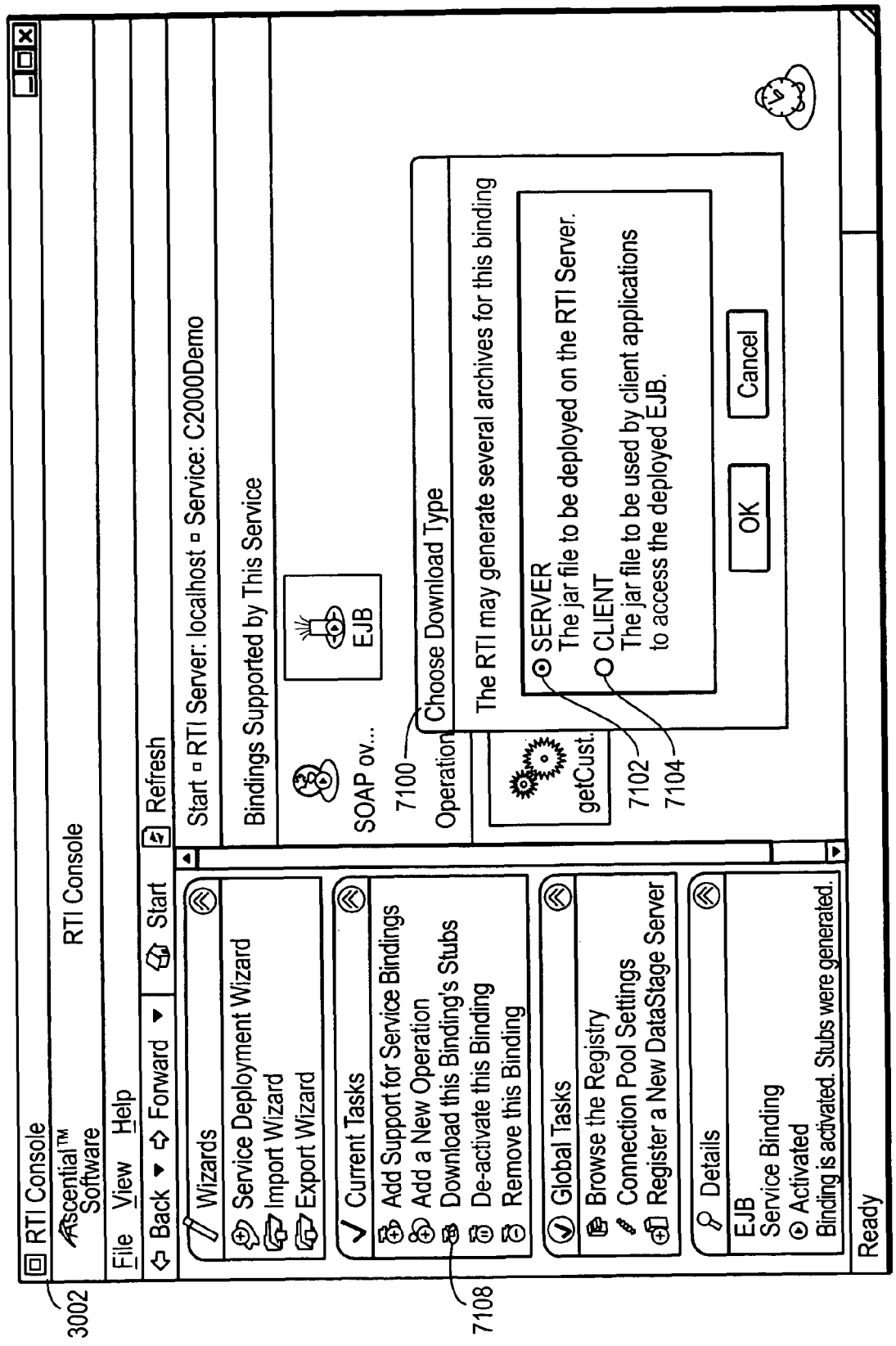
FIG. 71 shows an additional RTI display window with additional options for EJB binding.

Referring to FIG. 71, an additional display 7100 enables additional steps for adding an EJB binding. By clicking on the "Download the Binding's Stub" link 7108 (or using the contextual menu), the user can at any time re-generate the EJB JAR and re-deploy it. An EJB is a client/server component. At the display 7100 the user can elect to deploy the JAR file on the RTI server at a button 7102 or can elect to have the JAR file used by client applications to access the EJB at a button 7104. Inside the JAR, a README is also generated with a sample Java code showing how to use it.

Figure 72:
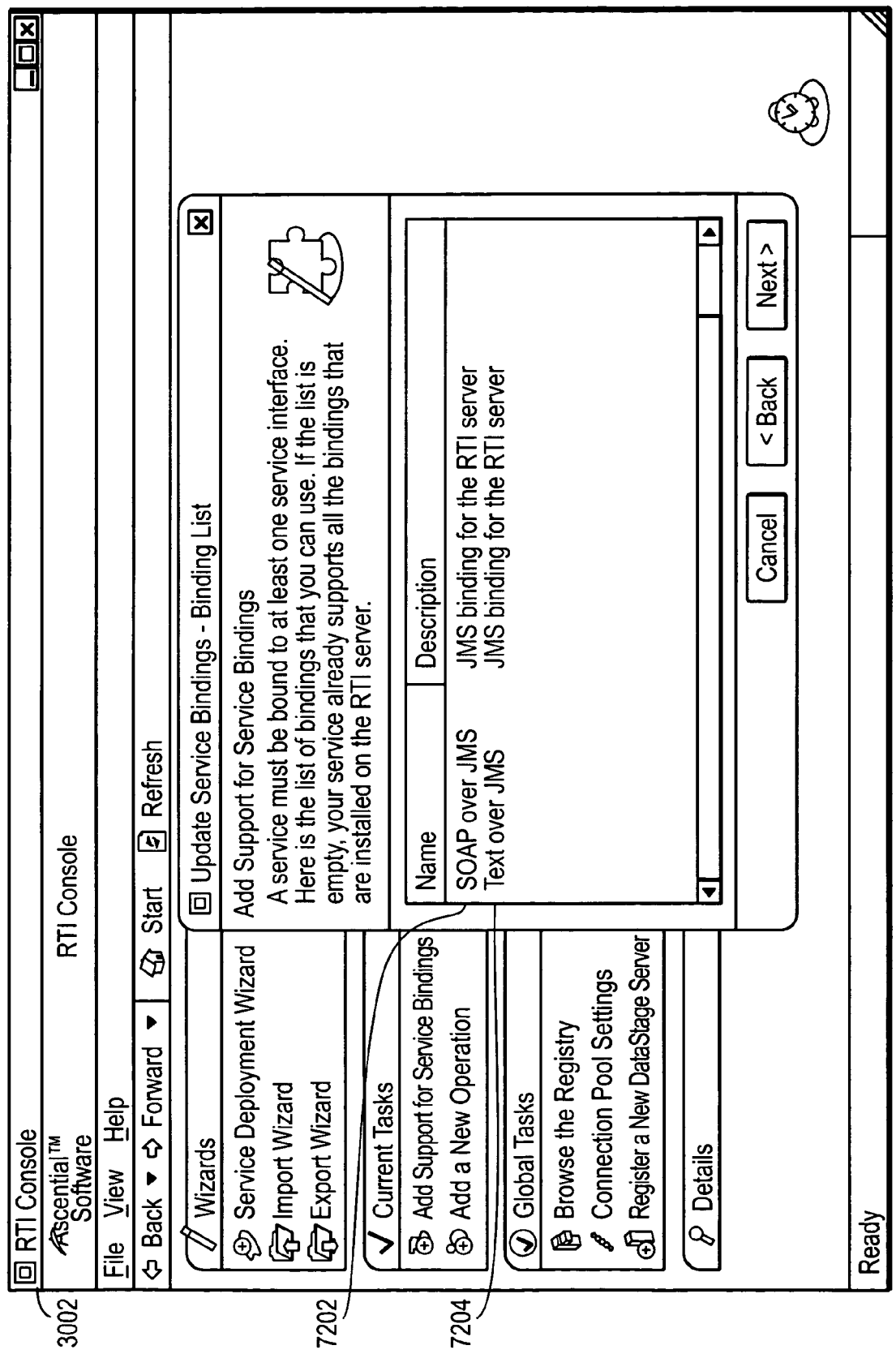
FIG. 72 shows addition of SOAP over HTTP binding and EJB binding.

Referring to FIG. 72, after adding the SOAP over HTTP binding and the EJB binding, the window 7202 shows two more bindings available for the service. The user can select, for example, the Text Over JMS binding 7204.

Figure 73:
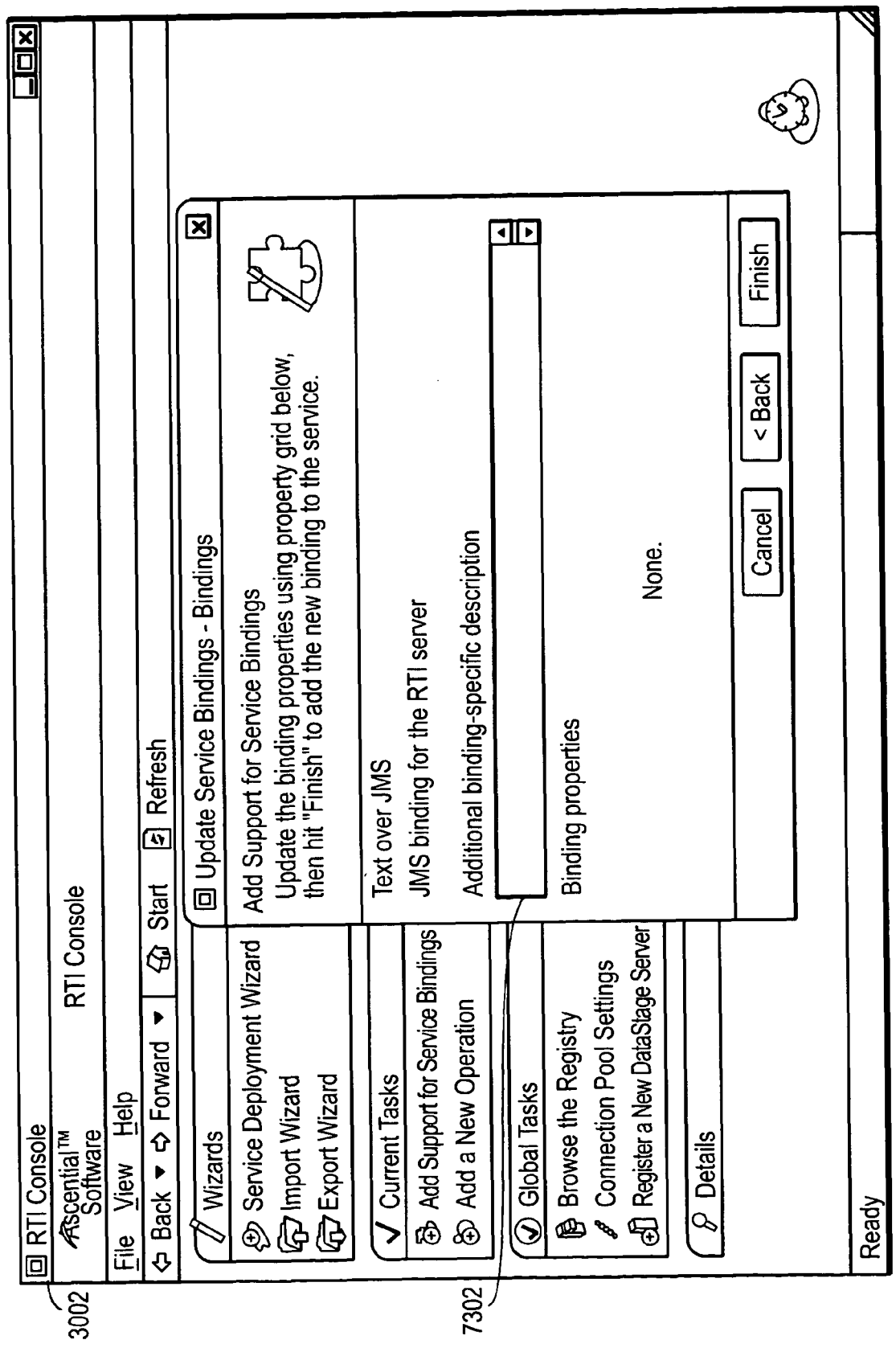
FIG. 73 illustrates a window for adding a description of the binding.

FIG. 73 shows a window 7302 allowing a user to add additional description for the binding, which will be published as part of the WSDL description for the service. Unlike other bindings, the Text Over JMS binding 7204 typically does not have any inherent binding properties. However, the Text Over JMS binding has many properties specific to each operation of the service, as seen in the following figures.

Figure 74:
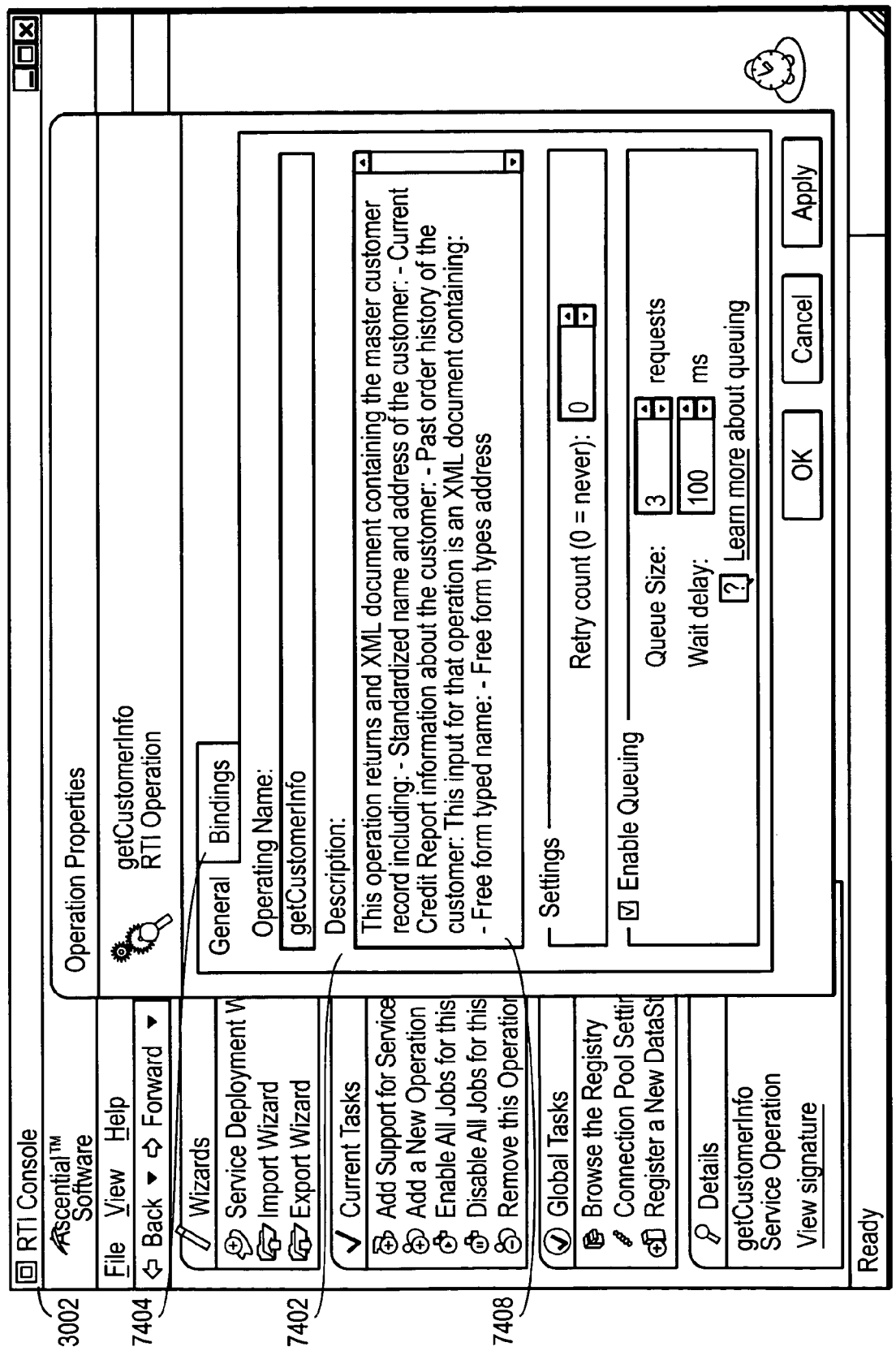
FIG. 74 shows a window for setting properties of an operation.

Referring to FIG. 74, when opening the properties of an operation, for example by right-clicking on the operation, a general tab 7404 is available in the display 7402. The general tab, when selected, displays in description window 7408 a description of a specific operation that returns a master customer record as an XML document.

Figure 75:
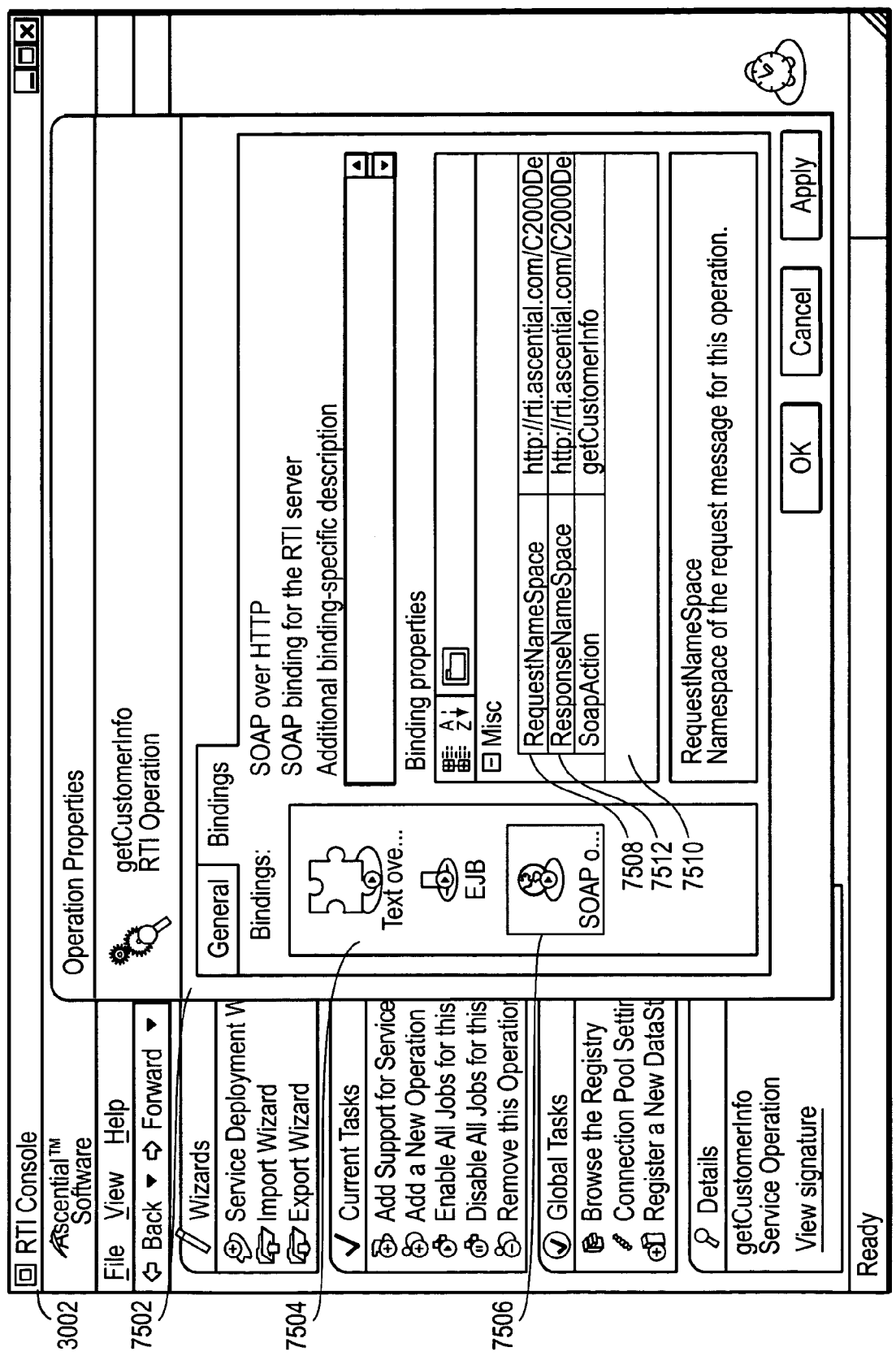
FIG. 75 shows a window with details of binding properties.

FIG. 75 shows a display window 7502 that appears when the bindings tab 7404 is selected. The left area 7504 of the window 7502 shows the various attached bindings for the operations. When a binding is selected, such as the SOAP binding 7506, the operation-specific properties for that binding appear in the right panel 7510. For example, in the embodiment of FIG. 75, the SOAP over HTTP binding 7506 allows to select a namespace 7508 for the SOAP request and a response 7512 for the operation. The SOAP action can also be modified by the user.

Figure 76:
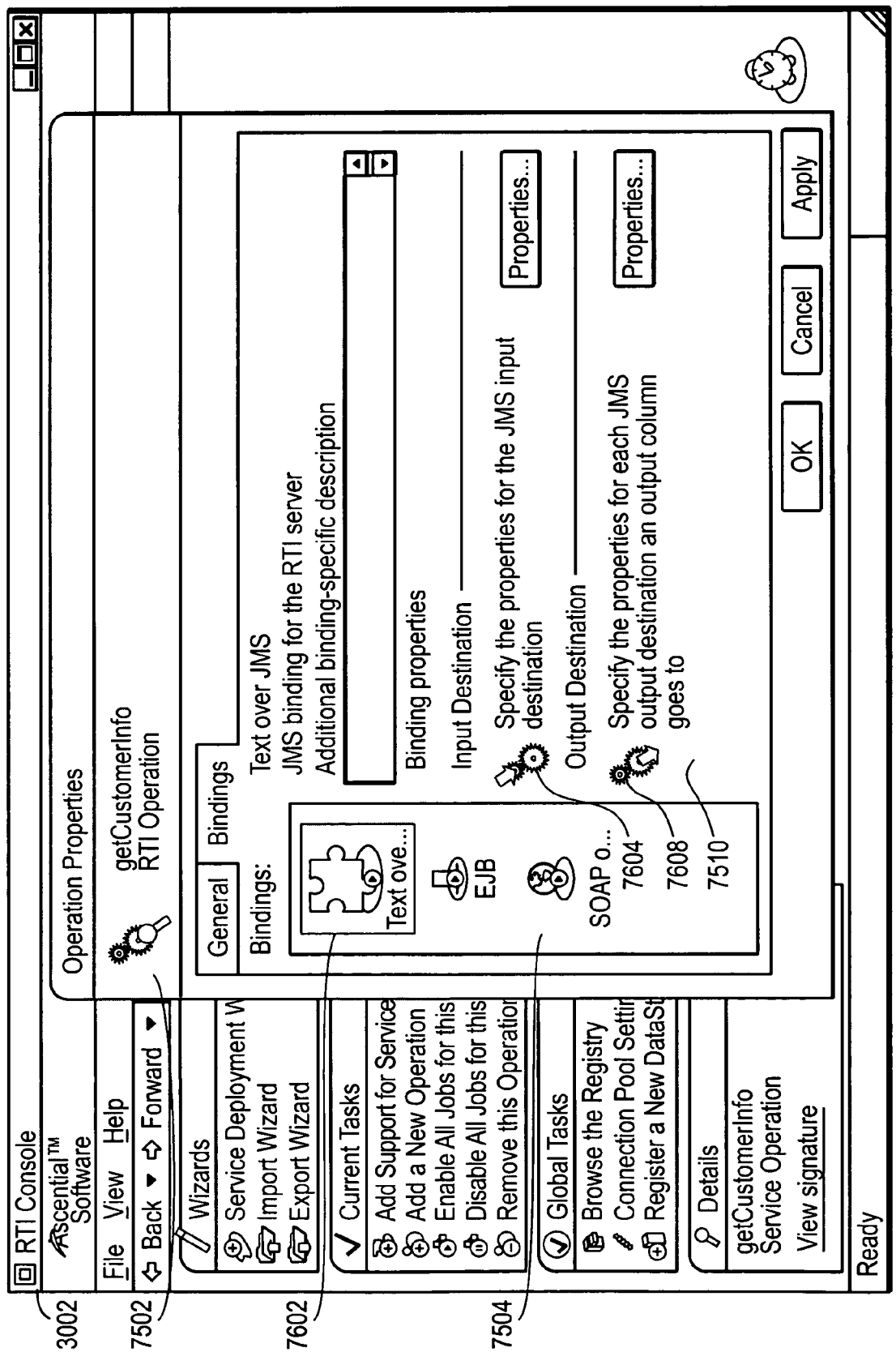
FIG. 76 shows a display window after selecting a bindings tab.

FIG. 76 shows RTI console 3002 with the display window 7502 when the bindings tab 7404 for the Text over JMS icon 7602 is selected in the left panel 7504. Specifying properties for the Text over JMS binding is much more complex than for the other bindings. For the Text over JMS binding, various queues, transactional behavior, and JMS properties are specified. The display window 7502 includes an input destination icon 7604, which enables setting of input destination properties. The input destination properties allow the user to control the message driven bean (MDB) generated for the binding. The MDB listens to the input destination.

The display window 7502 also includes an output destination icon 7608, which enables setting of output destination properties. The output destination properties allow the user to control to which queues or topics the result of the data integration job transformation will be sent.

Figure 77:
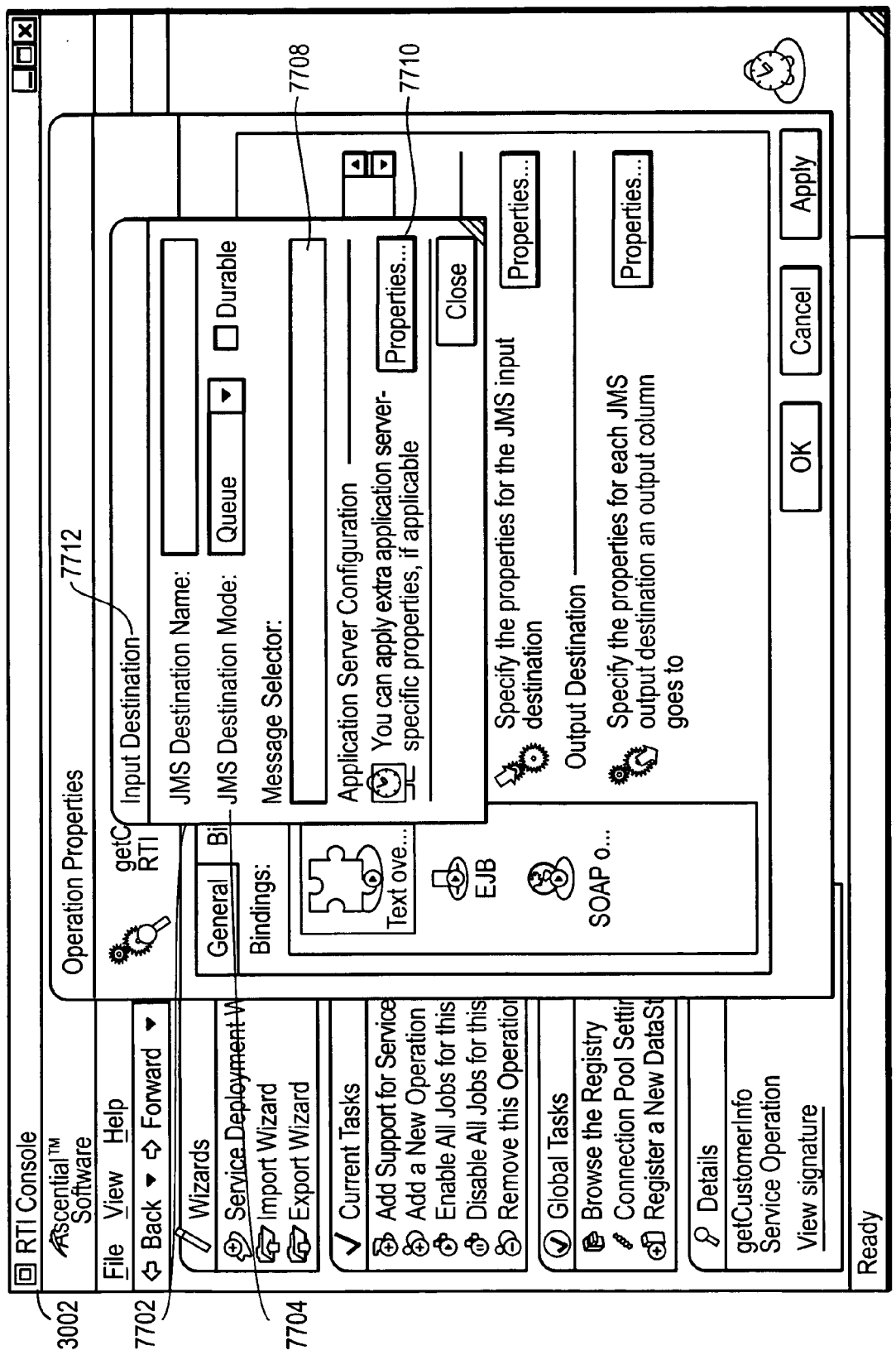
FIG. 77 shows a window for selecting an input destination.

Referring to FIG. 77, when the input destination icon 7604 of FIG. 76 is activated, an input destination pane 7712 appears, which allows the user to define properties of the input destination of the Text over JMS binding. In a field 7702 the user can set the destination name, which is the name of the queue or topic as configured in the application server. Queues or topics have to be in prior existence in order to use this binding. At a menu 7704 the user then indicates whether the input destination is a queue (in a point-to-point model) or a topic (in a publish/subscribe model). Using a field 7708, a user can select specified messages to be filtered out. A properties button 7710 allows the user to initiate a process for configuring some additional properties, as described in connection with the following figures.

Figure 78:
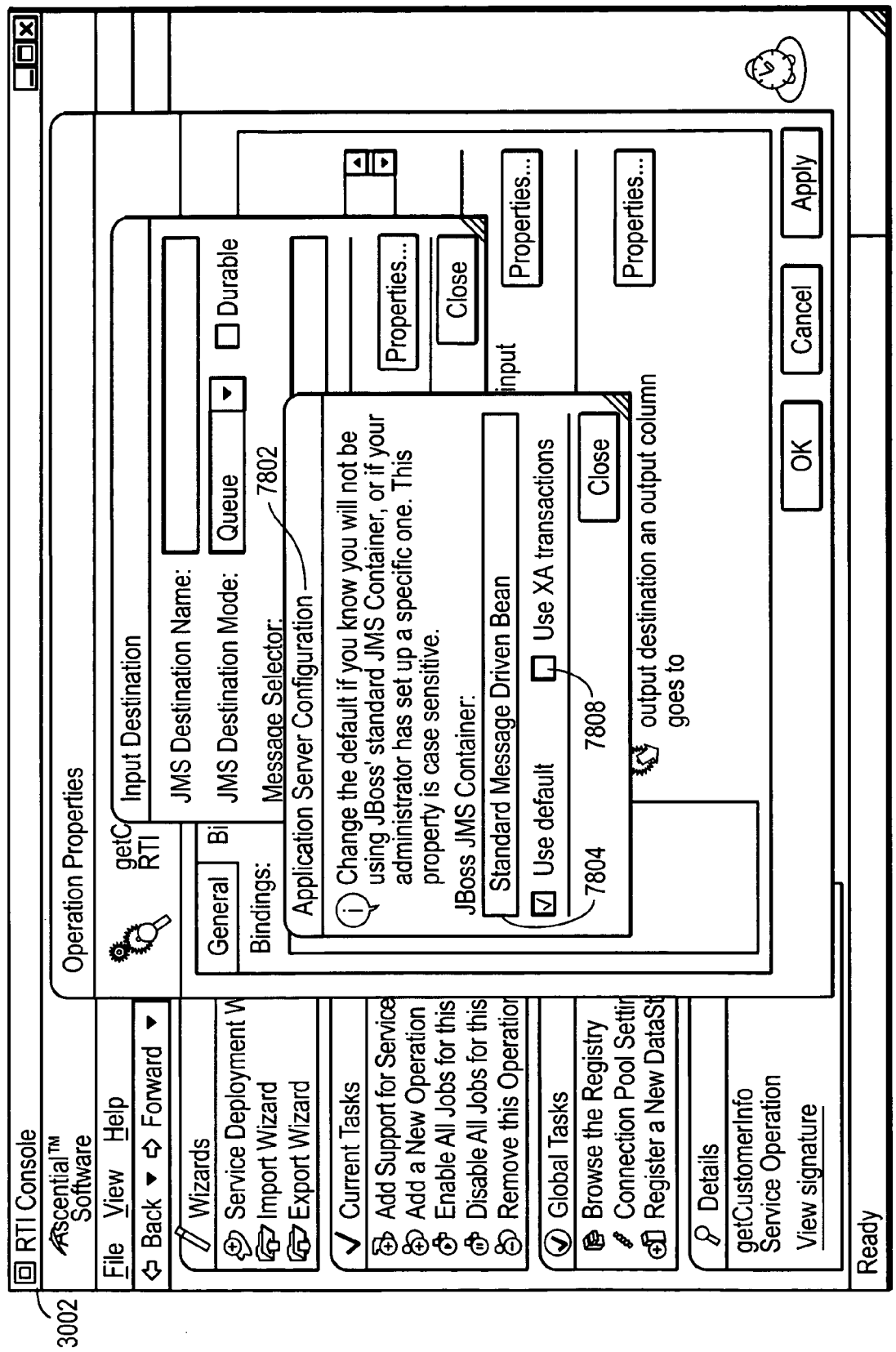
FIG. 78 shows an additional window for changing server configuration.

Referring to FIG. 78, by selecting button 7710 in window 7712 of FIG. 77, a window 7802 opens, which enables the definition of other steps in the Text over JMS input destination. First, at the location 7804, the user can specify the name of a JMS container. The value at the location 7804 can be changed if the user needs to configure, for example, another MOM (Microsoft Operations Manager), rather than JBOSSMQ, within JBOSS. The checkbox 7808 indicates that the user chooses the Message Driven Bean to start an XA transaction for each received message, in which case the JMS container for the operation needs to be XA compliant.

Figure 79:
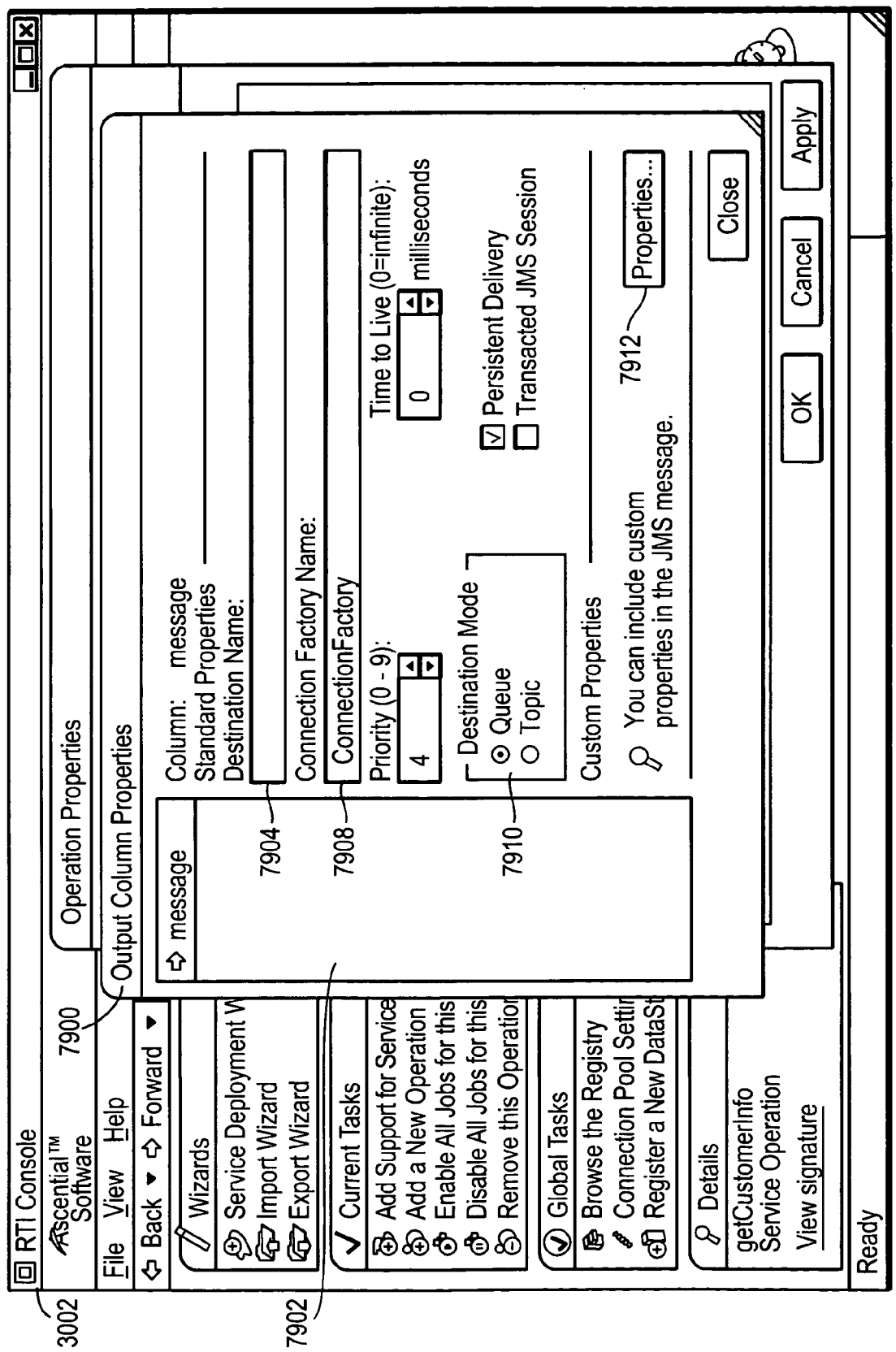
FIG. 79 shows a display window for specifying output destination properties for the Text Over JMS binding.

Referring to FIG. 79, a display window 7900 allows the user to specify output destination properties for the Text Over JMS binding. The display window 7900 is an exemplary window that appears when the user activates icon 7608 of FIG. 76. The columns of the RTI output appear in the left panel 7902 of the display 7900. Each of the columns can be mapped to an output JMS destination. In field 7904 the user can set the destination name for the selected column. In field 7908 the user can specify the name of the JMS connection factory that will be used. A button 7910 allows the user to specify whether the output destination will be a queue (for a point-to-point model) or a topic (for a publish/subscribe model). The user can select a button 7912 to define additional properties, as described in the next figure.

Figure 80:
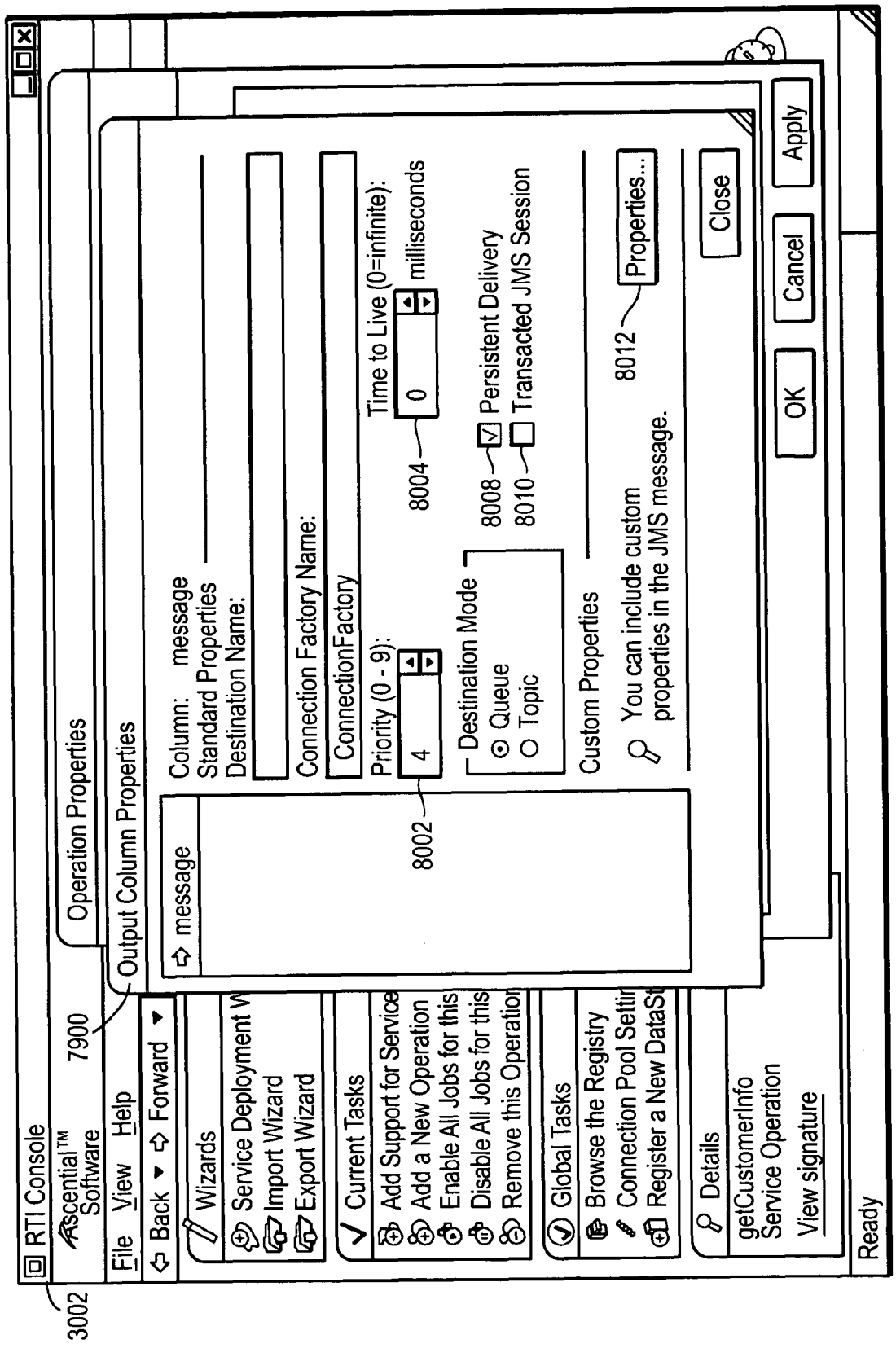
FIG. 80 shows the display window of FIG. 79 with additional options.

Referring to FIG. 80, the display window 7900 for allowing the user to specify output destination properties for the Text over JMS binding includes additional options. The user can use the field 8004 to set a lifetime for a message that is not delivered immediately. Field 8002 allows the user to set the JMS priority, which may be JMS provider-specific. The checkbox 8008 allows the user to determine whether the message will persist or be dropped if it cannot be delivered immediately. The checkbox 8010 allows the user to specify whether the JMS session is transacted and whether an XA connection factory is used, in which case the JMS session will join the XA transaction opened by the message driven bean (MDB) associated to the input destination, as described in connection with FIG. 76. A button 8012 allows the user to initiate a process for defining additional custom properties for the output destination for the Text over JMS binding.

Figure 81:
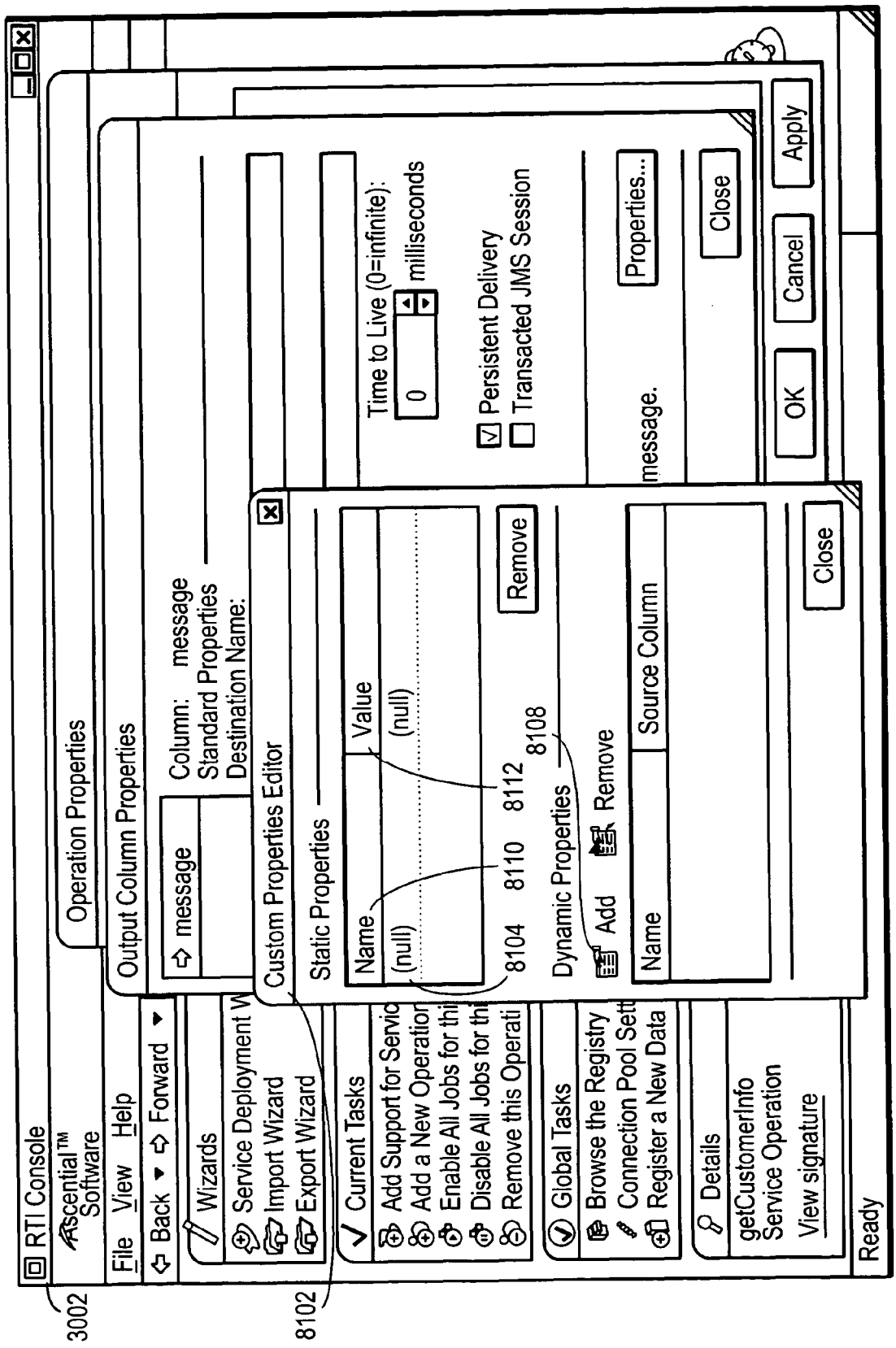
FIG. 81 shows the display window of FIG. 79 with an additional window for selecting additional custom properties.

Referring to FIG. 81, if the user uses button 8012 of FIG. 80 to initiate a process for defining additional custom properties in the display, then an embodiment of a custom properties editor window 8102 appears, where the user can define further properties of the output destination of the Text over JMS binding. In particular, output destination JMS headers can be added to the messages. The name column 8110 is the name of the header property. The value column 8112 is a static value. The custom properties editor allows the user to specify static properties 8104 and dynamic properties 8108. The presence of dynamic properties 8108 in the editor 8102 allows the user to create some properties for a JMS message header but use the content of the column of the RTI output stage as the value for the property.

Figure 82:
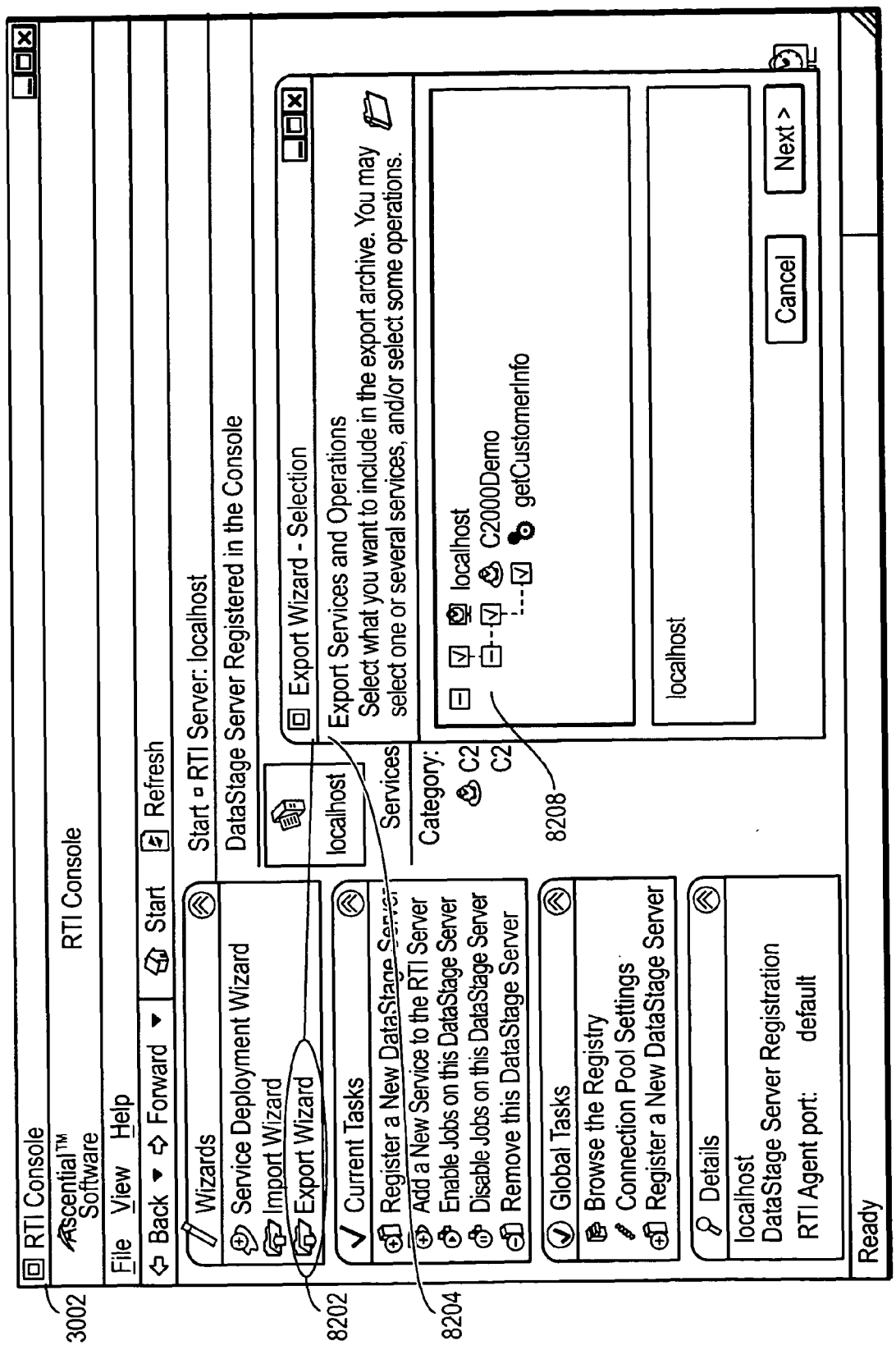
FIG. 82 shows the RTI console with an RTI export wizard for selecting export services.
Figure 83:
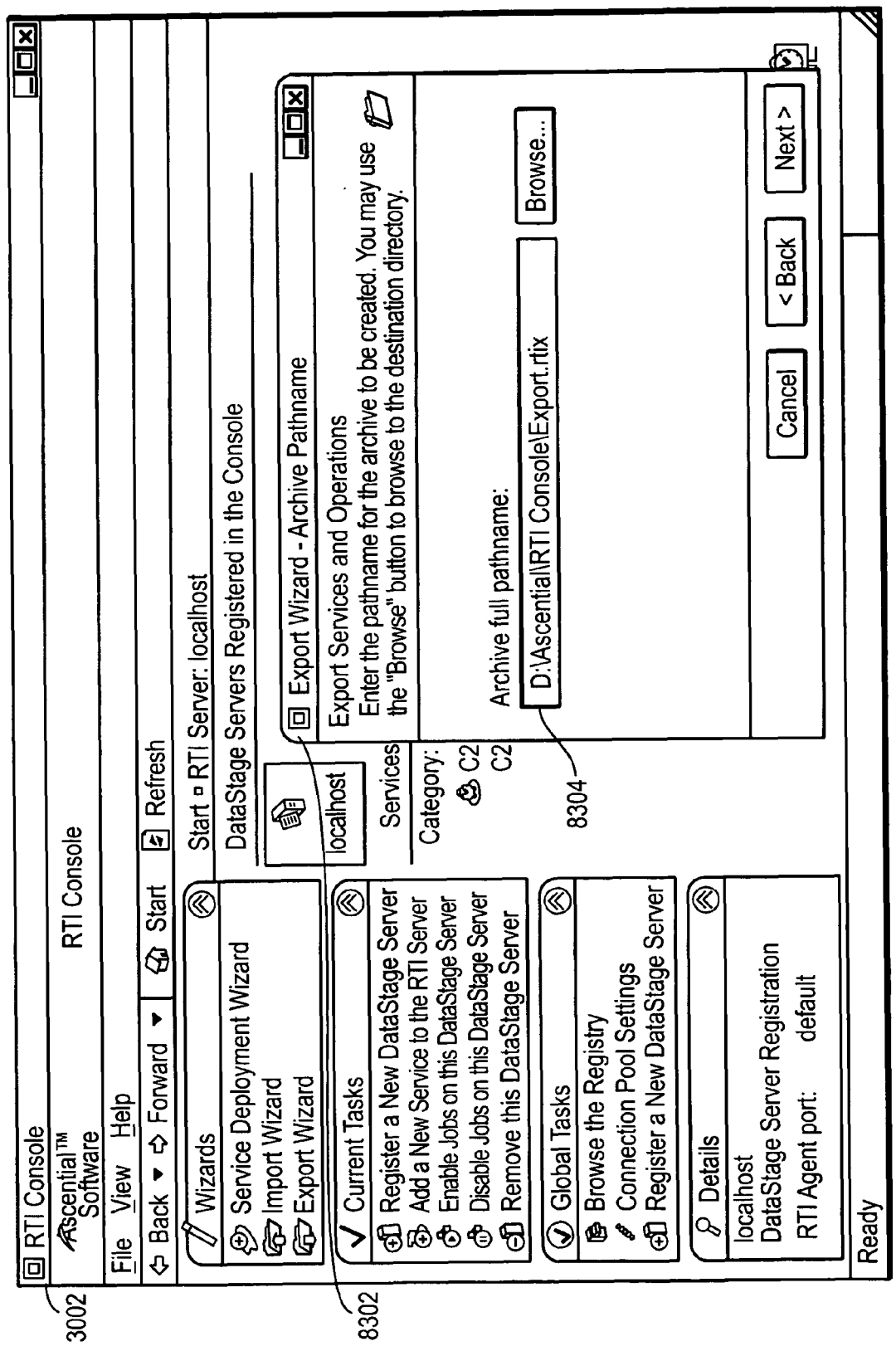
FIG. 83 shows the RTI console with a display window for defining an export path.

Referring to FIG. 82, a user can select a link 8202 from the RTI console 3002 to display the RTI export wizard 8204. The RTI export wizard 8204 allows the user, in the field 8208, to select the RTI server, RTI services, and/or RTI operations that will be included in an export file that can be exported to an archive. As shown in FIG. 83, the display window 8302 of the RTI export wizard allows the user to set a path name for the export file in field 8304.

Figure 84:
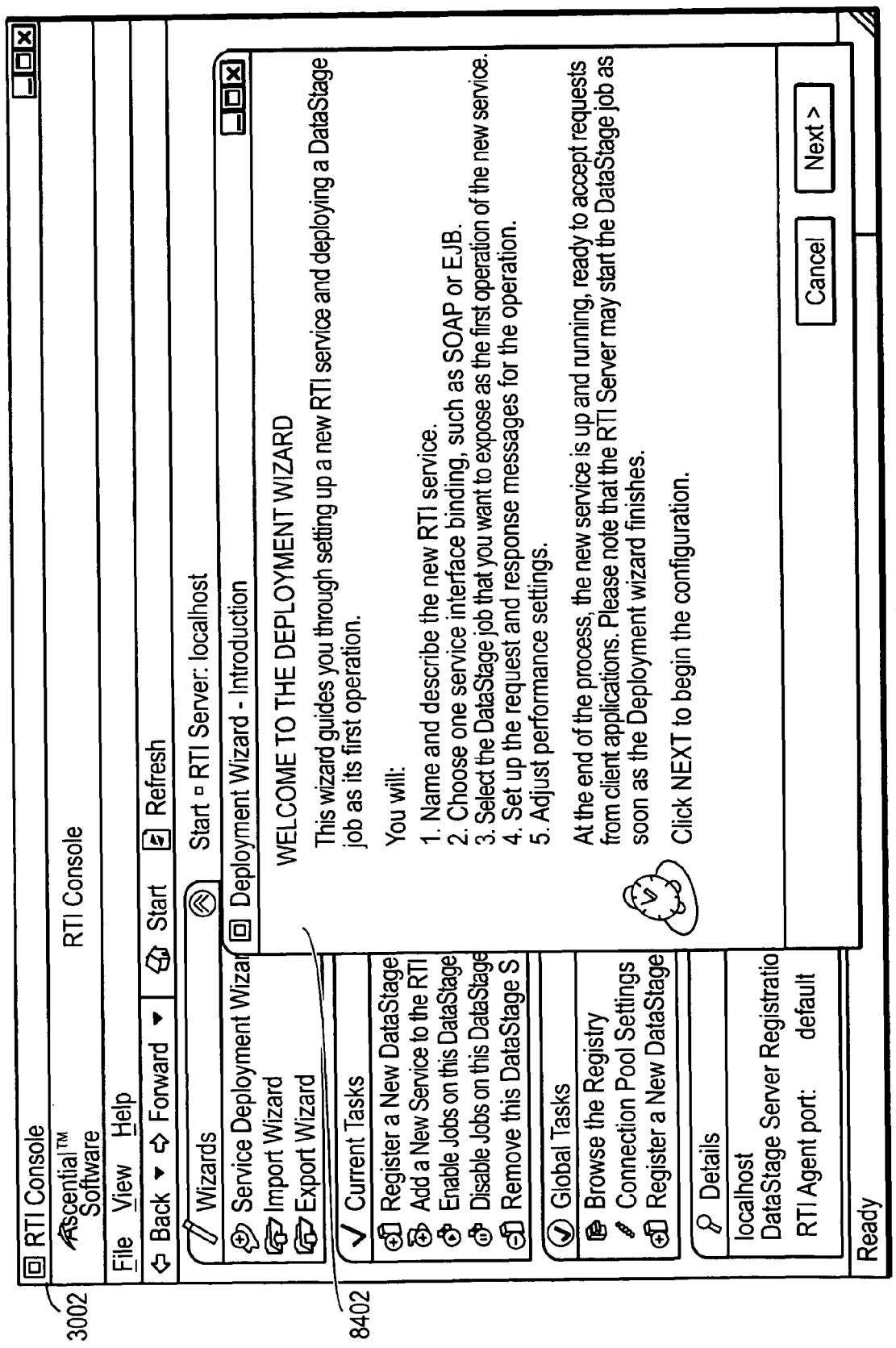
FIG. 84 shows an RTI console with an RTI deployment wizard for global deployment of an RTI service.

Referring to FIG. 84, the RTI console 3002 can include an RTI deployment wizard 8402, which can be a global deployment wizard that groups together the various steps identified in the figures above, including service creation, operation creation, data integration job association, and binding creation.

Figure 85:
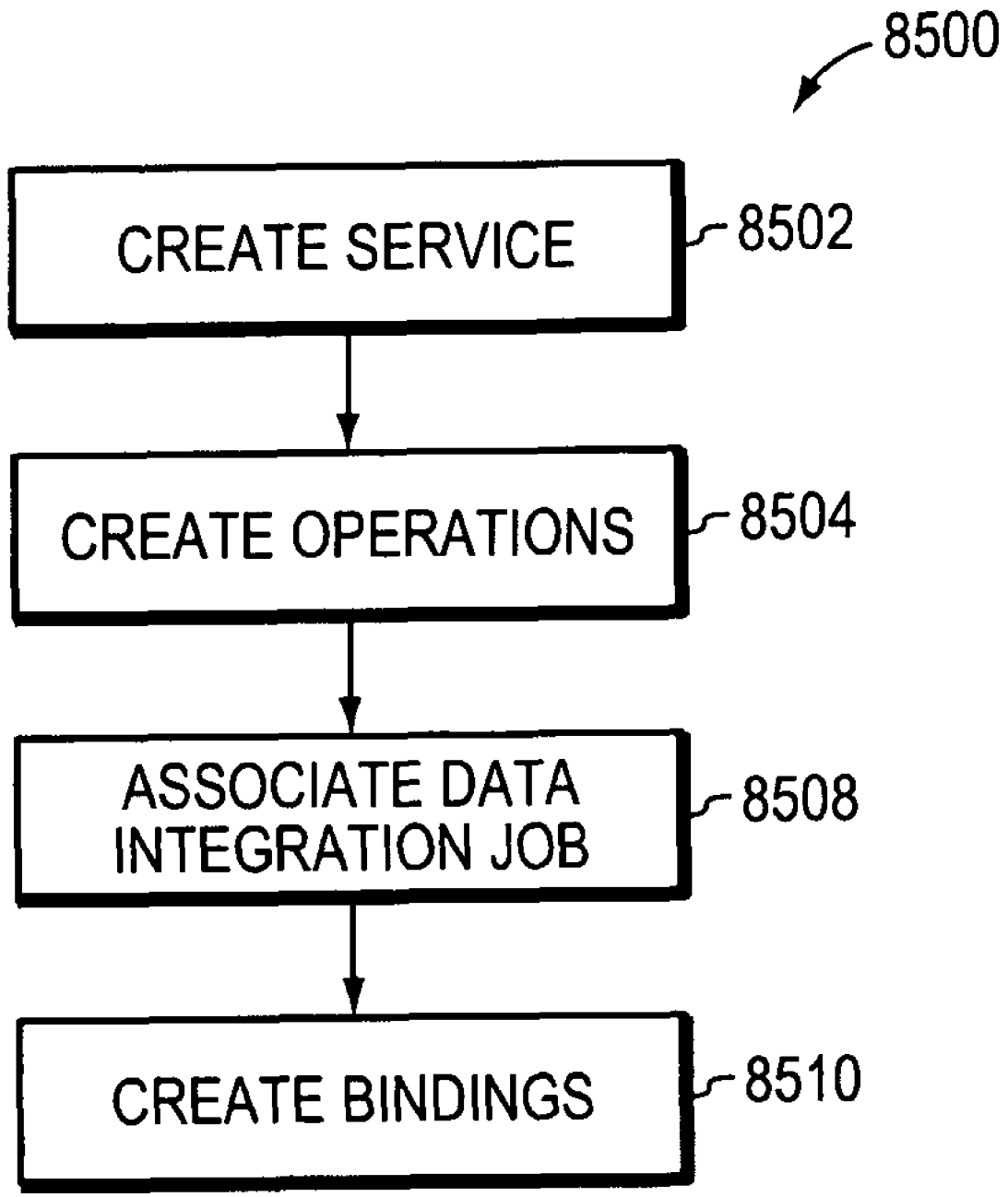
FIG. 85 is a flow diagram for creating an RTI service for data integration.

FIG. 85 summarizes in form of a flow diagram 8500 the aforedescribed process for creating an RTI service for a data integration job. At step 8502, the user creates an RTI service using, for example, the aforedescribed methods and systems. At step 8504, the user creates operations, such as a business logic, that will be employed by the service, again using the aforedescribed methods and systems. At a step 8508, the user associates a data integration job with the service. At a step 8510, the user creates bindings that allow the service to be invoked by various applications, again using the aforedescribed methods and systems.

Figure 86:
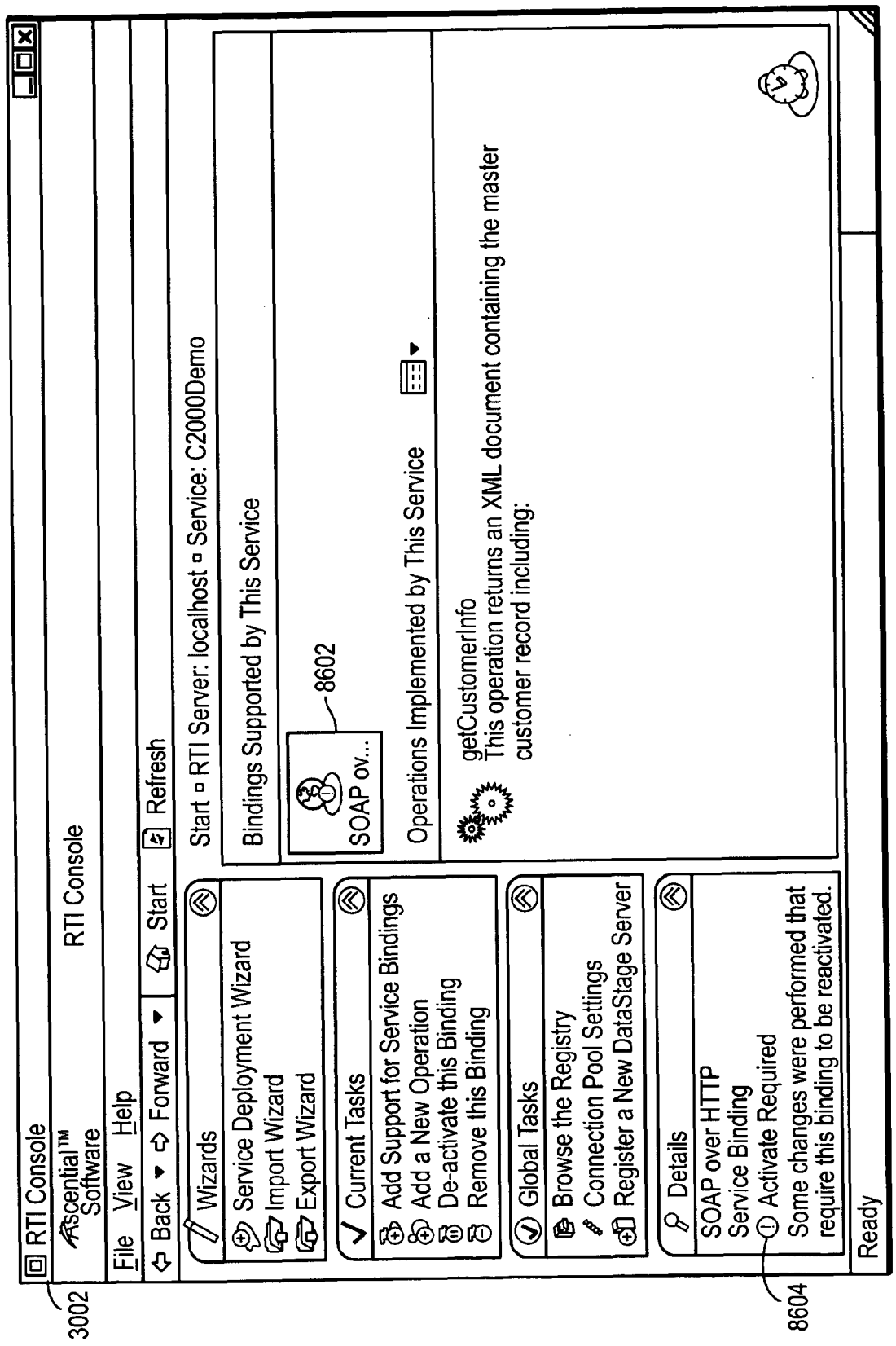
FIG. 86 shows an RTI console with required binding activation.

FIG. 86 shows another view of the RTI console 3002 of FIG. 64 in the event that a property of an operation, or an operation-specific binding property, has changed. A flag 8602 is added to the binding, reminding the user in details pane 8604 that the binding needs to be deactivated or reactivated and, depending on the nature of the binding, possibly redeployed.

Figure 87:
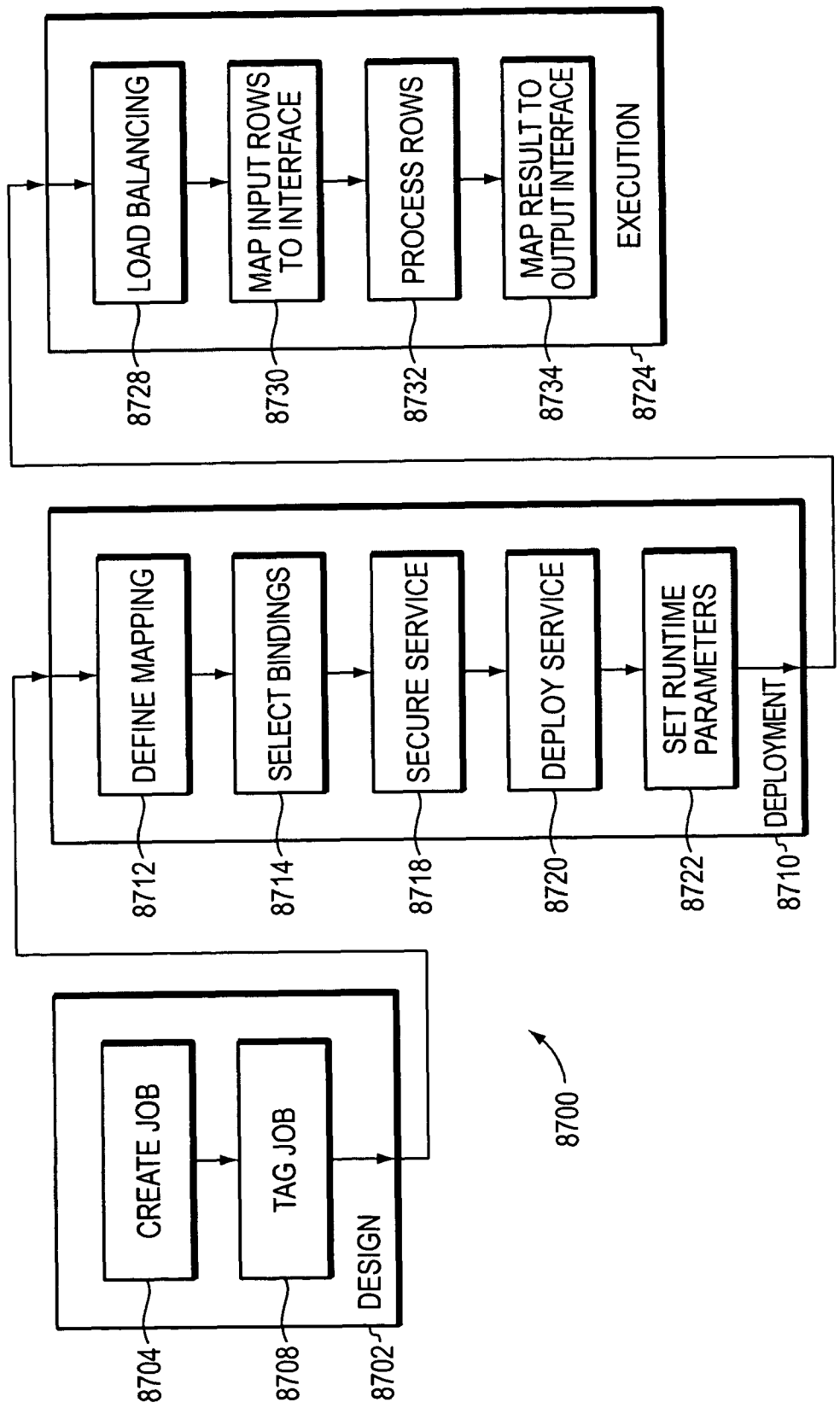
FIG. 87 is a flow diagram that shows creation of an RTI service.

FIG. 87 is another flow diagram 8700 for designing, deploying, and executing an RTI service. In the design phase 8702, a user can create an RTI job at step 8704 using RTI input stages 3138 and RTI output stages 3140 as conduits. At step 8708, the user can then tag the job as being eligible to be deployed, which completes the design phase 8702. Next, in the deployment phase 8710, the user defines at step 8712 mapping for the service. The user then selects bindings for the service, step 8714, and secures the service, step 8718. The user then deploys the service on data integration platforms 2702, step 8720, which can be one or more DataStage servers, and sets runtime parameters for the service, step 8722, such as minimum and maximum job instances for the service, timeout parameters, and management parameters, such as maximum idle time and maximum lifetime. This completes the execution phase 8710. Finally, in the deployment phase 8724, the user can execute load balancing for selection of the best data integration platform 2702 machine for the transaction in question, step 8728. The user can map the service input interface into rows of data, step 8730, and have the service process the rows of data in real time, step 8732. Finally, the service can map the result into the service output interface at step 8734, which completes the execution phase 8724.

In embodiments, when creating the operation, the input mapping can be customized, such as to support a complex type of data. If the user wishes to support a complex type, then, for example, all columns can be grouped together to create a complex type. In embodiments the RTI service can be created to expect an array of a complex type. Each element can be passed to the job instances as a different record. An end of wave market can be sent only after all elements of the array have been sent, because all of the elements are part of the same transaction.

Figure 88:
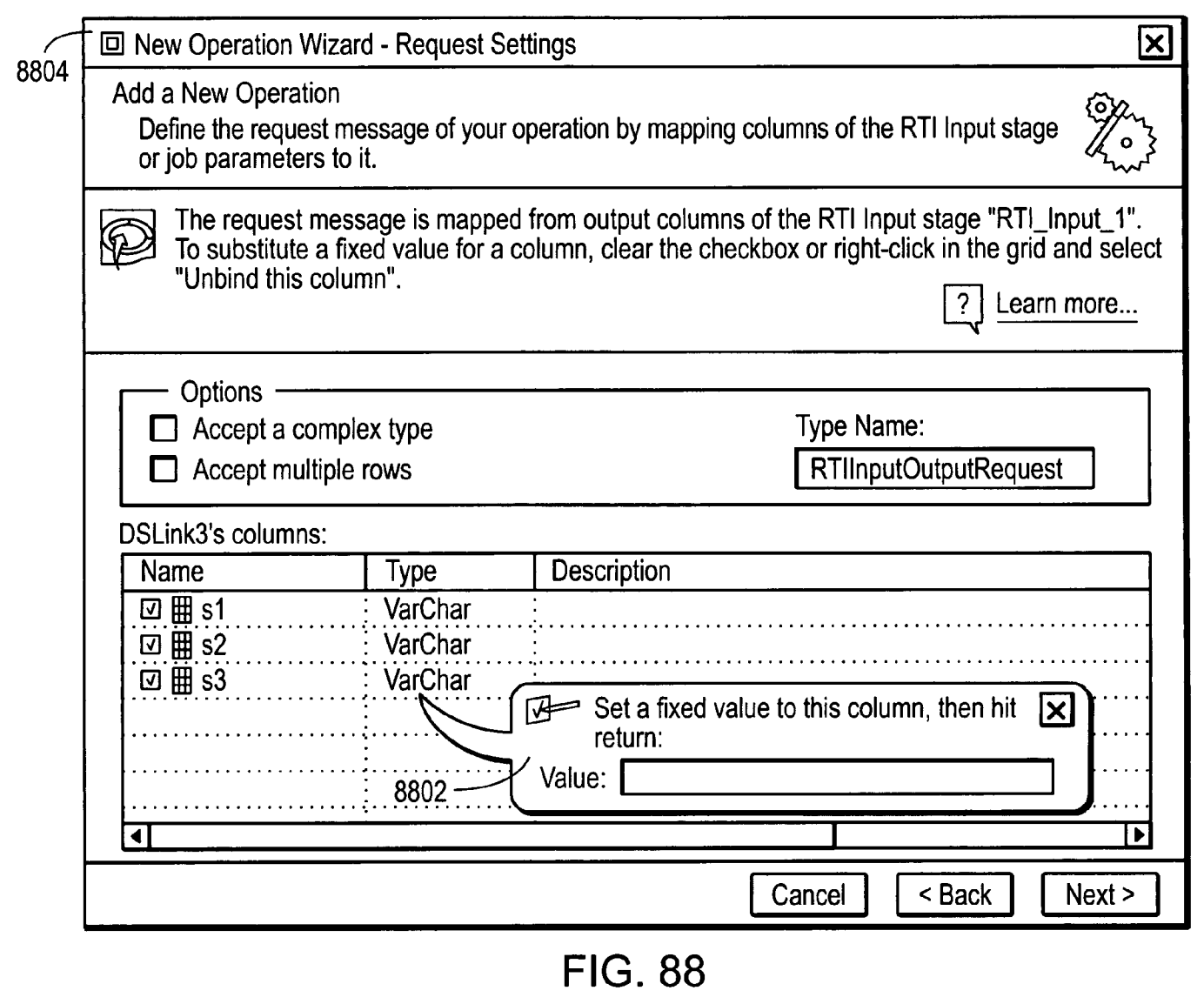

Referring to FIG. 88, certain input columns may be static when the service is deployed, so that they will not be part of the signature of the operation. Window 8802 opened in the New Operation Wizard 8804 allows one or more columns to be treated statically by the service.

In certain embodiments, the default output mapping can also be customized when creating the operation. For example, complex types can be created by grouping together. Also, arrays can be created, so that the service returns an array as the output. In that case, the job is designed so that several rows are sent to the RTI output stage 3140 before the end of wave marker is sent.

Figure 89:
FIG. 89 represents a window showing mapping of the RTI output stage on a response message with optionally dropped columns.

Referring to FIG. 89, it is also possible to drop columns from an output type which then do not appear at the RTI output stage 3140. For example, in the new operation wizard 8804 of FIG. 89, the response settings window 8902 can include a checkbox 8904 that, if unselected, drops the column from the output argument of the service.

Figure 90:
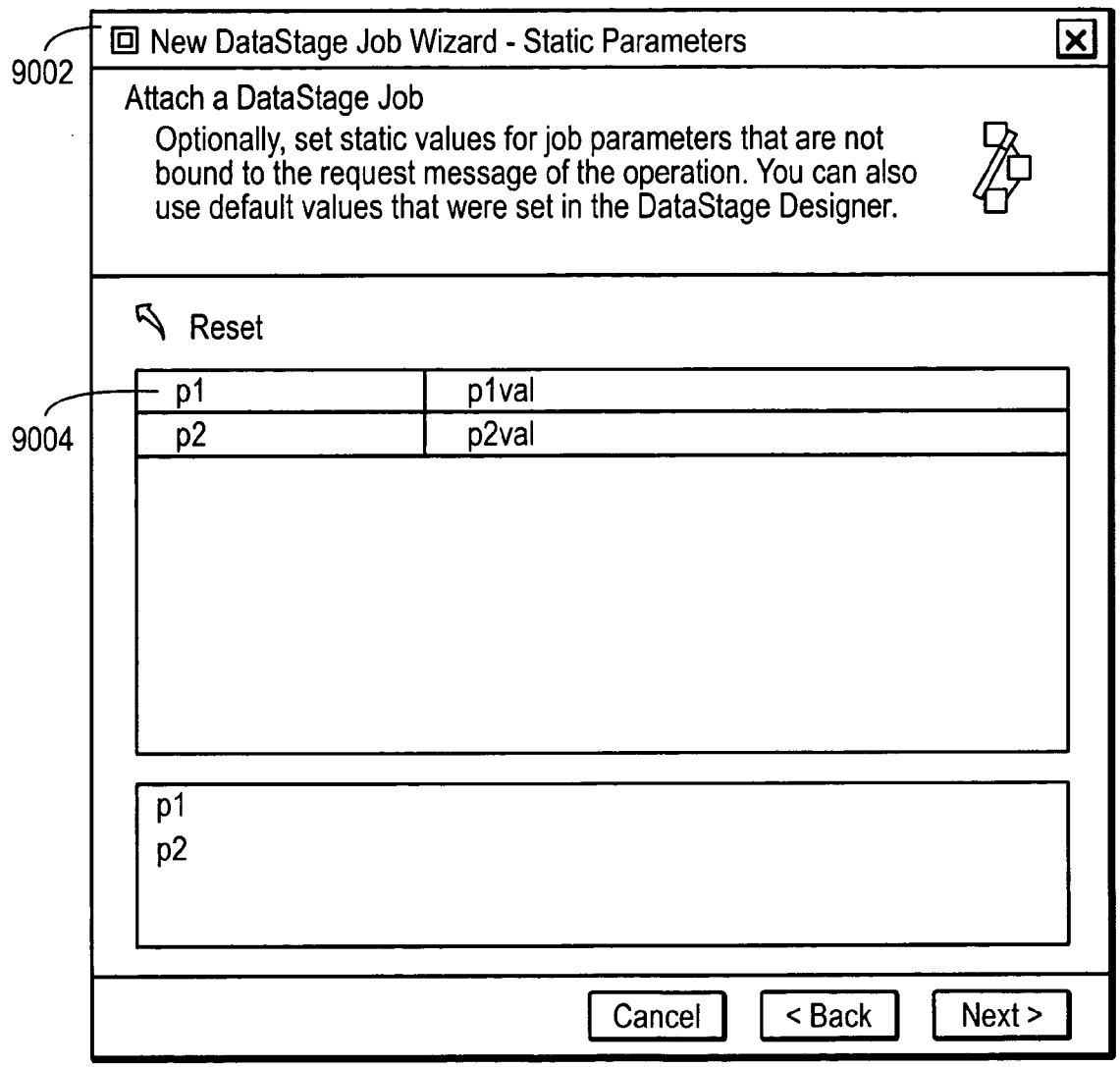
FIG. 90 shows a window with definitions of static values not bound to the request message.

As shown in FIG. 90, static values can be set as userdefined parameters in field 9004 of the New DataStage Job Wizard 9002 for job parameters that are not bound to the request message of the operation.

Figure 91:
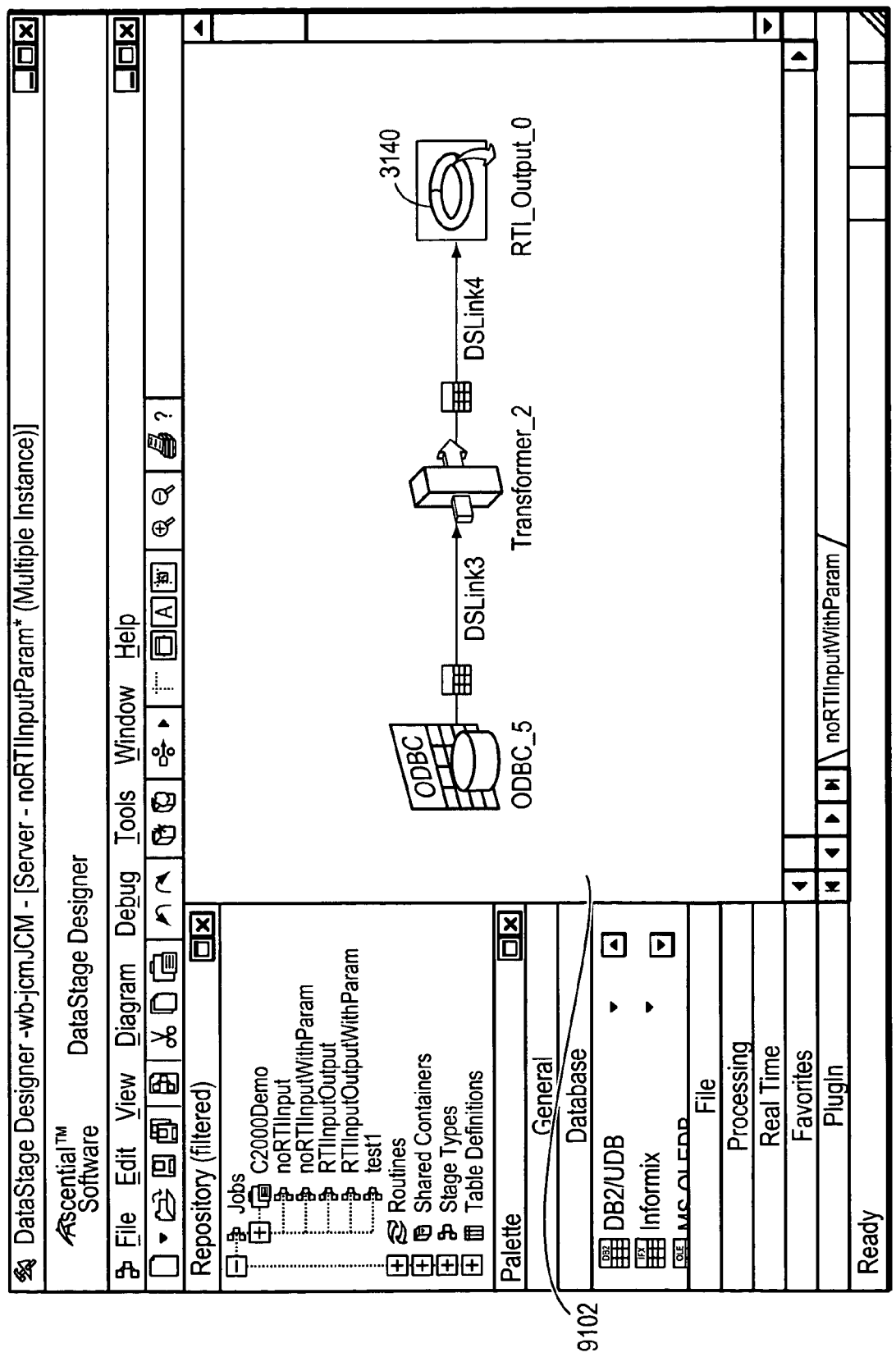
FIG. 91 shows creation of an RTI service with an RTI output stage, but without an RTI input stage.

Referring to FIG. 91, it is possible to create an RTI service that includes a job with an RTI output stage 3140, but no RTI input stage. Thus, a design interface 9102 can be displayed, such as a design interface for Ascential's DataStage platform, showing a user-defined data integration job consisting of a series of transactions. The user adds the RTI output stage 3140 at the end of the data integration job, but does not add an RTI input stage for the RTI service.

Figure 92:
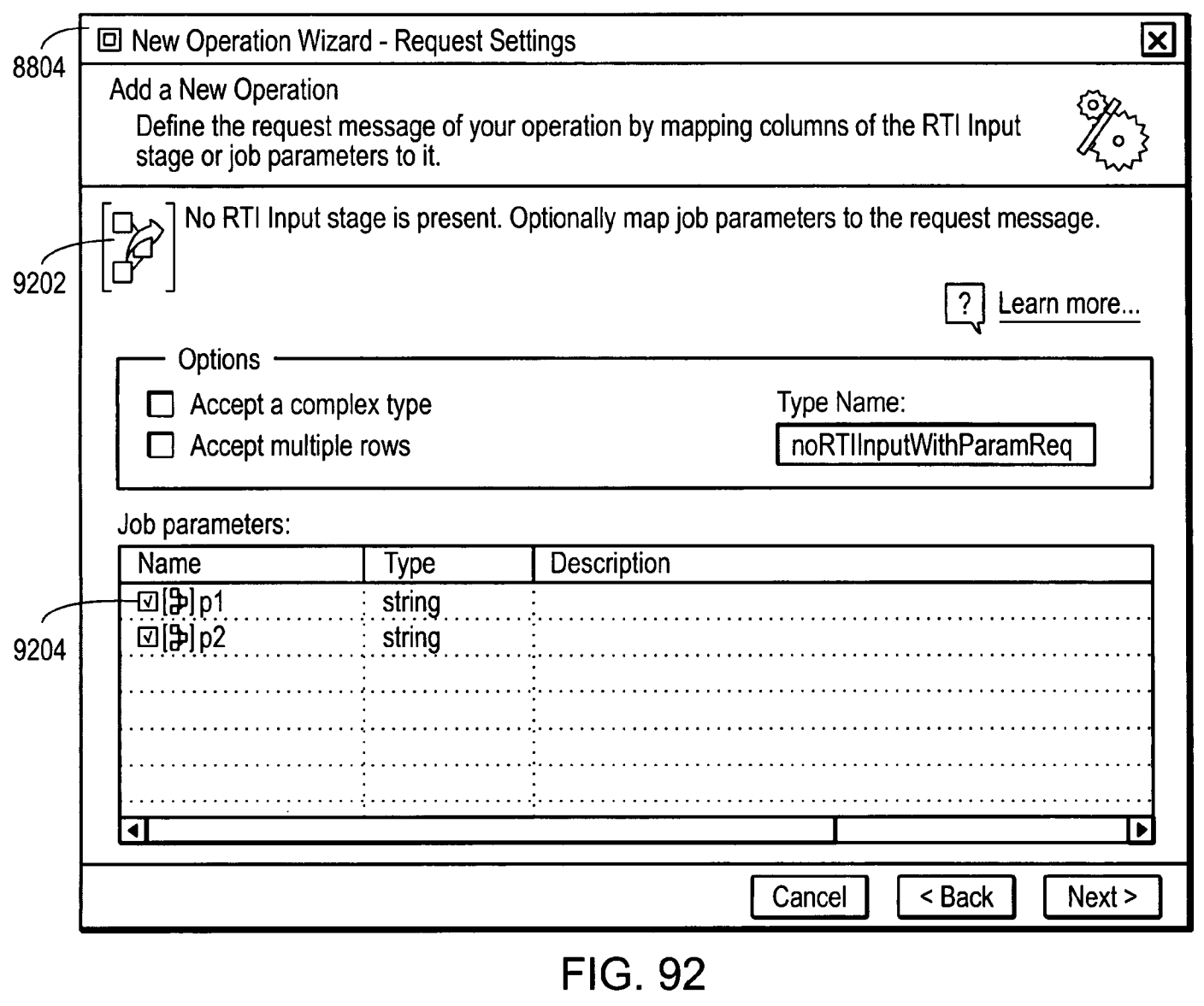

Referring to FIG. 92, a New Operation Wizard pane 8804 allows a user to add a new operation, with the wizard recognizing that no RTI input stage is present for the operation, as indicated by the icon 9202 on pane 8804. Because the RTI input stage is absent, the job will not always be on; instead, each request starts a new instance. The user can then optionally set job parameters in the field 9204 to be mapped to the request message. The job parameters become input arguments of the operation.

Figure 93:
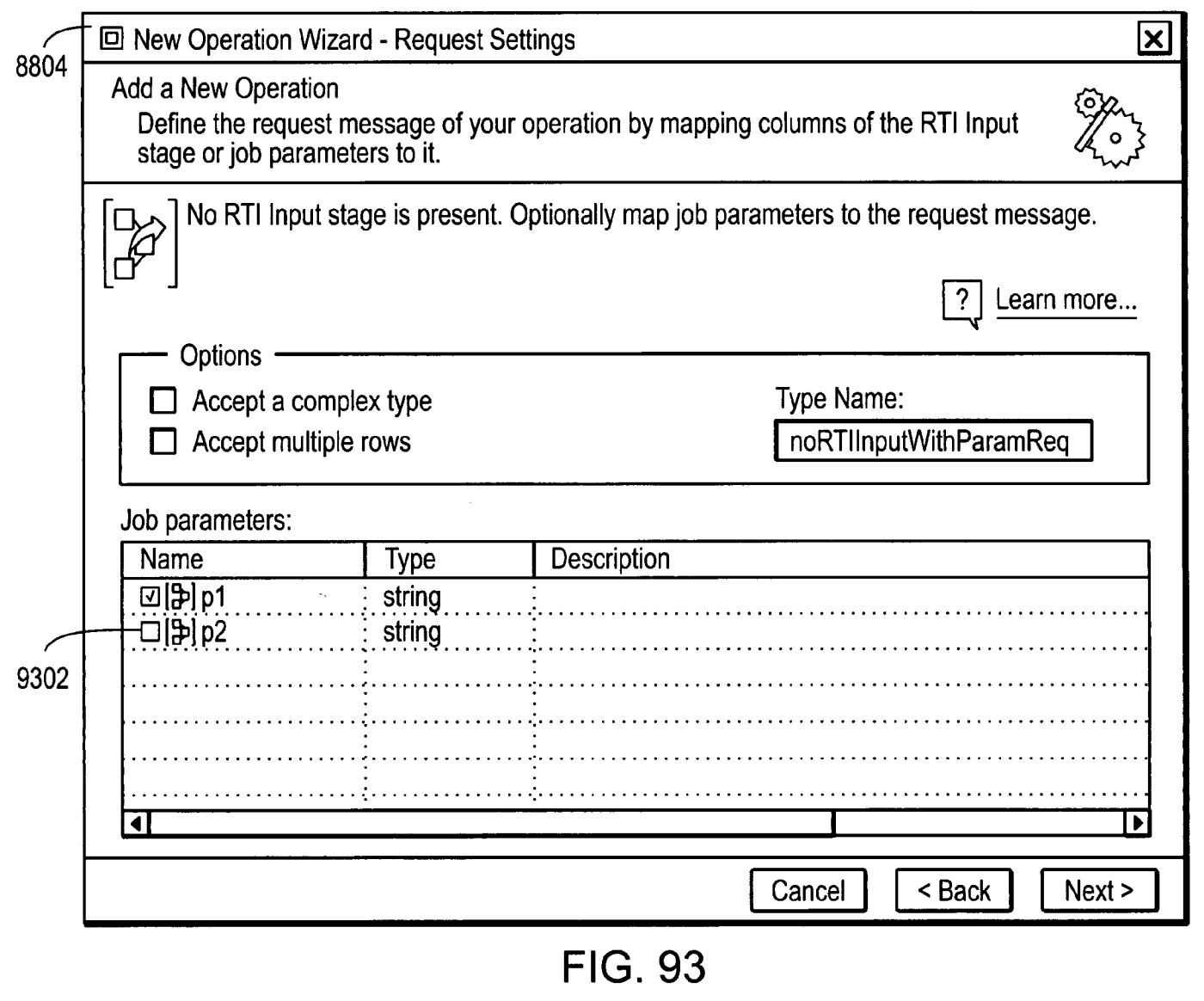

Referring to FIG. 93, it is still possible in the New Operation Wizard 8804 to fix a static value for a parameter at deployment time by un-checking the parameter p2 in field 9302 during the input mapping phase. Static values that are not bound to the request message of the operation. Default values established by the data integration platform 2702 during design of the job can also be used. Static values can be defined in field 9402 of the new job wizard 9002 of FIG. 94.

Figure 95:
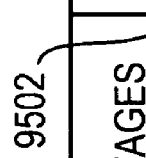
FIG. 95 is a table with RTI stages, job cycles, latency and units of work for each of three available job topologies.

As indicated in FIG. 95 and making use of the capabilities described herein, a business enterprise can use a data integration platform 2702 with at least three different job topologies, namely a batch topology without RTI service (NO-RTI), an RTI output-only topology with an RTI output phase 3140 (RTI-O), but without an RTI output phase 3138, and a full RTI topology (RTI-IO), with both an RTI input phase 3138 and an RTI output phase 3140. For batch jobs, each request starts a new job instance, resulting in high latency. Input arguments are minimal and output arguments do not exist. Job parameters can become service arguments. Each job runs to completion. The RTI output-only topology is similar, except that the service can now return output arguments from the job. In the full RTI topology, job instances are optionally always on, the service has input and output arguments that are bound to RTI input stages and output stages, and the job parameter values are set at deployment time. FIG. 95 shows as table 9502 the aforedescribed RTI stages, job cycles, latency and units of work for each of the three available topologies.

FIG. 96 shows in form of table 9602 job reusability, input arguments, output arguments, and job parameters for each of the three available topologies. Job reusability varies between the full RTI service and the topologies that do not include an RTI input stage 3138. The full RTI topology uses input arguments that consist of zero or more columns from an RTI input stage 3138, while the others use either job parameters or no input arguments. The full RTI topology and the RTI outputonly topology have output arguments consisting of one or more columns from an RTI output stage 3140, while the batch topology has no output arguments. Job parameters are fixed at deployment for the full RTI topology, while in the other topologies job parameters can optionally be set at deployment or used as input parameters for jobs.

An RTI service that encapsulates a data integration process in accordance with the methods and systems described above can have many novel uses. For example, a user can use any of the protocols that can be bound to the service to access the service to submit a request and get a result. Examples of requests for data integration include simple requests for data, analytical operations that require access to data from more than one source, and many others, as described below.

Figure 97:
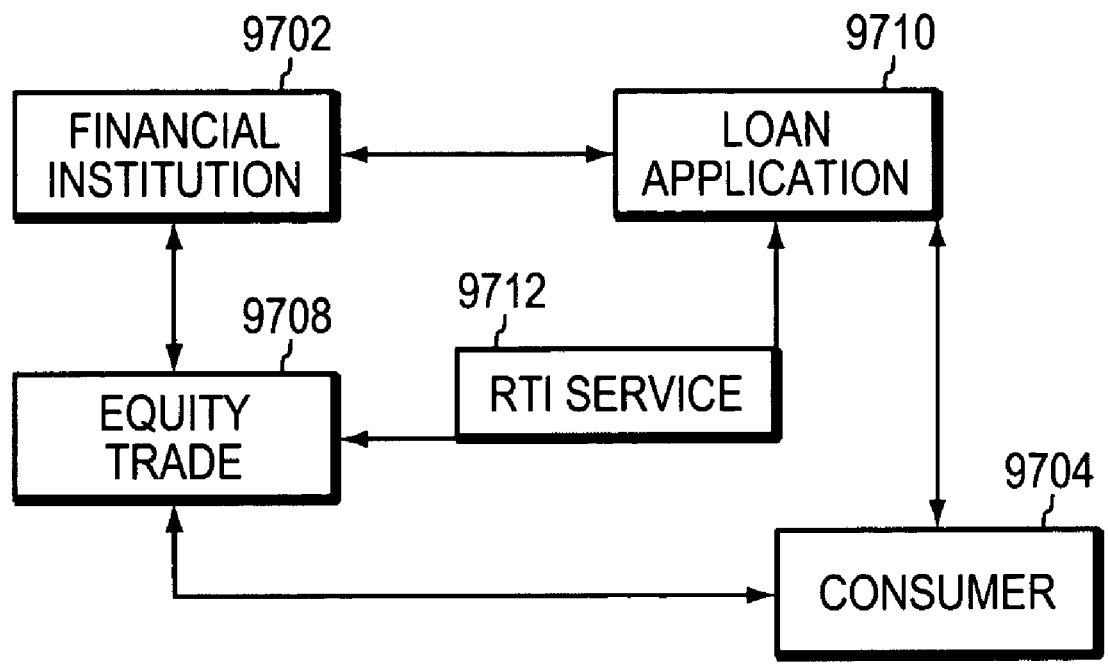
FIG. 97 shows an embodiment of an RTI service as applied to the financial services industry.

FIG. 97 depicts a flow diagram of an RTI service as applied to the financial services industry. Real time integration can lessen risks for business enterprises in the financial services industry. For example, one branch of a financial institution 9702 may handle a loan application 9710 of a consumer 9704, while another branch executes trades in equity trades 9708. Without an RTI service, the institution 9702 may inadvertently assume more risk when making the loan than it may be willing to take. Real time integration can provide the financial institution with an almost instantaneous and accurate profile of the customer at the time a given transaction is executed. Thus, an RTI service 9712 allows a computer application associated with the loan application to request up-to-the-minute data about the consumer's 9704 equity account, which can be retrieved through the RTI service from data associated with applications of the financial institution 9702 that handles equity trades 9708. Of course, in addition to financial institutions, finance departments of many enterprises making similar financial decisions can benefit from real time integration.

Figure 98:
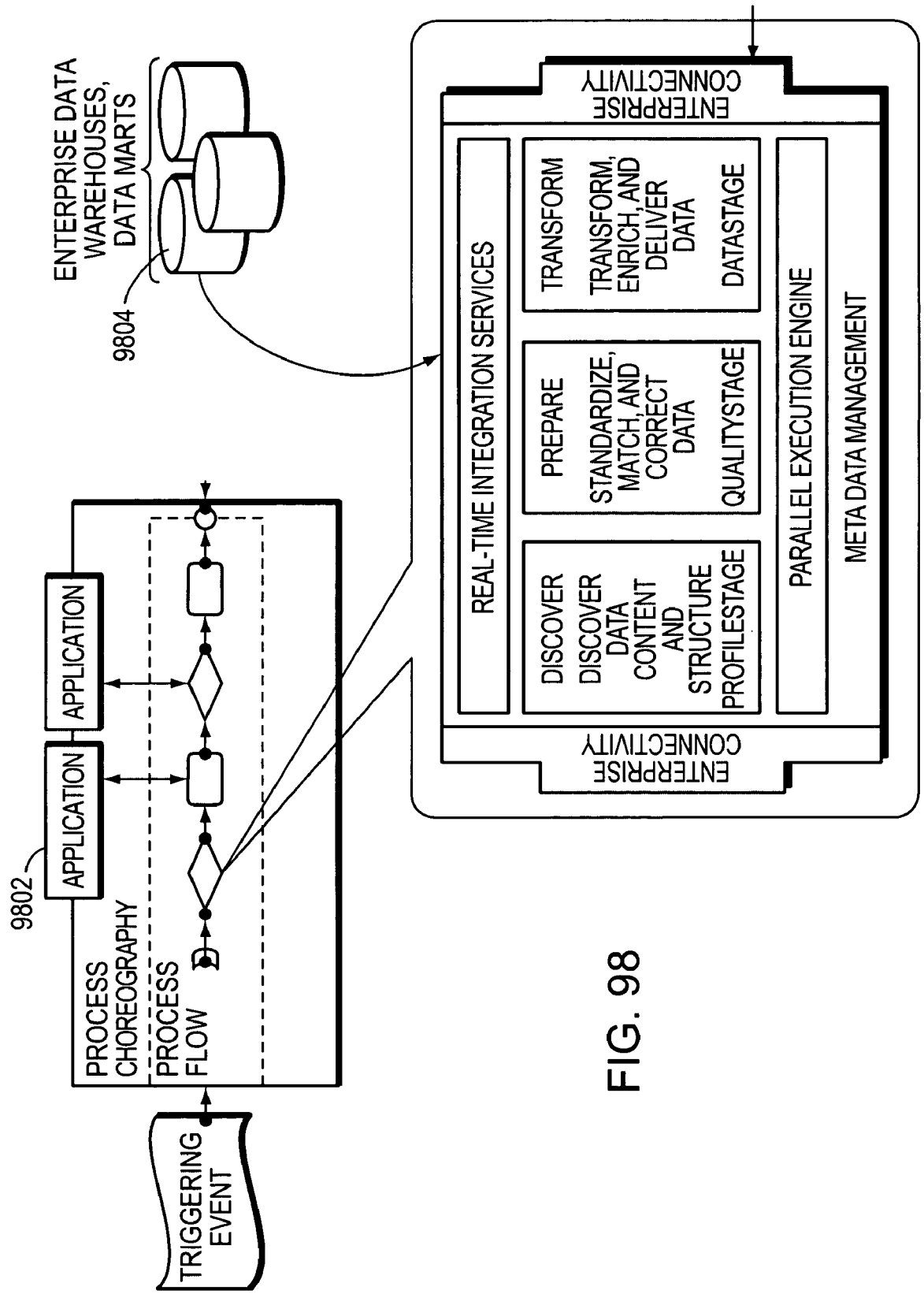
FIG. 98 shows an RTI service with real time links to the enterprise's important data sources.

Business enterprises can benefit from real time integration services, such as the RTI services described herein, in a wide variety of environments and for many purposes. One example is in the area of operational reporting and analysis. For example, RTI services can provide a consolidated view of real time transactional analysis with large volume batch data. Referring to FIG. 98, an RTI service 9802 can be constructed that calls out in real time to all of a business enterprise's important data sources 9804, such as enterprise data warehouses, data marts, databases, and the like. The RTI service 9802 can then apply consistent data-level transforms on the data from the data sources 9804. When used in this way, the RTI service can also automate source system analysis and provide in-flight, real time data quality management. There are many operational reporting or analysis processes of business enterprises that can benefit from such an RTI service, such as fraud detection and risk analysis in the financial services area, inventory control, forecasting and market-basket analysis in the retail area, compliance activities in the financial area, and shrinkage analysis and staff scheduling in the retail area. Any analysis or reporting task that can use data from more than one source can similarly benefit from an RTI service that retrieves and integrates the data on the fly in real time.

Figure 99:
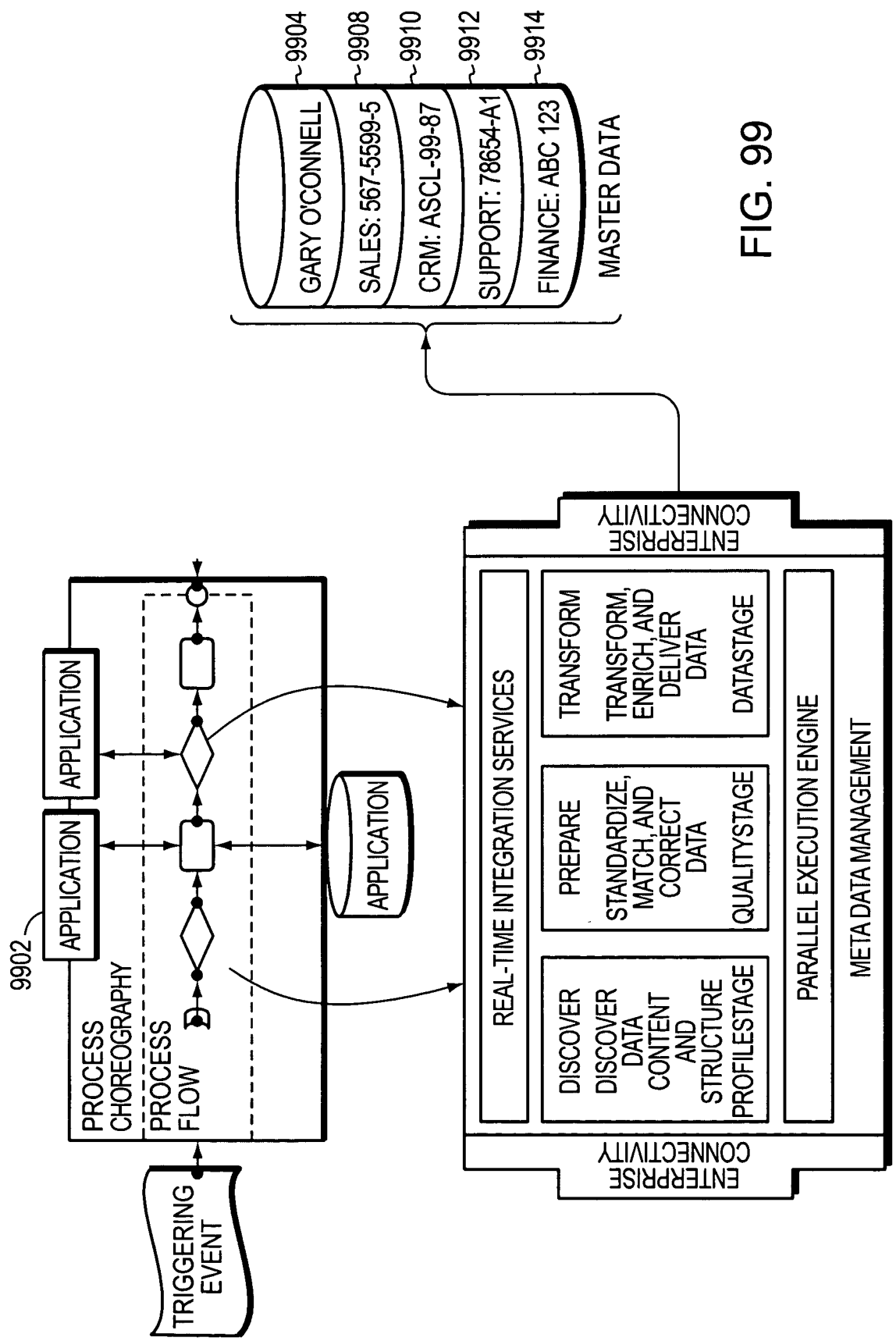
FIG. 99 shows various exemplary databases of an enterprise.

Another class of business processes that can benefit from RTI services such as those described herein are business processes that involve creating a master system of record databases. Referring to FIG. 99, an enterprise can have many databases that include data about a particular topic, such as customer 9904. For example, the customer's information may appear in a sales database 9908, a CRM database 9910, a support database 9912 and a finance database 9914. It is not unusual in a real business enterprise for each of these departments to have multiple databases of their own that may not share a common format. One of the desired benefits from data integration efforts is to establish data consistency across many databases. For example, if a customer's address changes, only one entity of the business may initially receive the information, while it would be preferable for all different departments to have access to this change. RTI services offer the possibility of creating master systems of records, without requiring changes in the native databases. Thus, an RTI application 9902 can be defined that links disparate silos of information, including those that use different protocols. By supporting multiple bindings, the RTI application can accept inputs and provide outputs to various applications of disparate formats. Meanwhile, the business logic in the RTI service can perform data integration tasks, such as performing data standardization for all incoming data, providing meta lineage information for all data, and maintaining linkage between the disparate data sources. The result is a real time and current master record service, which can be accessed as an RTI service. Many applications can benefit from master records. In financial services, an institution may wish to have a customer master record, as well as a security master record across the whole enterprise. In telecommunications, insurance and other industries that deal with large numbers of customers, master records services can support consisting billing, claims processing and the like. In retail enterprises, master records can support point of sale applications, web services, customer marketing databases, and inventory synchronization functions. In manufacturing and logistics operations, a business enterprise can establish a master record process for data about a product from different sources, such as information about design, manufacturing, inventory, sales, returns, service obligations, warranty information, and the like. In other cases, the business can use the RTI service to support ERP instance consolidation. RTI services that embody master records provide the benefits of data integration without requiring coding in the native applications to allow disparate data sources to talk to each other.

Figure 100:
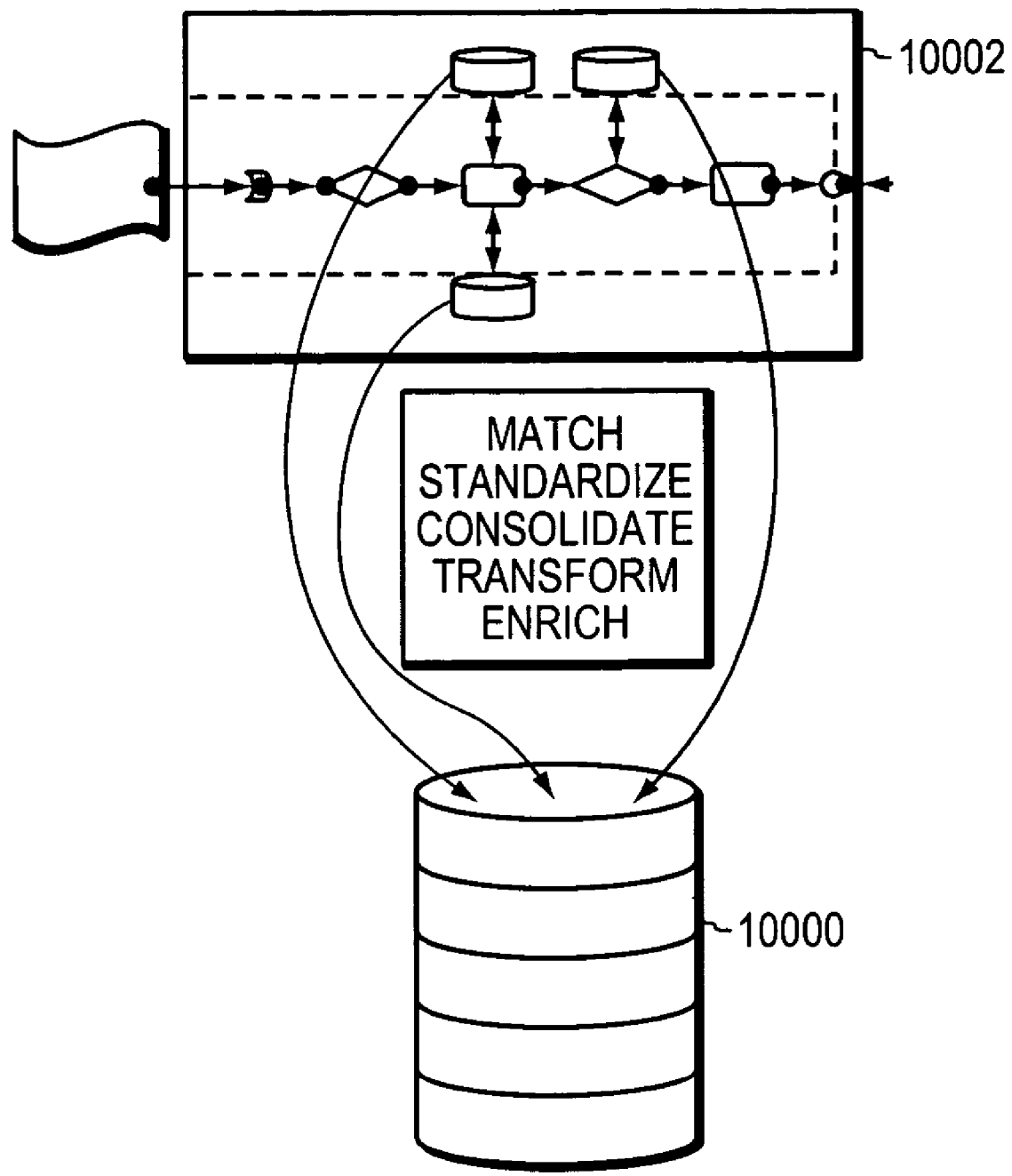
FIG. 100 illustrates an RTI service with a master customer database.

The embodiment of FIG. 100 shows an RTI service 10002 similar that that depicted in FIG. 98 with a master customer database 10000. The master customer database 10000 may include an integrated customer view across many different databases that include some data about the customer, including both internal and external systems. The master customer database can be regarded as a master system that may include the "best" data about the customer from all different sources. To establish the master customer database, data integration requires matching, standardization, consolidation, transformation and enrichment of data, all of which can be performed by the RTI service 10002. While some data can be handled in batch mode, new data must be handled in real time to ensure that rapidly changing data is always accurate and current. A master customer database can be used by a business entity in almost any field, including retail, financial services, manufacturing, logistics, professional services, medical and pharmaceutical, telecommunications, information technology, biotechnology, or many others.

Figure 101:
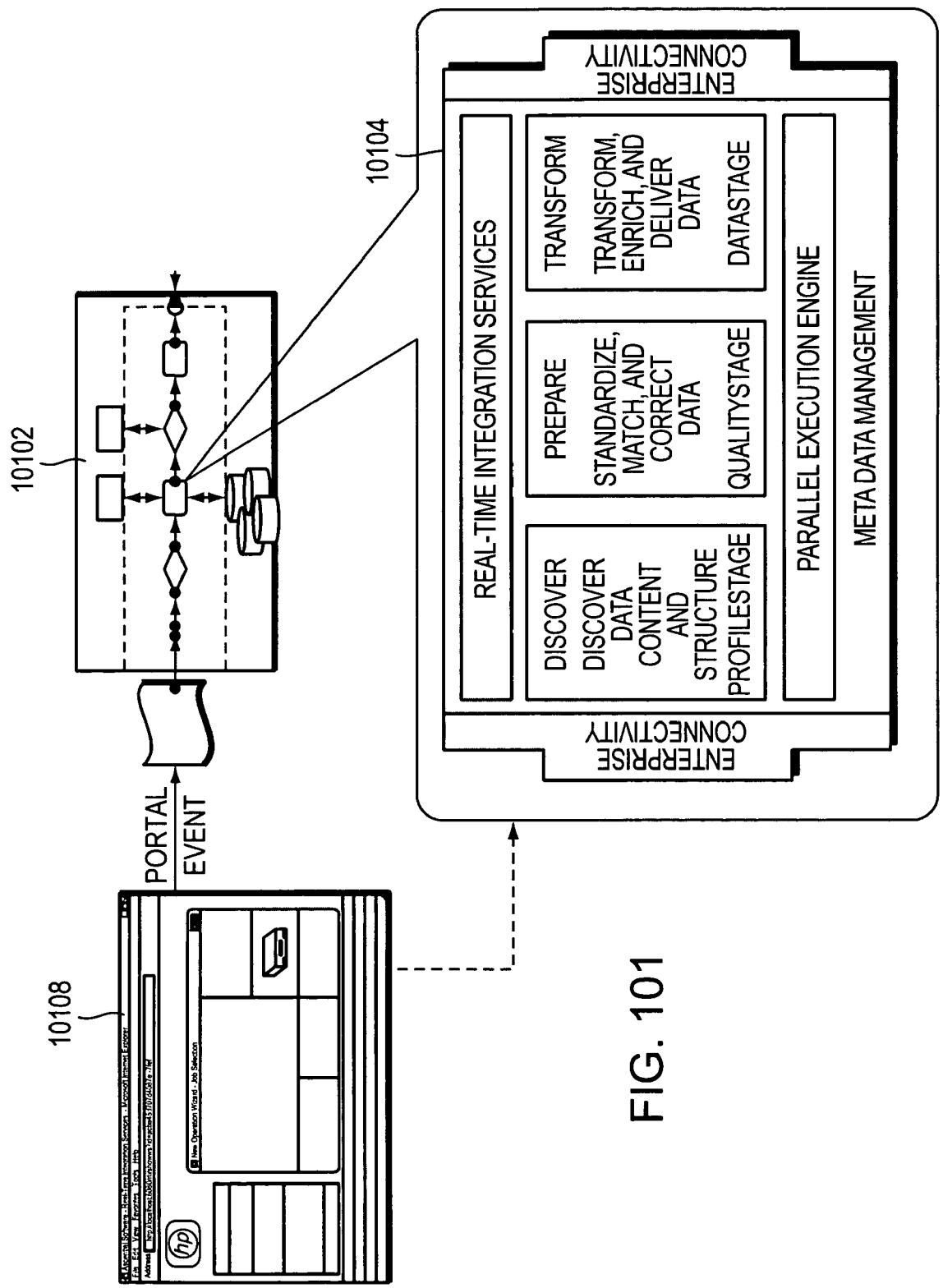
FIG. 101 shows an example of a transactional business process employing an RTI service.

RTI services as described herein can also support services that expose data integration tasks, such as transformation, validation and standardization routines, to transactional business processes. Thus, the RTI services provide on-the-fly data quality, enrichment and transformation. An application can easily call up such services via a services-oriented architecture, which promotes the reuse of standard business logic across the entire business enterprise. Referring to FIG. 101, an RTI service 10102 embodies a set of data transformation, validation and standardization routines, such as those embodied by a data integration platform 10104, such as Ascential's DataStage platform. An application 10108 can trigger an event that calls the RTI service to accomplish the data integration task in real time.

Examples of business processes that can benefit from real time transformation, validation and standardization routines include call center up-selling and cross-selling in the telemarketing industry, reinsurance risk validation in the financial industry, point of sale account creation in retail businesses, and enhanced service quality in fields such as health care and information technology services.

Figure 102:
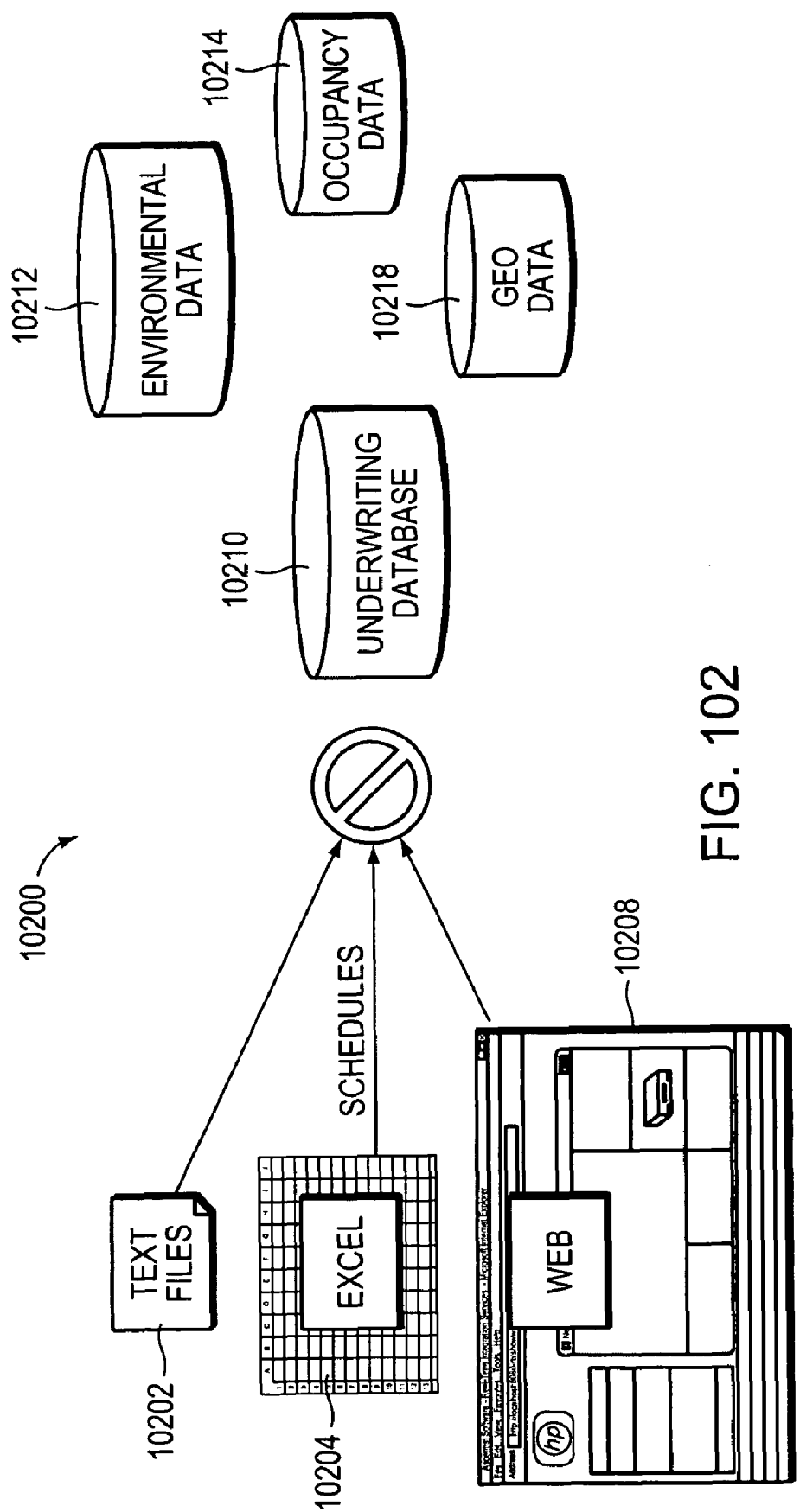
FIG. 102 shows an example of an underwriting business process employing an RTI service.

Referring to FIG. 102, an example of a conventional business process that can benefit from real time integration services is an underwriting process 10200, such as underwriting for an insurance policy, for example property insurance. The process of underwriting property may require access to a variety of different data sources of different types, such as text files 10202, spreadsheets 10204, web data 10208, and the like. Such data can be inconsistent and error-prone. When relying on batch jobs, the lead-time for obtaining supplemental data may be inconsistent with the need for rapid underwriting decisions. The main underwriting database 10210 may contain some data, but other relevant data may be included in various other databases, such as an environmental database 10212, an occupancy database 10214, and a geographic database 10218. Therefore, if the data from the different sources and databases were not integrated at the time an underwriting decision is made, such decision may be based on flawed assumptions.

Figure 103:
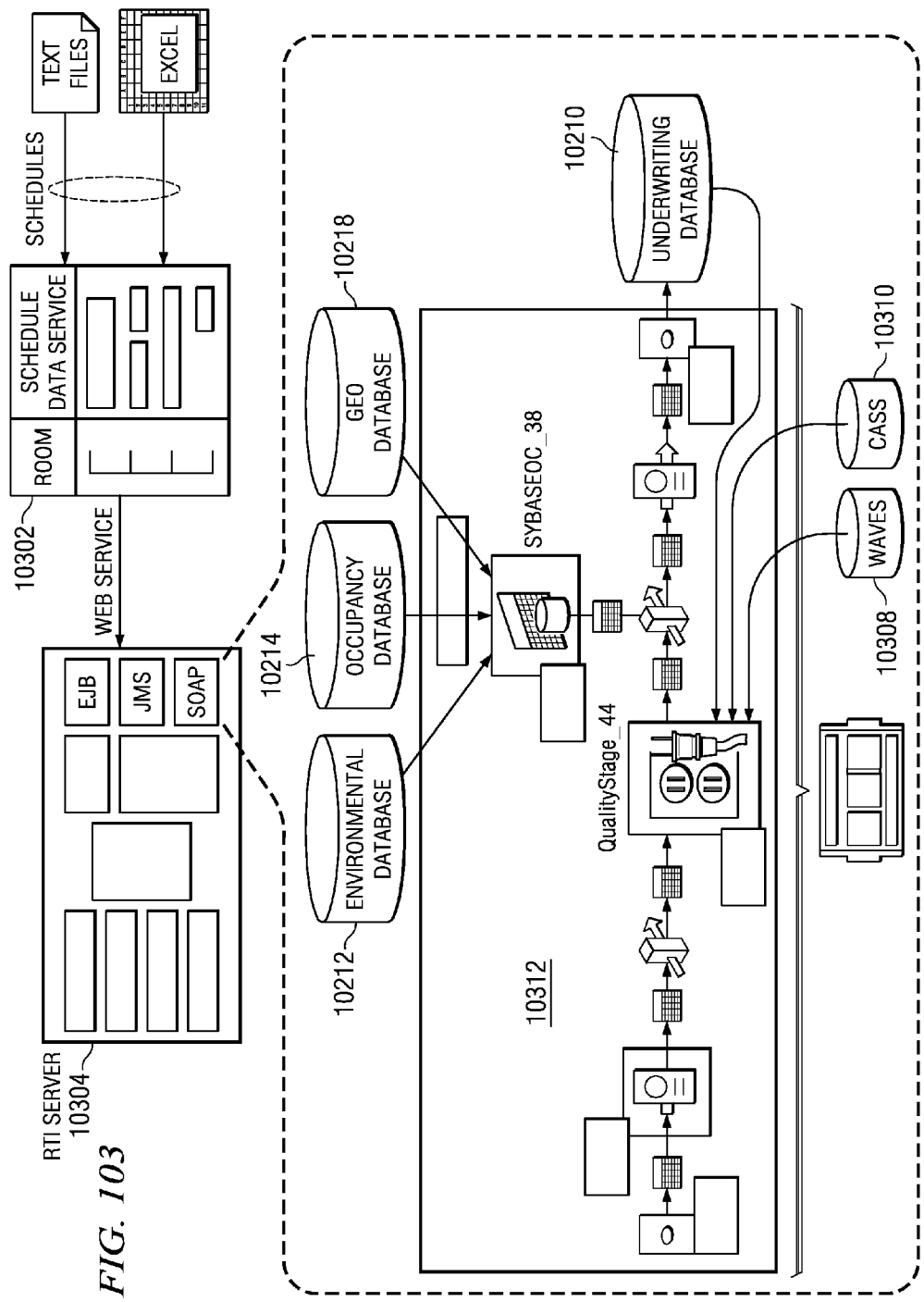
FIG. 103 shows details of the an RTI service of FIG. 102.

Conversely, as shown in FIG. 103, an RTI service can improve the quality of the underwriting decision by updating information almost instantaneously. The text files, spreadsheets, and web files can each be inputted to the RTI service running on an RTI server 10304, such as through a web interface 10302. The environmental database 10212, occupancy database 10214, and geographic database 10218, as well as the underwriting database 10210, can all be called by a data integration job 10312, which can include a CASS process 10310 and a Waves process 10308, such as embodied by Ascential Software's QualityStage product. The RTI service can include bindings for the protocols for each of those databases. The result is an integrated underwriting decision process that benefits from current information from all of the schedules, as well as the disparate databases, all enabled by the RTI service. For example, an RTI integration job can quickly provide current address information in an underwriting process by being able to quickly integrate thousands of addresses from disparate sources, for example in less than one minute.

Figure 104:
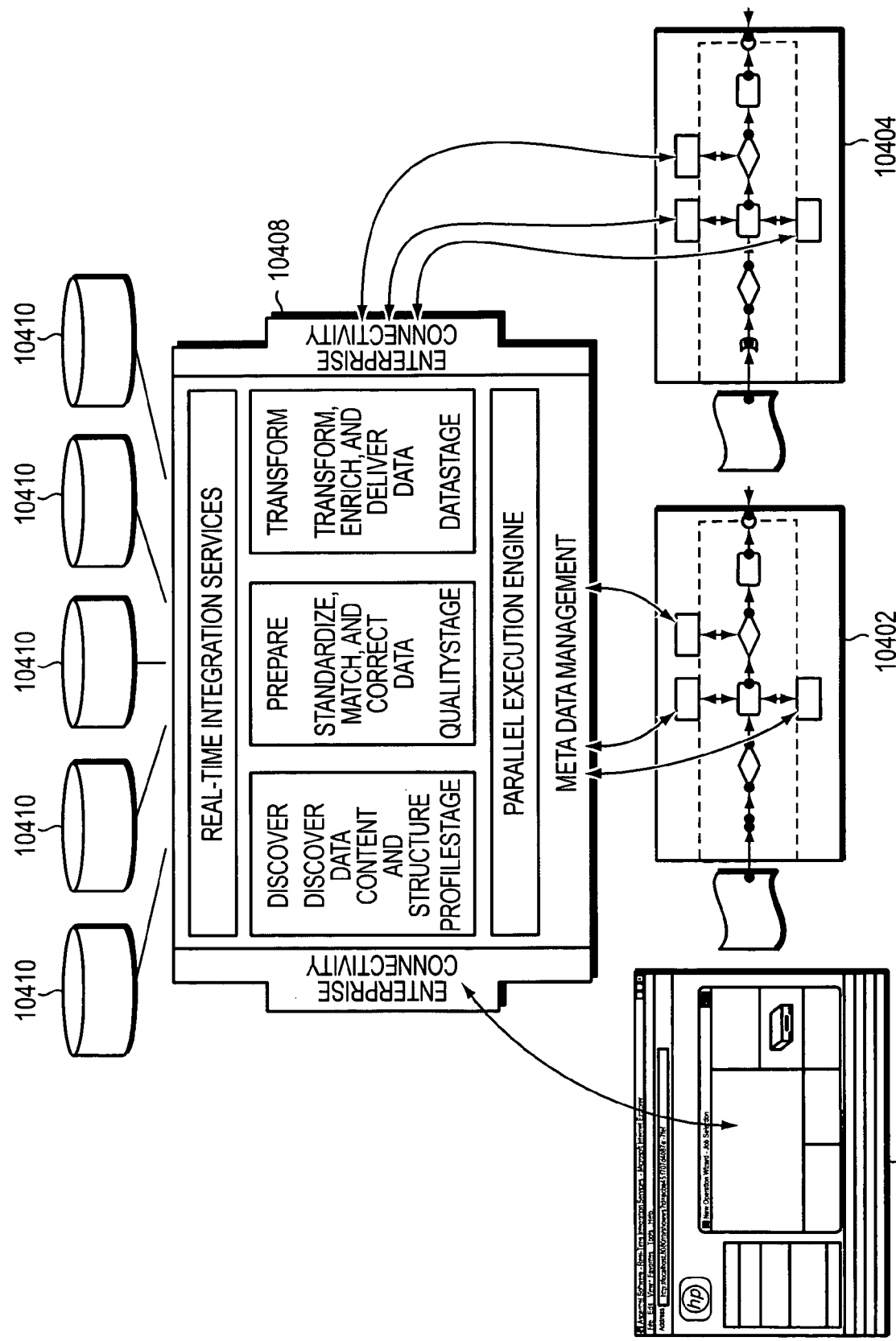
FIG. 104 an example of a business process for enterprise data services employing an RTI service.

Other business processes that benefit from the aforedescribed RTI services are enterprise data services. In particular, an RTI integration process can provide standard, consolidated data access and transformation services. The RTI integration process can provide virtual access to disparate data sources, both internal and external. The RTI integration process can provide on-the-fly data quality enrichment and transformation. The RTI integration process can also track all metadata passing through the process. Referring to FIG. 104, one or more RTI services 10402, 10404 can operate within the enterprise to provide data services. Each of the RTI services 10402, 10404 can support data integration jobs 10408. The data integration jobs 10408 can access databases 10410, which may be disparate data sources, with different native languages and protocols, both internal and external to the enterprise. An enterprise application 10412 can access the data integration jobs 10408 through the RTI services 10402, 10404.

Figure 105:
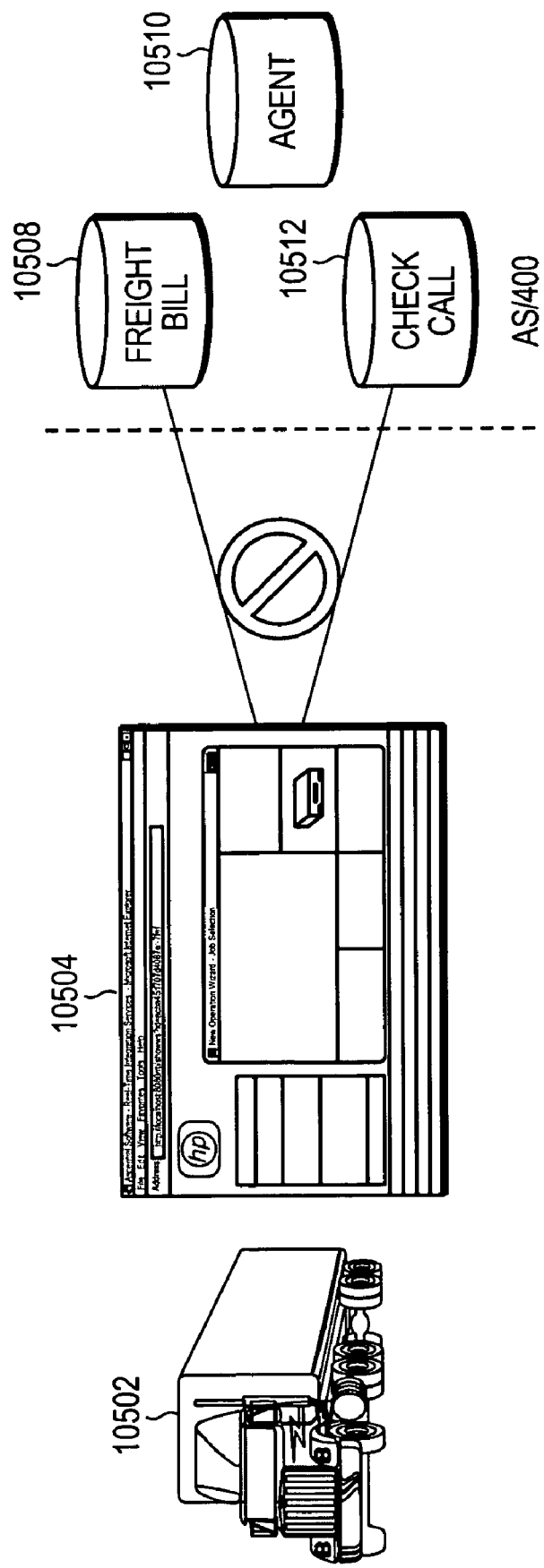
FIG. 105 shows an example of a trucking broker employing an RTI service.

Referring to FIG. 105, another business enterprise that can benefit from real time integration services is a distribution business, such as a trucking broker. The trucking broker handles a plurality of trucks 10502, which carry goods from one location to another. The trucks 10502 may have remote devices that run simple applications 10504, such as trip logs that allow the trucks 10502 to log in when the trucks 10502 leave or arrives at a location. Drivers of trucks 10502 often have mobile computing devices, for example devices that use a satellite global positioning system. The enterprise itself may have several computer applications or databases, such as a freight bill application 10508, an agent process 10510, and a check call application 10512. However, although these native applications may handle processes that can provide useful information to drivers, they are typically not coded to run on the mobile devices of the trucks 10502. For example, drivers may wish to be able to schedule trips, but the trip scheduling application may require data not resident on the mobile device of the trucks 10502, for example, information about other trips that have been completed.

Figure 106:
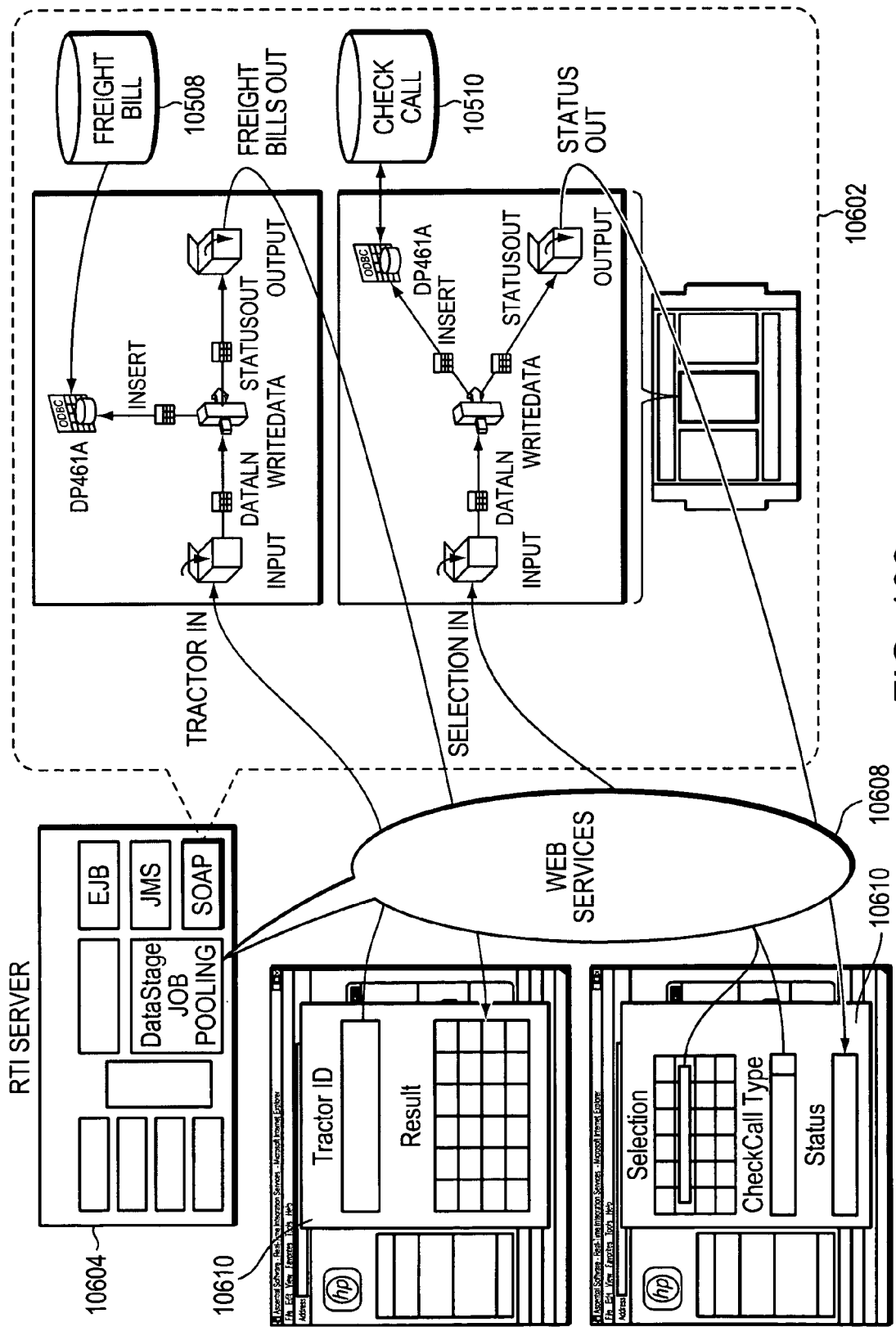
FIG. 106 shows details of the an RTI service of FIG. 105.

Referring to FIG. 106, when using an RTI service, a set of data integration services 10602 can be defined to support applications 10610 that a driver can access as web services, for example, by using a mobile computing device. For example, an application 10610 can allow the driver to update his schedule with data from the truck broker enterprise. The RTI server 10604 publishes data integration jobs from the data integration services 10602, which the applications 10610 access as web services 10608. The data integration services 10602 can integrate data from the enterprise, for example about other jobs already completed, including data from the freight bill application 10508, agent process, and check call application 10510. The RTI service thus acts as a smart graphical user interface for the driver's applications, such as a scheduling application. The driver can download the application to the mobile computing device to invoke the service. The RTI service thus advantageously provides the infrastructure for applications that use RTI services on mobile computing devices.

Data integration processes may invoked various ways. For example, in embodiments, a data integration process can be invoked by another process. In other embodiments, a data integration process may pull data off of a message bus and enrich the data through a data integration process. In embodiments, a data integration process can be invoked as a web service, passing data, such as XML data, in real time. In embodiments, a process may fire events to invoke a data integration process.

Another embodiment of the present invention is in connection with supply chain management, such as in inventory management and perishable goods distribution. For example, if a supply chain manager has a current picture of the current inventory levels in various retail store locations, the manager can direct further deliveries or partial shipments to the stores that have low inventory levels or high demand, resulting in a more efficient distribution of goods. Similarly, if a marketing manager has current information about the inventory levels in retail stores or warehouses and current information about demand (such as in different parts of the country) the manager can structure pricing, advertisements or promotions to account for that information, such as to lower prices on items for which demand is weak or for which inventory levels are unexpectedly high. Of course, these are simple examples, but in preferred embodiments managers can have access to a wide range of data sources that enable highly complex business decisions to be made in real time.

In another embodiment, an RTI service can also be employed in connection with manufacturing, where real time integration can facilitate quality control. For example, if defect analysis can be performed in real time, then corrections can be made in time to avoid manufacturing products using a defective process, thereby avoiding the costs of having to scrap or rebuild products.

In another embodiment, an RTI service can continuously update data residing in data warehouses in small increments, rather than in a batch mode.

In another embodiment, an RTI service can be managed in a registry that can be searched, or an already-written application using the protocol attached to the service can be added. For example, customer management operations, such as adding a customer, removing a customer, or validating a customer address can use or be attached to a known web service protocol. In embodiments, such customer management applications can be attached to an RTI service, where the application is a client of the RTI service. In other words, a predefined application can be attached to the RTI service where the application calls or uses the RTI service. The result is that the user can download a service on demand on a particular device and run it on the particular device that is using the application. For example, a mobile computing device, such as a pocket PC, may have a hosting environment running on it. The mobile computing device may have an application, such as one for mobile data integration services, with a number of downloaded applications and available applications. The mobile device may browse applications. When it downloads the application that is attached to an RTI service, the application is downloaded over the air to the mobile device, but it invokes the RTI service attached to it at the same time. As a result, the user can have mobile application deployment, while simultaneously having access to real time, integrated data from the enterprise. Thus, RTI services offer a highly effective model for mobile computing applications where an enterprise benefits from having the user have up-to-date data.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A computer-implemented method for real time integration of data residing in a plurality of data sources, the computer-implemented method comprising the steps of:
   receiving a request containing individual requests for real time integration of data into a pipeline of a computing facility by a real time integration agent of the computing facility;
   inserting an end of wave marker after each one of the individual requests in the pipeline to separate processing of the individual requests into distinct units;
   processing the individual requests in the request for the real time integration of data by a plurality of data integration platforms of the computing facility from the plurality of data sources using a real time integration input stage until the end of wave marker is encountered, wherein the plurality of data integration platforms are waiting to process the request, wherein the request is processed when received by the plurality of data integration platforms, wherein processing the request includes a discover data stage to query the plurality of data sources to form extracted data;
   receiving the extracted data, from the plurality of data sources, to form received data;
   integrating the received data, in real time, using a set of stages including metadata management, a preparation stage, and a transform stage to form at least one real time integrated data output configured for at least one data target wherein the preparation stage includes a cleaning process to form cleansed data, the transform stage receives the cleansed data for transformation into a desired format selected from a plurality of formats to form transformed data and includes an aggregation process for the cleansed data and the transformed data; and
   presenting the at least one integrated real time data output to a user in real time as a service.

2. The computer-implemented method of claim 1, wherein the service is accessed through a web service protocol.

3. The computer-implemented method of claim 1, wherein real time integration of the data supports data integration job instances, wherein a job instance is capable of supporting one of a batch topology, a real time topology, or the batch topology and the real time topology.

4. The computer-implemented method of claim 3, further comprising pipelining a series of data integration transactions for delivery to the job instance.

5. The computer-implemented method of claim 1, wherein real time integration of the data includes communicating with at least one other data source, wherein the at least one other data source comprises a location selected from a group consisting of a first location where data is handled, a second location where data is stored, and a third location where other information is stored.

6. The computer-implemented method of claim 1, wherein processing the request for data results in a data request, and wherein real time integration includes processing the data request through a plurality of processing facilities.

7. The computer-implemented method of claim 6, wherein the plurality of processing facilities processes the data request concurrently.

8. The computer-implemented method of claim 1, wherein receiving the extracted data from the plurality of data sources is intermittent.

9. The computer-implemented method of claim 8, wherein receiving the extracted data comprises intermittent reception, and wherein the intermittent reception occurs via a wireless communication channel.

10. The computer-implemented method of claim 1, wherein the plurality of data sources comprise one of a data warehouse, a data retrieval system, or the data warehouse and the data retrieval system.

11. The computer-implemented method of claim 1, further comprising receiving the extracted data from a facility selected from a group consisting of a mobile computing facility, a desktop computing facility, and a central computing facility.

12. The computer-implemented method of claim 6, wherein at least one of the plurality of processing facilities comprises at least one remotely located processing facility.

13. The computer-implemented method of claim 12, wherein the at least one remotely located processing facility comprises a server.

14. The computer-implemented method of claim 1, wherein the plurality of data sources contains data from different sources.

15. The computer-implemented method of claim 14, wherein at least one of the different sources comprises data that is incompatible with real time integration.

16. The computer-implemented method of claim 1, wherein presenting the at least one integrated data output as the service comprises publishing the service as a web service.

17. The computer-implemented method of claim 1 wherein the service is defined by a Web Services Description Language description.

18. The computer-implemented method of claim 1, wherein the service is published in a public registry.

19. The computer-implemented method of claim 1, wherein the service is published in a private registry.

20. The computer-implemented method of claim 1, wherein the service is bound by a multiple of program access protocols.

21. The computer-implemented method of claim 1, wherein the user is one of an enterprise device or an enterprise application.

22. The computer-implemented method of claim 21, wherein the enterprise application is a distribution process.

23. The computer-implemented method of claim 21, wherein the enterprise application is a manufacturing process.

24. The computer-implemented method of claim 21, wherein the enterprise application is a financial process.

25. The computer-implemented method of claim 1, further comprising attaching a client application to the service.

26. The computer-implemented method of claim 25, further comprising downloading the client application to a client.

27. The computer-implemented method of claim 26, wherein the client is a mobile computing device.

28. An apparatus for real time integration of data residing in a plurality of data sources, the apparatus comprising:
a computer storage facility containing computer programs stored therein for execution on a computing facility;
a computing facility connected to the computer storage facility wherein the computing facility executes the computer programs to direct the apparatus to:
receive a request containing individual requests for real time integration of data into a pipeline of the computing facility by a real time integration agent of the computing facility;
insert an end of wave marker after each one of the individual requests in the pipeline to separate processing of the individual requests into distinct units;
process the individual requests in the request for the real time integration of data by a plurality of data integration platforms of the apparatus from the plurality of data sources using a real time integration input stage until the end of wave marker is encountered, wherein the plurality of data integration platforms are waiting to process the request, wherein the request is processed when received by the plurality of data integration platforms, and wherein processing the request includes a discover data stage to query the plurality of data sources to form extracted data;
receive the extracted data, from the plurality of data sources, to form received data;
integrate the received data, in real time, using a set of stages including metadata management, a preparation stage, and a transform stage to form at least one real time integrated data output configured for at least one data target wherein the preparation stage includes a cleaning process to form cleansed data, the transform stage receives the cleansed data for transformation into a desired format selected from a plurality of formats to form transformed data and includes an aggregation process for the cleansed data and the transformed data; and
present the at least one integrated real time data output to a user in real time as a service.

29. The apparatus of claim 28, wherein the service is accessed through a web service protocol.

30. The apparatus of claim 28, wherein the apparatus supports data integration job instances, wherein a job instance is capable of supporting one of a batch topology, a real time topology, or the batch topology and the real time topology.

31. The apparatus of claim 30, further comprising a pipeline facility for managing delivery of a series of data integration transactions to a data integration platform.

32. The apparatus of claim 29, wherein the computing facility communicates with at least one other computing facility, wherein the at least one other computing facility comprises a location selected from a group consisting of a first facility where data is handled, a second facility where data is stored, and a third facility where other information is stored.

33. The apparatus of claim 28, further comprising a plurality of processing facilities, wherein the computing facility processes the request through a plurality of processing facilities.

34. The apparatus of claim 33, wherein the plurality of processing facilities processes the request concurrently.

35. The apparatus of claim 28, wherein communication between the apparatus and the plurality of data sources is intermittent.

36. The apparatus of claim 35, wherein communication comprises a wireless communication channel.

37. The apparatus of claim 28, wherein the plurality of data sources comprise one of a data warehouse, a data retrieval system, or the data warehouse and the data retrieval system.

38. The apparatus of claim 28, wherein the request is generated on a facility selected from a group comprising a mobile computing facility, a desktop computing facility, and a central computing facility.

39. The apparatus of claim 33, wherein at least one of the plurality of processing facilities comprises at least one remotely located processing facility.

40. The apparatus of claim 39, wherein the at least one remotely located processing facility comprises a server.

41. The apparatus of claim 28, wherein the plurality of data sources contains data from different sources.

42. The apparatus of claim 41, wherein at least one of the different sources comprises data that is incompatible with processing by a data integration facility.

43. The apparatus of claim 28, wherein the real time integration agent publishes the service as a web service.

44. The apparatus of claim 28 wherein the service is defined by a Web Services Description Language description.

45. The apparatus of claim 28, wherein the service is published in a public registry.

46. The apparatus of claim 28, wherein the service is published in a private registry.

47. The apparatus of claim 28, wherein the service is bound by a multiple of program access protocols.

48. The apparatus of claim 28, wherein an application is a distribution process.

49. The apparatus of claim 28, wherein an application is a manufacturing process.

50. The method of claim 1, wherein the plurality of data integration platforms are a plurality of data integration job instances and further comprising:
prior to processing the individual requests in the request, passing the request and the end of wave marker to a data integration job instance in the plurality of data integration job instances.

51. The method of claim 1, further comprising:
identifying, by the real time integration agent, whether a delay in processing the request is greater than a specified amount; and
responsive to a determination that the delay in processing the request is greater than the specified amount, starting a new instance of the data integration platform without an instance start delay.

52. The method of claim 1, wherein the receiving and integrating steps are performed responsive to encountering the end of wave marker while processing the request.

53. The method of claim 1, wherein the plurality of data integration platforms waiting to process the request comprises the plurality of data integration platforms running and maintaining connections to the plurality of data sources prior to the request being received by the real time integration agent.

* * * * *

UNITED STATES PATENT AND TRADEMARK OFFICE
Certificate

Patent No. 8,307,109 B2                        Patented: November 6, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jean-Claude Mamou, Millbury, MA (US); Thomas Cherel, Saint-Eustache (FR); Brian Tinnel, North Grafton, MA (US); Christophe Toum, Carrieres sous Poissy (FR); Cassio Dos Santos, Boston, MA (US); David T. Meeks, Ashland, MA (US); Lee Scheffler, West Newton, MA (US); and Michael J. Beckerle, Needham, MA (US).

Signed and Sealed this Eighteenth Day of November 2014.

KRISTA M. ZELE
*Supervisory Patent Examiner*
Art Unit 2453
Technology Center 2400